US012632667B2

(12) United States Patent (10) Patent No.: US 12,632,667 B2
Zass et al. (45) Date of Patent: May 19, 2026

(54) ANALYZING OBJECTS DATA TO GENERATE A TEXTUAL CONTENT REPORTING EVENTS

(71) Applicants:Ron Zass, Kiryat Tivon (IL); Ben Avi Ingel, Binyamina (IL)

(72) Inventors: Ron Zass, Kiryat Tivon (IL); Ben Avi Ingel, Binyamina (IL)

( * ) Notice: Subject to any disclaimer, the term of this patent is extended or adjusted under 35 U.S.C. 154(b) by 476 days.

(21) Appl. No.: 17/976,808

(22) Filed: Oct. 30, 2022

(65) Prior Publication Data

US 2023/0052442 A1 Feb. 16, 2023

Related U.S. Application Data

(60) Provisional application No. 63/420,413, filed on Oct. 28, 2022, provisional application No. 63/273,938, filed on Oct. 31, 2021.

(51) Int. Cl.
*G06F 40/40* (2020.01)
*G06F 16/68* (2019.01)
(Continued)

(52) U.S. Cl.
CPC ............ *G06F 40/40* (2020.01); *G06F 16/685* (2019.01); *G06F 16/686* (2019.01); *G06F 40/253* (2020.01); *G06F 40/30* (2020.01); *G06F 40/56* (2020.01); *G06V 10/82* (2022.01); *G06V 20/41* (2022.01); *G06V 20/44* (2022.01); *G06V 20/50* (2022.01); *G06V 20/52* (2022.01);
(Continued)

(58) Field of Classification Search
CPC ...... G06F 40/40; G06F 16/685; G06F 16/686; G06F 40/253; G06F 40/56; G06F 40/30; G06V 20/70; G06V 20/52; G06V 10/82; G06V 20/41; G06V 20/50; G06V 20/44; G10L 15/26; G10L 25/51
See application file for complete search history.

(56) References Cited

U.S. PATENT DOCUMENTS 4,305,131 A 12/1981 Best
6,077,085 A 6/2000 Parry
(Continued)

OTHER PUBLICATIONS

Pang et al., Human Action Adverb Recognition: ADHA Dataset and a Three-Stream Hybrid Model, 2018, arXiv, whole document (Year: 2018).*
(Continued)

*Primary Examiner* — Sonia L Gay

(57) ABSTRACT

Systems, methods and non-transitory computer readable media for analyzing objects data to generate a textual content reporting events are provided. An indication of an event may be received. An indication of a group of one or more objects associated with the event may be received. For each object of the group of one or more objects, data associated with the object may be received. The data associated with the group of one or more objects may be analyzed to select an adjective. A particular description of the event may be generated. The particular description may be based on the group of one or more objects. The particular description may include the selected adjective. A textual content may be generated. The textual content may include the particular description. The generated textual content may be provided.

21 Claims, 24 Drawing Sheets

(51) Int. Cl.

| | |
|---|---|
| *G06F 16/683* | (2019.01) |
| *G06F 40/253* | (2020.01) |
| *G06F 40/30* | (2020.01) |
| *G06F 40/56* | (2020.01) |
| *G06V 10/82* | (2022.01) |
| *G06V 20/40* | (2022.01) |
| *G06V 20/50* | (2022.01) |
| *G06V 20/52* | (2022.01) |
| *G06V 20/70* | (2022.01) |
| *G10L 15/26* | (2006.01) |
| *G10L 25/51* | (2013.01) |

(52) U.S. Cl.
CPC .............. *G06V 20/70* (2022.01); *G10L 15/26* (2013.01); *G10L 25/51* (2013.01)

(56) References Cited

U.S. PATENT DOCUMENTS

| | | | |
|---|---|---|---|
| 6,778,252 | B2 | 8/2004 | Moulton et al. |
| 7,568,148 | B1 | 7/2009 | Bharat et al. |
| 8,140,322 | B2 | 3/2012 | Simonsen et al. |
| 9,280,973 | B1 | 3/2016 | Soyannwo et al. |
| 9,747,282 | B1 | 8/2017 | Baker et al. |
| 9,864,933 | B1 | 1/2018 | Cosic |
| 9,881,077 | B1 | 1/2018 | Alfonseca et al. |
| 10,360,716 | B1 | 7/2019 | van der Meulen et al. |
| 10,423,999 | B1 | 9/2019 | Doctor |
| 10,467,792 | B1 | 11/2019 | Roche |
| 10,607,134 | B1 | 3/2020 | Cosic |
| 10,827,024 | B1 | 11/2020 | Schissel et al. |
| 11,024,194 | B1 | 6/2021 | Beigman Klebanov |
| 11,140,459 | B2 | 10/2021 | Ingel |
| 11,159,597 | B2 | 10/2021 | Ingel |
| 11,202,131 | B2 | 12/2021 | Zass |
| 11,232,645 | B1 | 1/2022 | Roche et al. |
| 11,244,385 | B1 | 2/2022 | Fraser |
| 11,336,935 | B1 * | 5/2022 | Wu ......................... G06V 20/42 |
| 11,520,079 | B2 | 12/2022 | Zass |
| 11,966,688 | B1 | 4/2024 | Ehrlich |
| 2002/0087317 | A1 | 7/2002 | Lee et al. |
| 2002/0161578 | A1 | 10/2002 | Saindon et al. |
| 2002/0161579 | A1 | 10/2002 | Saindon et al. |
| 2004/0068410 | A1 | 4/2004 | Mohamed et al. |
| 2004/0172257 | A1 | 9/2004 | Liqin et al. |
| 2004/0186712 | A1 | 9/2004 | Coles et al. |
| 2005/0255431 | A1 | 11/2005 | Baker |
| 2005/0272013 | A1 | 12/2005 | Knight |
| 2006/0285654 | A1 | 12/2006 | Nesvadba et al. |
| 2007/0124166 | A1 | 5/2007 | Van Luchene |
| 2007/0130529 | A1 | 6/2007 | Shrubsole |
| 2007/0208569 | A1 | 9/2007 | Subramanian et al. |
| 2007/0220575 | A1 | 9/2007 | Cooper et al. |
| 2008/0015968 | A1 | 1/2008 | Van Luchene et al. |
| 2008/0195386 | A1 | 8/2008 | Proidl |
| 2008/0295130 | A1 | 11/2008 | Worthen |
| 2009/0037179 | A1 | 2/2009 | Liu et al. |
| 2009/0175596 | A1 | 7/2009 | Hirai |
| 2010/0082326 | A1 | 4/2010 | Bangalore |
| 2010/0100907 | A1 | 4/2010 | Chang |
| 2010/0238179 | A1 | 9/2010 | Kelly |
| 2011/0064388 | A1 | 3/2011 | Brown et al. |
| 2011/0076992 | A1 | 3/2011 | Chou |
| 2012/0054619 | A1 | 3/2012 | Spooner et al. |
| 2013/0038737 | A1 | 2/2013 | Yehezkel et al. |
| 2013/0110513 | A1 | 5/2013 | Jhunja et al. |
| 2013/0188862 | A1 | 7/2013 | Lievens |
| 2014/0088961 | A1 * | 3/2014 | Woodward ............. G10L 15/22 704/235 |
| 2014/0142918 | A1 | 5/2014 | Dotterer et al. |
| 2014/0164507 | A1 | 6/2014 | Tesch et al. |
| 2014/0303958 | A1 | 10/2014 | Lee et al. |
| 2014/0358518 | A1 | 12/2014 | Wu et al. |
| 2015/0092007 | A1 | 4/2015 | Koborita et al. |
| 2015/0319518 | A1 | 11/2015 | Wilson |
| 2015/0356967 | A1 | 12/2015 | Byron et al. |
| 2016/0005436 | A1 | 1/2016 | Axen et al. |
| 2016/0021334 | A1 | 1/2016 | Rossano et al. |
| 2016/0042766 | A1 | 2/2016 | Kummer |
| 2016/0049146 | A1 | 2/2016 | Chang |
| 2016/0132578 | A1 | 5/2016 | Allen |
| 2016/0232241 | A1 | 8/2016 | Stoyanov et al. |
| 2016/0254795 | A1 | 9/2016 | Ballard |
| 2016/0328391 | A1 | 11/2016 | Choi |
| 2016/0365087 | A1 | 12/2016 | Freud |
| 2017/0004820 | A1 | 1/2017 | Lv et al. |
| 2017/0011745 | A1 | 1/2017 | Navaratnam |
| 2017/0031548 | A1 | 2/2017 | Dellinger et al. |
| 2017/0075877 | A1 | 3/2017 | Lepeltier |
| 2017/0076749 | A1 | 3/2017 | Kanevsky |
| 2017/0235820 | A1 | 8/2017 | Conrad et al. |
| 2017/0255616 | A1 | 9/2017 | Yun et al. |
| 2017/0262697 | A1 | 9/2017 | Kaps et al. |
| 2018/0101594 | A1 | 4/2018 | Chakerian et al. |
| 2018/0121555 | A1 | 5/2018 | Li et al. |
| 2018/0143809 | A1 | 5/2018 | Zang et al. |
| 2018/0174577 | A1 | 6/2018 | Jothilingam et al. |
| 2018/0174595 | A1 | 6/2018 | Dirac et al. |
| 2018/0253992 | A1 | 9/2018 | Koul et al. |
| 2018/0260448 | A1 | 9/2018 | Osotio et al. |
| 2018/0322875 | A1 | 11/2018 | Adachi |
| 2018/0357215 | A1 | 12/2018 | Austin et al. |
| 2018/0374461 | A1 | 12/2018 | Serletic |
| 2019/0065478 | A1 | 2/2019 | Tsujikawa et al. |
| 2019/0114302 | A1 | 4/2019 | Bequet |
| 2019/0164533 | A1 | 5/2019 | Lawrenson et al. |
| 2019/0166176 | A1 | 5/2019 | Jain et al. |
| 2019/0197315 | A1 * | 6/2019 | Zhang .................... G06V 20/47 |
| 2019/0250891 | A1 | 8/2019 | Kumar et al. |
| 2019/0317739 | A1 | 10/2019 | Turek et al. |
| 2019/0354592 | A1 | 11/2019 | Musham et al. |
| 2020/0005796 | A1 | 1/2020 | Ziv et al. |
| 2020/0007946 | A1 | 1/2020 | Olkha |
| 2020/0042601 | A1 | 2/2020 | Doggett |
| 2020/0043112 | A1 | 2/2020 | Brinkley, II |
| 2020/0051566 | A1 | 2/2020 | Shin |
| 2020/0058289 | A1 | 2/2020 | Gabryjelski et al. |
| 2020/0066304 | A1 | 2/2020 | Chen |
| 2020/0104368 | A1 * | 4/2020 | Jacobson ............... G06N 20/00 |
| 2020/0104369 | A1 * | 4/2020 | Bellegarda ............. G06F 40/30 |
| 2020/0105245 | A1 | 4/2020 | Gupta |
| 2020/0111474 | A1 | 4/2020 | Kumar et al. |
| 2020/0143813 | A1 | 5/2020 | Nakagawa |
| 2020/0150981 | A1 | 5/2020 | Westberg et al. |
| 2020/0159862 | A1 | 5/2020 | Kleiner et al. |
| 2020/0174776 | A1 | 6/2020 | Vinod et al. |
| 2020/0221176 | A1 | 7/2020 | Hwang et al. |
| 2020/0296510 | A1 | 9/2020 | Li et al. |
| 2020/0311120 | A1 | 10/2020 | Zhao et al. |
| 2021/0019373 | A1 | 1/2021 | Freitag |
| 2021/0042110 | A1 | 2/2021 | Basyrov et al. |
| 2021/0042341 | A1 | 2/2021 | Miller et al. |
| 2021/0063363 | A1 | 3/2021 | Kaminski et al. |
| 2021/0081101 | A1 | 3/2021 | Speare et al. |
| 2021/0097976 | A1 | 4/2021 | Chicote et al. |
| 2021/0103626 | A1 | 4/2021 | Jolly et al. |
| 2021/0182468 | A1 | 6/2021 | Co et al. |
| 2021/0192824 | A1 | 6/2021 | Chen |
| 2021/0224319 | A1 | 7/2021 | Ingel |
| 2021/0225365 | A1 | 7/2021 | Sinha et al. |
| 2021/0232759 | A1 | 7/2021 | Schick et al. |
| 2021/0271815 | A1 | 9/2021 | Li et al. |
| 2021/0271862 | A1 * | 9/2021 | Ji ......................... G06V 10/764 |
| 2021/0303318 | A1 | 9/2021 | Raghavan |
| 2021/0312122 | A1 * | 10/2021 | O'Donncha ............ G06F 40/30 |
| 2021/0313052 | A1 | 10/2021 | Makrinich et al. |
| 2021/0397418 | A1 | 12/2021 | Nikumb et al. |
| 2021/0400101 | A1 | 12/2021 | Ingel |
| 2022/0046052 | A1 | 2/2022 | Coates et al. |
| 2022/0070550 | A1 | 3/2022 | Ingel |
| 2022/0132179 | A1 * | 4/2022 | Bennett-James ...... G06V 10/70 |
| 2022/0188564 | A1 * | 6/2022 | Gudimetla .......... G06F 18/2178 |
| 2022/0318488 | A1 | 10/2022 | Ray |

(56) References Cited

U.S. PATENT DOCUMENTS

| | | |
|---|---|---|
| 2022/0382524 A1 | 12/2022 | Ansari et al. |
| 2023/0095089 A1 | 3/2023 | Kaliyaperumal et al. |
| 2023/0115185 A1 | 4/2023 | Huang et al. |
| 2023/0252224 A1 | 8/2023 | Tran |
| 2024/0220521 A1 | 7/2024 | Ehrlich |
| 2024/0220714 A1 | 7/2024 | Ehrlich |

OTHER PUBLICATIONS

Chen, Generating Video Descriptions With Latent Topic Guidance, 2019, IEEE, whole document (Year: 2019).*

Wang, Keep it Consistent Topic-Aware Storytelling from an Image Stream via Iterative Multi-agent Communication, 2020, arXiv, whole document (Year: 202).*

Alsaedi, Burnap, and Rana, "Sensing real-world events using social media data and a classification-clustering framework", Oct. 2016, IEEE/WIC/ACM International Conference on Web Intelligence (WI) 2016, pp. 216-223.

Mckeown, Robin, and Kukich, "Generating concise natural language summaries", Sep. 1995, Information Processing & Management vol. 31 No. 5 (1995), pp. 703-733.

Jai-Andaloussi, Mourabit, Madrane, Chaouni, and Sekkaki, "Soccer events summarization by using sentiment analysis", Dec. 2015, International Conference on Computational Science and Computational Intelligence (CSCI) 2015, pp. 398-403.

Chen, Ding, Zheng, Qin, Huang, and Shah, "A history and theory of textual event detection and recognition", Nov. 2020 IEEE Access vol. 8, pp. 201371-201392.

Moutidis, and Williams, "Complex networks for event detection in heterogeneous high volume news streams", May 2020, arXiv preprint arXiv:2005.13751 (2020), pp. 1-9.

Wang, and Zhang, "A Neural Model for Joint Event Detection and Summarization", Aug. 2017, IJCAI 2017, pp. 4158-4164.

De Smet, and Moens, "An aspect based document representation for event clustering", Jan. 2009, Proceedings of the 19th Meeting of Computational Linguistics in the Netherlands 2009, pp. 55-68.

Xie, Sundaram, and Campbell, "Event mining in multimedia streams", Apr. 2008, Proceedings of the IEEE vol. 96 No. 4 (2008), pp. 623-647.

* cited by examiner

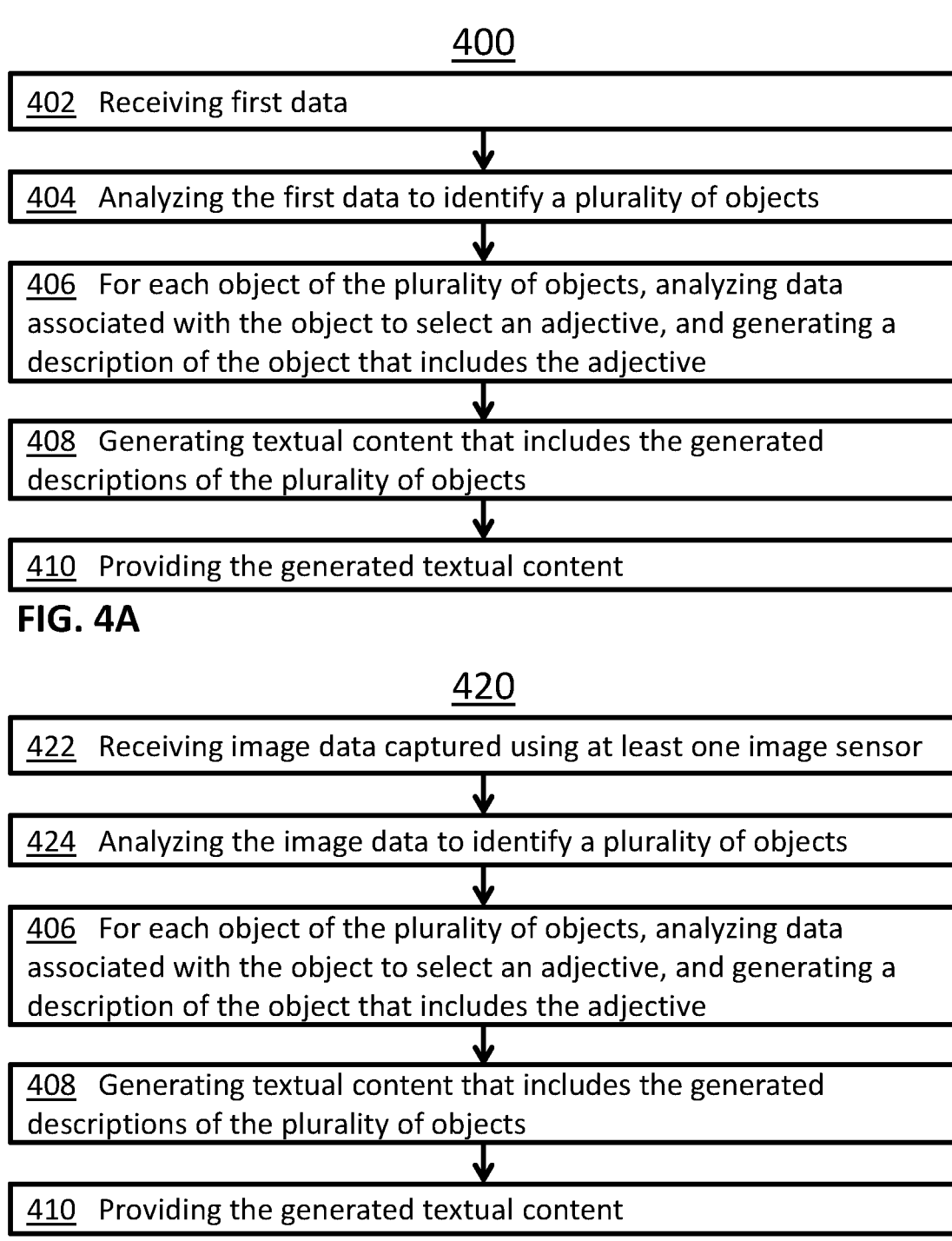

400

| | |
|---|---|
| 402 | Receiving first data |

↓

| | |
|---|---|
| 404 | Analyzing the first data to identify a plurality of objects |

↓

| | |
|---|---|
| 406 | For each object of the plurality of objects, analyzing data associated with the object to select an adjective, and generating a description of the object that includes the adjective |

↓

| | |
|---|---|
| 408 | Generating textual content that includes the generated descriptions of the plurality of objects |

↓

| | |
|---|---|
| 410 | Providing the generated textual content |

| | |
|---|---|
| 422 | Receiving image data captured using at least one image sensor |

↓

| | |
|---|---|
| 424 | Analyzing the image data to identify a plurality of objects |

↓

| | |
|---|---|
| 406 | For each object of the plurality of objects, analyzing data associated with the object to select an adjective, and generating a description of the object that includes the adjective |

↓

| | |
|---|---|
| 408 | Generating textual content that includes the generated descriptions of the plurality of objects |

↓

| | |
|---|---|
| 410 | Providing the generated textual content |

| 442   Receiving audio data captured using at least one audio sensor |

↓

| 444   Analyzing the audio data to identify a plurality of objects |

↓

| 406   For each object of the plurality of objects, analyzing data associated with the object to select an adjective, and generating a description of the object that includes the adjective |

↓

| 408   Generating textual content that includes the generated descriptions of the plurality of objects |

↓

| 410   Providing the generated textual content |

| 402   Receiving first data |

↓

| 454   Analyzing the first data to identify a plurality of events |

↓

| 456   For each event of the plurality of events, analyzing data associated with the event to select an adjective, and generating a description of the event that includes the adjective |

↓

| 458   Generating textual content that includes the generated descriptions of the plurality of events |

↓

| 410   Providing the generated textual content |

Figures 4E, 4F:
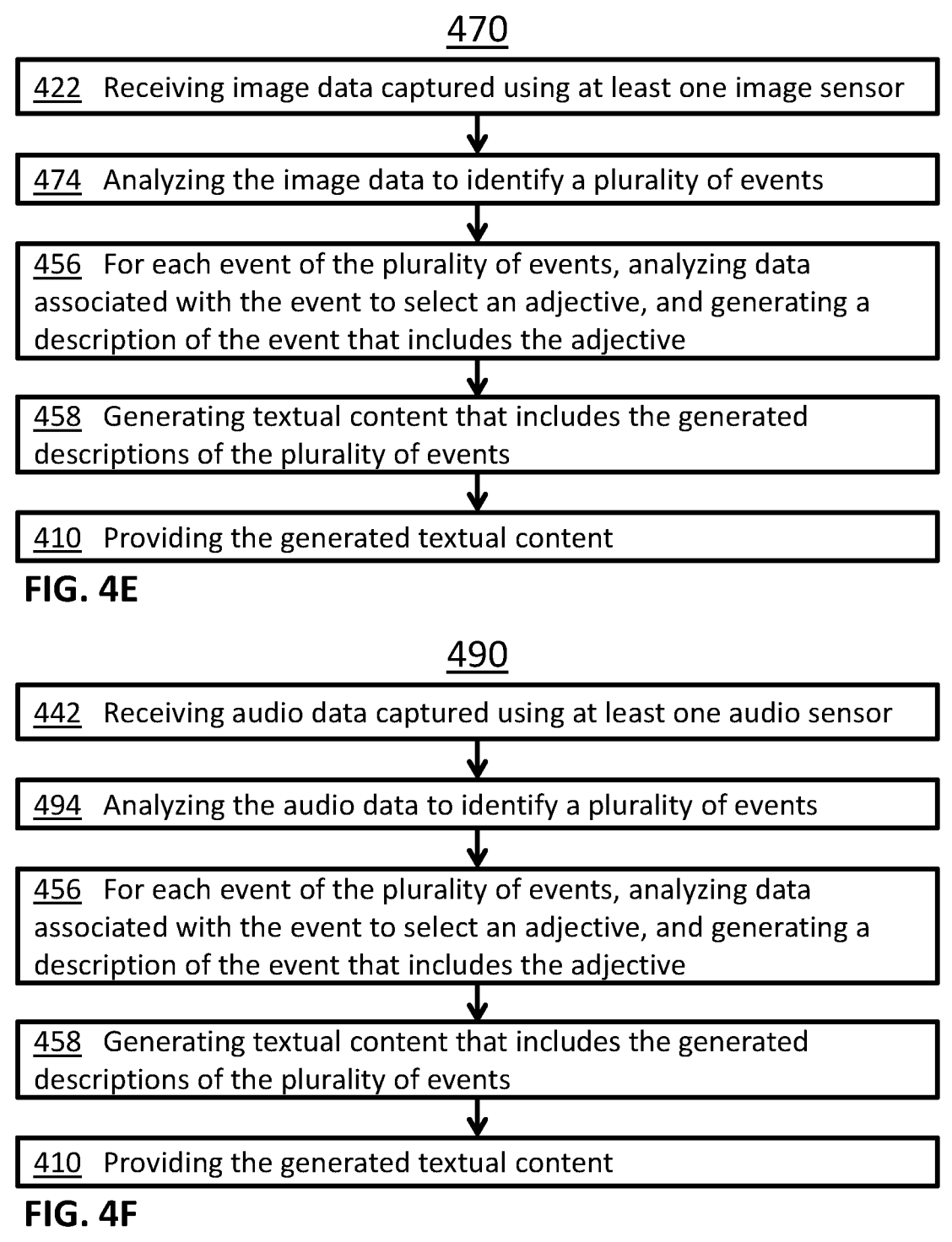

| 422   Receiving image data captured using at least one image sensor |

↓

| 474   Analyzing the image data to identify a plurality of events |

↓

| 456   For each event of the plurality of events, analyzing data associated with the event to select an adjective, and generating a description of the event that includes the adjective |

↓

| 458   Generating textual content that includes the generated descriptions of the plurality of events |

↓

| 410   Providing the generated textual content |

| 442   Receiving audio data captured using at least one audio sensor |

↓

| 494   Analyzing the audio data to identify a plurality of events |

↓

| 456   For each event of the plurality of events, analyzing data associated with the event to select an adjective, and generating a description of the event that includes the adjective |

↓

| 458   Generating textual content that includes the generated descriptions of the plurality of events |

↓

| 410   Providing the generated textual content |

Figure 5A:
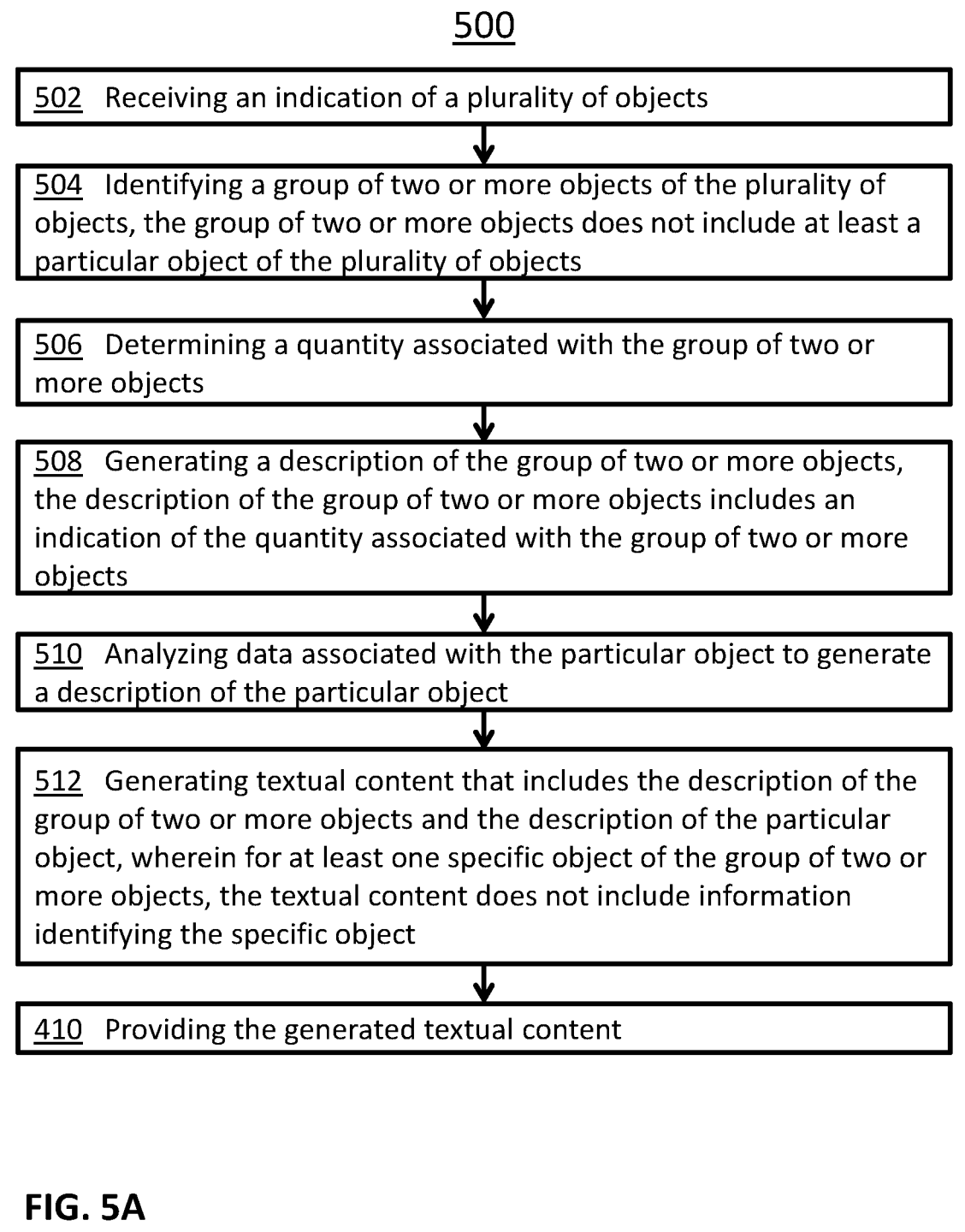

| 502  Receiving an indication of a plurality of objects |

↓

| 504  Identifying a group of two or more objects of the plurality of objects, the group of two or more objects does not include at least a particular object of the plurality of objects |

↓

| 506  Determining a quantity associated with the group of two or more objects |

↓

| 508  Generating a description of the group of two or more objects, the description of the group of two or more objects includes an indication of the quantity associated with the group of two or more objects |

↓

| 510  Analyzing data associated with the particular object to generate a description of the particular object |

↓

| 512  Generating textual content that includes the description of the group of two or more objects and the description of the particular object, wherein for at least one specific object of the group of two or more objects, the textual content does not include information identifying the specific object |

↓

| 410  Providing the generated textual content |

Figure 5B:
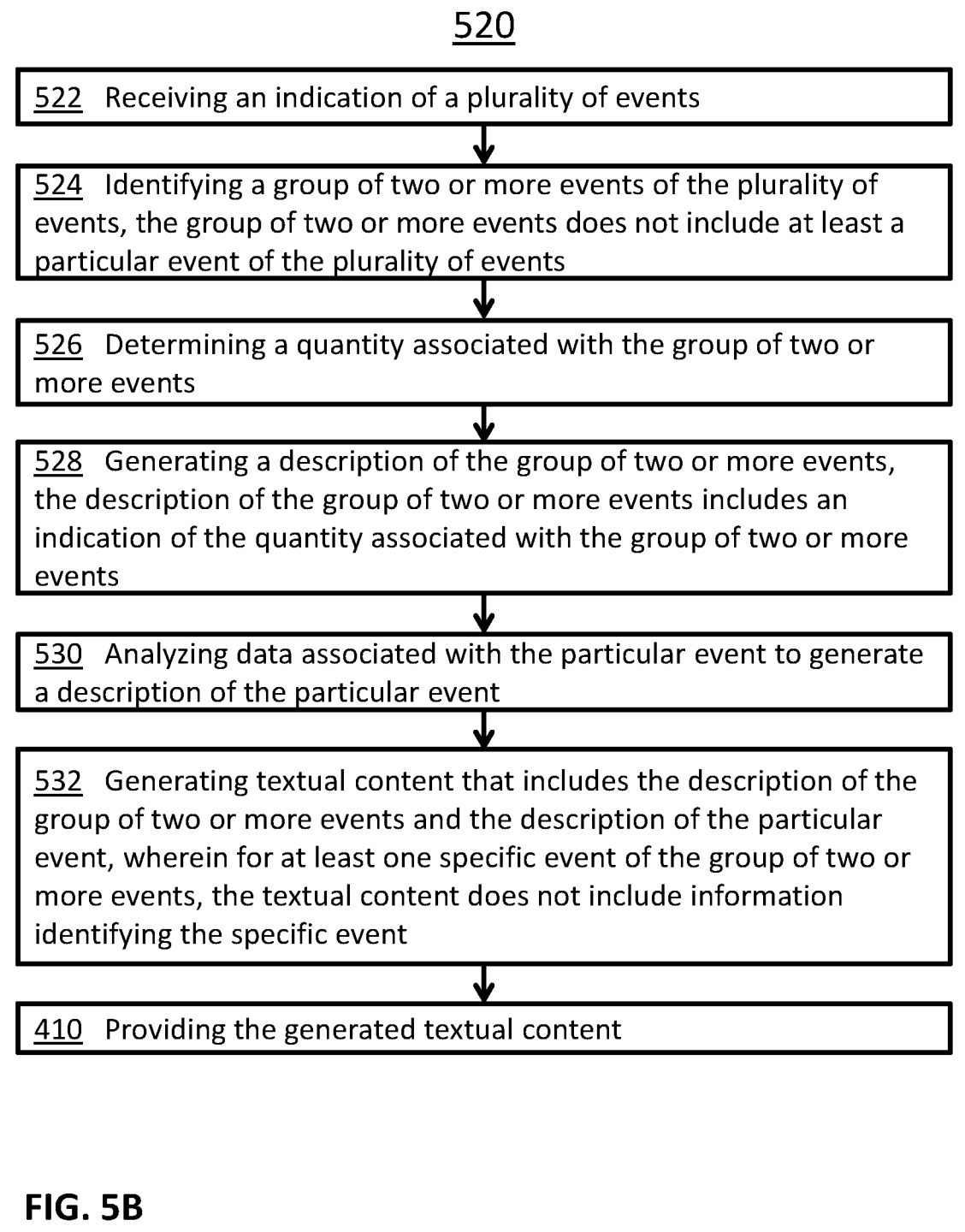

| 522   Receiving an indication of a plurality of events |

| 524   Identifying a group of two or more events of the plurality of events, the group of two or more events does not include at least a particular event of the plurality of events |

| 526   Determining a quantity associated with the group of two or more events |

| 528   Generating a description of the group of two or more events, the description of the group of two or more events includes an indication of the quantity associated with the group of two or more events |

| 530   Analyzing data associated with the particular event to generate a description of the particular event |

| 532   Generating textual content that includes the description of the group of two or more events and the description of the particular event, wherein for at least one specific event of the group of two or more events, the textual content does not include information identifying the specific event |

| 410   Providing the generated textual content |

Figures 5C, 5D:
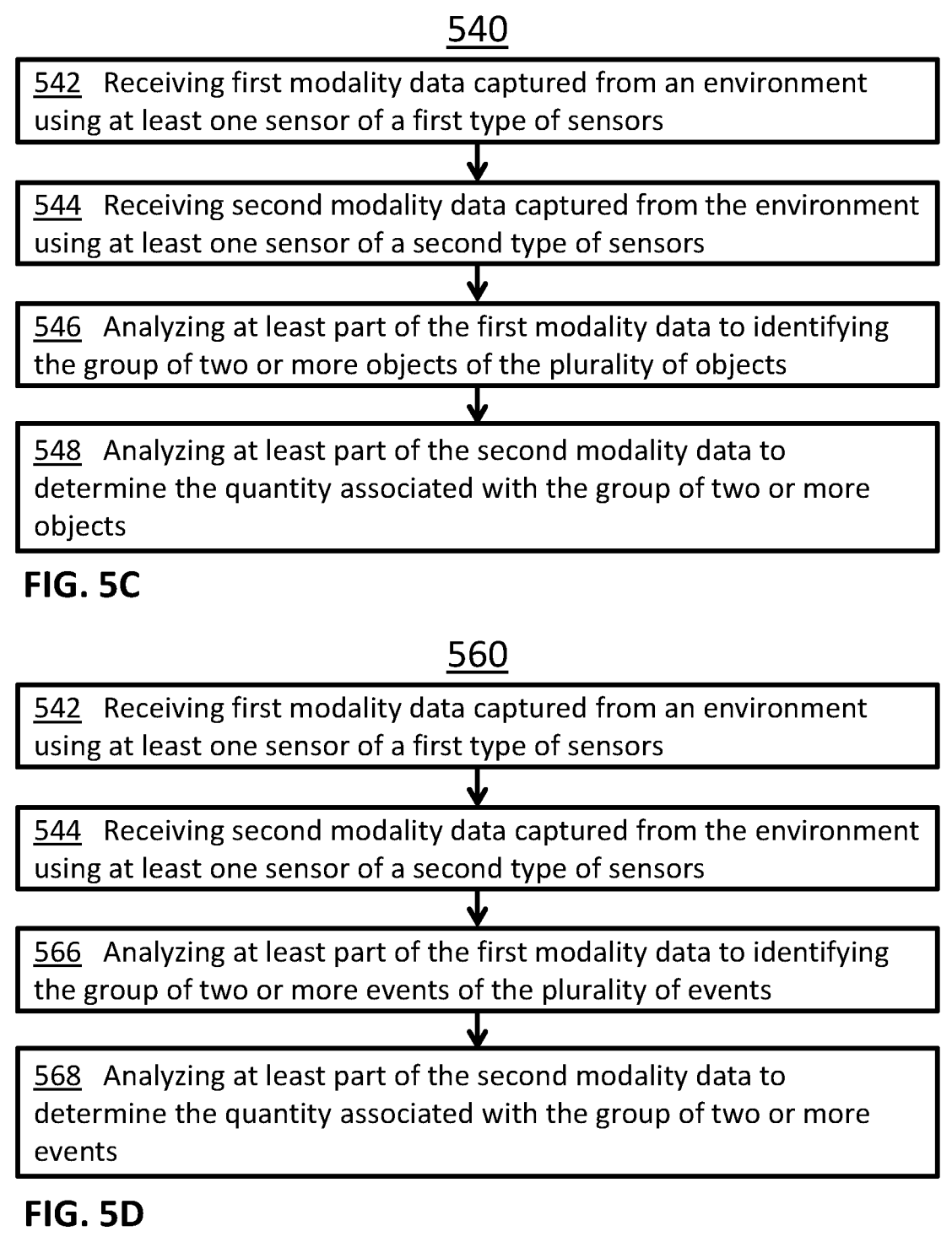

| 542 Receiving first modality data captured from an environment using at least one sensor of a first type of sensors |
|---|

| 544 Receiving second modality data captured from the environment using at least one sensor of a second type of sensors |
|---|

| 546 Analyzing at least part of the first modality data to identifying the group of two or more objects of the plurality of objects |
|---|

| 548 Analyzing at least part of the second modality data to determine the quantity associated with the group of two or more objects |
|---|

| 542 Receiving first modality data captured from an environment using at least one sensor of a first type of sensors |
|---|

| 544 Receiving second modality data captured from the environment using at least one sensor of a second type of sensors |
|---|

| 566 Analyzing at least part of the first modality data to identifying the group of two or more events of the plurality of events |
|---|

| 568 Analyzing at least part of the second modality data to determine the quantity associated with the group of two or more events |
|---|

Figure 6A:
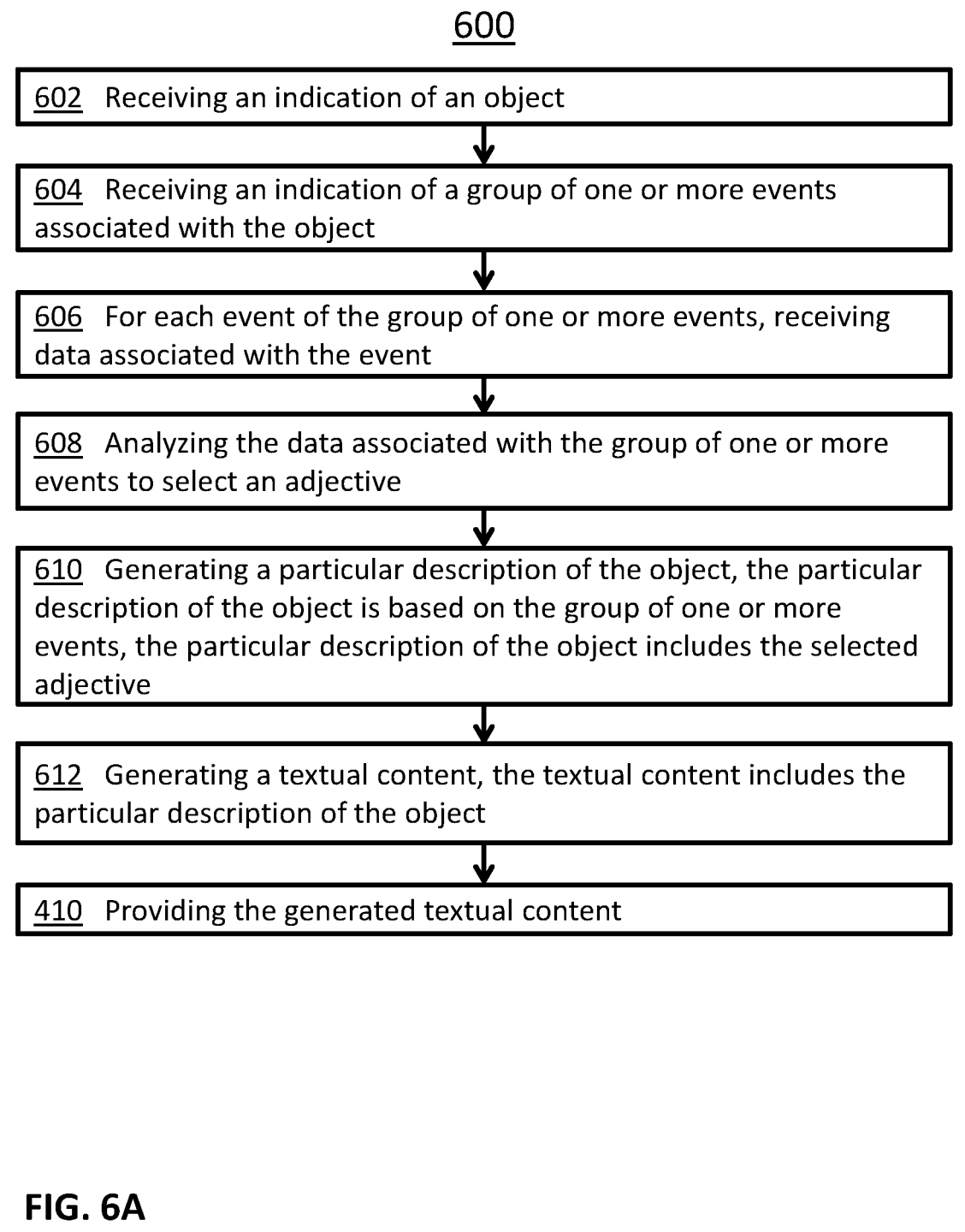

602 Receiving an indication of an object

604 Receiving an indication of a group of one or more events associated with the object 606 For each event of the group of one or more events, receiving data associated with the event 608 Analyzing the data associated with the group of one or more events to select an adjective 610 Generating a particular description of the object, the particular description of the object is based on the group of one or more events, the particular description of the object includes the selected adjective 612 Generating a textual content, the textual content includes the particular description of the object 410 Providing the generated textual content

Figure 6B:
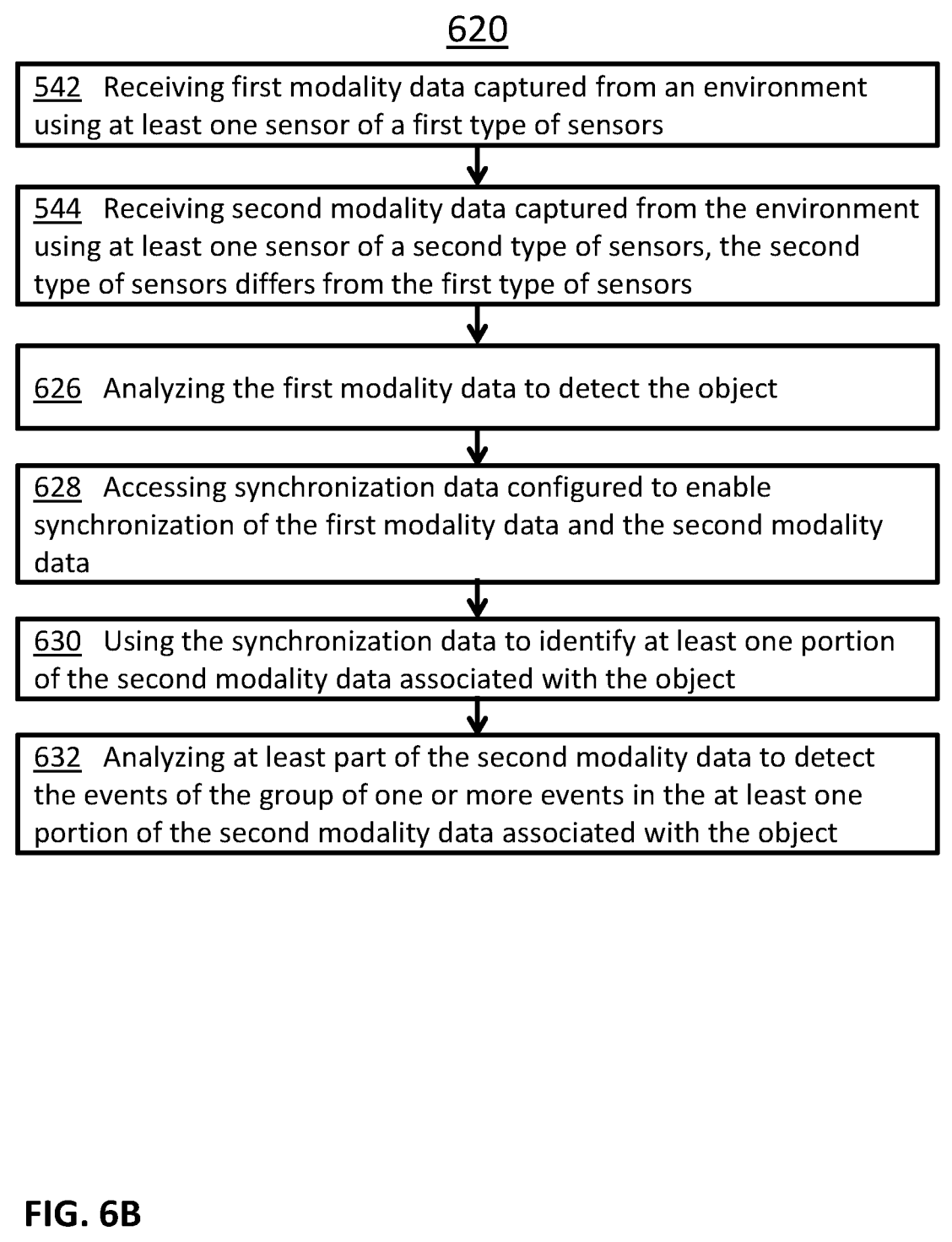

542   Receiving first modality data captured from an environment using at least one sensor of a first type of sensors 544   Receiving second modality data captured from the environment using at least one sensor of a second type of sensors, the second type of sensors differs from the first type of sensors 626   Analyzing the first modality data to detect the object 628   Accessing synchronization data configured to enable synchronization of the first modality data and the second modality data 630   Using the synchronization data to identify at least one portion of the second modality data associated with the object 632   Analyzing at least part of the second modality data to detect the events of the group of one or more events in the at least one portion of the second modality data associated with the object

Figure 6C:
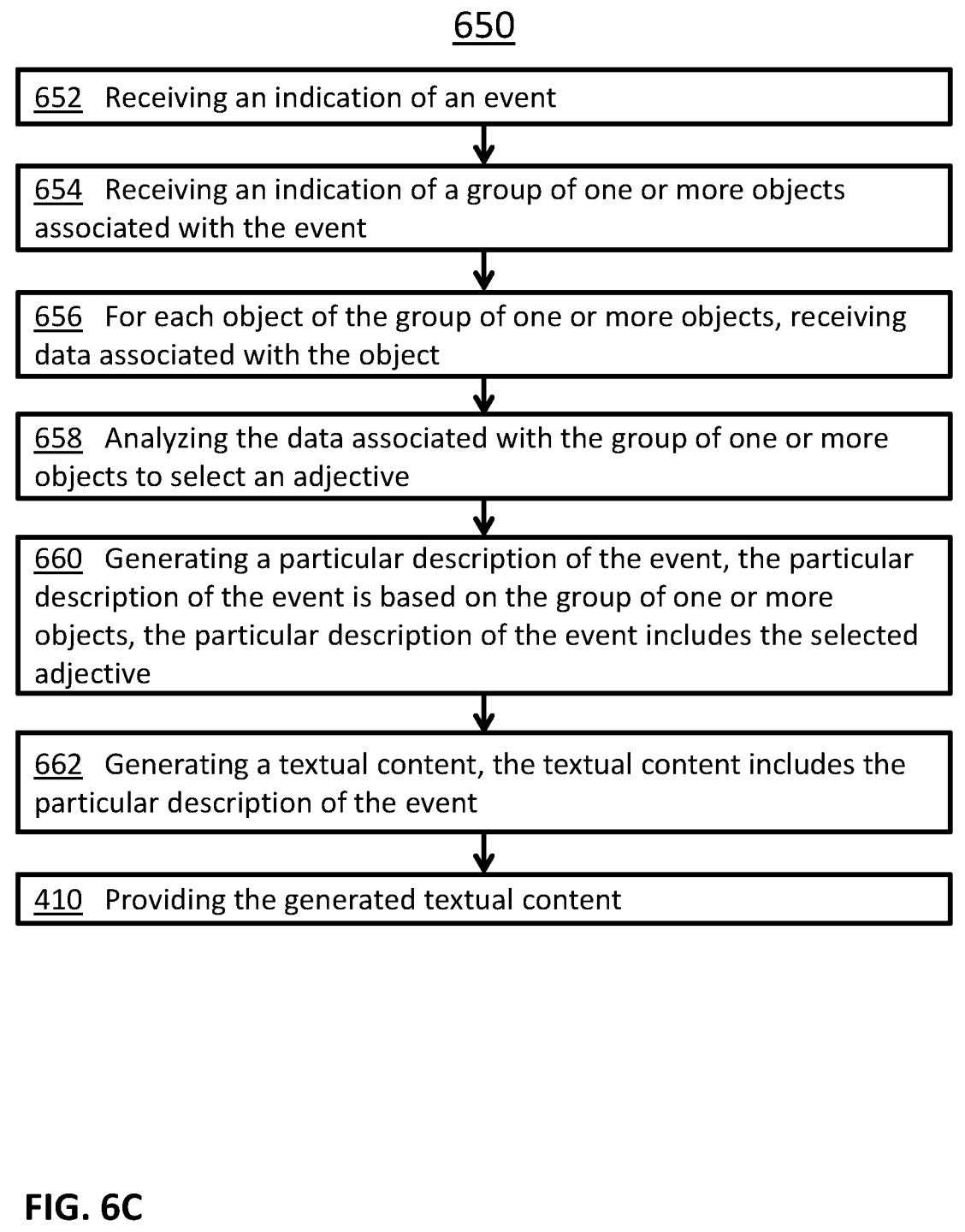

652 Receiving an indication of an event

↓

654 Receiving an indication of a group of one or more objects associated with the event

↓

656 For each object of the group of one or more objects, receiving data associated with the object

↓

658 Analyzing the data associated with the group of one or more objects to select an adjective

↓

660 Generating a particular description of the event, the particular description of the event is based on the group of one or more objects, the particular description of the event includes the selected adjective

↓

662 Generating a textual content, the textual content includes the particular description of the event

↓

410 Providing the generated textual content

Figure 6D:
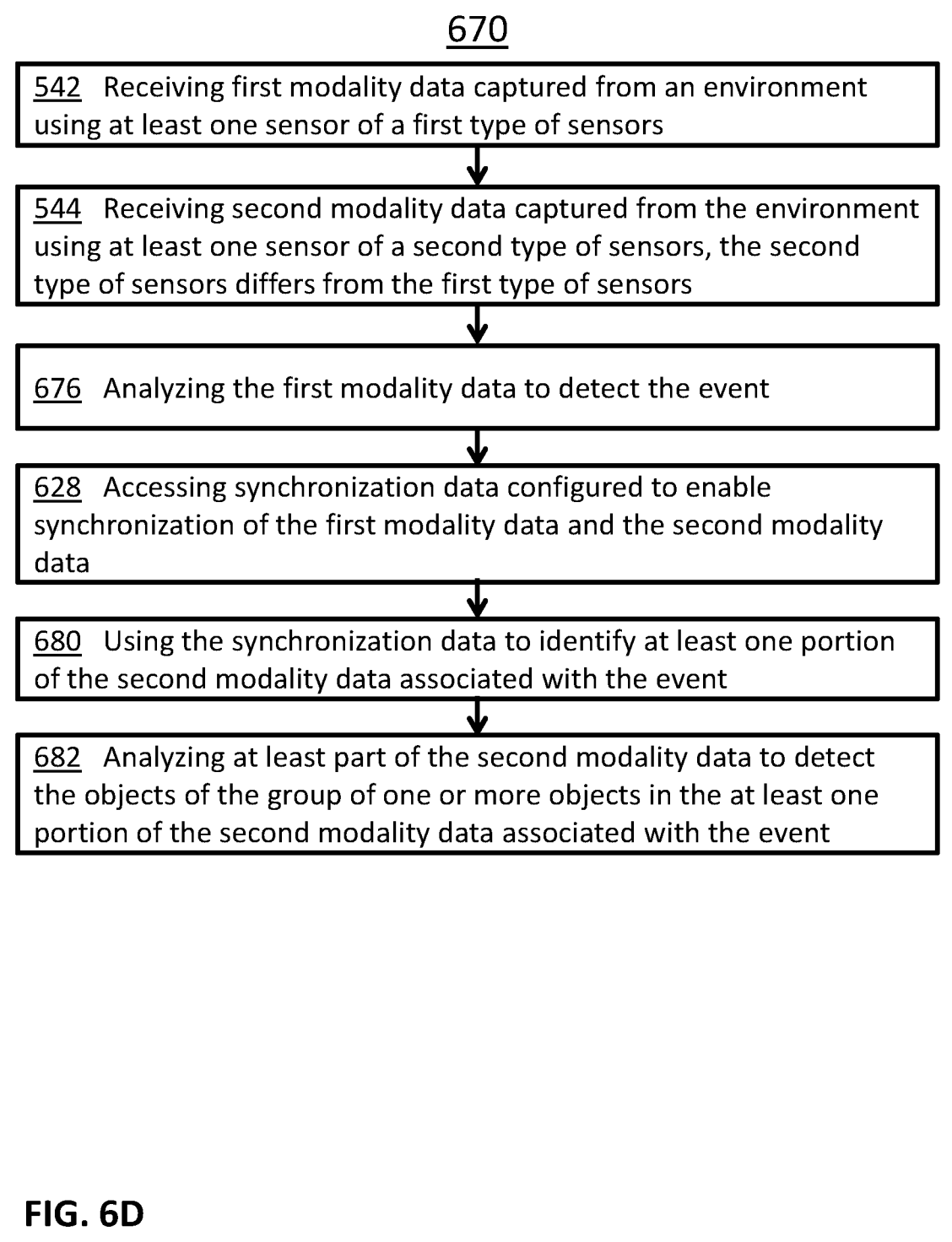

| 542 | Receiving first modality data captured from an environment using at least one sensor of a first type of sensors |

| 544 | Receiving second modality data captured from the environment using at least one sensor of a second type of sensors, the second type of sensors differs from the first type of sensors |

| 676 | Analyzing the first modality data to detect the event |

| 628 | Accessing synchronization data configured to enable synchronization of the first modality data and the second modality data |

| 680 | Using the synchronization data to identify at least one portion of the second modality data associated with the event |

| 682 | Analyzing at least part of the second modality data to detect the objects of the group of one or more objects in the at least one portion of the second modality data associated with the event |

| |
|---|
| <u>702</u>   Receiving an indication of a plurality of objects, the plurality of objects includes at least a first object and a second object |

↓

| |
|---|
| <u>704</u>   Receiving an indication of a first group of one or more events associated with the first object |

↓

| |
|---|
| <u>706</u>   Receiving an indication of a second group of one or more events associated with the second object |

↓

| |
|---|
| <u>708</u>   Based on the first group of one or more events, determining to include in a textual content a description based on the first group of one or more events of the first object |

↓

| |
|---|
| <u>710</u>   Based on the second group of one or more events, determining not to include in the textual content any description based on the second group of one or more events of the second object |

↓

| |
|---|
| <u>712</u>   For each event of the first group of one or more events, receiving data associated with the event |

↓

| |
|---|
| <u>714</u>   Analyzing the data associated with the first group of one or more events to generate a particular description of the first object, the particular description of the first object is based on the first group of one or more events |

↓

| |
|---|
| <u>716</u>   Generating the textual content, the textual content includes the particular description of the first object and does not include any description based on the second group of one or more events of the second object |

Figure 7B:
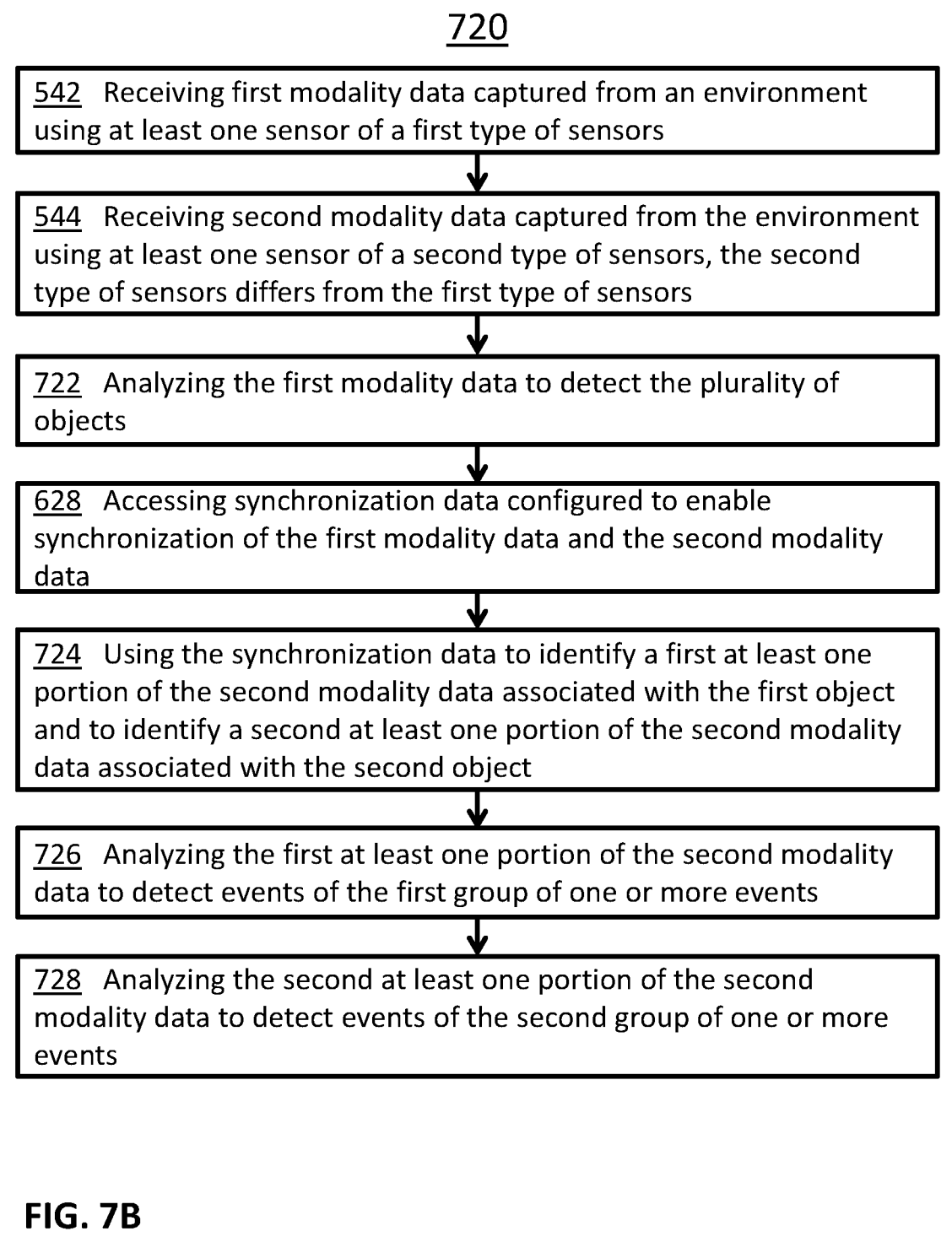

542   Receiving first modality data captured from an environment using at least one sensor of a first type of sensors 544   Receiving second modality data captured from the environment using at least one sensor of a second type of sensors, the second type of sensors differs from the first type of sensors 722   Analyzing the first modality data to detect the plurality of objects 628   Accessing synchronization data configured to enable synchronization of the first modality data and the second modality data 724   Using the synchronization data to identify a first at least one portion of the second modality data associated with the first object and to identify a second at least one portion of the second modality data associated with the second object 726   Analyzing the first at least one portion of the second modality data to detect events of the first group of one or more events 728   Analyzing the second at least one portion of the second modality data to detect events of the second group of one or more events

| |
|---|
| <u>732</u>   Determining a first magnitude associated with the first group of one or more events |

↓

| |
|---|
| <u>734</u>   Based on the first magnitude, determining to include in the textual content the description based on the first group of one or more events of the first object |

↓

| |
|---|
| <u>736</u>   Determining a second magnitude associated with the second group of one or more events |

↓

| |
|---|
| <u>738</u>   Based on the second magnitude, determining not to include in the textual content any description based on the second group of one or more events of the second object |

Figures 7D, 7E:
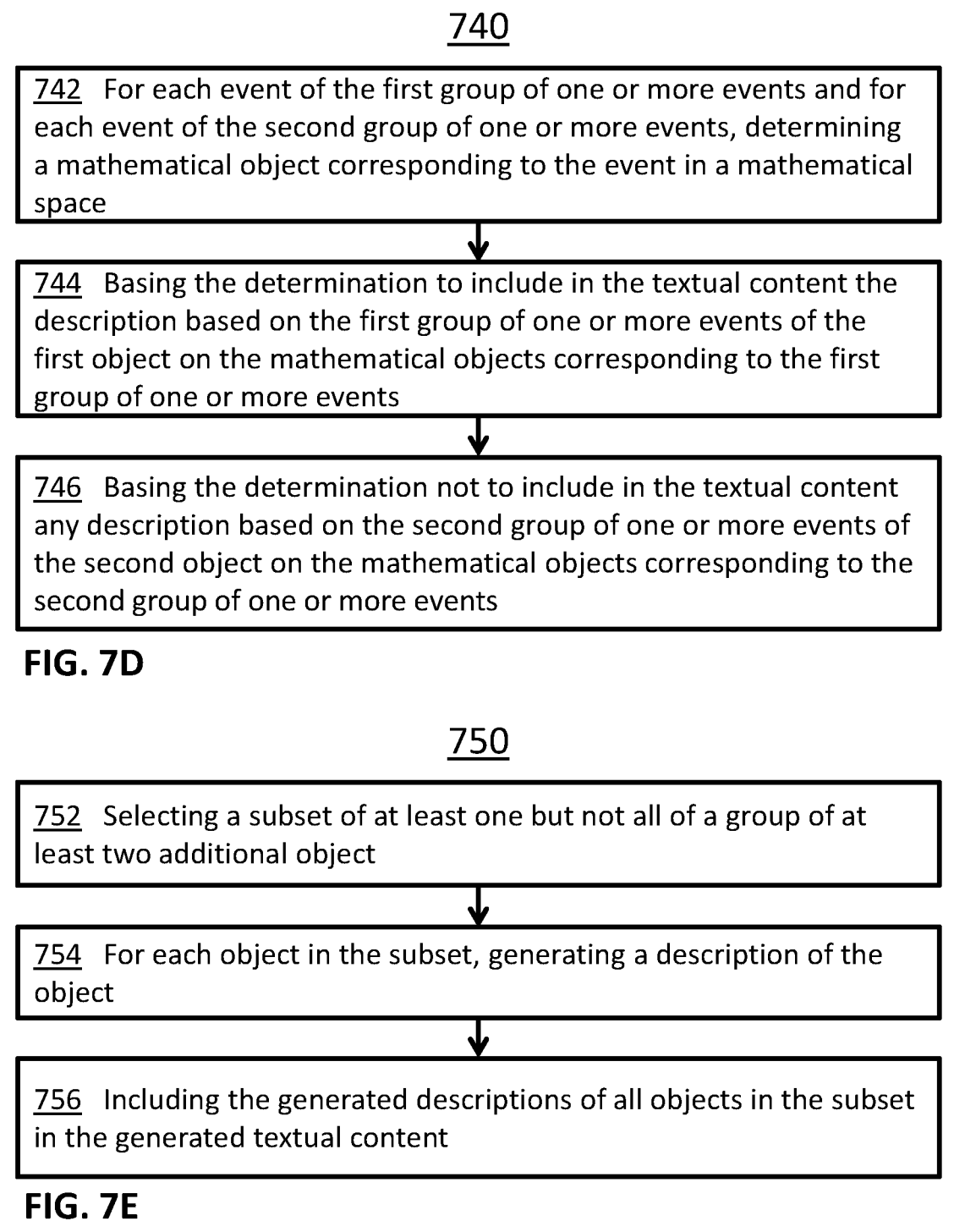

742   For each event of the first group of one or more events and for each event of the second group of one or more events, determining a mathematical object corresponding to the event in a mathematical space 744   Basing the determination to include in the textual content the description based on the first group of one or more events of the first object on the mathematical objects corresponding to the first group of one or more events 746   Basing the determination not to include in the textual content any description based on the second group of one or more events of the second object on the mathematical objects corresponding to the second group of one or more events

752   Selecting a subset of at least one but not all of a group of at least two additional object 754   For each object in the subset, generating a description of the object 756   Including the generated descriptions of all objects in the subset in the generated textual content

Figure 7F:
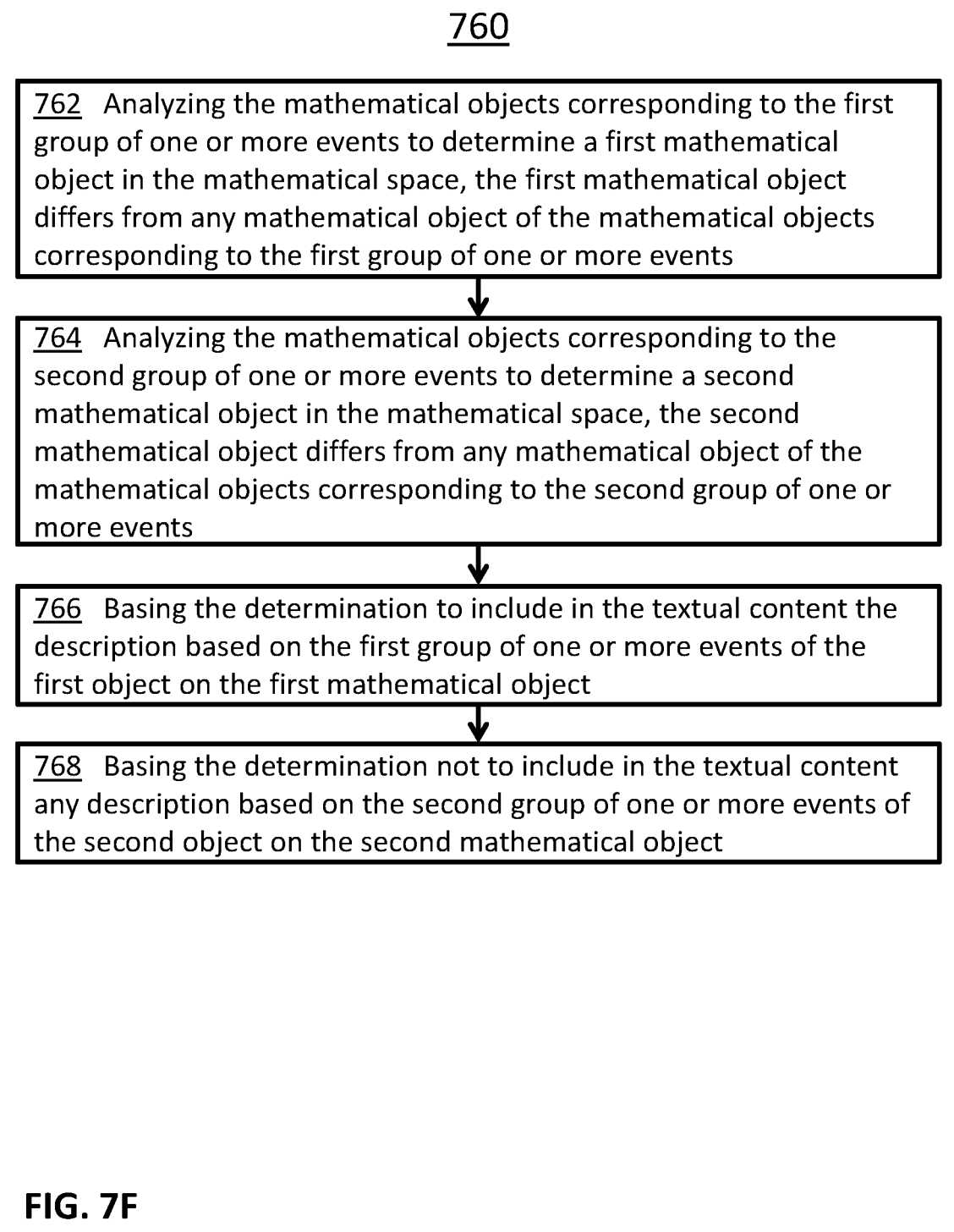

762　Analyzing the mathematical objects corresponding to the first group of one or more events to determine a first mathematical object in the mathematical space, the first mathematical object differs from any mathematical object of the mathematical objects corresponding to the first group of one or more events 764　Analyzing the mathematical objects corresponding to the second group of one or more events to determine a second mathematical object in the mathematical space, the second mathematical object differs from any mathematical object of the mathematical objects corresponding to the second group of one or more events 766　Basing the determination to include in the textual content the description based on the first group of one or more events of the first object on the first mathematical object 768　Basing the determination not to include in the textual content any description based on the second group of one or more events of the second object on the second mathematical object

802 Receiving an indication of a plurality of events, the plurality of events includes at least a first event and a second event

↓

804 Receiving an indication of a first group of one or more objects associated with the first event

↓

806 Receiving an indication of a second group of one or more objects associated with the second event

↓

808 Based on the first group of one or more objects, determining to include in a textual content a description based on the first group of one or more object of the first event

↓

810 Based on the second group of one or more objects, determine not to include in the textual content any description based on the second group of one or more objects of the second event

↓

812 For each object of the first group of one or more objects, receiving data associated with the object

↓

814 Analyzing the data associated with the first group of one or more objects to generate a particular description of the first event, the particular description of the first event is based on the first group of one or more objects

↓

816 Generating the textual content, the textual content includes the particular description of the first event and does not include any description based on the second group of one or more objects of the second event → 410

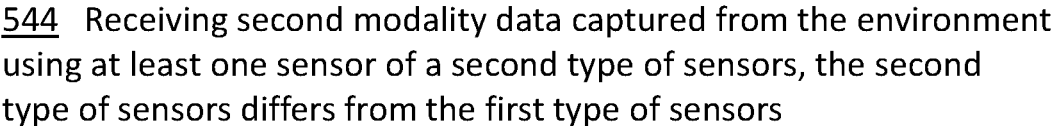

| <u>542</u>  Receiving first modality data captured from an environment using at least one sensor of a first type of sensors |
|---|

| <u>544</u>  Receiving second modality data captured from the environment using at least one sensor of a second type of sensors, the second type of sensors differs from the first type of sensors |
|---|

| <u>822</u>  Analyzing the first modality data to detect the plurality of events |
|---|

| <u>628</u>  Accessing synchronization data configured to enable synchronization of the first modality data and the second modality data |
|---|

| <u>824</u>  Using the synchronization data to identify a first at least one portion of the second modality data associated with the first event and to identify a second at least one portion of the second modality data associated with the second event |
|---|

| <u>826</u>  Analyzing the first at least one portion of the second modality data to detect objects of the first group of one or more objects |
|---|

| <u>828</u>  Analyzing the second at least one portion of the second modality data to detect objects of the second group of one or more objects |
|---|

| <u>832</u>   Determining a first magnitude associated with the first group of one or more objects |

↓

| <u>834</u>   Based on the first magnitude, determining to include in the textual content the description based on the first group of one or more objects of the first event |

↓

| <u>836</u>   Determining a second magnitude associated with the second group of one or more objects |

↓

| <u>838</u>   Based on the second magnitude, determining not to include in the textual content any description based on the second group of one or more objects of the second event |

Figures 8D, 8E:
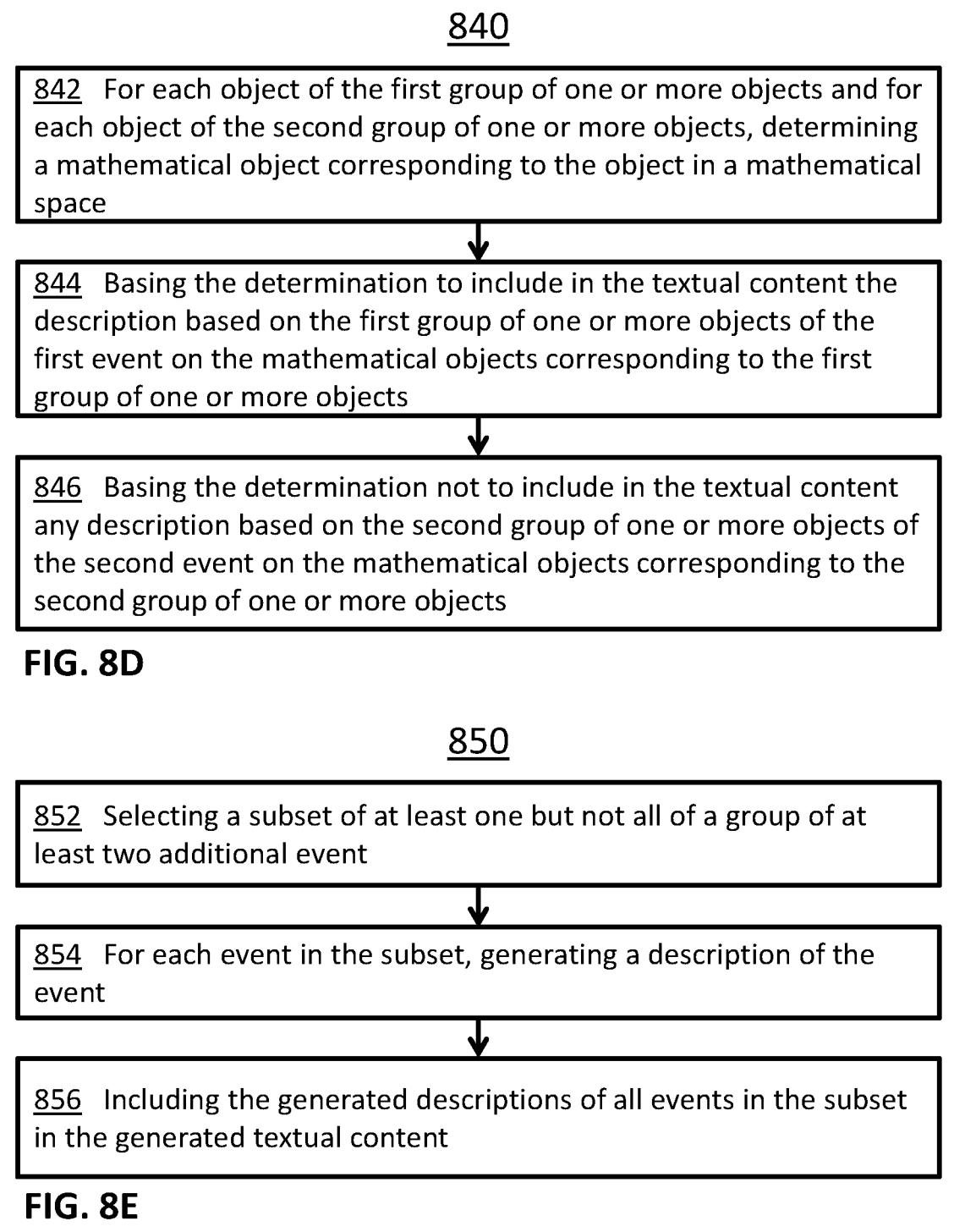

842  For each object of the first group of one or more objects and for each object of the second group of one or more objects, determining a mathematical object corresponding to the object in a mathematical space

↓

844  Basing the determination to include in the textual content the description based on the first group of one or more objects of the first event on the mathematical objects corresponding to the first group of one or more objects

↓

846  Basing the determination not to include in the textual content any description based on the second group of one or more objects of the second event on the mathematical objects corresponding to the second group of one or more objects

852  Selecting a subset of at least one but not all of a group of at least two additional event

↓

854  For each event in the subset, generating a description of the event

↓

856  Including the generated descriptions of all events in the subset in the generated textual content

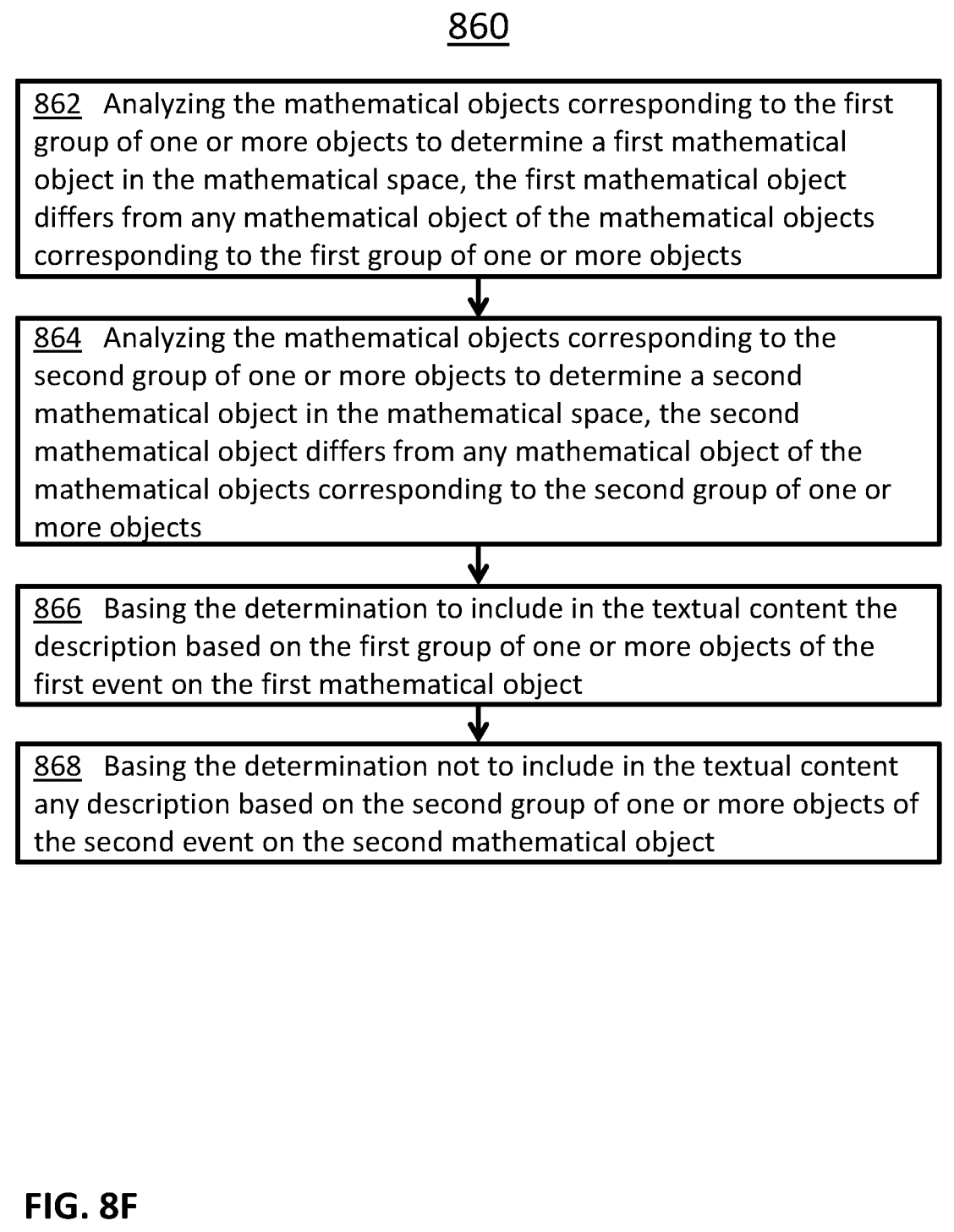

862   Analyzing the mathematical objects corresponding to the first group of one or more objects to determine a first mathematical object in the mathematical space, the first mathematical object differs from any mathematical object of the mathematical objects corresponding to the first group of one or more objects 864   Analyzing the mathematical objects corresponding to the second group of one or more objects to determine a second mathematical object in the mathematical space, the second mathematical object differs from any mathematical object of the mathematical objects corresponding to the second group of one or more objects 866   Basing the determination to include in the textual content the description based on the first group of one or more objects of the first event on the first mathematical object 868   Basing the determination not to include in the textual content any description based on the second group of one or more objects of the second event on the second mathematical object

FIG. 8F

ANALYZING OBJECTS DATA TO GENERATE A TEXTUAL CONTENT REPORTING EVENTS

CROSS REFERENCES TO RELATED APPLICATIONS

This application claims the benefit of priority of U.S. Provisional Patent Application No. 63/273,938, filed on Oct. 31, 2021, and U.S. Provisional Patent Application No. 63/420,413, filed on Oct. 28, 2022. The entire contents of all of the above-identified applications are herein incorporated by reference.

BACKGROUND

Technological Field

The disclosed embodiments generally relate to systems and methods for generating textual contents reporting events. More particularly, the disclosed embodiments relate to systems and methods for generating textual contents reporting events based on objects.

BACKGROUND INFORMATION

Manual generation of textual contents is time consuming, and the generation of high-quality textual contents that includes relevant information while omitting non-relevant information requires talent and expertise. Real-world events may rapidly follow one another, or occur simultaneously, and the burdensome task of describing the real-world events may increase as the frequency of the events increases. Real-world objects may be abundant, and the burdensome task of describing the real-world events may increase as the number of objects increases. While an accurate reporting of large number of real-world objects and events is useful or required in many applications, it is clear that as the number of events and objects increases the task of manually reporting the events and objects becomes too complex. It is therefore beneficial to automate these tasks.

SUMMARY

In some examples, systems, methods and non-transitory computer readable media for analyzing audio data for text generation are provided. In some examples, systems, methods and non-transitory computer readable media for analyzing audio data to generate a textual content reporting objects are provided. In some examples, audio data captured using at least one audio sensor may be received. The audio data may be analyzed to identify a plurality of objects. For each object of the plurality of objects, data associated with the object may be analyzed to select an adjective, and a description of the object that includes the adjective may be generated. Further, a textual content that includes the generated descriptions of the plurality of objects may be generated. The generated textual content may be provided.

In some examples, systems, methods and non-transitory computer readable media for analyzing audio data for text generation are provided. In some examples, systems, methods and non-transitory computer readable media for analyzing audio data to generate a textual content reporting events are provided. In some examples, audio data captured using at least one audio sensor may be received. The audio data may be analyzed to identify a plurality of events. For each event of the plurality of events, data associated with the event may be analyzed to select an adjective, and a description of the event that includes the adjective may be generated. Further, a textual content that includes the generated descriptions of the plurality of events may be generated. The generated textual content may be provided.

In some examples, systems, methods and non-transitory computer readable media for analyzing image data to report events are provided. In some examples, systems, methods and non-transitory computer readable media for analyzing visual data to generate a textual content reporting events are provided. In some examples, image data captured using at least one image sensor may be received. The image data may be analyzed to identify a plurality of events. For each event of the plurality of events, analyzing data associated with the event to select an adjective, and a description of the event that includes the adjective may be generated. Further, textual content that includes the generated descriptions of the plurality of events may be generated. The generated textual content may be provided.

In some examples, systems, methods and non-transitory computer readable media for analyzing image data to report objects are provided. In some examples, systems, methods and non-transitory computer readable media for analyzing visual data to generate a textual content reporting objects are provided. In some examples, image data captured using at least one image sensor may be received. The image data may be analyzed to identify a plurality of objects. For each object of the plurality of objects, data associated with the object may be analyzed to select an adjective, and a description of the object that includes the adjective may be generated. Further, textual content that includes the generated descriptions of the plurality of objects may be generated. The generated textual content may be provided.

In some examples, systems, methods and non-transitory computer readable media for analyzing data to report objects are provided. In some examples, systems, methods and non-transitory computer readable media for analyzing data to generate a textual content reporting objects are provided. In some examples, first data may be received. The first data may be analyzed to identify a plurality of objects. For each object of the plurality of objects, data associated with the object may be analyzed to select an adjective, and a description of the object that includes the adjective may be generated. Further, a textual content that includes the generated descriptions of the plurality of objects may be generated. The generated textual content may be provided.

In some examples, systems, methods and non-transitory computer readable media for analyzing data to report events are provided. In some examples, systems, methods and non-transitory computer readable media for analyzing data to generate a textual content reporting events are provided. In some examples, first data may be received. The first data may be analyzed to identify a plurality of events. For each event of the plurality of events, data associated with the event may be analyzed to select an adjective, and a description of the event that includes the adjective may be generated. Further, a textual content that includes the generated descriptions of the plurality of events may be generated. The generated textual content may be provided.

In some examples, systems, methods and non-transitory computer readable media for grouping events and generating a textual content reporting the events are provided. In some examples, systems, methods and non-transitory computer readable media for generating a textual content selectively reporting events are provided. In some examples, an indication of a plurality of events may be received. A group of two or more events of the plurality of events may be identified. In one example, the group of two or more events does not include at least a particular event of the plurality of events. A quantity associated with the group of two or more events may be determined. A description of the group of two or more events may be generated. The description of the group of two or more events may include an indication of the quantity associated with the group of two or more events. Data associated with the particular event may be analyzed to generate a description of the particular event. Further, a textual content that includes the description of the group of two or more events and the description of the particular event may be generated. In one example, for at least one specific event of the group of two or more events, the textual content does not include information identifying the specific event. The generated textual content may be provided.

In some examples, systems, methods and non-transitory computer readable media for grouping objects and generating a textual content reporting the objects are provided. In some examples, systems, methods and non-transitory computer readable media for generating a textual content selectively reporting objects are provided. In some examples, an indication of a plurality of objects may be received. A group of two or more objects of the plurality of objects may be identified. In one example, the group of two or more objects does not include at least a particular object of the plurality of objects. Further, a quantity associated with the group of two or more objects may be determined. Further, a description of the group of two or more objects may be generated. The description of the group of two or more objects may include an indication of the quantity associated with the group of two or more objects. Data associated with the particular object may be analyzed to generate a description of the particular object. Further, a textual content that includes the description of the group of two or more objects and the description of the particular object. In one example, for at least one specific object of the group of two or more objects, the textual content does not include information identifying the specific object. The generated textual content may be provided.

In some examples, systems, methods and non-transitory computer readable media for analyzing objects data to generate a textual content reporting events are provided. In some examples, systems, methods and non-transitory computer readable media for generating a textual content reporting events are provided. In some examples, an indication of an event may be received. Further, an indication of a group of one or more objects associated with the event may be received. For each object of the group of one or more objects, data associated with the object may be received. The data associated with the group of one or more objects may be analyzed to select an adjective. A particular description of the event may be generated. The particular description may be based on the group of one or more objects. The particular description may include the selected adjective. Further, a textual content may be generated. The textual content may include the particular description. The generated textual content may be provided.

In some examples, systems, methods and non-transitory computer readable media for analyzing events data to generate a textual content reporting events are provided. In some examples, systems, methods and non-transitory computer readable media for generating a textual content reporting objects are provided. In some examples, an indication of an object may be received. Further, an indication of a group of one or more events associated with the object may be received. For each event of the group of one or more events, data associated with the event may be received. The data associated with the group of one or more events may be analyzed to select an adjective. Further, a particular description of the object may be generated. The particular description may be based on the group of one or more events. Further, the particular description may include the selected adjective. A textual content may be generated. The textual content may include the particular description. The generated textual content may be provided.

In some examples, systems, methods and non-transitory computer readable media for selecting and reporting objects based on events are provided. In some examples, systems, methods and non-transitory computer readable media for generating a textual content selectively reporting objects are provided. In some examples, an indication of a plurality of objects may be received. The plurality of objects may include at least a first object and a second object. Further, an indication of a first group of one or more events associated with the first object may be received. Further, an indication of a second group of one or more events associated with the second object may be received. The second group of one or more events may include at least one event not included in the first group of one or more events. Based on the first group of one or more events, it may be determined to include in a textual content a description based on the first group of one or more events of the first object. Based on the second group of one or more events, it may be determined not to include in the textual content any description based on the second group of one or more events of the second object. For each event of the first group of one or more events, data associated with the event may be received. The data associated with the first group of one or more events may be analyzed to generate a particular description of the first object. The particular description of the first object may be based on the first group of one or more events. The textual content may be generated. The textual content may include the particular description of the first object. In one example, the textual content does not include any description based on the second group of one or more events of the second object. The generated textual content may be provided.

In some examples, systems, methods and non-transitory computer readable media for selecting and reporting events based on objects are provided. In some examples, systems, methods and non-transitory computer readable media for generating a textual content selectively reporting events are provided. In some examples, an indication of a plurality of events may be received. The plurality of events may include at least a first event and a second event. Further, an indication of a first group of one or more objects associated with the first event may be received. Further, an indication of a second group of one or more objects associated with the second event may be received. The second group of one or more objects may include at least one object not included in the first group of one or more objects. Based on the first group of one or more objects, it may be determined to include in a textual content a description based on the first group of one or more objects of the first event. Based on the second group of one or more objects, it may be determined not to include in the textual content any description based on the second group of one or more objects of the second event. For each object of the first group of one or more objects, data associated with the object may be received. The data associated with the first group of one or more objects may be analyzed to generate a particular description of the first event. The particular description of the first event may be based on the first group of one or more objects. The textual content may be generated. In one example, the textual content may include the particular description of the first event and does not include any description based on the second group of one or more objects of the second event. The generated textual content may be provided.

In some examples, systems, methods and non-transitory computer readable media for generating textual contents describing real-world objects and/or real-world events are provided.

BRIEF DESCRIPTION OF THE DRAWINGS

FIG. 4A is a flowchart of an exemplary method for analyzing data to generate a textual content reporting objects, consistent with some embodiments of the present disclosure.

FIG. 4B is a flowchart of an exemplary method for analyzing visual data to generate a textual content reporting objects, consistent with some embodiments of the present disclosure.

FIG. 4C is a flowchart of an exemplary method for analyzing audio data to generate a textual content reporting objects, consistent with some embodiments of the present disclosure.

FIG. 4D is a flowchart of an exemplary method for analyzing data to generate a textual content reporting events, consistent with some embodiments of the present disclosure.

FIG. 4E is a flowchart of an exemplary method for analyzing visual data to generate a textual content reporting events, consistent with some embodiments of the present disclosure.

FIG. 4F is a flowchart of an exemplary method for analyzing audio data to generate a textual content reporting events, consistent with some embodiments of the present disclosure.

FIG. 5A is a flowchart of an exemplary method for grouping objects and generating a textual content reporting the groups, consistent with some embodiments of the present disclosure.

FIG. 5B is a flowchart of an exemplary method for grouping events and generating a textual content reporting the groups, consistent with some embodiments of the present disclosure.

FIG. 5C is a flowchart of an exemplary method for grouping objects, consistent with some embodiments of the present disclosure.

FIG. 5D is a flowchart of an exemplary method for grouping events, consistent with some embodiments of the present disclosure.

FIG. 6A is a flowchart of an exemplary method for generating a textual content reporting objects based on events, consistent with some embodiments of the present disclosure.

FIG. 6B is a flowchart of an exemplary method for detecting objects and events associated with the objects, consistent with some embodiments of the present disclosure.

FIG. 6C is a flowchart of an exemplary method for generating a textual content reporting events based on objects, consistent with some embodiments of the present disclosure.

FIG. 6D is a flowchart of an exemplary method for detect events and objects associated with the events, consistent with some embodiments of the present disclosure.

FIG. 7A is a flowchart of an exemplary method for generating a textual content selectively reporting objects based on events, consistent with some embodiments of the present disclosure.

FIG. 7B is a flowchart of an exemplary method for detecting objects and events associated with the objects, consistent with some embodiments of the present disclosure.

FIGS. 7C and 7D are flowcharts of exemplary methods for selecting objects based on events associated with the objects, consistent with some embodiments of the present disclosure.

FIG. 7E is a flowchart of an exemplary method for adding descriptions of additional objects to a generated textual content, consistent with some embodiments of the present disclosure.

FIG. 7F is a flowchart of an exemplary method for selecting objects based on events associated with the objects, consistent with some embodiments of the present disclosure.

FIG. 8A is a flowchart of an exemplary method for generating a textual content selectively reporting events based on objects, consistent with some embodiments of the present disclosure.

FIG. 8B is a flowchart of an exemplary method for detecting events and objects associated with the events, consistent with some embodiments of the present disclosure.

FIGS. 8C and 8D are flowcharts of exemplary methods for selecting events based on objects associated with the events, consistent with some embodiments of the present disclosure.

FIG. 8E is a flowchart of an exemplary method for adding descriptions of additional events to a generated textual content, consistent with some embodiments of the present disclosure.

FIG. 8F is a flowchart of an exemplary method for selecting events based on objects associated with the events, consistent with some embodiments of the present disclosure.

DESCRIPTION

Figure 1A:
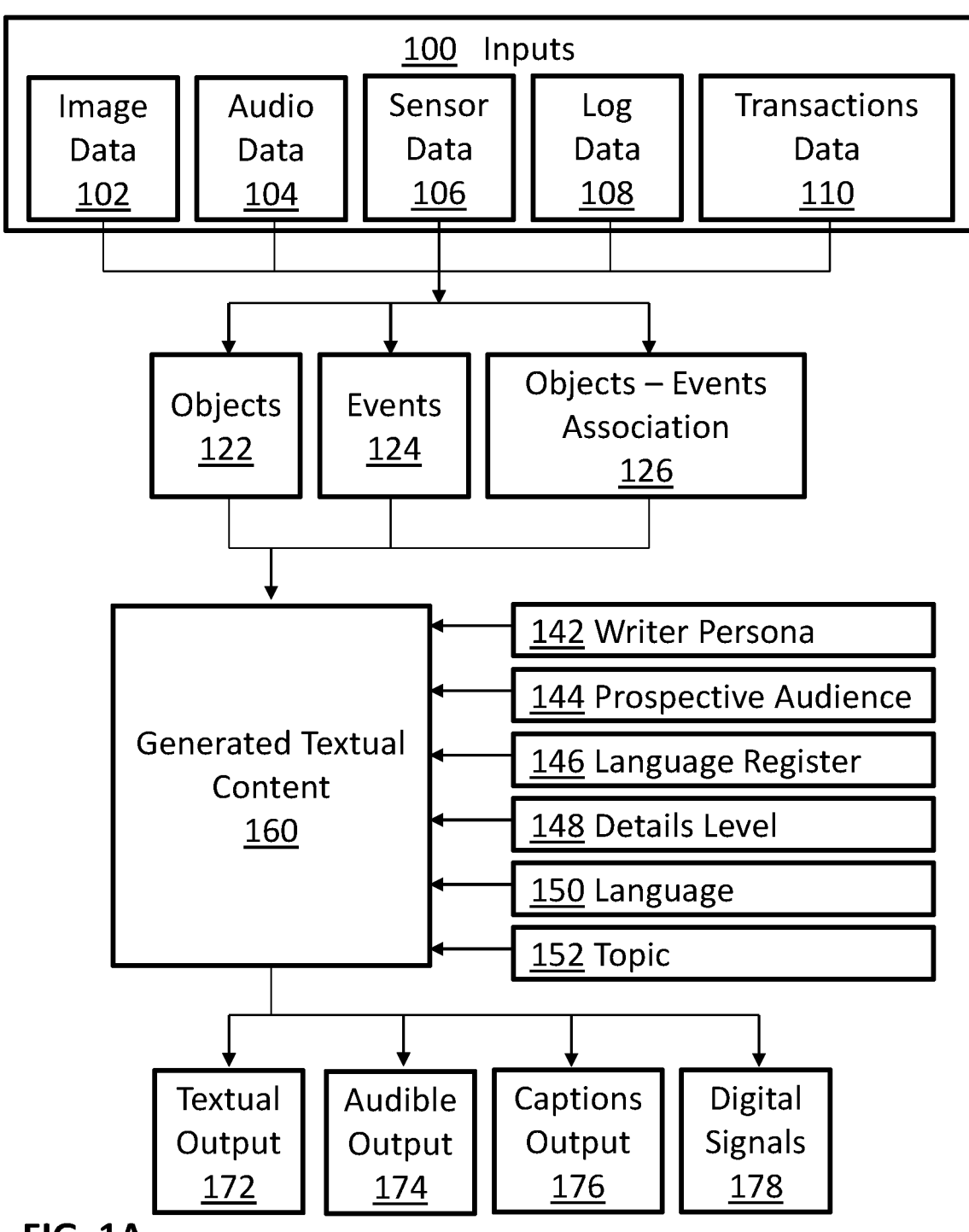
FIG. 1A is a block diagram illustrating some possible flows of information, consistent with some embodiments of the present disclosure.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating" " " "g, extracting, storing" " " "g, receiving, transmitting" g, or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus, the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

In embodiments of the presently disclosed subject matter, one or more stages illustrated in the figures may be executed in a different order and/or one or more groups of stages may be executed simultaneously. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating some possible flows of information consistent with some embodiments of the present disclosure. In this example, inputs 100 may comprise at least one of image data 102, audio data 104, sensor data 106, log data 108 or transactions data 110. In other examples, the inputs 100 may include any other type of information associated with events and/or objects. Some non-limiting examples of image data 102 and of analysis of such image data are described below. Some non-limiting examples of audio data 104 and of analysis of such audio data are described below. In some examples, sensor data 106 may include any data or signals captured using a physical sensor from an environment. Some non-limiting examples of such sensors may include image sensors (such as image sensor 260), audio sensors (such as audio sensors 250), motion sensors (such as motion sensor 270), positioning sensors (such as positioning sensors 275), touch sensors, proximity sensors, chemical sensors, temperature sensors, barometers, and so forth. In some examples, log data 108 may include any information recording activities. Some non-limiting examples of such log data may include a digital log file, a hardcopy log file, a handwritten log, an audio log recorded using at least one audio sensor, a visual log or a video log recorded using at least one image sensor, and so forth. In one example, log data 108 may be generated by a computing device, such as apparatus 200, when a processor (such as processing unit 220) of the computing device executes instructions that causes the processor to perform operations for creating the log, and the log may include entries recording activities performed by the processor and/ or activities observed by the computing device. In some examples, transactions data 110 may include any information recording historic or prospective transactions. For example, transactions data 110 may include recordings of transactions in digital format, in analog format, in hardcopy, and so forth.

In the example of FIG. 1A, any one of inputs 100, alone or in combination, may be analyzed or otherwise used to identify at least one of objects 122, events 124, or associations of objects with events 126. In some examples, objects 122 may include any number of objects, such as a single object, two objects, three objects, between four and ten objects, more than ten objects, and so forth. In some examples, objects 122 may include at least one of animate objects, inanimate objects, people, animals, physical objects, or virtual objects (for example, from an extended reality environment, from a digital record, and so forth). In some examples, events 124 may include any number of events, such as a single event, two events, three events, between four and ten events, more than ten events, and so forth. In some examples, events 124 may include at least one of physical events, virtual events (for example, occurring in an extended reality environment, occurring digitally in a computing device, etc.), historic events, ongoing event, or prospective events. In some examples, events 124 may comprise an interaction among two or more objects, such as a conversation between two people, an interaction of a person with a computing device, a person operating a machine, rubbing of two objects, collision of two objects, and so forth. Some more non-limiting examples of an event may include an action, an interaction, a conversation, a collision, a failure, a thing that happens, a planned event, an unplanned event, an incident, an event in the physical world, an event in a virtual world, a virtual event, an exchange of information, a physical contact between physical objects, and so forth. In one example, an event may be associated with one or more objects, for example the event may be caused by an object, may affect an object, and so forth. In some examples, associations 126 of objects with events may include an association of a single event with a single object, may include association of a single event with a plurality of objects, may include association of a plurality of events with a single object, may include association of a plurality of events with a plurality of objects, and so forth. In some examples, associations 126 may include any number of associations, such as a single association, two associations, three associations, between four and ten associations, more than ten associations, and so forth. In some examples, any one of objects 122, events 124 or associations 126 may be represented digitally, may be stored in a memory (such as memory 210), may be transmitted to an external device (for example, using a digital communication device), may be used for further analysis, may be provided to an individual (for example, using a user interface), and so forth.

In some examples, an indication of a writer persona, such as writer persona 142, may be obtained. For example, the indication of the writer persona may include or enable access to information related to the writer persona. For example, information related to the writer persona may be read from memory (such as memory 210), may be received from an external device (for example, using a digital communication device), may be determined based on an analysis of historic contents (such as historic textual contents, historic visual contents, historic auditory content, historic contents generated by the writer persona, historic contents liked by the writer persona, etc.) associated with the writer persona, may be received from an individual (for example, via a user interface), and so forth. For example, the information related to the writer persona may include at least a portion of historic contents associated with the writer persona, may include an indication or words and/or phrases associated with the writer persona (for example, words and/or phrases commonly used by the writer persona), may include an indication or symbols and/or analogs associated with the writer persona (for example, symbols and/or analogs commonly used by the writer persona), may include an indication of interest areas of the writer persona, may include an indication of a language register associated with the writer persona, may include an indication of one or more languages associated with the writer persona, and so forth.

In some examples, an indication of a prospective audience, such as prospective audience 144, may be obtained. For example, the indication of the prospective audience may include or enable access to information related to the prospective audience. For example, information related to the prospective audience may be read from memory (such as memory 210), may be received from an external device (for example, using a digital communication device), may be determined based on an analysis of historic contents (such as historic textual contents, historic visual contents, historic auditory content, etc.) associated with the prospective audience, may be received from an individual (for example, via a user interface), and so forth. For example, the information related to the prospective audience may include at least a portion of historic contents associated with the prospective audience (for example, historic contents consumed or liked by the prospective audience), may include an indication or words and/or phrases associated with the prospective audience (for example, words and/or phrases commonly heard or read by the prospective audience), may include an indication of one or more languages associated with the prospective audience, and so forth.

In some examples, an indication of a topic, such as topic 152, may be obtained. For example, the indication of the topic may include or enable access to information related to the topic. For example, information related to the topic may be read from memory (such as memory 210), may be received from an external device (for example, using a digital communication device), may be determined based on an analysis of historic contents (such as historic textual contents, historic visual contents, historic auditory content, etc.) associated with the topic, may be received from an individual (for example, via a user interface), and so forth. For example, the information related to the topic may include at least a portion of historic contents associated with the topic, may include an indication or words and/or phrases associated with the topic (for example, words and/or phrases commonly used in contents associated with the topic), may include a language register corresponding to the topic (for example, using different language registers to report a funeral of a king and to share a joke about the king), and so forth. In some examples, image data (such as image data received by Step 422) may be analyzed to determine an indication of the topic associated with the generated textual content. For example, a classification model may be used to classify the image data to a class of a plurality of alternative class, each alternative class may be associated with a topic, and thereby the topic may be determined from the classification. In some examples, audio data (such as audio data received by Step 442) may be analyzed to determine an indication of the topic associated with the generated textual content. For example, a classification model may be used to classify the audio data to a class of a plurality of alternative class, each alternative class may be associated with a topic, and thereby the topic may be determined from the classification.

In the example of FIG. 1A, any one of objects 122, events 124 or associations 126 may be used to generate a textual content (for example as described herein), and thereby obtaining generated textual content 160. In some examples, the generation of textual content 160 may be further based on at least one of writer persona 142, prospective audience 144, language register 146, details level 148, language 150 or topic 152. In one example, textual content 160 may be generated in a style associated with writer persona 142, may include details that has high correlation with writer persona 142 (for example, are close to an interest area of writer persona 142), may include symbols or analogs that are common for writer persona 142, and so forth. In one example, textual content 160 may be generated in a style associated with prospective audience 144 (for example, a style that prospective audience 144 is used to, a style that prospective audience 144 is susceptible to), may include details that has high correlation with prospective audience 144 (for example, are of interest to prospective audience 144), may include symbols or analogs that prospective audience 144 is familiar with, and so forth. In one example, textual content 160 may be generated in language register 146, may include words associated with language register 146, may include expressions or analogs associated with language register 146, and so forth. For example, language register 146 may be selected based on at least one of writer persona 142 or prospective audience 144. In one example, the amount and/or granularity of details included in generated textual content 160 may be determined based on details level 148. In one example, the language of generated textual content 160 may be selected based on language 150. In one example, which details to include in generated textual content 160 and which details to leave out of generated textual content 160 may be determined based on the affinity of the details to topic 152. In some examples, generated textual content 160 may include at least one of a text, a digital encoding of a text, or an analog encoding of the text. In some examples, a textual content (such as textual content 160) may be generated in a particular style. For example, in a particular style selected by an individual, in a particular style associated with a writer persona, in a particular style associated with a prospective audience, in a particular style selected based on input data, and so forth. For example, a style may include at least one of an affinity to usage of specific words and/or expressions, a length of sentences and/or paragraphs, a language register, a selection of topics, a degree of sarcasm, or a degree of humor. In one example, a particular generative model associated with the particular style may be selected of a plurality of alternative generative models, and the textual content may be generated using the particular generative model, thereby generating the textual content in the particular style. In another example, information associated with the style may be used as input to a generative model to cause the generative model to generate the textual content in the particular style.

In the example of FIG. 1A, one or more outputs may be provided based on generated textual content 160. For example, the one or more outputs may include at least one of textual output 172 including at least part of generated textual content 160, visual presentation of at least part of generated textual content 160, audible output 174 presenting at least part of generated textual content 160, captions output 176 presenting at least part of generated textual content 160 as captions over another media (such as a video), or digital signals 178 encoding at least part of generated textual content 160.

Figure 1B:
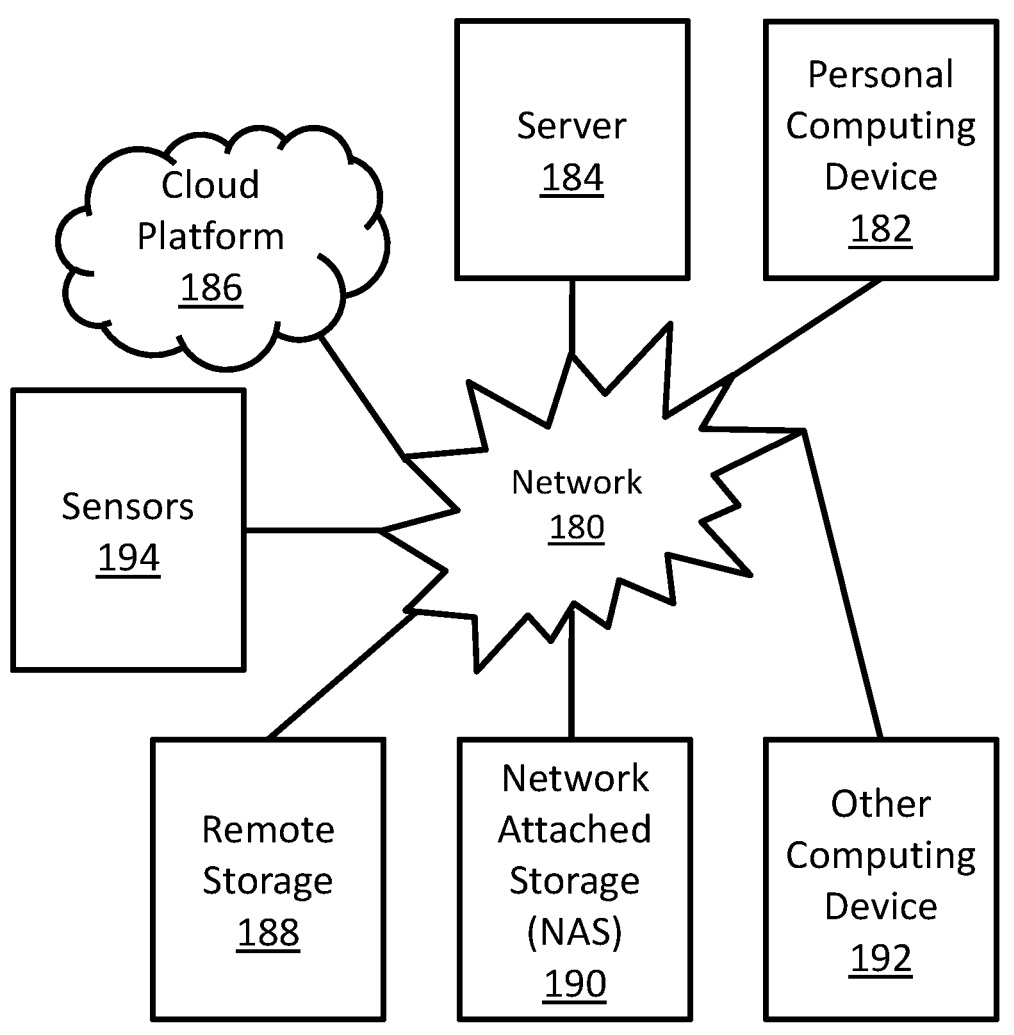
FIG. 1B is a block diagram illustrating a possible implementation of a communicating system, consistent with some embodiments of the present disclosure.

FIG. 1B is a block diagram illustrating a possible implementation of a communicating system consistent with some embodiments of the present disclosure. In this example, apparatuses may communicate using communication network 180 or directly with each other. Some non-limiting examples of such apparatuses may include at least one of personal computing device 182 (such as a mobile phone, smartphone, tablet, personal computer, smartwatch, etc.), server 184, cloud platform 186, remote storage 188 and network attached storage (NAS) 190, other computing devices 192, or sensors 194. Some non-limiting examples of communication network 180 may include digital communication network, analog communication network, the Internet, phone networks, cellular networks, satellite communication networks, private communication networks, virtual private networks (VPN), and so forth, FIG. 1B illustrates a possible implementation of a communication system. In some embodiments, other communication systems that enable communication between apparatuses may be used. Some non-limiting examples of sensors 194 may include at least one of a remote sensor, a sensor integrated in a computing device, image sensors (such as image sensor 260), audio sensors (such as audio sensors 250), motion sensors (such as motion sensor 270), positioning sensors (such as positioning sensors 275), touch sensors, proximity sensors, chemical sensors, temperature sensors, barometers, and so forth.

Figure 2A:
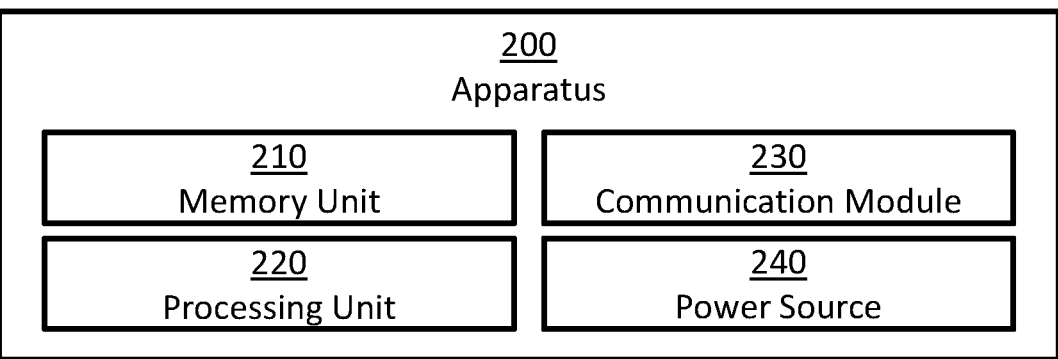
FIGS. 2A and 2B are block diagrams illustrating some possible implementations of an apparatus, consistent with some embodiments of the present disclosure.
Figure 2B:
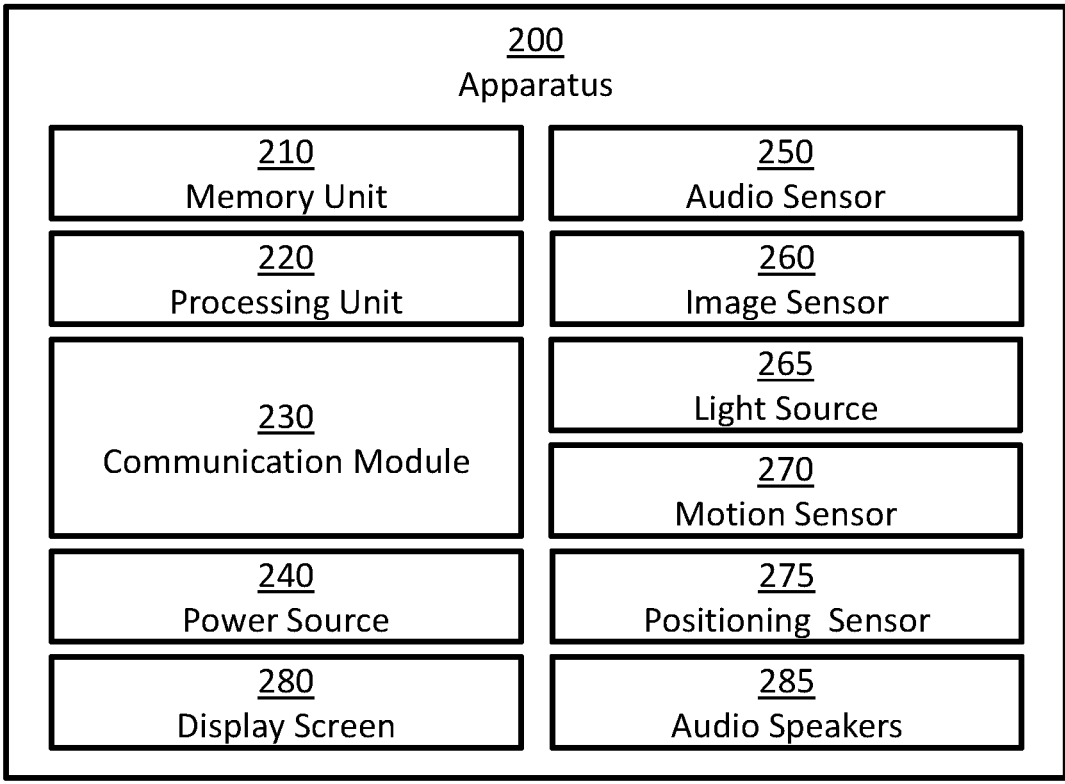

FIG. 2A is a block diagram illustrating a possible implementation of apparatus 200. In this example, apparatus 200 may comprise: one or more memory units 210, one or more processing units 220, and one or more image sensors 260. In some implementations, apparatus 200 may comprise additional components, while some components listed above may be excluded. FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, one or more positioning sensors 275, one or more display screens 280, and one or more audio speakers 285. In some implementations, apparatus 200 may comprise additional components, while some components listed above may be excluded. For example, in some implementations apparatus 200 may also comprise at least one of the following: one or more barometers; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, positioning sensors 275, one or more display screens 280, and one or more audio speakers 285. In some embodiments, apparatus 200 may be included and/or may be used as a personal computing device (such as personal computing device 182), a personal computer, a tablet, a mobile phone, a smartphone, a smartwatch, a computing device, a wearable computing device, a head-mounted computing device, a server (such as server 184), a computational node of a cloud platform (for example, of cloud platform 186), a router, a remote storage unit (such as remote storage 188), NAS (such as NAS 190), a sensor (such as sensors 194), and so forth.

In some embodiments, one or more power sources 240 may be configured to power apparatus 200. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; 3D images; sequence of 3D images; 3D videos; and so forth. In some examples, the captured visual information may be stored in memory units 210. In some additional examples, the captured visual information may be transmitted using communication modules 230, for example to other computerized devices. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
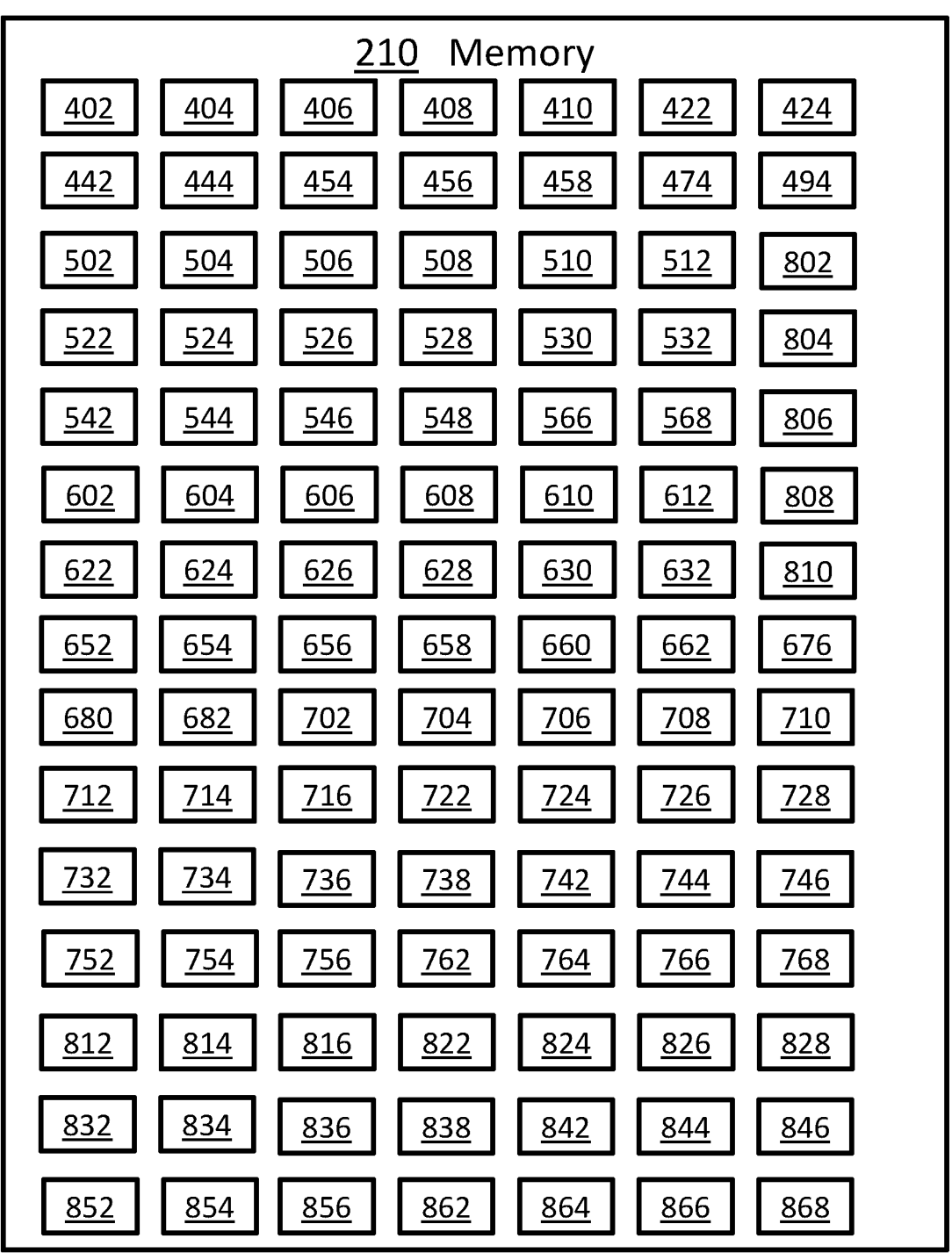
FIG. 3 is a block diagram illustrating an exemplary embodiment of a memory containing software modules, consistent with some embodiments of the present disclosure.

FIG. 3 is a block diagram illustrating an exemplary embodiment of a memory 210 containing software modules. In this example, memory 210 contains software modules 402, 404, 406, 408, 410, 422, 424, 442, 444, 454, 456, 458,

474, 494, 502, 504, 506, 508, 510, 512, 522, 524, 526, 528, 530, 532, 542, 544, 546, 548, 566, 568, 602, 604, 606, 608, 610, 612, 622, 624, 626, 628, 630, 632, 652, 654, 656, 658, 660, 662, 676, 680, 682, 702, 704, 706, 708, 710, 712, 714, 716, 722, 724, 726, 728, 732, 734, 736, 738, 742, 744, 746, 752, 754, 756, 762, 764, 766, 768, 802, 804, 806, 808, 810, 812, 814, 816, 822, 824, 826, 828, 832, 834, 836, 838, 842, 844, 846, 852, 854, 856, 862, 864, 866 and 868. In other examples, memory 210 may contain additional modules or fewer modules. The modules are described in more details below. In one example, at least one of these modules may include data and/or computer implementable instructions that when executed by at least one processor (such as processing units 220) may cause the at least one processor to perform operations for carrying out operations corresponding to at least one of these modules. Any one of these modules may be executed alone or in combination with other modules. In particular, any one of these modules may be used as a step in a method, for example as described below. It is understood that herein any reference to a step may equally refer to a module and vice versa.

In some embodiments, a method (such as methods 400, 420, 440, 450, 470, 490, 500, 520, 540, 560, 600, 620, 650, 670, 700, 720, 730, 740, 750, 760, 800, 820, 830, 840, 850 and 860) may comprise of one or more steps. In some examples, these methods, as well as all individual steps therein, may be performed by various aspects of apparatus 200, of a computerized device, and so forth. For example, a system comprising of at least one processor, such as processing units 220, may perform any of these methods as well as all individual steps therein, for example by processing units 220 executing software instructions stored within memory units 210 to perform operations corresponding to the steps. In some examples, these methods, as well as all individual steps therein, may be performed by a dedicated hardware. In some examples, computer readable medium, such as a non-transitory computer readable medium, may store data and/or computer implementable instructions that when executed by at least one processor causes the at least one processor to perform operations for carrying out at least one of these methods as well as all individual steps therein and/or at least one of these steps. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another process, a trigger from an external device, etc.), and so forth.

In some embodiments, machine learning algorithms (also referred to as machine learning models in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for example in the cases described below. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent) using stochastic gradient descent, using mini-batch gradient descent, and so forth. In some examples, an artificial neural network may be created from two or more other artificial neural networks by combining the two or more other artificial neural networks into a single artificial neural network.

In some embodiments, generative models may be configured to generate new content, such as textual content, visual content, auditory content, graphical content, and so forth. In some examples, generative models may generate new content without input. In other examples, generative models may generate new content based on an input. In one example, the new content may be fully determined from the input, where every usage of the generative model with the same input will produce the same new content. In another example, the new content may be associated with the input but not fully determined from the input, where every usage of the generative model with the same input may product a different new content that is associated with the input. In some examples, a generative model may be a result of training a machine learning generative algorithm with training examples. An example of such training example may include a sample input, together with a sample content associated with the sample input. Some non-limiting examples of such generative models may include Deep Generative Model (DGM), Generative Adversarial Network model (GAN), auto-regressive model, Variational AutoEncoder (VAE), transformers based generative model, artificial neural networks based generative model, hard-coded generative model, and so forth.

Some non-limiting examples of audio data (such as audio data 104) may include audio recordings, audio stream, audio data that includes speech, audio data that includes music, audio data that includes ambient noise, digital audio data, analog audio data, digital audio signals, analog audio signals, mono audio data, stereo audio data, surround audio data, audio data captured using at least one audio sensor (such as audio sensor 250), audio data generated artificially, and so forth. In one example, audio data may be generated artificially from a textual content, for example using text-to-speech algorithms. In another example, audio data may be generated using a generative machine learning model. In some embodiments, analyzing audio data (for example, by the methods, steps and modules described herein) may comprise analyzing the audio data to obtain a preprocessed audio data, and subsequently analyzing the audio data and/or the preprocessed audio data to obtain the desired outcome. One of ordinary skill in the art will recognize that the followings are examples, and that the audio data may be preprocessed using other kinds of preprocessing methods. In some examples, the audio data may include no speech. In other examples, the audio may include speech. In some examples, the audio data may include sounds and/or vocalizations. In some examples, the audio data may include ambient noise. In some examples, the audio data may be preprocessed by transforming the audio data using a transformation function to obtain a transformed audio data, and the preprocessed audio data may comprise the transformed audio data. For example, the transformation function may comprise a multiplication of a vectored time series representation of the audio data with a transformation matrix. For example, the transformation function may comprise convolutions, audio filters (such as low-pass filters, high-pass filters, band-pass filters, all-pass filters, etc.), linear functions, nonlinear functions, and so forth. In some examples, the audio data may be preprocessed by smoothing the audio data, for example using Gaussian convolution, using a median filter, and so forth. In some examples, the audio data may be preprocessed to obtain a different representation of the audio data. For example, the preprocessed audio data may comprise: a representation of at least part of the audio data in a frequency domain; a Discrete Fourier Transform of at least part of the audio data; a Discrete Wavelet Transform of at least part of the audio data; a time/frequency representation of at least part of the audio data; a spectrogram of at least part of the audio data; a log spectrogram of at least part of the audio data; a Mel-Frequency Spectrum of at least part of the audio data; a sonogram of at least part of the audio data; a periodogram of at least part of the audio data; a representation of at least part of the audio data in a lower dimension; a lossy representation of at least part of the audio data; a lossless representation of at least part of the audio data; a time order series of any of the above; any combination of the above; and so forth. In some examples, the audio data may be preprocessed to extract audio features from the audio data. Some non-limiting examples of such audio features may include: auto-correlation; number of zero crossings of the audio signal; number of zero crossings of the audio signal centroid; MP3 based features; rhythm patterns; rhythm histograms; spectral features, such as spectral centroid, spectral spread, spectral skewness, spectral kurtosis, spectral slope, spectral decrease, spectral roll-off, spectral variation, etc.; harmonic features, such as fundamental frequency, noisiness, inharmonicity, harmonic spectral deviation, harmonic spectral variation, tristimulus, etc.; statistical spectrum descriptors; wavelet features; higher level features; perceptual features, such as total loudness, specific loudness, relative specific loudness, sharpness, spread, etc.; energy features, such as total energy, harmonic part energy, noise part energy, etc.; temporal features; and so forth. In some examples, analyzing the audio data may include calculating at least one convolution of at least a portion of the audio data, and using the calculated at least one convolution to calculate at least one resulting value and/or to make determinations, identifications, recognitions, classifications, and so forth.

In some embodiments, analyzing audio data (for example, by the methods, steps and modules described herein) may comprise analyzing the audio data and/or the preprocessed audio data using one or more rules, functions, procedures, artificial neural networks, speech recognition algorithms, speaker recognition algorithms, speaker diarisation algorithms, audio segmentation algorithms, noise cancelling algorithms, source separation algorithms, inference models, and so forth. Some non-limiting examples of such inference models may include: an inference model preprogrammed manually; a classification model; a data regression model; a result of training algorithms, such as machine learning algorithms and/or deep learning algorithms, on training examples, where the training examples may include examples of data instances, and in some cases, a data instance may be labeled with a corresponding desired label and/or result; and so forth.

Some non-limiting examples of image data (such as image data 102) may include one or more images, grayscale images, color images, series of images, 2D images, 3D images, videos, 2D videos, 3D videos, frames, footages, or data derived from other image data. In some embodiments, analyzing image data (for example by the methods, steps and modules described herein) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array. In some examples, audio data may comprise one or more channels, and each channel may include a stream or a one-dimensional array of values. In one example, calculating a convolution of audio data may include calculating a one dimensional convolution on one or more channels of the audio data. In another example, calculating a convolution of audio data may include stacking arrays from different channels to create a two dimensional array, and calculating a two dimensional convolution on the resulting two dimensional array.

Some non-limiting examples of a mathematical object in a mathematical space may include a mathematical point in the mathematical space, a group of mathematical points in the mathematical space (such as a region, a manifold, a mathematical subspace, etc.), a mathematical shape in the mathematical space, and so forth.

In some examples, modality data captured from an environment using at least one sensor of a particular type of sensors may be received. For example, receiving the modality data may comprise reading the modality data from memory, may comprise receiving the modality data from an external device (for example using a digital communication device), may comprise capturing the modality data using the at least one sensor of the particular type of sensors, and so forth. In some examples, different modality data captured using different types of sensors may be received. For example, first modality data captured from an environment using at least one sensor of a first type of sensors may be received, second modality data captured from the environment using at least one sensor of a second type of sensors may be received, third modality data captured from the environment using at least one sensor of a third type of sensors may be received, and so forth. The first type of sensors, second type of sensors and third type of sensors may differ from one another. Some non-limiting examples of such types of sensors may include image sensors, audio sensors, motion sensors, positioning sensors, touch sensors, proximity sensors, chemical sensors, temperature sensors, barometers, and so forth.

FIG. 4A is a flowchart of an exemplary method 400 for analyzing data to generate a textual content reporting objects. In this example, method 400 may comprise receiving first data (Step 402); analyzing the first data to identify a plurality of objects (Step 404); for each object of the plurality of objects, analyzing data associated with the object to select an adjective, and generating a description of the object that includes the adjective (Step 406); generating a textual content that includes the generated descriptions of the plurality of objects (Step 408); and providing the generated textual content (Step 410). In other examples, method 400 may include additional steps or fewer steps. In other examples, one or more steps of method 400 may be executed in a different order and/or one or more groups of steps may be executed simultaneously.

In some examples, systems, methods and non-transitory computer readable media for analyzing data to report objects are provided. In some examples, systems, methods and non-transitory computer readable media for analyzing data to generate a textual content reporting objects are provided. In one example, Step 402 may receive radar data, and Step 404 may analyze the radar data using a pattern recognition algorithm to identify flying objects. Further, Step 406 may analyze data associated with each flying object (for example, analyzing the portion of the radar data corresponding to the flying object) to select an adjective, for example 'fast' and 'small' for a bird and 'big' for an airplane. Step 406 may further generate a description of each flying object that includes the selected adjective, such as 'small bird is flying fast' and 'big airplane'. Further, Step 408 may generate a textual content that includes the generated descriptions of the flying objects, such as 'The small bird is flying fast towards your big airplane.' Step 410 may send this textual content as a message to the airplane.

FIG. 4B is a flowchart of an exemplary method 420 for analyzing visual data to generate a textual content reporting objects. In this example, method 420 may comprise receiving image data captured using at least one image sensor (Step 422); analyzing the image data to identify a plurality of objects (Step 424); for each object of the plurality of objects, analyzing data associated with the object to select an adjective, and generating a description of the object that includes the adjective (Step 406); generating a textual content that includes the generated descriptions of the plurality of objects (Step 408); and providing the generated textual content (Step 410). In other examples, method 420 may include additional steps or fewer steps. In other examples, one or more steps of method 420 may be executed in a different order and/or one or more groups of steps may be executed simultaneously.

In some examples, systems, methods and non-transitory computer readable media for analyzing image data to report objects are provided. In some examples, systems, methods and non-transitory computer readable media for analyzing visual data to generate a textual content reporting objects are provided. In one example, Step 422 may receive a video of a band, and Step 424 may analyze the video using a face recognition algorithm to identify band members, for example Bob and Alice. Further, Step 406 may analyze data associated with each band member (such as biographical information or historical articles associated with a band member) to select an adjective, for example 'outgoing' for Bob 'reserved' for Alice. Step 406 may further generate a description of each band member that includes the selected adjective, such as 'Bob is an extremely affable and outgoing type of person' and 'Alice is a reserved person'. Further, Step 408 may generate a textual content that includes the generated descriptions of the band members, such as 'It is well known that Bob is an extremely affable and outgoing type of person and Alice is a reserved person. There different personalities helped balance each other.' Step 410 may send this textual content as a message to an individual using a texting app. In another example, Step 422 may receive an image of a parade, and Step 424 may analyze the image using object recognition algorithm to identify participants in the parade, for example a person and a donkey. Further, Step 406 may analyze data associated with each participant (for example analyzing a portion of the image depicting the participant using a visual classification algorithm) to select an adjective, for example 'tall' for the person and 'white' for the donkey. Step 406 may further generate a description of each participant that includes the selected adjective, such as 'a tall person' and 'a white donkey'. Further, Step 408 may generate a textual content that includes the generated descriptions of the participants, such as 'The parade was led by a tall person riding a white donkey.' Step 410 may publish this textual content, for example on a website.

FIG. 4C is a flowchart of an exemplary method 440 for analyzing audio data to generate a textual content reporting objects. In this example, method 440 may comprise receiving audio data captured using at least one audio sensor (Step 442); analyzing the audio data to identify a plurality of objects (Step 444); for each object of the plurality of objects, analyzing data associated with the object to select an adjective, and generating a description of the object that includes the adjective (Step 406); generating a textual content that includes the generated descriptions of the plurality of objects (Step 408); and providing the generated textual content (Step 410). In other examples, method 440 may include additional steps or fewer steps. In other examples, one or more steps of method 440 may be executed in a different order and/or one or more groups of steps may be executed simultaneously.

In some examples, systems, methods and non-transitory computer readable media for analyzing audio data for text generation are provided. In some examples, systems, methods and non-transitory computer readable media for analyzing audio data to generate a textual content reporting objects are provided. In one example, Step 442 may receive audio recording of mechanical machines, and Step 444 may analyze the audio recording using an audio pattern recognition algorithm to identify specific machines producing sounds in the audio recording based on their typical sounds. Further, Step 406 may analyze data associated with each specific machine (such as a maintenance record) to select an adjective, for example 'new' for one machine and 'older' for another machine. Step 406 may further generate a description of each specific machine that includes the selected adjective, such as 'the new machine stopped at midnight' and 'the older machine kept working all night'. Further, Step 408 may generate a textual content that includes the generated descriptions of the specific machines, such as 'While the new machine stopped at midnight, the older machine kept working all night, and the task was completed.' Step 410 may insert this textual content to a log. In another example, Step 442 may receive a real-time audio stream of a conversation, and Step 444 may analyze the audio stream using a speaker diarisation algorithm to identify participants in the conversation, for example Bob and Alice. Further, Step 406 may analyze data associated with each participant (for example the portion of the audio stream including speech produced by the participant using an audio classification algorithm) to select an adjective, for example 'suggestive' for Bob and 'categorical' for Alice. Step 406 may further generate a description of each participant that includes the selected adjective, such as 'the accusations Bob made in his suggestive voice' and 'Alice provided a categorical denial'. Further, Step 408 may generate a textual content that includes the generated descriptions of the participants, such as 'Alice provided a categorical denial to the accusations Bob made in his suggestive voice.' Step 410 may publish this textual content, for example in an article.

FIG. 4D is a flowchart of an exemplary method 450 for analyzing data to generate a textual content reporting events. In this example, method 450 may comprise receiving first data (Step 402); analyzing the first data to identify a plurality of events (Step 454); for each event of the plurality of events, analyzing data associated with the event to select an adjective, and generating a description of the event that includes the adjective (Step 456); generating a textual content that includes the generated descriptions of the plurality of events (Step 458); and providing the generated textual content (Step 410). In other examples, method 450 may include additional steps or fewer steps. In other examples, one or more steps of method 450 may be executed in a different order and/or one or more groups of steps may be executed simultaneously.

In some examples, systems, methods and non-transitory computer readable media for analyzing data to report events are provided. In some examples, systems, methods and non-transitory computer readable media for analyzing data to generate a textual content reporting events are provided. In one example, Step 402 may receive rain gauge data, and Step 454 may analyze the rain gauge data using a clustering algorithm to identify rainfall events. Further, Step 456 may analyze data associated with each rainfall event (for example, analyzing the portion of the rain gauge data corresponding to the rainfall event and/or time data) to select an adjective, for example 'heavy' for an afternoon rainfall event and 'minor' for a morning rainfall event. Step 456 may further generate a description of each rainfall event that includes the selected adjective, such as 'heavy rainfall' and 'minor rainfall'. Further, Step 458 may generate a textual content that includes the generated descriptions of the rainfall events, such as 'The heavy rainfall of the afternoon surprised us after the minor rainfall of the morning.' Step 410 may include this textual content in a weather report.

FIG. 4E is a flowchart of an exemplary method 470 for analyzing visual data to generate a textual content reporting events. In this example, method 470 may comprise receiving image data captured using at least one image sensor (Step 422); analyzing the image data to identify a plurality of events (Step 474); for each event of the plurality of events, analyzing data associated with the event to select an adjective, and generating a description of the event that includes the adjective (Step 456); generating a textual content that includes the generated descriptions of the plurality of events (Step 458); and providing the generated textual content (Step 410). In other examples, method 470 may include additional steps or fewer steps. In other examples, one or more steps of method 470 may be executed in a different order and/or one or more groups of steps may be executed simultaneously.

In some examples, systems, methods and non-transitory computer readable media for analyzing image data to report events are provided. In some examples, systems, methods and non-transitory computer readable media for analyzing visual data to generate a textual content reporting events are provided. In one example, Step 422 may receive a video captured from an environment, and Step 474 may analyze the video to detect two explosions. Further, Step 456 may analyze data associated with each explosion (for example analyzing a portion of the video depicting the explosion using a visual classification algorithm) to select an adjective, for example 'massive' and 'smaller'. Step 456 may further generate a description of each explosion that includes the selected adjective, such as 'a massive explosion' and 'a smaller explosion'. Further, Step 458 may generate a textual content that includes the generated descriptions of the explosions, such as 'the smaller explosion that followed the massive explosion did most of the damage.' Step 410 may output this textual content as an audio overlay of the video using a text to speech algorithm. In another example, Step

422 may receive a video of a baseball game, and Step 474 may analyze the video to detect actions, such as a strike and a single. Further, Step 456 may analyze data associated with each action (for example, analyzing audio recording of the reaction of the audience to the action using an audio classification algorithm) to select an adjective, for example 'disheartening' for the strike and 'comforting' for the single. Step 456 may further generate a description of each action that includes the selected adjective, such as 'the disheartening strike' and 'a comforting single'. Further, Step 458 may generate a textual content that includes the generated descriptions of the actions, such as 'The disheartening strike was followed by a comforting single, and the audience went wild.' Step 410 may provide this textual content as part of an article associated with the baseball game.

FIG. 4F is a flowchart of an exemplary method 490 for analyzing audio data to generate a textual content reporting events. In this example, method 490 may comprise receiving audio data captured using at least one audio sensor (Step 442); analyzing the audio data to identify a plurality of events (Step 494); for each event of the plurality of events, analyzing data associated with the event to select an adjective, and generating a description of the event that includes the adjective (Step 456); generating a textual content that includes the generated descriptions of the plurality of events (Step 458); and providing the generated textual content (Step 410). In other examples, method 490 may include additional steps or fewer steps. In other examples, one or more steps of method 490 may be executed in a different order and/or one or more groups of steps may be executed simultaneously.

In some examples, systems, methods and non-transitory computer readable media for analyzing audio data for text generation are provided. In some examples, systems, methods and non-transitory computer readable media for analyzing audio data to generate a textual content reporting events are provided. In one example, Step 442 may receive an audio stream captured from a corridor, and Step 494 may analyze the real time audio stream to detect sounds of people crossing the corridor (such as steps, whistles, speech, and so forth), thereby identifying events of people passing the corridor. Further, Step 456 may analyze data associated with each passage through the corridor (such as portions of the audio data corresponding to the passage) to select an adjective, for example 'loud' and 'swift'. Step 456 may further generate a description of each passage that includes the selected adjective, such as 'a loud group of three people crossed the corridor from east to west' and 'a swift passage of a single person'. Further, Step 458 may generate a textual content that includes the generated descriptions of the passages, such as 'In the morning, only a swift passage of a single person was observed, but in the afternoon, a loud group of three people crossed the corridor from east to west.' Step 410 may insert this textual content to a log. In another example, Step 442 may receive an audio stream captured using a wearable microphone worn by an individual, and Step 494 may analyze the audio stream (for example using a speaker diarisation algorithm) to detect conversations involving the individual. Step 456 may analyze data associated with each conversation, for example analyzing biometric data captured during the conversation by a biometric sensor included in the wearable microphone to determine biological reaction to the conversation and/or analyzing the audio data to identify the participants in the conversation. Further, Step 456 may use the analysis to select an adjective, for example 'stressful' for a conversation with a boss of the individual, and 'pleasant' for a conversation with a friend.

Step 456 may further generate a description of each conversation that includes the selected adjective, such as 'stressful conversation with your boss' and 'pleasant conversation with a friend'. Further, Step 458 may generate a textual content that includes the generated descriptions of the passages, such as 'The pleasant conversation with a friend helped reduced your heart rate after the stressful conversation with your boss.' Step 410 may insert this textual content to a textual summary of a day.

In some examples, Step 402 may comprise receiving first data. In one example, the first data may be data captured using at least one sensor. In another example, the first data may be data generated, for example using a machine learning generative model. In one example, the first data may include at least one of inputs 100, image data 102, audio data 104, sensor data 106, log data 108 or transactions data 110. In some examples, receiving the first data may comprise reading the first data from memory, may comprise receiving the first data from an external device (for example using a digital communication device), may comprise receiving the first data from an individual (for example via a user interface), may comprise capturing the first data using at least one sensor, may comprise generating the first data, and so forth. In some examples, the first data may be or include image data captured using at least one image sensor, for example image data received by Step 422. In some examples, the first data may be or include audio data captured using at least one audio sensor, for example audio data received by Step 442.

In some examples, Step 422 may comprise receiving image data (such as image data 102) captured using at least one image sensor. In some examples, receiving the image data may comprise reading the image data from memory, may comprise receiving the image data from an external device (for example using a digital communication device), may comprise capturing the image data using the at least one image sensor, and so forth.

In some examples, Step 442 may comprise receiving audio data captured using at least one audio sensor, such as audio data 104. In some examples, receiving the audio data may comprise reading the audio data from memory, may comprise receiving the audio data from an external device (for example using a digital communication device), may comprise capturing the audio data using the at least one audio sensor, and so forth. In some examples, the audio data received by Step 442 may include no speech. In some examples, the audio data received by Step 442 may include speech. In some examples, the audio data received by Step 442 may include sounds and/or vocalizations. In some examples, the audio data received by Step 442 may include ambient noise.

In some examples, Step 404 may comprise analyzing the first data received by Step 402 to identify a plurality of objects. In some examples, Step 404 may comprise analyzing data (for example, analyzing at least one of the first data received by Step 402, inputs 100, image data 102, audio data 104, sensor data 106, log data 108 or transactions data 110) to identify one or more objects (for example, a single object, a plurality of objects, objects 122, and so forth). In some examples, a machine learning model may be trained using training examples to identify objects from data. An example of such training example may include sample data, together with a label indicating one or more objects associated with the sample data. Step 404 may use the trained machine learning model to analyze the data and identify the plurality of objects. In some examples, Step 404 may calculate a function of the data to obtain a result value, and may identify the plurality of objects based on the result value. For example, when the result value is a first value, Step 404 may identify a first plurality of objects, and when the result value is a second value, Step 404 may identify a second plurality of objects. The second plurality of objects may differ from the first plurality of objects. Some non-limiting examples of such function may include a linear function, a non-linear function, a polynomial function, an exponential function, a logarithmic function, and so forth. In some examples, the first data may be or include image data, and Step 404 may use Step 424 to analyze the image data and identify the plurality of objects. In some examples, the first data may be or include audio data, and Step 404 may use Step 444 to analyze the audio data and identify the plurality of objects. In some examples, the plurality of objects identified by Step 404 and/or Step 424 and/or Step 444 may include at least one of an animate object, an inanimate object, a person, an animal, a physical object, or a virtual object (for example, from an extended reality environment, from a digital record, and so forth). In one example, the plurality of objects identified by Step 404 and/or Step 424 and/or Step 444 may include at least inanimate object and at least one animate object.

In some examples, Step 424 may comprise analyzing the image data received by Step 422 to identify a plurality of objects. In some examples, Step 424 may comprise analyzing image data (such as the image data received by Step 422, image data 102, etc.) to identify one or more objects (for example, a single object, a plurality of objects, objects 122, and so forth). In some examples, a machine learning model may be trained using training examples to identify objects from image data. An example of such training example may include a sample image data, together with a label indicating one or more objects depicted in the sample image data. Step 424 may use the trained machine learning model to analyze the image data and identify the plurality of objects. In some examples, Step 424 may calculate a convolution of at least part of the image data and thereby obtain a result value of the calculated convolution of the at least part of the image data, and may identify the plurality of objects based on the result value. For example, when the result value is a first value, Step 424 may identify a first plurality of objects, and when the result value is a second value, Step 424 may identify a second plurality of objects. The second plurality of objects may differ from the first plurality of objects.

In some examples, Step 444 may comprise analyzing the audio data received by Step 442 to identify a plurality of objects. In some examples, Step 444 may comprise analyzing audio data (such as the audio data received by Step 442, audio data 102, etc.) to identify one or more objects (for example, a single object, a plurality of objects, objects 122, and so forth). In some examples, a machine learning model may be trained using training examples to identify objects from audio data. An example of such training example may include a sample audio data, together with a label indicating one or more objects associated with the sample audio data. Step 444 may use the trained machine learning model to analyze the audio data and identify the plurality of objects. In some examples, Step 444 may calculate a convolution of at least part of the audio data and thereby obtain a result value of the calculated convolution of the at least part of the audio data, and may identify the plurality of objects based on the result value. For example, when the result value is a first value, Step 444 may identify a first plurality of objects, and when the result value is a second value, Step 444 may identify a second plurality of objects. The second plurality of objects may differ from the first plurality of objects. In some examples, the audio data may include sounds generated by an object, such as speech generated by a person, an animal generating noises and/or vocalizations, a machine generating noise, and so forth. Different objects may generate different sounds, such as a voice unique to a person, a frequency unique to a specific machine, and so forth. Step 444 may analyze the audio data to recognize the sounds, and thereby identify the object.

In some examples, Step 404 and/or Step 424 and/or Step 444 may identify at least three objects, and may select the plurality of objects of the at least three objects. In one example, the plurality of objects does not include at least a particular object of the at least three objects. In one example, the textual content generated by Step 408 does not include any description of the particular object. In some examples, Step 404 may analyze the first data received by Step 402 to identify at least three objects, and may select the plurality of objects of the at least three objects. In some examples, for each object of the at least three objects, Step 404 and/or Step 424 and/or Step 444 may determine a type of the object. Further, Step 404 and/or Step 424 and/or Step 444 may base the selection of the plurality of objects of the at least three objects on the types of the at least three objects. For example, Step 404 may determine a type of an object based on an analysis of the first data using a classification model, where each class may be associated with a type. In another example, Step 424 may determine a type of an object based on an analysis of the image data, for example using a visual object recognition algorithm. In yet another example, Step 444 may determine a type of an object based on an analysis of the audio data using a classification model, where each class may be associated with a type. In some examples, for each object of the at least three objects, Step 404 and/or Step 424 and/or Step 444 may analyze the data associated with the object to determine a mathematical object associated with the object in a mathematical space, for example as described below in relation to Step 406. Further, Step 404 and/or Step 424 and/or Step 444 may base the selection of the plurality of objects of the at least three objects on the mathematical objects associated with the at least three objects. In some examples, Step 404 and/or Step 424 and/or Step 444 may obtain an indication of a writer persona (for example as described above in relation to writer persona 142), and may base the selection of the plurality of objects of the at least three objects on the writer persona. For example, historic textual contents associated with the writer persona may indicate different levels of affinity of the writer persona to different types of objects, and the objects of the at least three objects with higher level of affinity to the writer persona may be included in the plurality of objects, while objects with lower level of affinity to the writer persona may be excluded from the plurality of objects. In some examples, Step 404 and/or Step 424 and/or Step 444 may obtain an indication of a prospective audience (for example as described above in relation to prospective audience 144), and may base the selection of the plurality of objects of the at least three objects on the prospective audience. For example, a prospective audience of children may have affinity to specific types of objects while a prospective audience of adults may have affinity to other types of objects, and the objects of the at least three objects with higher level of affinity to the prospective audience may be included in the plurality of objects, while objects with lower level of affinity to the prospective audience may be excluded from the plurality of objects. In some examples, Step 404 and/or Step 424 and/or Step 444 may obtain an indication of a topic associated with the generated textual content (for example as described above in relation to topic 152), and for each object of the at least three objects, may identify a degree of relevance of the object to the topic. Further, Step 404 and/or Step 424 and/or Step 444 may base the selection of the plurality of objects of the at least three objects on the degrees of relevance of the at least three objects. For example, the objects of the at least three objects with higher degree of relevance to the topic may be included in the plurality of objects, while objects with lower degree of relevance to the topic may be excluded from the plurality of objects. In one example, the degrees of relevance may be binary (relevant or not-relevant). In another example, the degrees of relevance may be discrete (for example, 'high', 'medium', 'low' or 'none'). In yet another example, the degrees of relevance may be continuous (for example, a number in a continuous range of numbers). In one example, a machine learning model may be trained using training examples to determine degrees of relevance of objects to topics. An example of such training example may include sample data associated with a sample object and a sample topic, together with a label indicating the degree of relevance of the sample object to the sample topic. The trained machine learning model may be used, for each object of the at least three objects, to analyze data associated with the object to determine a degree of relevance of the object to the topic. In one example, Step 404 and/or Step 424 and/or Step 444 may determine a mathematical object associated with the topic in a mathematical space. For example, an output of a mathematical function when data associated with the topic is used as input may be used to determine the mathematical object. Some non-limiting examples of such mathematical function may include a linear function, a non-linear function, a polynomial function, an exponential function, a logarithmic function, and so forth. Further, for each object of the at least three objects, Step 404 and/or Step 424 and/or Step 444 may determine a mathematical object corresponding to the object in the mathematical space, for example as described below in relation to Step 406. Further, for each object of the at least three objects, Step 404 and/or Step 424 and/or Step 444 may use the mathematical object corresponding to the object and the mathematical object associated with the topic in the mathematical space to identify the degree of relevance of the object to the topic. In one example, the degree of relevance of the object to the topic may be based on a distance between the mathematical object corresponding to the object and the mathematical object associated with the topic in the mathematical space. In another example, the mathematical object associated with the topic in the mathematical space may include a plurality of other mathematical objects (such as a region, a manifold, a mathematical subspace, etc.), and the degree of relevance of the object to the topic may be based on whether the mathematical object corresponding to the object is included in the mathematical object associated with the topic. In some examples, for each object of the at least three objects, Step 404 and/or Step 424 and/or Step 444 may obtain a magnitude associated with the object. For example, a regression model may be used to analyze data associated with the object and determine the magnitude associated with the object. In another example, the magnitude associated with the object may be included in the data associated with the object. In yet another example, for each object of the at least three objects, Step 424 may analyze the image data received by Step 422 to determine the magnitude associated with the object. In an additional example, for each object of the at least three objects, Step 444 may analyze the audio data received by Step 442 to determine the magnitude associated with the object. In another example, Step 424 may receive second modality data captured from an environment using at least one sensor of a second type of sensors (the second type of sensors may differ from image sensors, such as audio sensors), and for each object of the at least three objects, Step 424 may analyze the second modality data to determine the magnitude associated with the object. In yet another example, Step 444 may receive second modality data captured from an environment using at least one sensor of a second type of sensors (the second type of sensors may differ from audio sensors, such as image sensors), and for each object of the at least three objects, Step 444 may analyze the second modality data to determine the magnitude associated with the object. Further, Step 404 and/or Step 424 and/or Step 444 may base the selection of the plurality of objects of the at least three objects on the magnitudes associated with the at least three objects. For example, the objects of the at least three objects associated with higher magnitudes may be included in the plurality of objects, while objects associated with lower magnitudes may be excluded from the plurality of objects.

In some examples, Step 424 may analyze the image data received by Step 422 to detect at least three objects, and may select the plurality of objects of the at least three objects. In one example, for each object of the at least three objects, Step 424 may calculate a convolution of at least part of the image data and thereby obtain a result value of the calculated convolution of the at least part of the image data, and may determine whether to include the object in the plurality of objects based on the result value of the calculated convolution of the at least part of the image data.

In some examples, Step 444 may analyze the audio data received by Step 442 to detect at least three objects, and may select the plurality of objects of the at least three objects. In one example, for each object of the at least three objects, Step 444 may calculate a convolution of at least part of the audio data and thereby obtain a result value of the calculated convolution of the at least part of the audio data, and may determine whether to include the object in the plurality of objects based on the result value of the calculated convolution of the at least part of the audio data.

In some examples, Step 406 may comprise, for each object of the plurality of objects identified by Step 404 and/or Step 424 and/or Step 444, analyzing data associated with the object to select an adjective, and generating a description of the object that includes the adjective. In some examples, Step 406 may comprise, for each object of a group of one or more objects (such as objects 122, the plurality of objects identified by Step 404 and/or Step 424 and/or Step 444, etc.), analyzing data associated with the object to select an adjective, and generating a description of the object that includes the adjective. In one example, the data associated with the object does not include the adjective selected by Step 406. In one example, a machine learning model may be trained using training examples to select adjectives based on data. An example of such training example may include sample data, together with a label indicating a sample selection of a sample adjective associated with the sample data. Step 406 may use the trained machine learning model to analyze the data associated with the object and select the adjective. In one example, the adjective may be a descriptive adjective. In another example, the adjective may be a numeral adjective. In yet another example, the adjective may be a quantitative adjective. In an additional example, the adjective may be a demonstrative adjective. In another example, the adjective may be an interrogative adjective. In yet another example, the adjective may be a possessive adjective. In an additional example, the adjective may be a proper adjective. In yet another example, the adjective may be an exclamatory adjective. In some examples, Step 406 may insert the selected adjective to a sentence (for example, a template sentence, in a sample sentence, and so forth) in a location selected for an adjective (for example, a place for an adjective in the template sentence, replacing another adjective in the sample sentence, and so forth), to thereby generate the description of the object that includes the adjective. In some examples, Step 406 may use a generative model to generate the description of the object that includes the adjective, for example using the selected adjective as an input to the generative model.

In some examples, Step 406 may analyze the image data received by Step 422 to determine the data associated with a particular object of the plurality of objects. For example, the data may include or be based on pixel values of at least part of a depiction of the particular object in the image data. In another example, Step 406 may calculate a convolution of at least part of the image data and thereby obtain a result value of the calculated convolution of the at least part of the image data, and may determine the data associated with a particular object based on the result value. In some examples, Step 406 may analyze the audio data received by Step 442 to determine the data associated with a particular object of the plurality of objects. For example, the data may include or be based on pitch values of at least part of the audio data. In another example, Step 406 may calculate a convolution of at least part of the audio data and thereby obtain a result value of the calculated convolution of the at least part of the audio data, and may determine the data associated with a particular object based on the result value. In one example, the audio data received by Step 442 does not include the adjective selected by Step 406. In some examples, Step 404 may analyze first modality data captured from an environment using at least one sensor of a first type of sensors to identify the plurality of objects (for example, as described herein in relation to Step 404 and/or Step 424 and/or Step 444). Further, second modality data captured from an environment using at least one sensor of a second type of sensors may be received (for example, as described above). The second type of sensors may differ from first type of sensors. In one example, Step 406 may analyze at least part of the second modality data to determine the data associated with a particular object of the plurality of objects, for example as described herein. In one example, the first type of sensors may be image sensors, the first modality data may be image data, the second type of sensors may be audio sensors, and the second modality data may be audio data. In another example, the first type of sensors may be audio sensors, the first modality data may be audio data, the second type of sensors may be image sensors, and the second modality data may be image data. In some examples, Step 406 may access synchronization data configured to enable synchronization of the first modality data and the second modality data. In one example, the synchronization data may include data configured to correlate different portions of the second modality data to different portions of the first modality data. For example, the synchronization data may correlate the different portions of the first modality data and the different portions of the second modality data to a common timeline. In some examples, Step 406 may use the synchronization data to identify a portion of the second modality data corresponding to the particular object, for example based on the portion of the second modality data being synchronized with a portion of the first modality data corresponding to the particular object. In some examples, Step 406 may analyze the portion of the second modality data corresponding to the particular object to determine the data associated with the particular object, for example as described herein.

In some examples, Step 406 may analyze the data associated with an object (such as an object of the plurality of objects identified by Step 404 and/or Step 424 and/or Step 444, an object of objects 122, an event of the group of one or more events of Step 654, etc.) to determine a mathematical object in a mathematical space. For example, an output of a mathematical function when the data associated with the object is used as input may be used to determine the mathematical object. Some non-limiting examples of such mathematical function may include a linear function, a non-linear function, a polynomial function, an exponential function, a logarithmic function, and so forth. In one example, Step 406 may analyze image data associated with the object (such as a portion of the image data received by Step 422 corresponding to the object and selected as described below) to determine the mathematical object in the mathematical space. For example, Step 406 may calculate a convolution of at least part of the image data and thereby obtain a result value of the calculated convolution of the at least part of the image data, and may select the mathematical object in the mathematical space based on the result value. In one example, Step 406 may analyze audio data associated with the object (such as a portion of the audio data received by Step 442 corresponding to the object and selected as described below) to determine the mathematical object in the mathematical space. For example, Step 406 may calculate a convolution of at least part of the audio data and thereby obtain a result value of the calculated convolution of the at least part of the audio data, and may select the mathematical object in the mathematical space based on the result value. In some examples, Step 406 may analyze the data associated with a particular object of the plurality of objects identified by Step 404 and/or Step 424 and/or Step 444 to determine a particular mathematical object in the mathematical space, and may base the selection of the adjective for the particular object on the particular mathematical object. For example, when the particular mathematical object is in a first region of the mathematical space, Step 406 may select a first adjective, and when the particular mathematical object is in a second region of the mathematical space, Step 406 may select a second adjective, the second adjective may differ from the first adjective. In some examples, Step 406 may analyze the data associated with a specific object of the plurality of objects to determine a specific mathematical object in the mathematical space. The specific object may differ from the particular object, and the specific mathematical object may differ from the particular mathematical object. In one example, Step 406 may base the selection of the adjective for the particular object on the specific mathematical object. In another example, Step 406 may base the selection of the adjective for the particular object on the specific mathematical object and the particular mathematical object. For example, when a distance between the particular mathematical object and the specific mathematical object is below a selected threshold, Step 406 may select a first adjective, and when the distance is above the selected threshold, Step 406 may select a second adjective. In another example, when the particular mathematical object and the specific mathematical object are in a selected region of the mathematical space, Step 406 may select a first adjective, and when either the particular mathematical object or the specific mathematical object are outside the selected region, Step 406 may select a second adjective. The second adjective may differ from the first adjective.

In some examples, Step 406 may analyze image data associated with an object (such as an object of the plurality of objects identified by Step 404 and/or Step 424 and/or Step 444, an object of objects 122, etc.) to select the adjective for the object. For example, a machine learning model may be trained using training examples to select adjectives based on images and/or videos. An example of such training example may include a sample image and/or a sample video associated with a sample object, together with a label indicating a sample selection of an adjective for the sample object. Step 406 may use the trained machine learning model to analyze the image data associated with the object and select the adjective for the object. In one example, Step 406 may calculate a convolution of at least part of the image data and thereby obtain a result value of the calculated convolution of the at least part of the image data, and may select the adjective for the object based on the result value of the calculated convolution of the at least part of the image data. In some examples, Step 406 may determine a portion of the image data received by Step 422 associated with a particular object of the plurality of objects. For example, the particular object may appear in a part of the image data, and the portion of the image data may be determined based on the part of the image data in which the particular object appears. The portion of the image data may include some but not all of the image data. Further, Step 406 may analyze the portion of the image data to select the adjective for the particular object, for example as described above. In one example, Step 406 may calculate a convolution of the portion of the image data associated with the particular object and thereby obtain a result value of the calculated convolution of the portion of the image data associated with the particular object. Further, Step 406 may base the selection of the adjective for the particular object on the result value of the calculated convolution of the portion of the image data associated with the particular object. In one example, Step 406 may analyze the portion of the image data to determine a mathematical object in a mathematical space (for example as described above), and may base the selection of the adjective for the particular object on the mathematical object.

In some examples, Step 406 may analyze audio data associated with an object (such as an object of the plurality of objects identified by Step 404 and/or Step 424 and/or Step 444, an object of objects 122, etc.) to select the adjective for the object. For example, a machine learning model may be trained using training examples to select adjectives based on audio clips. An example of such training example may include a sample audio clip associated with a sample object, together with a label indicating a sample selection of an adjective for the sample object. Step 406 may use the trained machine learning model to analyze the audio data associated with the object and select the adjective for the object. In one example, Step 406 may calculate a convolution of at least part of the audio data and thereby obtain a result value of the calculated convolution of the at least part of the audio data, and may select the adjective for the object based on the result value of the calculated convolution of the at least part of the audio data. In some examples, Step 406 may determine a portion of the audio data received by Step 442 associated with a particular object of the plurality of objects. For example, sounds associated with the particular object may be in a part of the audio data, and the portion of the audio data may be determined based on the part of the audio data in which the sounds associated with the particular object are. The portion of the audio data may include some but not all of the audio data. Further, Step 406 may analyze the portion of the audio data to select the adjective for the particular object, for example as described above. In one example, Step 406 may calculate a convolution of the portion of the audio data associated with the particular object and thereby obtain a result value of the calculated convolution of the portion of the audio data associated with the particular object. Further, Step 406 may base the selection of the adjective for the particular object on the result value of the calculated convolution of the portion of the audio data associated with the particular object. In one example, Step 406 may analyze the portion of the audio data to determine a mathematical object in a mathematical space (for example as described above), and may base the selection of the adjective for the particular object on the mathematical object.

Additionally or alternatively, Step 406 may comprise, for each object of a group of one or more objects (such as one or more objects of objects 122, one or more objects of the plurality of objects identified by Step 404 and/or Step 424 and/or Step 444, the entire plurality of objects identified by Step 404 and/or Step 424 and/or Step 444, and so forth), analyzing data associated with the object to select an adverb. In some examples, Step 406 may comprise analyzing the data associated with a particular object of the plurality of objects to select an adverb. Further, Step 406 may include the adverb in the generated description of the particular object. In some examples, a machine learning model may be trained using training examples to select adverbs based on data. An example of such training example may include sample data, together with a label indicating a sample selection of a sample adverb associated with the sample data. Step 406 may use the trained machine learning model to analyze the data associated with the object and select the adverb. In some examples, Step 406 may insert the selected adverb to a sentence (for example, a template sentence, in a sample sentence, and so forth) in a location selected for an adverb (for example, a place for an adverb in the template sentence, replacing another adverb in the sample sentence, and so forth), to thereby generate the description of the object that includes the adverb. In some examples, Step 406 may use a generative model to generate the description of the object that includes the adverb, for example using the selected adverb as an input to the generative model.

Additionally or alternatively, Step 406 may comprise, for each object of a group of one or more objects (such as one or more objects of objects 122, one or more objects of the plurality of objects identified by Step 404 and/or Step 424 and/or Step 444, the entire plurality of objects identified by Step 404 and/or Step 424 and/or Step 444, and so forth), identifying an event associated with the object, and including a description of the event in the generated description of the object. In some examples, Step 406 may comprise identifying an event associated with a particular object of the plurality of objects, and including a description of the event in the generated description of the particular object. In one example, the identification of the event associated with the object may be performed as described herein, for example as described in relation to Step 704 and/or Step 706 and/or method 720. In one example, Step 406 may analyze image data (such as the image data received by Step 422) to identify the event associated with a particular object, for example as described below. In one example, Step 406 may analyze audio data (such as the audio data received by Step 442) to identify the event associated with a particular object, for example as described below. In one example, the description of the event may be generated as described herein, for example as described in relation to Step 456. In some examples, Step 406 may insert the description of the event to a template in a location selected for a description of an event, to thereby generate the description of the object that includes the description of the event. In some examples, Step 406 may use a generative model to generate the description of the object that includes the description of the event, for example using the description of the event as an input to the generative model.

In some examples, Step 408 may comprise generating a textual content that includes the descriptions of the plurality of objects generated by Step 406. In some examples, Step 408 may comprise generating a textual content that includes a plurality of descriptions (such as the descriptions of the plurality of objects generated by Step 406). In some examples, Step 408 may insert the descriptions to a template in locations selected for descriptions, to thereby generate the textual content that includes the descriptions of the plurality of objects. In some examples, Step 408 may use a generative model to generate the textual content that includes the descriptions of the plurality of objects, for example using the descriptions as inputs to the generative model. In some examples, Step 408 may further include in the textual content other details, such as a description of another object, a description of an event, a description of a scenery, a description of a location, a description related to time, a description of a cause or a reason, a description of a result, contextual information, a reference, and so forth.

In some examples, Step 408 may further comprise selecting an order for the plurality of objects in the generated textual content, and generating the textual content to include the descriptions of the plurality of objects arranged based on the selected order. In one example, the plurality of objects may be identified by analyzing the first data by Step 404, and the selected order for the plurality of objects in the generated textual content may differ from an order of the plurality of objects in the first data. In one example, the plurality of objects may be identified by Step 424 by analyzing the image data, and the selected order for the plurality of objects in the generated textual content may differ from an order of the plurality of objects in the image data. In one example, the plurality of objects may be identified by analyzing the audio data by Step 444, and the selected order for the plurality of objects in the generated textual content may differ from an order of the plurality of objects in the audio data. In some examples, Step 408 may select the order for the plurality of objects in the generated textual content based on the data associated with the plurality of objects used by Step 406. In one example, for each object of the plurality of objects, the data may include a magnitude associated with the object, for example as described herein, and Step 408 may select the order for the plurality of objects in the generated textual content based on the magnitudes associated with the objects (for example, in a descending order of magnitudes, in an ascending order of magnitudes, and so forth). In one example, a machine learning model may be trained using training examples to analyze data associated with objects to select order for the objects. An example of such training example may include sample data associated with sample objects, together with a label indicating a sample selection of order for the sample objects. Step 408 may use the trained machine learning model to analyze the data associated with the plurality of objects and select the order for the plurality of objects in the generated textual content. In some examples, Step 408 may obtain an indication of a topic associated with the generated textual content (for example as described above in relation to topic 152), and may select the order for the plurality of objects in the generated textual content based on the topic associated with the generated textual content. In one example, objects more relevant to the topic may be positioned earlier. In some examples, Step 408 may obtain an indication of a writer persona (for example as described above in relation to writer persona 142), and may select the order for the plurality of objects in the generated textual content based on the writer persona. For example, historic textual contents associated with the writer persona may indicate an affinity of the writer persona to start with objects of specific type, and objects of the specific type of the plurality of objects may be positioned first in the selected order. In some examples, Step 408 may obtain an indication of a prospective audience (for example as described above in relation to prospective audience 144), and may select the order for the plurality of objects in the generated textual content based on the prospective audience. For example, the prospective audience may have affinity to specific object type, and objects of the specific type of the plurality of objects may be positioned first in the selected order.

In some examples, the plurality of objects may be identified by Step 424 by analyzing the image data, and Step 408 may select an order for the plurality of objects in the generated textual content based on an analysis of the image data. Step 408 may generate the textual content to include the descriptions of the plurality of objects arranged based on the selected order, as described above. In some examples, Step 408 may calculate a convolution of at least part of the image data and thereby obtain a result value of the calculated convolution of the at least part of the image data, and may select the order for the plurality of objects in the generated textual content based on the result value of the calculated convolution of the at least part of the image data. In some examples, Step 408 may analyze the image data to determine that a first object of the plurality of objects holds a second object of the plurality of objects, and may base the selection of the order on the determination that the first object holds the second object. In one example, the first object may precede the second object in the selected order. In one example, the second object may precede the first object in the selected order. In one example, Step 408 may analyze the image data using a visual object detection algorithm to detect the first and second objects, and then analyze the image data using a visual classification algorithm to determine whether the first object holds the second object (for example, by classifying the image data to a 'first object holds second object' class or to a 'first object does not hold second object' class). In some examples, Step 408 may analyze the image data to determine that a first object of the plurality of objects contains a second object of the plurality of objects, and may base the selection of the order on the determination that the first object contains the second object. In one example, Step 408 may analyze the image data using a visual object detection algorithm to detect the first and second objects, and then analyze the image data using a visual classification algorithm to determine whether the first object contains the second object (for example, by classifying the image data to a 'first object contains second object' class or to a 'first object does not contain second object' class). In some examples, Step 408 may analyze the image data to determine that a first object of the plurality of objects uses a second object of the plurality of objects, and may base the selection of the order on the determination that the first object uses the second object. In one example, Step 408 may analyze the image data using a visual object detection algorithm to detect the first and second objects, and then analyze the image data using a visual classification algorithm to determine whether the first object uses the second object (for example, by classifying the image data to a 'first object uses second object' class or to a 'first object does not use second object' class). In some examples, Step 408 may analyze the image data to determine that a first object of the plurality of objects operates a second object of the plurality of objects, and may base the selection of the order on the determination that the first object operates the second object. In one example, Step 408 may analyze the image data using a visual object detection algorithm to detect the first and second objects, and then analyze the image data using a visual classification algorithm to determine whether the first object operates the second object (for example, by classifying the image data to a 'first object operates second object' class or to a 'first object does not operate second object' class). In some examples, Step 408 may analyze the image data to determine that a first object of the plurality of objects affects a second object of the plurality of objects, and may base the selection of the order on the determination that the first object affects the second object. In one example, Step 408 may analyze the image data using a visual object detection algorithm to detect the first and second objects, and then analyze the image data using a visual classification algorithm to determine whether the first object affects the second object (for example, by classifying the image data to a 'first object affects second object' class or to a 'first object does not affect second object' class).

In some examples, the plurality of objects may be identified by analyzing the audio data by Step 444, and Step 408 may select the order for the plurality of objects in the generated textual content based on an analysis of the audio data. In some examples, Step 408 may calculate a convolution of at least part of the audio data and thereby obtain a result value of the calculated convolution of the at least part of the audio data, and may select the order for the plurality of objects in the generated textual content based on the result value of the calculated convolution of the at least part of the audio data. In some examples, Step 408 may analyze the audio data to determine that a first object of the plurality of objects operates a second object of the plurality of objects, and may base the selection of the order on the determination that the first object operates the second object. For example, the first object and the second objects may be positioned one after the other in the selected order based on the determination. In another example, the descriptions of the first object and the second object may be intertwined based on the selected order in response to the determination. In one example, the first object may be a person operating a computing device with voice commands, and Step 408 may analyze the audio data to identify the voice commands and the audio output of the computing device, thereby identifying the first object (i.e., the person) operating the second object (i.e., the computing device). In another example, the first object may be a dog opening a dog door, and the second object may be the dog door, and Step 408 may analyze the audio data to identify the sounds of the steps of the dog and the noise of the dog door while it opens, thereby identifying the first object (i.e., the dog) operating (i.e., opening) the second object (i.e., the dog door). In some examples, Step 408 may analyze the audio data to determine that a first object of the plurality of objects is conversing with a second object of the plurality of objects, for example using a speaker diarisation algorithm, and may base the selection of the order on the determination that the first object is conversing with the second object. For example, the first object and the second objects may be positioned one after the other in the selected order based on the determination. In another example, the descriptions of the first object and the second object may be intertwined based on the selected order in response to the determination.

In some examples, Step 408 may further comprise selecting a conjunction for a pair of first and second objects of the plurality of objects identified by Step 404 and/or Step 424 and/or Step 444. In some examples, Step 408 may comprise selecting a conjunction for a pair of a first and second objects (such as a pair of objects of objects 122, a pair of objects of the plurality of objects identified by Step 404 and/or Step 424 and/or Step 444, and so forth). In one example, Step 408 may generate a textual content that includes: the generated description of the first object, followed by the selected conjunction, followed by the generated description of the second object. In some examples, Step 408 may base the selection of the conjunction for the pair of first and second objects of the plurality of objects on the data associated with the first object and the data associated with the second object. For example, a machine learning model may be trained using training examples to select conjunctions based on data associated with objects. An example of such training example may include sample data associated with pair of sample objects, together with a label indicating a sample selection of a conjunction corresponding to the pair of sample objects. Step 408 may use the trained machine learning model to analyze the data associated with the first object and the data associated with the second object, and to select the conjunction for the pair of first and second objects. In some examples, Step 408 may base the selection of the conjunction for the pair of first and second objects of the plurality of objects on an analysis of image data, such as an analysis of the image data received by Step 422. For example, Step 408 may calculate a convolution of at least part of the image data and thereby obtain a result value of the calculated convolution of the at least part of the image data, and may select the conjunction for the pair of first and second objects based on the result value of the calculated convolution of the at least part of the image data. For example, when the result value is a first value, Step 408 may select a first conjunction, and when the result value is a second value, Step 408 may select a second conjunction, the second conjunction may differ from the first conjunction. In some examples, Step 408 may base the selection of the conjunction for the pair of first and second objects of the plurality of objects on an analysis of audio data, such as an analysis of the audio data received by Step 422. For example, Step 408 may calculate a convolution of at least part of the audio data and thereby obtain a result value of the calculated convolution of the at least part of the audio data, and may select the conjunction for the pair of first and second objects based on the result value of the calculated convolution of the at least part of the audio data. For example, when the result value is a first value, Step 408 may select a first conjunction, and when the result value is a second value, Step 408 may select a second conjunction, the second conjunction may differ from the first conjunction.

In some examples, an indication of a writer persona may be obtained, for example as described above in relation to writer persona 142. In one example, the image data received by Step 422 may be analyzed to determine the indication of the writer persona. For example, when the image data depicts a sporting event, a writer persona of a sport reporter may be selected, and when the image data depicts a political event, a writer persona of a political commentator may be selected. In one example, the audio data received by Step 442 may be analyzed to determine the indication of the writer persona. For example, when the audio data includes sounds from a sporting event, a writer persona of a sport reporter may be selected, and when the audio data includes sounds from a political event, a writer persona of a political commentator may be selected. Further, for each object of the plurality of objects identified by Step 404 and/or Step 424 and/or Step 444, Step 406 may analyze the data associated with the object and use the indication of the writer persona to select the adjective, and Step 408 may generate the description of the object that includes the adjective in a style associated with the writer persona. In some examples, Step 406 may select two or more synonyms based on the data associated with the object, and may select the adjective of the two or more synonyms based on the writer persona. For example, the writer persona may be associated with a specific language register, and the synonym most compatible with the specific language register may be selected. In another example, the synonym that was most commonly used by the writer persona in historic textual contents may be selected. In some examples, Step 408 may use information related to the writer persona (such as a style, a language register or a word commonly used by the writer persona) as input to the generative model to generate the description of the object that includes the adjective in the style associated with the writer persona.

In some examples, an indication of a prospective audience may be obtained, for example as described above in relation to prospective audience 144. In one example, the image data received by Step 422 may be analyzed to determine the indication of the prospective audience. For example, when the image data depicts a sporting event, a prospective audience of sport fans may be selected, and when the image data depicts a political event, a prospective audience of a general public may be selected. In one example, the audio data received by Step 442 may be analyzed to determine the indication of the prospective audience. For example, when the audio data includes sounds from a sporting event, a prospective audience of sport fans may be selected, and when the audio data includes sounds from a political event, a prospective audience of a general public may be selected. Further, for each object of the plurality of objects identified by Step 404 and/or Step 424 and/or Step 444, Step 406 may analyze the data associated with the object and use the indication of the prospective audience to select the adjective, and Step 408 may generate the description of the object that includes the adjective in a style associated with the prospective audience. In some examples, Step 406 may select two or more synonyms based on the data associated with the object, and may select the adjective of the two or more synonyms based on the prospective audience. For example, the prospective audience may be associated with a specific language register, and the synonym most compatible with the specific language register may be selected. In another example, the synonym that was most commonly heard or read by the prospective audience in historic textual contents may be selected. In some examples, Step 408 may use information related to the prospective audience (such as a style, a language register or a word commonly heard and/or read by the prospective audience) as input to the generative model to generate the description of the object that includes the adjective in the style associated with the prospective audience.

In some examples, an indication of a topic associated with the generated textual content may be obtained, for example as described above in relation to topic 152. In one example, the image data received by Step 422 may be analyzed to determine the indication of the topic. For example, when the image data depicts a sporting event, a topic may be the sporting event, and when the image data depicts a political event, a topic may be the political event. In one example, the audio data received by Step 442 may be analyzed to determine the indication of the topic. For example, when the audio data includes sounds from a sporting event, a topic may be the sporting event, and when the audio data includes sounds from a political event, a topic may be the political event. In one example, the topic associated with the generated textual content may be selected based on a writer persona associated with the generated textual content. For example, in relation to an opera, a musician writer persona may cause a selection of a topic related to an orchestra performing the opera, and a costume designer writer persona may cause a selection of a topic related to wardrobe. In one example, the topic associated with the generated textual content may be selected based on a prospective audience associated with the generated textual content. For example, in relation to a shopping center, a prospective audience of children may cause a selection of a topic related to a particular store in the shopping center, and a prospective audience of adults may cause a selection of a topic related to a different store in the shopping center. Further, for each object of the plurality of objects identified by Step 404 and/or Step 424 and/or Step 444, Step 406 may analyze the data associated with the object and using the indication of the topic to select the adjective. In some examples, Step 406 may select two or more synonyms based on the data associated with the object, and may select the adjective of the two or more synonyms based on the topic. For example, the topic may be associated with a specific language register (as described above in relation to topic 152), and the synonym most compatible with the specific language register may be selected. In another example, the synonym that was most commonly used in historic contents associated with the topic may be selected.

In some examples, Step 410 may comprise providing the textual content generated by Step 408 and/or Step 458 and/or Step 512 and/or Step 532 and/or Step 612 and/or Step 662 and/or Step 716 and/or Step 816. In some examples, Step 410 may comprise providing textual content. In one example, providing the generated textual content by Step 410 may comprise causing a visual presentation of the generated textual content to an individual, for example via a user interface, via a physical display screen, via a hologram, via an extended reality appliance, and so forth. In one example, providing the generated textual content by Step 410 may comprise causing an audio representation of the generated textual content to be outputted audibly, for example via audio speakers, via earphone, via headphone, via earbud, to an individual, and so forth. In one example, providing the generated textual content by Step 410 may comprise transmitting the generated textual content to an external device, for example using an analog communication device, using a digital communication device, directly, via an intermediate device, over a communication network, over a digital communication network, and so forth. In one example, providing the generated textual content by Step 410 may comprise storing the generated textual content in a memory, for example in a digital memory accessible by at least one external process, in memory 210, and so forth. In one example, Step 410 may generate digital signals encoding the generated textual content, and may transmit the digital signals to an external device using a digital communication device.

In some examples, the generated textual content may be based on a plurality of objects, for example on the plurality of objects of Step 502, the plurality of objects identified by Step 404 and/or Step 424 and/or Step 444, and so forth. In one example, Step 410 may provide a first portion of the generated textual content before an indication of at least one object of the plurality of objects is received, and may provide a second portion of the generated textual content after the indication of the at least one object of the plurality of objects is received. In one example, Step 410 may provide a first portion of the generated textual content before at least one object of the plurality of objects is identified, and may provide a second portion of the generated textual content after the at least one object of the plurality of objects is identified. In some examples, the generated textual content may be based on an analysis of image data, for example on an analysis of image data received by Step 422 in method 420 and method 470. Step 410 may provide a first portion of the generated textual content before a particular portion of the image data is received, and a second portion of the generated textual content may be based on the particular portion of the image data (and may be provided by Step 410 after the particular portion of the image data is received). In one example, Step 410 may provide the first portion of the generated textual content before the particular portion of the image data is captured. In some examples, the generated textual content may be based on an analysis of audio data, for example on an analysis of audio data received by Step 442 in method 440 and method 490. Step 410 may provide a first portion of the generated textual content before a particular portion of the audio data is received, and a second portion of the generated textual content may be based on the particular portion of the audio data (and may be provided by Step 410 after the particular portion of the audio data is received). In one example, Step 410 may provide the first portion of the generated textual content before the particular portion of the audio data is captured.

In some examples, an object (such as a particular object of the plurality of objects identified by Step 404 and/or Step 424 and/or Step 444, the object of Step 602, etc.) may be associated with a particular portion of a media stream, and Step 410 may provide the generated textual content in a format that associate the description of the object in the generated textual content with the particular portion of the media stream. For example, the media stream may be a video, and the description of the object may be provided in one or more captions over the particular portion of the video. In another example, the media stream may be an audio stream, and the description of the object may be provided while the portion while the particular portion of the audio stream is audibly outputted. In some examples, an event (such as a particular event of the plurality of events identified by Step 454 and/or Step 474 and/or Step 494, the event of Step 652, etc.) may be associated with a particular portion of a media stream, and Step 410 may provide the generated textual content in a format that associate the description of the event in the generated textual content with the particular portion of the media stream. For example, the media stream may be a video, and the description of the event may be provided in one or more captions over the particular portion of the video. In another example, the media stream may be an audio stream, and the description of the event may be provided while the portion while the particular portion of the audio stream is audibly outputted.

In some examples, Step 454 may comprise analyzing the first data received by Step 402 to identify a plurality of events. In some examples, Step 454 may comprise analyzing data (for example, analyzing at least one of the first data received by Step 402, inputs 100, image data 102, audio data 104, sensor data 106, log data 108 or transactions data 110)

to identify one or more events (for example, a single event, a plurality of events, events 124, and so forth). In some examples, a machine learning model may be trained using training examples to identify events from data. An example of such training example may include sample data, together with a label indicating one or more events associated with the sample data. Step 454 may use the trained machine learning model to analyze the data and identify the plurality of events. In some examples, Step 454 may calculate a function of the data to obtain a result value, and may identify the plurality of events based on the result value. For example, when the result value is a first value, Step 454 may identify a first plurality of events, and when the result value is a second value, Step 454 may identify a second plurality of events. The second plurality of events may differ from the first plurality of events. Some non-limiting examples of such function may include a linear function, a non-linear function, a polynomial function, an exponential function, a logarithmic function, and so forth. In some examples, the first data may be or include image data, and Step 454 may use Step 474 to analyze the image data and identify the plurality of events. In some examples, the first data may be or include audio data, and Step 454 may use Step 494 to analyze the audio data and identify the plurality of events. In some examples, the plurality of events identified by Step 454 and/or Step 474 and/or Step 494 may include an interaction among two or more objects, such as a conversation between two people, an interaction of a person with a computing device, a person operating a machine, rubbing of two objects, collision of two objects, and so forth. In some examples, the plurality of events identified by Step 454 and/or Step 474 and/or Step 494 may include an event involving a single object, such as a person jumping, a computing device outputting sounds while performing actions, an animal vocalizing sounds, an object exploding, and so forth.

In some examples, Step 474 may comprise analyzing the image data received by Step 422 to identify a plurality of events. In some examples, Step 474 may comprise analyzing image data (such as the image data received by Step 422, image data 102, etc.) to identify one or more events (for example, a single event, a plurality of events, events 124, and so forth). In some examples, a machine learning model may be trained using training examples to identify events from image data. An example of such training example may include a sample image data, together with a label indicating one or more events depicted in the sample image data. Step 474 may use the trained machine learning model to analyze the image data and identify the plurality of events. In some examples, Step 474 may calculate a convolution of at least part of the image data and thereby obtain a result value of the calculated convolution of the at least part of the image data, and may identify the plurality of events based on the result value. For example, when the result value is a first value, Step 474 may identify a first plurality of events, and when the result value is a second value, Step 474 may identify a second plurality of events. The second plurality of events may differ from the first plurality of events.

In some examples, Step 494 may comprise analyzing the audio data received by Step 442 to identify a plurality of events. In some examples, Step 494 may comprise analyzing audio data (such as the audio data received by Step 442, audio data 102, etc.) to identify one or more events (for example, a single event, a plurality of events, events 124, and so forth). In some examples, a machine learning model may be trained using training examples to identify events from audio data. An example of such training example may include a sample audio data, together with a label indicating one or more events associated with the sample audio data. Step 494 may use the trained machine learning model to analyze the audio data and identify the plurality of events. In some examples, Step 494 may calculate a convolution of at least part of the audio data and thereby obtain a result value of the calculated convolution of the at least part of the audio data, and may identify the plurality of events based on the result value. For example, when the result value is a first value, Step 494 may identify a first plurality of events, and when the result value is a second value, Step 494 may identify a second plurality of events. The second plurality of events may differ from the first plurality of events. In some examples, the audio data may include sounds generated as a result of an event, such as speech generated in a conversation, sounds generated by a computing device performing an action, noises generated by actions of machines, noises generated by a collision, and so forth. Different events may generate different sounds, such as a combination of voices unique to people involved in a conversation, a frequency unique to a specific action of a specific machine, and so forth. Step 494 may analyze the audio data to recognize the sounds, and thereby identify the event.

In some examples, Step 454 and/or Step 474 and/or Step 494 may identify at least three events, and may select the plurality of events of the at least three events. In one example, the plurality of events does not include at least a particular event of the at least three events. In one example, the textual content generated by Step 458 does not include any description of the particular event. In some examples, Step 454 may analyze the first data received by Step 402 to identify at least three events, and may select the plurality of events of the at least three events. In some examples, for each event of the at least three events, Step 454 and/or Step 474 and/or Step 494 may determine a type of the event. Further, Step 454 and/or Step 474 and/or Step 494 may base the selection of the plurality of events of the at least three events on the types of the at least three events. For example, Step 454 may determine a type of an event based on an analysis of the first data using a classification model, where each class may be associated with a type. In another example, Step 474 may determine a type of an event based on an analysis of the image data, for example using a visual event recognition algorithm. In yet another example, Step 494 may determine a type of an event based on an analysis of the audio data using a classification model, where each class may be associated with a type. In some examples, for each event of the at least three events, Step 454 and/or Step 474 and/or Step 494 may analyze the data associated with the event to determine a mathematical object associated with the event in a mathematical space, for example as described below in relation to Step 456. Further, Step 454 and/or Step 474 and/or Step 494 may base the selection of the plurality of events of the at least three events on the mathematical objects associated with the at least three events. In some examples, Step 454 and/or Step 474 and/or Step 494 may obtain an indication of a writer persona (for example as described above in relation to writer persona 142), and may base the selection of the plurality of events of the at least three events on the writer persona. For example, historic textual contents associated with the writer persona may indicate different levels of affinity of the writer persona to different types of events, and the events of the at least three events with higher level of affinity to the writer persona may be included in the plurality of events, while events with lower level of affinity to the writer persona may be excluded from the plurality of events. In some examples, Step 454 and/or Step 474 and/or Step 494 may obtain an indication of a prospective audience (for example as described above in relation to prospective audience 144), and may base the selection of the plurality of events of the at least three events on the prospective audience. For example, a prospective audience of children may have affinity to specific types of events while a prospective audience of adults may have affinity to other types of events, and the events of the at least three events with higher level of affinity to the prospective audience may be included in the plurality of events, while events with lower level of affinity to the prospective audience may be excluded from the plurality of events. In some examples, Step 454 and/or Step 474 and/or Step 494 may obtain an indication of a topic associated with the generated textual content (for example as described above in relation to topic 152), and for each event of the at least three events, may identify a degree of relevance of the event to the topic. Further, Step 454 and/or Step 474 and/or Step 494 may base the selection of the plurality of events of the at least three events on the degrees of relevance of the at least three events. For example, the events of the at least three events with higher degree of relevance to the topic may be included in the plurality of events, while events with lower degree of relevance to the topic may be excluded from the plurality of events. In one example, the degrees of relevance may be binary (relevant or not-relevant). In another example, the degrees of relevance may be discrete (for example, 'high', 'medium', 'low' or 'none'). In yet another example, the degrees of relevance may be continuous (for example, a number in a continuous range of numbers). In one example, a machine learning model may be trained using training examples to determine degrees of relevance of events to topics. An example of such training example may include sample data associated with a sample event and a sample topic, together with a label indicating the degree of relevance of the sample event to the sample topic. The trained machine learning model may be used, for each event of the at least three events, to analyze data associated with the event to determine a degree of relevance of the event to the topic. In one example, Step 454 and/or Step 474 and/or Step 494 may determine a mathematical object associated with the topic in a mathematical space. For example, an output of a mathematical function when data associated with the topic is used as input may be used to determine the mathematical object. Some non-limiting examples of such mathematical function may include a linear function, a non-linear function, a polynomial function, an exponential function, a logarithmic function, and so forth. Further, for each event of the at least three events, Step 454 and/or Step 474 and/or Step 494 may determine a mathematical object corresponding to the event in the mathematical space, for example as described below in relation to Step 456. Further, for each event of the at least three events, Step 454 and/or Step 474 and/or Step 494 may use the mathematical object corresponding to the event and the mathematical object associated with the topic in the mathematical space to identify the degree of relevance of the event to the topic. In one example, the degree of relevance of the event to the topic may be based on a distance between the mathematical object corresponding to the event and the mathematical object associated with the topic in the mathematical space. In another example, the mathematical object associated with the topic in the mathematical space may include a plurality of other mathematical objects (such as a region, a manifold, a mathematical subspace, etc.), and the degree of relevance of the event to the topic may be based on whether the mathematical object corresponding to the event is included in the mathematical object associated with the topic. In some examples, for each event of the at least three events, Step 454 and/or Step 474 and/or Step 494 may obtain a magnitude associated with the event. For example, a regression model may be used to analyze data associated with the event and determine the magnitude associated with the event. In another example, the magnitude associated with the event may be included in the data associated with the event. In yet another example, for each event of the at least three events, Step 474 may analyze the image data received by Step 422 to determine the magnitude associated with the event. In an additional example, for each event of the at least three events, Step 494 may analyze the audio data received by Step 442 to determine the magnitude associated with the event. In another example, Step 474 may receive second modality data captured from an environment using at least one sensor of a second type of sensors (the second type of sensors may differ from image sensors, such as audio sensors), and for each event of the at least three events, Step 474 may analyze the second modality data to determine the magnitude associated with the event. In yet another example, Step 494 may receive second modality data captured from an environment using at least one sensor of a second type of sensors (the second type of sensors may differ from audio sensors, such as image sensors), and for each event of the at least three events, Step 494 may analyze the second modality data to determine the magnitude associated with the event. Further, Step 454 and/or Step 474 and/or Step 494 may base the selection of the plurality of events of the at least three events on the magnitudes associated with the at least three events. For example, the events of the at least three events associated with higher magnitudes may be included in the plurality of events, while events associated with lower magnitudes may be excluded from the plurality of events.

In some examples, Step 474 may analyze the image data received by Step 422 to detect at least three events, and may select the plurality of events of the at least three events. In one example, for each event of the at least three events, Step 474 may calculate a convolution of at least part of the image data and thereby obtain a result value of the calculated convolution of the at least part of the image data, and may determine whether to include the event in the plurality of events based on the result value of the calculated convolution of the at least part of the image data.

In some examples, Step 494 may analyze the audio data received by Step 442 to detect at least three events, and may select the plurality of events of the at least three events. In one example, for each event of the at least three events, Step 494 may calculate a convolution of at least part of the audio data and thereby obtain a result value of the calculated convolution of the at least part of the audio data, and may determine whether to include the event in the plurality of events based on the result value of the calculated convolution of the at least part of the audio data.

In some examples, Step 456 may comprise, for each event of the plurality of events identified by Step 454 and/or Step 474 and/or Step 494, analyzing data associated with the event to select an adjective, and generating a description of the event that includes the adjective. In some examples, Step 456 may comprise, for each event of a group of one or more events (such as events 124, the plurality of events identified by Step 454 and/or Step 474 and/or Step 494, etc.), analyzing data associated with the event to select an adjective, and generating a description of the event that includes the adjective. In one example, the data associated with the event does not include the adjective selected by Step 456. In one example, a machine learning model may be trained using training examples to select adjectives based on data. An example of such training example may include sample data, together with a label indicating a sample selection of a sample adjective associated with the sample data. Step 456 may use the trained machine learning model to analyze the data associated with the event and select the adjective. In one example, the adjective may be a descriptive adjective. In another example, the adjective may be a numeral adjective. In yet another example, the adjective may be a quantitative adjective. In an additional example, the adjective may be a demonstrative adjective. In another example, the adjective may be an interrogative adjective. In yet another example, the adjective may be a possessive adjective. In an additional example, the adjective may be a proper adjective. In yet another example, the adjective may be an exclamatory adjective. In some examples, Step 456 may insert the selected adjective to a sentence (for example, a template sentence, in a sample sentence, and so forth) in a location selected for an adjective (for example, a place for an adjective in the template sentence, replacing another adjective in the sample sentence, and so forth), to thereby generate the description of the event that includes the adjective. In some examples, Step 456 may use a generative model to generate the description of the event that includes the adjective, for example using the selected adjective as an input to the generative model.

In some examples, Step 456 may analyze the image data received by Step 422 to determine the data associated with a particular event of the plurality of events. For example, the data may include or be based on pixel values of at least part of a depiction of the particular event in the image data. In another example, Step 456 may calculate a convolution of at least part of the image data and thereby obtain a result value of the calculated convolution of the at least part of the image data, and may determine the data associated with a particular event based on the result value. In some examples, Step 456 may analyze the audio data received by Step 442 to determine the data associated with a particular event of the plurality of events. For example, the data may include or be based on pitch values of at least part of the audio data. In another example, Step 456 may calculate a convolution of at least part of the audio data and thereby obtain a result value of the calculated convolution of the at least part of the audio data, and may determine the data associated with a particular event based on the result value. In one example, the audio data received by Step 442 does not include the adjective selected by Step 456. In some examples, Step 454 may analyze first modality data captured from an environment using at least one sensor of a first type of sensors to identify the plurality of events (for example, as described herein in relation to Step 454 and/or Step 474 and/or Step 494). Further, second modality data captured from the environment using at least one sensor of a second type of sensors may be received (for example, as described above). The second type of sensors may differ from first type of sensors. In one example, Step 456 may analyze at least part of the second modality data to determine the data associated with a particular event of the plurality of events, for example as described herein. In one example, the first type of sensors may be image sensors, the first modality data may be image data, the second type of sensors may be audio sensors, and the second modality data may be audio data. In another example, the first type of sensors may be audio sensors, the first modality data may be audio data, the second type of sensors may be image sensors, and the second modality data may be image data. In some examples, Step 456 may access synchronization data configured to enable synchronization of the first modality data and the second modality data. In one example, the synchronization data may include data configured to correlate different portions of the second modality data to different portions of the first modality data. For example, the synchronization data may correlate the different portions of the first modality data and the different portions of the second modality data to a common timeline. In some examples, Step 456 may use the synchronization data to identify a portion of the second modality data corresponding to the particular event, for example based on the portion of the second modality data being synchronized with a portion of the first modality data corresponding to the particular event. In some examples, Step 456 may analyze the portion of the second modality data corresponding to the particular event to determine the data associated with the particular event, for example as described herein.

In some examples, Step 456 may analyze the data associated with an event (such as an event of the plurality of events identified by Step 454 and/or Step 474 and/or Step 494, an event of events 124, an event of the group of one or more events of Step 604, etc.) to determine a mathematical object in a mathematical space. For example, an output of a mathematical function when the data associated with the event is used as input may be used to determine the mathematical object. Some non-limiting examples of such mathematical function may include a linear function, a non-linear function, a polynomial function, an exponential function, a logarithmic function, and so forth. In one example, Step 456 may analyze image data associated with the event (such as a portion of the image data received by Step 422 corresponding to the event and selected as described below) to determine the mathematical object in the mathematical space. For example, Step 456 may calculate a convolution of at least part of the image data and thereby obtain a result value of the calculated convolution of the at least part of the image data, and may select the mathematical object in the mathematical space based on the result value. In one example, Step 456 may analyze audio data associated with the event (such as a portion of the audio data received by Step 442 corresponding to the event and selected as described below) to determine the mathematical object in the mathematical space. For example, Step 456 may calculate a convolution of at least part of the audio data and thereby obtain a result value of the calculated convolution of the at least part of the audio data, and may select the mathematical object in the mathematical space based on the result value. In some examples, Step 456 may analyze the data associated with a particular event of the plurality of events identified by Step 454 and/or Step 474 and/or Step 494 to determine a particular mathematical object in the mathematical space, and may base the selection of the adjective for the particular event on the particular mathematical object. For example, when the particular mathematical object is in a first region of the mathematical space, Step 456 may select a first adjective, and when the particular mathematical object is in a second region of the mathematical space, Step 456 may select a second adjective, the second adjective may differ from the first adjective. In some examples, Step 456 may analyze the data associated with a specific event of the plurality of events to determine a specific mathematical object in the mathematical space. The specific event may differ from the particular event, and the specific mathematical object may differ from the particular mathematical object. In one example, Step 456 may base the selection of the adjective for the particular event on the specific mathematical object. In another example, Step 456 may base the selection of the adjective for the particular event on the specific mathematical object and the particular mathematical object. For example, when a distance between the particular mathematical object and the specific mathematical object is below a selected threshold, Step 456 may select a first adjective, and when the distance is above the selected threshold, Step 456 may select a second adjective. In another example, when the particular mathematical object and the specific mathematical object are in a selected region of the mathematical space, Step 456 may select a first adjective, and when either the particular mathematical object or the specific mathematical object are outside the selected region, Step 456 may select a second adjective. The second adjective may differ from the first adjective.

In some examples, Step 456 may analyze image data associated with an event (such as an event of the plurality of events identified by Step 454 and/or Step 474 and/or Step 494, an event of events 124, etc.) to select the adjective for the event. For example, a machine learning model may be trained using training examples to select adjectives based on images and/or videos. An example of such training example may include a sample image and/or a sample video associated with a sample event, together with a label indicating a sample selection of an adjective for the sample event. Step 456 may use the trained machine learning model to analyze the image data associated with the event and select the adjective for the event. In one example, Step 456 may calculate a convolution of at least part of the image data and thereby obtain a result value of the calculated convolution of the at least part of the image data, and may select the adjective for the event based on the result value of the calculated convolution of the at least part of the image data. In some examples, Step 456 may determine a portion of the image data received by Step 422 associated with a particular event of the plurality of events. For example, the particular event may appear in a part of the image data, and the portion of the image data may be determined based on the part of the image data in which the particular event appears. The portion of the image data may include some but not all of the image data. Further, Step 456 may analyze the portion of the image data to select the adjective for the particular event, for example as described above. In one example, Step 456 may calculate a convolution of the portion of the image data associated with the particular event and thereby obtain a result value of the calculated convolution of the portion of the image data associated with the particular event. Further, Step 456 may base the selection of the adjective for the particular event on the result value of the calculated convolution of the portion of the image data associated with the particular event. In one example, Step 456 may analyze the portion of the image data to determine a mathematical object in a mathematical space (for example as described above), and may base the selection of the adjective for the particular event on the mathematical object.

In some examples, Step 456 may analyze audio data associated with an event (such as an event of the plurality of events identified by Step 454 and/or Step 474 and/or Step 494, an event of events 124, etc.) to select the adjective for the event. For example, a machine learning model may be trained using training examples to select adjectives based on audio clips. An example of such training example may include a sample audio clip associated with a sample event, together with a label indicating a sample selection of an adjective for the sample event. Step 456 may use the trained machine learning model to analyze the audio data associated with the event and select the adjective for the event. In one example, Step 456 may calculate a convolution of at least part of the audio data and thereby obtain a result value of the calculated convolution of the at least part of the audio data, and may select the adjective for the event based on the result value of the calculated convolution of the at least part of the audio data. In some examples, Step 456 may determine a portion of the audio data received by Step 442 associated with a particular event of the plurality of events. For example, sounds associated with the particular event may be in a part of the audio data, and the portion of the audio data may be determined based on the part of the audio data in which the sounds associated with the particular event are. The portion of the audio data may include some but not all of the audio data. Further, Step 456 may analyze the portion of the audio data to select the adjective for the particular event, for example as described above. In one example, Step 456 may calculate a convolution of the portion of the audio data associated with the particular event and thereby obtain a result value of the calculated convolution of the portion of the audio data associated with the particular event. Further, Step 456 may base the selection of the adjective for the particular event on the result value of the calculated convolution of the portion of the audio data associated with the particular event. In one example, Step 456 may analyze the portion of the audio data to determine a mathematical object in a mathematical space (for example as described above), and may base the selection of the adjective for the particular event on the mathematical object.

Additionally or alternatively, Step 456 may comprise, for each event of a group of one or more events (such as one or more events of events 124, one or more events of the plurality of events identified by Step 454 and/or Step 474 and/or Step 494, the entire plurality of events identified by Step 454 and/or Step 474 and/or Step 494, and so forth), analyzing data associated with the event to select an adverb. In some examples, Step 456 may comprise analyzing the data associated with a particular event of the plurality of events to select an adverb. Further, Step 456 may include the adverb in the generated description of the particular event. In some examples, a machine learning model may be trained using training examples to select adverbs based on data. An example of such training example may include sample data, together with a label indicating a sample selection of a sample adverb associated with the sample data. Step 456 may use the trained machine learning model to analyze data associated with the event and select the adverb. In some examples, Step 456 may insert the selected adverb to a sentence (for example, a template sentence, in a sample sentence, and so forth) in a location selected for an adverb (for example, a place for an adverb in the template sentence, replacing another adverb in the sample sentence, and so forth), to thereby generate the description of the event that includes the adverb. In some examples, Step 456 may use a generative model to generate the description of the event that includes the adverb, for example using the selected adverb as an input to the generative model.

Additionally or alternatively, Step 456 may comprise, for each event of a group of one or more events (such as one or more events of events 124, one or more events of the plurality of events identified by Step 454 and/or Step 474 and/or Step 494, the entire plurality of events identified by Step 454 and/or Step 474 and/or Step 494, and so forth), identifying an object associated with the event, and including a description of the object in the generated description of the event. In some examples, Step 456 may comprise identifying an object associated with a particular event of the plurality of events, and including a description of the object in the generated description of the particular event. In one example, the identification of the object associated with the event may be performed as described herein, for example as described in relation to Step 804 and/or Step 806 and/or method 820. In one example, Step 456 may analyze image data (such as the image data received by Step 422) to identify the object associated with a particular event, for example as described below. In one example, Step 456 may analyze audio data (such as the audio data received by Step 442) to identify the object associated with a particular event, for example as described below. In one example, the description of the object may be generated as described herein, for example as described in relation to Step 406. In some examples, Step 456 may insert the description of the object to a template in a location selected for a description of an object, to thereby generate the description of the event that includes the description of the object. In some examples, Step 456 may use a generative model to generate the description of the event that includes the description of the object, for example using the description of the object as an input to the generative model.

In some examples, Step 458 may comprise generating a textual content that includes the descriptions of the plurality of events generated by Step 456. In some examples, Step 458 may comprise generating a textual content that includes a plurality of descriptions (such as the descriptions of the plurality of events generated by Step 456). In some examples, Step 458 may insert the descriptions to a template in locations selected for descriptions, to thereby generate the textual content that includes the descriptions of the plurality of events. In some examples, Step 458 may use a generative model to generate the textual content that includes the descriptions of the plurality of events, for example using the descriptions as inputs to the generative model. In some examples, Step 458 may further include in the textual content other details, such as a description of an object, a description of another event, a description of a scenery, a description of a location, a description related to time, a description of a cause or a reason, a description of a result, contextual information, a reference, and so forth.

In some examples, Step 458 may further comprise selecting an order for the plurality of events in the generated textual content, and generating the textual content to include the descriptions of the plurality of events arranged based on the selected order. In one example, the plurality of events may be identified by analyzing the first data by Step 454, and the selected order for the plurality of events in the generated textual content may differ from an order of the plurality of events in the first data. In one example, the plurality of events may be identified by Step 474 by analyzing the image data, and the selected order for the plurality of events in the generated textual content may differ from an order of the plurality of events in the image data. In one example, the plurality of events may be identified by analyzing the audio data by Step 494, and the selected order for the plurality of events in the generated textual content may differ from an order of the plurality of events in the audio data. In some examples, Step 458 may select the order for the plurality of events in the generated textual content based on the data associated with the plurality of events used by Step 456. In one example, for each event of the plurality of events, the data may include a magnitude associated with the event, for example as described herein, and Step 458 may select the order for the plurality of events in the generated textual content based on the magnitudes associated with the events (for example, in a descending order of magnitudes, in an ascending order of magnitudes, and so forth). In one example, a machine learning model may be trained using training examples to analyze data associated with events to select order for the events. An example of such training example may include sample data associated with sample events, together with a label indicating a sample selection of an order for the sample events. Step 458 may use the trained machine learning model to analyze the data associated with the plurality of events and select the order for the plurality of events in the generated textual content. In some examples, Step 458 may obtain an indication of a topic associated with the generated textual content (for example as described above in relation to topic 152), and may select the order for the plurality of events in the generated textual content based on the topic associated with the generated textual content. In one example, events more relevant to the topic may be positioned earlier. In some examples, Step 458 may obtain an indication of a writer persona (for example as described above in relation to writer persona 142), and may select the order for the plurality of events in the generated textual content based on the writer persona. For example, historic textual contents associated with the writer persona may indicate an affinity of the writer persona to start with events of specific type, and events of the specific type of the plurality of events may be positioned first in the selected order. In some examples, Step 458 may obtain an indication of a prospective audience (for example as described above in relation to prospective audience 144), and may select the order for the plurality of events in the generated textual content based on the prospective audience. For example, the prospective audience may have affinity to specific event type, and events of the specific type of the plurality of events may be positioned first in the selected order.

In some examples, the plurality of events may be identified by Step 474 by analyzing the image data, and Step 458 may select an order for the plurality of events in the generated textual content based on an analysis of the image data. Step 458 may generate the textual content to include the descriptions of the plurality of events arranged based on the selected order, as described above. In some examples, Step 458 may calculate a convolution of at least part of the image data and thereby obtain a result value of the calculated convolution of the at least part of the image data, and may select the order for the plurality of events in the generated textual content based on the result value of the calculated convolution of the at least part of the image data. In some examples, Step 458 may analyze the image data to determine that a first event of the plurality of events caused a second event of the plurality of events, and may base the selection of the order on the determination that the first event caused the second event. In one example, the first event may precede the second event in the selected order. In one example, the second event may precede the first event in the selected order. In one example, Step 458 may analyze the image data using a visual event detection algorithm to detect the first and second events, and may then analyze the image data using a visual classification algorithm to determine whether the first event caused the second event (for example, by classifying the image data to a 'first event caused second event' class or to a 'first event did not cause second event' class). In some examples, Step 458 may analyze the image data to determine that a first event of the plurality of events and a second event of the plurality of events involve a common object, and may base the selection of the order on the determination that the first event and the second event involve the common object. In one example, Step 458 may analyze the image data using a visual event detection algorithm to detect the first and second events, and then analyze the image data using a visual classification algorithm to determine whether the first event and the second event involve a common object (for example, by classifying the image data to a 'first event and second event involve a common object' class or to a 'first event and second event do not involve a common object' class). In some examples, Step 458 may analyze the image data to determine that a first event of the plurality of events co-occurs with a second event of the plurality of events, and may base the selection of the order on the determination that the first event co-occurs with the second event. In one example, Step 458 may analyze the image data using a visual event detection algorithm to detect the first and second events, and then analyze the image data using a visual classification algorithm to determine whether the first event co-occurs with the second event (for example, by classifying the image data to a 'first event co-occurs with second event' class or to a 'first event does not co-occur with second event' class).

In some examples, the plurality of events may be identified by analyzing the audio data by Step 494, and Step 458 may select the order for the plurality of events in the generated textual content based on an analysis of the audio data. In some examples, Step 458 may calculate a convolution of at least part of the audio data and thereby obtain a result value of the calculated convolution of the at least part of the audio data, and may select the order for the plurality of events in the generated textual content based on the result value of the calculated convolution of the at least part of the audio data. In some examples, Step 458 may analyze the audio data to determine that a first event of the plurality of events caused a second event of the plurality of events, and may base the selection of the order on the determination that the first event caused the second event. For example, the first event and the second events may be positioned one after the other in the selected order based on the determination. In another example, the descriptions of the first event and the second event may be intertwined based on the selected order in response to the determination. In one example, the first event may involve a person operating a computing device with voice commands, the second event may involve audio output of the computing device caused by the voice command, and Step 458 may analyze the audio data to identify the voice commands and the audio output of the computing device, thereby identifying the first event (i.e., the person operating the computing device) causing the second event (i.e., the computing device outputting audio). In another example, the first event may be a dog running towards a dog door, the second event may be the dog door opens in response to the approaching dog (and causing noise while opening), and Step 458 may analyze the audio data to identify the sounds of the steps of the dog and the noise of the dog door while it opens, thereby identifying the first event (i.e., the dog running towards the dog door) causing the second event (i.e., the dog door opens). In some examples, Step 458 may analyze the audio data to determine that a first event of the plurality of events co-occurs with a second event of the plurality of events, and may base the selection of the order on the determination that the first event co-occurs with the second event. For example, the first event and the second events may be positioned one after the other in the selected order based on the determination. In another example, the descriptions of the first event and the second event may be intertwined based on the selected order in response to the determination.

In some examples, Step 458 may further comprise selecting a conjunction for a pair of first and second events of the plurality of events identified by Step 454 and/or Step 474 and/or Step 494. In some examples, Step 458 may comprise selecting a conjunction for a pair of a first and second events (such as a pair of events of events 124, a pair of events of the plurality of events identified by Step 454 and/or Step 474 and/or Step 494, and so forth). In one example, Step 458 may generate a textual content that includes: the generated description of the first event, followed by the selected conjunction, followed by the generated description of the second event. In some examples, Step 458 may base the selection of the conjunction for the pair of first and second events of the plurality of events on the data associated with the first event and the data associated with the second event. For example, a machine learning model may be trained using training examples to select conjunctions based on data associated with events. An example of such training example may include sample data associated with pair of sample events, together with a label indicating a sample selection of a conjunction corresponding to the pair of sample events. Step 458 may use the trained machine learning model to analyze the data associated with the first event and the data associated with the second event, and to select the conjunction for the pair of first and second events. In some examples, Step 458 may base the selection of the conjunction for the pair of first and second events of the plurality of events on an analysis of image data, such as an analysis of the image data received by Step 422. For example, Step 458 may calculate a convolution of at least part of the image data and thereby obtain a result value of the calculated convolution of the at least part of the image data, and may select the conjunction for the pair of first and second events based on the result value of the calculated convolution of the at least part of the image data. For example, when the result value is a first value, Step 458 may select a first conjunction, and when the result value is a second value, Step 458 may select a second conjunction, the second conjunction may differ from the first conjunction. In some examples, Step 458 may base the selection of the conjunction for the pair of first and second events of the plurality of events on an analysis of audio data, such as an analysis of the audio data received by Step 422. For example, Step 458 may calculate a convolution of at least part of the audio data and thereby obtain a result value of the calculated convolution of the at least part of the audio data, and may select the conjunction for the pair of first and second events based on the result value of the calculated convolution of the at least part of the audio data. For example, when the result value is a first value, Step 458 may select a first conjunction, and when the result value is a second value, Step 458 may select a second conjunction, the second conjunction may differ from the first conjunction.

In some examples, an indication of a writer persona may be obtained, for example as described above. Further, for each event of the plurality of events identified by Step 454 and/or Step 474 and/or Step 494, Step 456 may analyze the data associated with the event and use the indication of the writer persona to select the adjective, and Step 458 may generate the description of the event that includes the adjective in a style associated with the writer persona. In some examples, Step 456 may select two or more synonyms based on the data associated with the event, and may select the adjective of the two or more synonyms based on the writer persona, for example as described above in relation to Step 406. In some examples, Step 458 may use information related to the writer persona (such as a style, a language register or a word commonly used by the writer persona) as input to the generative model to generate the description of the event that includes the adjective in the style associated with the writer persona.

In some examples, an indication of a prospective audience may be obtained, for example as described above. Further, for each event of the plurality of events identified by Step 454 and/or Step 474 and/or Step 494, Step 456 may analyze the data associated with the event and use the indication of the prospective audience to select the adjective, and Step 458 may generate the description of the event that includes the adjective in a style associated with the prospective audience. In some examples, Step 456 may select two or more synonyms based on the data associated with the event, and may select the adjective of the two or more synonyms based on the prospective audience, for example as described above in relation to Step 406. In some examples, Step 458 may use information related to the prospective audience (such as a style, a language register or a word commonly heard and/or read by the prospective audience) as input to the generative model to generate the description of the event that includes the adjective in the style associated with the prospective audience.

In some examples, an indication of a topic associated with the generated textual content may be obtained, for example as described above. Further, for each event of the plurality of events identified by Step 454 and/or Step 474 and/or Step 494, Step 456 may analyze the data associated with the event and using the indication of the topic to select the adjective. In some examples, Step 456 may select two or more synonyms based on the data associated with the event, and may select the adjective of the two or more synonyms based on the topic, for example as described above in relation to Step 406.

FIG. 5A is a flowchart of an exemplary method 500 for grouping objects and generating a textual content reporting the groups. In this example, method 500 may comprise receiving an indication of a plurality of objects (Step 502); identifying a group of two or more objects of the plurality of objects (Step 504), the group of two or more objects may not include at least a particular object of the plurality of objects; determining a quantity associated with the group of two or more objects (Step 506); generating a description of the group of two or more objects, the description of the group of two or more objects includes an indication of the quantity associated with the group of two or more objects (Step 508); analyzing data associated with the particular object to generate a description of the particular object (Step 510); generating a textual content that includes the description of the group of two or more objects and the description of the particular object (Step 512), wherein for at least one specific object of the group of two or more objects, the textual content may not include information identifying the specific object; and providing the generated textual content (Step 410). In other examples, method 500 may include additional steps or fewer steps. In other examples, one or more steps of method 500 may be executed in a different order and/or one or more groups of steps may be executed simultaneously. In one example, the group of two or more objects may not include at least a specific object of the plurality of objects, the specific object may differ from the particular object, and the generated textual content may include no information associated with the specific object.

In some examples, systems, methods and non-transitory computer readable media for grouping objects and generating a textual content reporting the objects are provided. In some examples, systems, methods and non-transitory computer readable media for generating a textual content selectively reporting objects are provided. In one example, Step 502 may receive an indication of twenty people in a lecture hall, and Step 504 may identify that nineteen of these people are audience listening to a lecture given by a lecturer. Step 506 may determine a quantity associated with the audience, for example 19 people or 3 adults and 16 children. Step 508 may generate a description of the audience that includes an indication of the quantity, such as 'audience of 19 people' or 'audience of mostly children'. Step 510 may analyze data associated with the lecturer (for example, a lecturer profile) and generate a description of the lecturer, such as 'seventy years old lecturer'. Further, Step 512 may generate a textual content that includes the description of the audience and the description of the lecturer, such as 'an audience of 19 people attended the boring lecture of the seventy years old lecturer' or 'an audience of mostly children enjoyed the lecture of the seventy years old lecturer'. Step 410 may provide this textual content as part of a summary of a conference.

FIG. 5B is a flowchart of an exemplary method 520 for grouping events and generating a textual content reporting the groups. In this example, method 520 may comprise receiving an indication of a plurality of events (Step 522); identifying a group of two or more events of the plurality of events (Step 524), the group of two or more events may not include at least a particular event of the plurality of events; determining a quantity associated with the group of two or more events (Step 526); generating a description of the group of two or more events, the description of the group of two or more events includes an indication of the quantity associated with the group of two or more events (Step 528); analyzing data associated with the particular event to generate a description of the particular event (Step 530); generating a textual content that includes the description of the group of two or more events and the description of the particular event, wherein for at least one specific event of the group of two or more events, the textual content does not include information identifying the specific event (Step 532); and providing the generated textual content (Step 410). In other examples, method 520 may include additional steps or fewer steps. In other examples, one or more steps of method 520 may be executed in a different order and/or one or more groups of steps may be executed simultaneously. In one example, the group of two or more events does not include at least a specific event of the plurality of events, the specific event may differ from the particular event, and the generated textual content may include no information associated with the specific event.

In some examples, systems, methods and non-transitory computer readable media for grouping events and generating a textual content reporting the events are provided. In some examples, systems, methods and non-transitory computer readable media for generating a textual content selectively reporting events are provided. In one example, Step 522 may receive an indication of a plurality of accidents, and Step 524 may identify that seven of those accidents involved pedestrians. Step 526 may determine that the number of fatalities associated with the seven accidents involving pedestrians is two. Further, Step 528 may generate a description of the seven accidents involving pedestrians that includes an indication of the number of fatalities, such as 'two people died in accidents involving pedestrians'. Further, Step 530 may analyze data associated with the particular accident that did not involve pedestrians to generate a description of the particular accident, such as 'three people died in a single accident between two trucks'. Step 532 may generate a textual content that includes the description of the seven accidents involving pedestrians and the description of the particular accident, such as 'Yesterday, five people were killed on the road. Two people died in accidents involving pedestrians, and three people died in a single accident between two trucks.' Step 410 may include this textual content in an article.

FIG. 5C is a flowchart of an exemplary method 540 for grouping objects. In this example, method 540 may comprise receiving first modality data captured from an environment using at least one sensor of a first type of sensors (Step 542); receiving second modality data captured from the environment using at least one sensor of a second type of sensors (Step 544); analyzing at least part of the first modality data to identifying the group of two or more objects of the plurality of objects (Step 546); and analyzing at least part of the second modality data to determine the quantity associated with the group of two or more objects (Step 548). In other examples, method 540 may include additional steps or fewer steps. In other examples, one or more steps of method 540 may be executed in a different order and/or one or more groups of steps may be executed simultaneously.

FIG. 5D is a flowchart of an exemplary method 560 for grouping events. In this example, method 560 may comprise receiving first modality data captured from an environment using at least one sensor of a first type of sensors (Step 542); receiving second modality data captured from the environment using at least one sensor of a second type of sensors (Step 544); analyzing at least part of the first modality data to identifying the group of two or more events of the plurality of events (Step 566); and at least part of the second modality data to determine the quantity associated with the group of two or more events (Step 568). In other examples, method 560 may include additional steps or fewer steps. In other examples, one or more steps of method 560 may be executed in a different order and/or one or more groups of steps may be executed simultaneously.

In some examples, Step 502 may comprise receiving an indication of a plurality of objects. For example, receiving the indication of the plurality of objects may comprise reading the indication from memory, may comprise receiving the indication from an external device (for example using a digital communication device), may comprise receiving the indication from an individual (for example via a user interface), may comprise identifying the plurality of objects, and so forth. In one example, Step 502 may analyze data to identify the plurality of objects, for example using Step 404 analyzing data received by Step 402. In one example, Step 502 may analyze image data to identify the plurality of objects, for example using Step 424 analyzing image data received by Step 422. In one example, Step 502 may analyze audio data to identify the plurality of objects, for example using Step 444 analyzing audio data received by Step 442.

In some examples, Step 504 may comprise identifying a group of two or more objects of a plurality of objects (such as the plurality of objects of Step 502, objects 122, etc.). In one example, the group of two or more objects does not include at least a particular object of the plurality of objects. In some examples, each object of the plurality of objects may be associated with data (for example as described above), and Step 504 may base the identification of the group of two or more objects of the plurality of objects on an analysis of the data associated with the plurality of objects. In one example, a machine learning model may be trained using training examples to determine whether to include objects in a group based on data associated with the objects. An example of such training example may include sample data associated with a sample object, together with a label indicating whether to include the sample object in a sample group. For each object of the plurality of objects, Step 504 may use the trained machine learning model to analyze the data associated with the object and determine whether to include the object in the group of two or more objects. In some examples, a RANdom SAmple Consensus algorithm (RANSAC) or a clustering algorithm may be used to analyze the data and identify the group of two or more objects of the plurality of objects. In some examples, each object of the plurality of objects may be associated with image data (for example as described above), and Step 504 may base the identification of the group of two or more objects of the plurality of objects on an analysis of the image data associated with the plurality of objects. In one example, Step 504 may calculate a convolution of at least part of the image data and thereby obtain a result value of the calculated convolution of the at least part of the image data, and may base the identification of the group of two or more objects of the plurality of objects on the result value of the calculated convolution of the at least part of the image data. For example, when the result value is a first value, Step 504 may identify a first group of two or more objects, and when the result value is a second value, Step 504 may identify a second group of two or more objects. The second group may differ from the first group. In one example, each object of the plurality of objects may be associated with a position in the image data, and Step 504 may select all objects in a selected region of the image data to be the group of two or more objects. In some examples, each object of the plurality of objects may be associated with audio data (for example as described above), and Step 504 may base the identification of the group of two or more objects of the plurality of objects on an analysis of the audio data associated with the plurality of objects. In one example, Step 504 may calculate a convolution of at least part of the audio data and thereby obtain a result value of the calculated convolution of the at least part of the audio data, and may base the identification of the group of two or more objects of the plurality of objects on the result value of the calculated convolution of the at least part of the audio data. For example, when the result value is a first value, Step 504 may identify a first group of two or more objects, and when the result value is a second value, Step 504 may identify a second group of two or more objects. The second group may differ from the first group. In one example, each object of the plurality of objects may be associated with a time in the audio data, and Step 504 may select all objects in a selected time window to be the group of two or more objects. In some examples, each object of the plurality of objects may be associated with a type or object, and Step 504 may base the identification of the group of two or more objects of the plurality of objects on the types of the plurality of objects. For example, Step 504 may include all object of a particular type in the group of two or more objects, and/or may exclude all object of a particular type in the group of two or more objects. In one example, Step 504 may determine that the group of two or more objects does not include the particular object based on a type of the particular object. In one example, Step 504 may determine that the group of two or more objects does not include the particular object based on a type of the particular object and on a type of at least one object in the group of two or more objects. In some examples, an indication of a writer persona may be obtained, for example as described above. Further, Step 504 may base the identification of the group of two or more objects of the plurality of objects on the writer persona. For example, the writer persona may have a tendency to group objects of a specific category together (for example, tend to generate contents that group objects of the specific category together), and Step 504 may include all objects of the plurality of objects corresponding to the specific category in the group of two or more objects. In another example, historic textual contents associated with the writer persona may indicate different levels of affinity of the writer persona to different types of objects, and Step 504 may determine to exclude the particular object from the group of two or more objects based on the affinity of the writer persona to the particular object being higher than a selected threshold or being higher than the affinity of the writer persona to at least one other object of the plurality of objects. In some examples, an indication of a prospective audience may be obtained, for example as described above. Further, Step 504 may base the identification of the group of two or more objects of the plurality of objects on the prospective audience. For example, the prospective audience may have a tendency to contents group objects of a specific category together (for example, tend to consume or like contents that group objects of the specific category together), and Step 504 may include all objects of the plurality of objects corresponding to the specific category in the group of two or more objects. In another example, historic textual contents associated with the prospective audience may indicate different levels of affinity of the prospective audience to different types of objects, and Step 504 may determine to exclude the particular object from the group of two or more objects based on the affinity of the prospective audience to the particular object being higher than a selected threshold or being higher than the affinity of the prospective audience to at least one other object of the plurality of objects. In some examples, an indication of a topic associated with the generated textual content may be obtained, for example as described above. Further, Step 504 may base the identification of the group of two or more objects of the plurality of objects on the topic associated with the generated textual content. For example, different objects may have different levels of affinity to the topic, and Step 504 may determine to exclude the particular object from the group of two or more objects based on the affinity of the particular object to the topic being higher than a selected threshold or being higher than the affinity of o at least one other object of the plurality of objects to the topic. In one example, Step 504 may determine a mathematical object associated with the topic in a mathematical space, for example as described above in relation to Step 404 and/or Step 424 and/or Step 444. Further, for each object of the plurality of objects, Step 504 may determine a mathematical object corresponding to the object in the mathematical space, for example as described above in relation to Step 406. Further, Step 504 may base the identification of the group of two or more objects of the plurality of objects on the mathematical object associated with the topic and the mathematical objects corresponding to the plurality of objects. For example, a region of the mathematical space may be selected based on the mathematical object associated with the topic (for example, using the mathematical object associated with the topic as a center of a spherical region of a selected radius), and Step 504 may identify all objects of the plurality of objects corresponding to mathematical objects contained in the selected region as belonging to the group of two or more objects, and/or may exclude all objects of the plurality of objects corresponding to mathematical objects not contained in the selected region from the group of two or more objects. In some examples, Step 504 may, for each object of the plurality of objects, determine a mathematical object in a mathematical space corresponding to the object, for example as described above in relation to Step 406. Further, Step 504 may base the identification of the group of two or more objects of the plurality of objects on the mathematical objects corresponding to the plurality of objects. For example, Step 504 may identify all objects of the plurality of objects corresponding to mathematical objects contained in a selected region as belonging to the group of two or more objects, and/or may exclude all objects of the plurality of objects corresponding to mathematical objects not contained in the selected region from the group of two or more objects. In another example, Step 504 may use a RANSAC algorithm or a clustering algorithm to analyze the mathematical objects corresponding to the plurality of objects and identify the group of two or more objects of the plurality of objects. In some examples, for each object of the plurality of objects, Step 504 may determine a magnitude associated with the object, for example as described above in relation to Step 404 and/or Step 424 and/or Step 444. Further, Step 504 may base the identification of the group of two or more objects of the plurality of objects on the magnitudes associated with the plurality of objects. For example, the objects of the plurality of objects associated with higher magnitudes may be included in the group of two or more objects, while objects associated with lower magnitudes may be excluded from the group of two or more objects.

In some examples, Step 506 may comprise determining a quantity associated with a group of two or more objects (such as a quantity associated with the group of two or more objects identified by Step 504). In some examples, each object in the group of two or more objects may be associated with a number, and the quantity associated with the group of two or more objects determined by Step 506 may be a function of the numbers associated with the objects in the group of two or more objects. Some non-limiting examples of such function may include sum, mean, median, a linear function, a non-linear function, a polynomial function, an exponential function, a logarithmic function, and so forth. In one example, at least two numbers of the numbers associated with the objects in the group of two or more objects may be different from one another. Some non-limiting examples of numbers associated with an object may include an amount of items associated with the object, a weight of the object, a height of the object, a length of the object, a dimension of the object, a money amount, a time length, and so forth. In one example, a data-structure associating objects with numbers may be accessed to determine the number associated with the object. In another example, data associated with an object (such as a data-record, image data, audio data, etc.) may be analyzed to determine the number associated with the object. For example, a machine learning model may be trained using training examples to determine numbers associated with objects from data associated with the objects. An example of such training example may include sample data associated with a sample object, together with a label indicating a number associated with the sample object. The trained machine learning model may be used to analyze the data associated with an object to determine the number associated with the object. In some examples, each object in the group of two or more objects may be associated with a position in space, and the quantity associated with the group of two or more objects may be an area or a volume of the convex hull associated with the positions of the objects in the group of two or more objects. In some examples, each object in the group of two or more objects may be associated with a point in time, and the quantity associated with the group of two or more objects may be an elapsed time between the earliest point in time and the latest point in time associated with the group of two or more objects. In some examples, each object in the group of two or more objects may be associated with image data. Further, for each object in the group of two or more objects, the image data associated with the object may be analyzed to determine data associated with the object, for example as described above in relation to Step 406. Further, Step 506 may determine the quantity associated with the group of two or more objects based on the data associated with the group of two or more objects, for example as described above. In one example, for each object in the group of two or more objects, a convolution of at least part of the image data associated with the object may be calculated and thereby a result value of the calculated convolution of the at least part of the image data associated with the object may be obtained, and the data associated with the object may be determined based on the result value of the calculated convolution of the at least part of the image data associated with the object. In one example, each object of the group of two or more objects may be a person, the image data associated with the person may be an image of the person, and the image data may be analyzed using a visual age determination algorithm to determine an age of the person, and thereby the number associated with the object may be determined. In one example, each object of the group of two or more objects may be ajar, the image data associated with the jar may be an image of the content of the jar, and the image data may be analyzed using a visual object detection algorithm to determine number of items in a jar, and thereby the number associated with the object may be determined. In some examples, each object in the group of two or more objects may be associated with audio data. Further, for each object in the group of two or more objects, the audio data associated with the object may be analyzed to determine data associated with the object, for example as described above in relation to Step 406. Further, Step 506 may determine the quantity associated with the group of two or more objects based on the data associated with the group of two or more objects. In one example, for each object in the group of two or more objects, a convolution of at least part of the audio data associated with the object may be calculated and thereby a result value of the calculated convolution of the at least part of the audio data associated with the object may be obtained, and the data associated with the object may be determined based on the result value of the calculated convolution of the at least part of the audio data associated with the object. In one example, the audio data associated with an object may be a recording of a sound or a vocalization produced by the object, and the audio data may be analyzed to measure a volume level of the sound, thereby determining the number associated with the object. In some examples, each object in the group of two or more objects may be associated with an event, and Step 506 may determine the quantity associated with the group of two or more objects based on the events associated with the group of two or more objects. For example, the event be associated with an object may be an action performed or caused by the object. In another example, the event be associated with an object may be an event affecting the object. In one example, the event associated with an object may be identified, for example as described in relation to Step 704 and/or Step 706 and/or method 720. In one example, Step 506 may analyze image data associated with the object (such as the image data received by Step 422) to identify the event associated with a particular object, for example as described below. In one example, Step 406 may analyze audio data (such as the audio data received by Step 442) to identify the event associated with a particular object, for example as described below. In some examples, each event may be associated with the number, and Step 506 may calculate a function of the numbers associated with the events to thereby determine the quantity associated with the group of two or more objects. Some non-limiting examples of such function may include sum, mean, median, a linear function, a non-linear function, a polynomial function, an exponential function, a logarithmic function, and so forth. For example, each event may be a shot of a basketball to a hoop by a basketball player (i.e., an object), the number associated with the event may be a number of points associated with the shot (for example, 0 points for a miss, 2 points for a successful shot from within the three-point line, and 3 points for a successful shot from behind the three-point line), and the quantity may be the total number of points associated with all the shots (i.e. events) associated with a group of two or more basketball players (i.e., the group of two or more objects). In some examples, Step 506 may use method 540 to determine the quantity associated with the group of two or more objects identified by Step 504.

In some examples, Step 508 may comprise generating a description of a group of two or more objects (such as the group of two or more objects identified by Step 504). The description of the group of two or more objects may include an indication of a quantity associated with the group of two or more objects (such as the quantity associated with the group of two or more objects determined by Step 506). Some non-limiting examples of such indication of a quantity may include "three", "4.42", "more than four", "many", and so forth. Some non-limiting examples of such description of the group of two or more objects may include 'the contestant passed three competitors consecutively', 'the team consists of seven players', 'the basket includes three items', 'the items weigh two pounds', 'five people were wounded and two people were killed', 'the total debt of the group is ten million dollars', and so forth. In some examples, Step 508 may insert the indication of the quantity to a sentence (for example, a template sentence, in a sample sentence, and so forth) in a location selected for a quantity (for example, a place for a quantity in the template sentence, replacing another quantity in the sample sentence, and so forth), to thereby generate the description of the group of two or more objects that includes the indication of the quantity. In some examples, Step 508 may use a generative model to generate the description of the group of two or more objects that includes the indication of the quantity, for example using the selected indication of the quantity as an input to the generative model.

In some examples, Step 508 may analyze data associated with a group of two or more objects (such as the group of two or more objects identified by Step 504) to select an adjective, and may include the selected adjective in the generated description of the group of two or more objects. For example, a machine learning model may be trained using training examples to select adjectives based on data associated with groups of objects. An example of such training example may include sample data associated with a sample group of objects, together with a label indicating a sample selection of a sample adjective associated with the sample group of objects. Step 508 may use the trained machine learning model to analyze the data associated with the group of two or more objects and select the adjective. In one example, the adjective may be a descriptive adjective. In another example, the adjective may be a numeral adjective. In yet another example, the adjective may be a quantitative adjective. In an additional example, the adjective may be a demonstrative adjective. In another example, the adjective may be an interrogative adjective. In yet another example, the adjective may be a possessive adjective. In an additional example, the adjective may be a proper adjective. In yet another example, the adjective may be an exclamatory adjective. In some examples, Step 508 may insert the selected adjective to a sentence (for example, a template sentence, in a sample sentence, and so forth) in a location selected for an adjective (for example, a place for an adjective in the template sentence, replacing another adjective in the sample sentence, and so forth), to thereby generate the description of the group of two or more objects that includes the adjective. In some examples, Step 508 may use a generative model to generate the description of the group of two or more objects that includes the adjective, for example using the selected adjective as an input to the generative model.

Additionally or alternatively, Step 508 may analyze data associated with a group of two or more objects (such as the group of two or more objects identified by Step 504) to select an adverb, and may include the selected adverb in the generated description of the group of two or more objects. For example, a machine learning model may be trained using training examples to select adverbs based on data associated with groups of objects. An example of such training example may include sample data associated with a sample group of objects, together with a label indicating a sample selection of a sample adverb associated with the sample group of objects. Step 508 may use the trained machine learning model to analyze the data associated with the group of two or more objects and select the adverb. In some examples, Step 508 may insert the selected adverb to a sentence (for example, a template sentence, in a sample sentence, and so forth) in a location selected for an adverb (for example, a place for an adverb in the template sentence, replacing another adverb in the sample sentence, and so forth), to thereby generate the description of the group of two or more objects that includes the adverb. In some examples, Step 508 may use a generative model to generate the description of the group of two or more objects that includes the adverb, for example using the selected adverb as an input to the generative model.

In some examples, an indication of a writer persona may be obtained, for example as described above. Further, Step 504 may base the identification of the group of two or more objects of the plurality of objects on the writer persona, for example as described above. Further, Step 508 may generate the description of the group of two or more objects in a style associated with the writer persona, for example as described above. In some examples, an indication of a prospective audience may be obtained, for example as described above. Further, Step 504 may base the identification of the group of two or more objects of the plurality of objects on the prospective audience, for example as described above. Further, Step 508 may generate the description of the group of two or more objects in a style associated with the prospective audience, for example as described above.

In some examples, Step 510 may comprise analyzing data associated with a particular object to generate a description of the particular object, for example of a particular object not included in the group of two or more objects identified by Step 504. For example, Step 510 may use Step 406 to analyze the data associated with the particular object to generate the description of the particular object.

In some examples, Step 512 may comprise generating a textual content that includes a description of a group of two or more objects and a description of a particular object not included in the group of two or more objects. In some examples, Step 512 may comprise generating a textual content that includes the description of the group of two or more objects generated by Step 508 and the description of the particular object generated by Step 510. In one example, for at least one specific object of the group of two or more objects, the textual content does not include information identifying the specific object. In some examples, Step 512 may insert the description of a group of two or more objects generated by Step 508 to a template in a location selected for a description of a group of objects, and may insert the description of the particular object generated by Step 510 to the template in a location selected for a description of a single object, thereby generating the textual content that includes the description of the group of two or more objects generated by Step 508 and the description of the particular object generated by Step 510. In some examples, Step 512 may use a generative model to generate a textual content that includes the description of a group of two or more objects and the description of the particular object, for example using the descriptions as inputs to the generative model. In some examples, the textual content generated by Step 512 may include no information identifying any specific object of the group of two or more objects. In some examples, the textual content generated by Step 512 may include no information identifying a specific object of the group of two or more objects. In some examples, Step 512 may further include in the textual content other details, such as a description of another object, a description of an event, a description of a scenery, a description of a location, a description related to time, a description of a cause or a reason, a description of a result, contextual information, a reference, and so forth.

In some examples, Step 512 may further comprise selecting an order for the description of the group of two or more objects and the description of the particular object in the generated textual content. Further, Step may generate the textual content to include description of the group of two or more objects and the description of the particular object arranged based on the selected order. In one example, the selection of the order may be based on data associated with the objects. In one example, the selection of the order may be based on the description of the group of two or more objects and the description of the particular object. For example, a machine learning model may be trained using training examples to select order for descriptions based on the descriptions. An example of such training example may include a plurality of sample descriptions, together with a label indicating a sample selection of a sample order for the sample descriptions. Step 512 may use the trained machine learning model to analyze the description of the group of two or more objects and the description of the particular object and select an order for the two descriptions, thereby selecting the order for the description of the group of two or more objects and the description of the particular object in the generated textual content. In some examples, Step 512 may obtain an indication of a topic associated with the generated textual content (for example as described above in relation to topic 152), and may select the order for the description of the group of two or more objects and the description of the particular object in the generated textual content based on the topic associated with the generated textual content. In one example, when the particular object is more relevant to the topic than the group of two or more objects, the description of the particular object may be positioned before the description of the group of two or more objects, and vice versa. In some examples, Step 512 may obtain an indication of a writer persona (for example as described above in relation to writer persona 142), and may select the order for the description of the group of two or more objects and the description of the particular object in the generated textual content based on the writer persona. For example, historic textual contents associated with the writer persona may indicate an affinity of the writer persona to start with a description of a single object or with a description of a group of objects, and the order may be selected according to the affinity of the writer persona. In some examples, Step 512 may obtain an indication of a prospective audience (for example as described above in relation to prospective audience 144), and may select the order for the description of the group of two or more objects and the description of the particular object in the generated textual content based on the prospective audience. For example, the prospective audience may have affinity to group statistics over individual accomplishments, and therefore the description of the particular object may be positioned before the description of the group of two or more objects.

In some examples, Step 512 may further comprise selecting a conjunction for the description of the group of two or more objects and the description of the particular object, and may generate the textual content to include: the description of the group of two or more objects, followed by the selected conjunction, followed by the description of the particular object. In some examples, Step 512 may further comprise selecting a conjunction for the description of the group of two or more objects and the description of the particular object, and may generate the textual content to include: the description of the particular object, followed by the selected conjunction, followed by the description of the group of two or more objects. In some examples, the selection of the conjunction may be based on the description of the group of two or more objects and the description of the particular object. For example, a machine learning model may be trained using training examples to select conjunction for two descriptions based on the descriptions. An example of such training example may include a pair of sample descriptions, together with a label indicating a sample selection of a conjunction for the pair of sample descriptions. Step 512 may use the trained machine learning model to analyze the description of the group of two or more objects and the description of the particular object and select the conjunction. In another example, the selection of the conjunction may be based on data associated with the objects. In some examples, Step 512 may obtain an indication of a writer persona (for example as described above in relation to writer persona 142), and may select the conjunction based on the writer persona. For example, historic textual contents associated with the writer persona may indicate an affinity of the writer persona to specific conjunctions, and the conjunction may be selected from the specific conjunctions. In some examples, Step 512 may obtain an indication of a prospective audience (for example as described above in relation to prospective audience 144), and may select the conjunction based on the prospective audience. For example, the prospective audience may have an affinity to a specific language register, and the conjunction may be selected according to the specific language register.

In some examples, Step 410 may provide a first portion of the textual content generated by Step 512 before an indication of at least one object of the plurality of objects is received by Step 502, and may provide a second portion of the textual content generated by Step 512 after the indication of the at least one object of the plurality of objects is received by Step 502. In one example, the first portion of the generated textual content may include the description of the group of two or more objects, the at least one object of the plurality of objects may include the particular object, and the second portion of the generated textual content may include the description of the particular object. In another example, the first portion of the generated textual content may include the description of the particular object, the at least one object of the plurality of objects may include at least one object of the group of two or more objects, and the second portion of the generated textual content may include the description of the group of two or more objects.

In some examples, Step 522 may comprise receiving an indication of a plurality of events. For example, receiving the indication of the plurality of events may comprise reading the indication from memory, may comprise receiving the indication from an external device (for example using a digital communication device), may comprise receiving the indication from an individual (for example via a user interface), may comprise identifying the plurality of events, and so forth. In one example, Step 522 may analyze data to identify the plurality of events, for example using Step 454 analyzing data received by Step 452. In one example, Step 522 may analyze image data to identify the plurality of events, for example using Step 474 analyzing image data received by Step 472. In one example, Step 522 may analyze audio data to identify the plurality of events, for example using Step 494 analyzing audio data received by Step 492.

In some examples, Step 524 may comprise identifying a group of two or more events of a plurality of events (such as the plurality of events of Step 522, events 124, etc.). In one example, the group of two or more events does not include at least a particular event of the plurality of events. In some examples, each event of the plurality of events may be associated with data (for example as described above), and Step 524 may base the identification of the group of two or more events of the plurality of events on an analysis of the data associated with the plurality of events. In one example, a machine learning model may be trained using training examples to determine whether to include events in a group based on data associated with the events. An example of such training example may include sample data associated with a sample event, together with a label indicating whether to include the sample event in a sample group. For each event of the plurality of events, Step 524 may use the trained machine learning model to analyze the data associated with the event and determine whether to include the event in the group of two or more events. In some examples, a RANSAC or a clustering algorithm may be used to analyze the data and identify the group of two or more events of the plurality of events. In some examples, each event of the plurality of events may be associated with image data (for example as described above), and Step 524 may base the identification of the group of two or more events of the plurality of events on an analysis of the image data associated with the plurality of events. In one example, Step 524 may calculate a convolution of at least part of the image data and thereby obtain a result value of the calculated convolution of the at least part of the image data, and may base the identification of the group of two or more events of the plurality of events on the result value of the calculated convolution of the at least part of the image data. For example, when the result value is a first value, Step 524 may identify a first group of two or more events, and when the result value is a second value, Step 524 may identify a second group of two or more events. The second group may differ from the first group. In one example, each event of the plurality of events may be associated with a position in the image data, and Step 524 may select all events in a selected region of the image data to be the group of two or more events. In one example, each event of the plurality of events may be associated with a time in a video, and Step 524 may select all events in a selected time window to be the group of two or more events. In some examples, each event of the plurality of events may be associated with audio data (for example as described above), and Step 524 may base the identification of the group of two or more events of the plurality of events on an analysis of the audio data associated with the plurality of events. In one example, Step 524 may calculate a convolution of at least part of the audio data and thereby obtain a result value of the calculated convolution of the at least part of the audio data, and may base the identification of the group of two or more events of the plurality of events on the result value of the calculated convolution of the at least part of the audio data. For example, when the result value is a first value, Step 524 may identify a first group of two or more events, and when the result value is a second value, Step 524 may identify a second group of two or more events. The second group may differ from the first group. In one example, each event of the plurality of events may be associated with a time in the audio data, and Step 524 may select all events in a selected time window to be the group of two or more events. In some examples, each event of the plurality of events may be associated with a type or event, and Step 524 may base the identification of the group of two or more events of the plurality of events on the types of the plurality of events. For example, Step 524 may include all event of a particular type in the group of two or more events, and/or may exclude all event of a particular type in the group of two or more events. In one example, Step 524 may determine that the group of two or more events does not include the particular event based on a type of the particular event. In one example, Step 524 may determine that the group of two or more events does not include the particular event based on a type of the particular event and on a type of at least one event in the group of two or more events. In some examples, an indication of a writer persona may be obtained, for example as described above. Further, Step 524 may base the identification of the group of two or more events of the plurality of events on the writer persona. For example, the writer persona may have a tendency to group events of a specific category together (for example, tend to generate contents that group events of the specific category together), and Step 524 may include all events of the plurality of events corresponding to the specific category in the group of two or more events. In another example, historic textual contents associated with the writer persona may indicate different levels of affinity of the writer persona to different types of events, and Step 524 may determine to exclude the particular event from the group of two or more events based on the affinity of the writer persona to the particular event being higher than a selected threshold or being higher than the affinity of the writer persona to at least one other event of the plurality of events. In some examples, an indication of a prospective audience may be obtained, for example as described above. Further, Step 524 may base the identification of the group of two or more events of the plurality of events on the prospective audience. For example, the prospective audience may have a tendency to contents group events of a specific category together (for example, tend to consume or like contents that group events of the specific category together), and Step 524 may include all events of the plurality of events corresponding to the specific category in the group of two or more events. In another example, historic textual contents associated with the prospective audience may indicate different levels of affinity of the prospective audience to different types of events, and Step 524 may determine to exclude the particular event from the group of two or more events based on the affinity of the prospective audience to the particular event being higher than a selected threshold or being higher than the affinity of the prospective audience to at least one other event of the plurality of events. In some examples, an indication of a topic associated with the generated textual content may be obtained, for example as described above. Further, Step 524 may base the identification of the group of two or more events of the plurality of events on the topic associated with the generated textual content. For example, different events may have different levels of affinity to the topic, and Step 524 may determine to exclude the particular event from the group of two or more events based on the affinity of the particular event to the topic being higher than a selected threshold or being higher than the affinity of o at least one other event of the plurality of events to the topic. In one example, Step 524 may determine a mathematical object associated with the topic in a mathematical space, for example as described above in relation to Step 454 and/or Step 474 and/or Step 494. Further, for each event of the plurality of events, Step 524 may determine a mathematical object corresponding to the event in the mathematical space, for example as described above in relation to Step 456. Further, Step 524 may base the identification of the group of two or more events of the plurality of events on the mathematical object associated with the topic and the mathematical objects corresponding to the plurality of events. For example, a region of the mathematical space may be selected based on the mathematical object associated with the topic (for example, using the mathematical object associated with the topic as a center of a spherical region of a selected radius), and Step 524 may identify all events of the plurality of events corresponding to mathematical objects contained in the selected region as belonging to the group of two or more events, and/or may exclude all events of the plurality of events corresponding to mathematical objects not contained in the selected region from the group of two or more events. In some examples, Step 524 may, for each event of the plurality of events, determine a mathematical object in a mathematical space corresponding to the event, for example as described above in relation to Step 456. Further, Step 524 may base the identification of the group of two or more events of the plurality of events on the mathematical objects corresponding to the plurality of events. For example, Step 524 may identify all events of the plurality of events corresponding to mathematical objects contained in a selected region as belonging to the group of two or more events, and/or may exclude all events of the plurality of events corresponding to mathematical objects not contained in the selected region from the group of two or more events. In another example, Step 524 may use a RANSAC algorithm or a clustering algorithm to analyze the mathematical objects corresponding to the plurality of events and identify the group of two or more events of the plurality of events. In some examples, for each event of the plurality of events, Step 524 may determine a magnitude associated with the event, for example as described above in relation to Step 454 and/or Step 474 and/or Step 494. Further, Step 524 may base the identification of the group of two or more events of the plurality of events on the magnitudes associated with the plurality of events. For example, the events of the plurality of events associated with higher magnitudes may be included in the group of two or more events, while events associated with lower magnitudes may be excluded from the group of two or more events.

In some examples, Step 526 may comprise determining a quantity associated with a group of two or more events (such as a quantity associated with the group of two or more events identified by Step 524). In some examples, each event in the group of two or more events may be associated with a number, and the quantity associated with the group of two or more events determined by Step 526 may be a function of the numbers associated with the events in the group of two or more events. Some non-limiting examples of such function may include sum, mean, median, a linear function, a non-linear function, a polynomial function, an exponential function, a logarithmic function, and so forth. In one example, at least two numbers of the numbers associated with the events in the group of two or more events may be different from one another. Some non-limiting examples of numbers associated with an event may include an amount of objects involved in the event, a duration of the event, a volume level of sounds produced by the event, an extent of the event, a money amount associated with the event, a time length, and so forth. In one example, a data-structure associating events with numbers may be accessed to determine the number associated with the event. In another example, data associated with an event (such as a data-record, image data, audio data, etc.) may be analyzed to determine the number associated with the event. For example, a machine learning model may be trained using training examples to determine numbers associated with events from data associated with the events. An example of such training example may include sample data associated with a sample event, together with a label indicating a number associated with the sample event. The trained machine learning model may be used to analyze the data associated with an event to determine the number associated with the event. In some examples, each event in the group of two or more events may be associated with a position in space, and the quantity associated with the group of two or more events may be an area or a volume of the convex hull associated with the positions of the events in the group of two or more events. In some examples, each event in the group of two or more events may be associated with a point in time, and the quantity associated with the group of two or more events may be an elapsed time between the earliest point in time and the latest point in time associated with the group of two or more events. In some examples, each event in the group of two or more events may be associated with image data. Further, for each event in the group of two or more events, the image data associated with the event may be analyzed to determine data associated with the event, for example as described above in relation to Step 456. Further, Step 526 may determine the quantity associated with the group of two or more events based on the data associated with the group of two or more events, for example as described above. In one example, for each event in the group of two or more events, a convolution of at least part of the image data associated with the event may be calculated and thereby a result value of the calculated convolution of the at least part of the image data associated with the event may be obtained, and the data associated with the event may be determined based on the result value of the calculated convolution of the at least part of the image data associated with the event. In one example, each event of the group of two or more events may be an interaction among a group of people, the image data associated with the interaction may be an image of the group of people interacting, and the image data may be analyzed using a person detection algorithm to determine the number of people involved in the interaction, and thereby the number associated with the event may be determined. In one example, each event of the group of two or more events may be a basketball shot, the image data associated with the collision may be a video of the shot, and the image data may be analyzed using a trained machine learning algorithm to determine a number of points associated with the shot, and thereby the number associated with the event may be determined. In some examples, each event in the group of two or more events may be associated with audio data. Further, for each event in the group of two or more events, the audio data associated with the event may be analyzed to determine data associated with the event, for example as described above in relation to Step 456. Further, Step 526 may determine the quantity associated with the group of two or more events based on the data associated with the group of two or more events. In one example, for each event in the group of two or more events, a convolution of at least part of the audio data associated with the event may be calculated and thereby a result value of the calculated convolution of the at least part of the audio data associated with the event may be obtained, and the data associated with the event may be determined based on the result value of the calculated convolution of the at least part of the audio data associated with the event. In one example, the audio data associated with an event may be a recording of a sound or a vocalization produced during the event, and the audio data may be analyzed to measure a volume level of the sound, thereby determining the number associated with the event. In some examples, each event in the group of two or more events may be associated with an object, and Step 526 may determine the quantity associated with the group of two or more events based on the objects associated with the group of two or more events. For example, the event may include an action, and the object associated with the event may be an object performing an action. In another example, the object associated with the event may be an object affected by the event. In one example, the object associated with an event may be identified, for example as described in relation to Step 804 and/or Step 806 and/or method 820. In one example, Step 526 may analyze image data associated with the event (such as the image data received by Step 472) to identify the object associated with a particular event, for example as described below. In one example, Step 456 may analyze audio data (such as the audio data received by Step 492) to identify the object associated with a particular event, for example as described below. In some examples, each object may be associated with the number, and Step 526 may calculate a function of the numbers associated with the objects to thereby determine the quantity associated with the group of two or more events. Some non-limiting examples of such function may include sum, mean, median, a linear function, a non-linear function, a polynomial function, an exponential function, a logarithmic function, and so forth. For example, each object may be a person interacting with a device (i.e., an event), the number associated with the object may be an age of the person, and the quantity may be the average age of people (i.e. objects) interacting with the device (i.e., the group of two or more events). In some examples, Step 526 may use method 560 to determine the quantity associated with the group of two or more events identified by Step 524.

In some examples, Step 528 may comprise generating a description of a group of two or more events (such as the group of two or more events identified by Step 524). The description of the group of two or more events may include an indication of a quantity associated with the group of two or more events (such as the quantity associated with the group of two or more events determined by Step 526). Some non-limiting examples of such indication of a quantity may include "three", "4.42", "more than four", "many", and so forth. Some non-limiting examples of such description of the group of two or more events may include 'the contestant passed three competitors consecutively' (each pass is an event), 'the basketball team received 17 points in the third quarter' (describing a result of a plurality of shots), 'five people were wounded and two people were killed in three accidents' (each accident is an event), 'the sales totaled 7 million dollar' (each sale is an event), and so forth. In some examples, Step 528 may insert the indication of the quantity to a sentence (for example, a template sentence, in a sample sentence, and so forth) in a location selected for a quantity (for example, a place for a quantity in the template sentence, replacing another quantity in the sample sentence, and so forth), to thereby generate the description of the group of two or more events that includes the indication of the quantity. In some examples, Step 528 may use a generative model to generate the description of the group of two or more events that includes the indication of the quantity, for example using the selected indication of the quantity as an input to the generative model.

In some examples, Step 528 may analyze data associated with a group of two or more events (such as the group of two or more events identified by Step 524) to select an adjective, and may include the selected adjective in the generated description of the group of two or more events. For example, a machine learning model may be trained using training examples to select adjectives based on data associated with groups of events. An example of such training example may include sample data associated with a sample group of events, together with a label indicating a sample selection of a sample adjective associated with the sample group of events. Step 528 may use the trained machine learning model to analyze the data associated with the group of two or more events and select the adjective. In one example, the adjective may be a descriptive adjective. In another example, the adjective may be a numeral adjective. In yet another example, the adjective may be a quantitative adjective. In an additional example, the adjective may be a demonstrative adjective. In another example, the adjective may be an interrogative adjective. In yet another example, the adjective may be a possessive adjective. In an additional example, the adjective may be a proper adjective. In yet another example, the adjective may be an exclamatory adjective. In some examples, Step 528 may insert the selected adjective to a sentence (for example, a template sentence, in a sample sentence, and so forth) in a location selected for an adjective (for example, a place for an adjective in the template sentence, replacing another adjective in the sample sentence, and so forth), to thereby generate the description of the group of two or more events that includes the adjective. In some examples, Step 528 may use a generative model to generate the description of the group of two or more events that includes the adjective, for example using the selected adjective as an input to the generative model.

Additionally or alternatively, Step 528 may analyze data associated with a group of two or more events (such as the group of two or more events identified by Step 524) to select an adverb, and may include the selected adverb in the generated description of the group of two or more events. For example, a machine learning model may be trained using training examples to select adverbs based on data associated with groups of events. An example of such training example may include sample data associated with a sample group of events, together with a label indicating a sample selection of a sample adverb associated with the sample group of events. Step 528 may use the trained machine learning model to analyze the data associated with the group of two or more events and select the adverb. In some examples, Step 528 may insert the selected adverb to a sentence (for example, a template sentence, in a sample sentence, and so forth) in a location selected for an adverb (for example, a place for an adverb in the template sentence, replacing another adverb in the sample sentence, and so forth), to thereby generate the description of the group of two or more events that includes the adverb. In some examples, Step 528 may use a generative model to generate the description of the group of two or more events that includes the adverb, for example using the selected adverb as an input to the generative model.

In some examples, an indication of a writer persona may be obtained, for example as described above. Further, Step 524 may base the identification of the group of two or more events of the plurality of events on the writer persona, for example as described above. Further, Step 528 may generate the description of the group of two or more events in a style associated with the writer persona, for example as described above. In some examples, an indication of a prospective audience may be obtained, for example as described above. Further, Step 524 may base the identification of the group of two or more events of the plurality of events on the prospective audience, for example as described above. Further, Step 528 may generate the description of the group of two or more events in a style associated with the prospective audience, for example as described above.

In some examples, Step 530 may comprise analyzing data associated with a particular event to generate a description of the particular event, for example of a particular event not included in the group of two or more events identified by Step 524. For example, Step 530 may use Step 456 to analyze the data associated with the particular event to generate the description of the particular event.

In some examples, Step 532 may comprise generating a textual content that includes a description of a group of two or more events and a description of a particular event not included in the group of two or more events. In some examples, Step 532 may comprise generating a textual content that includes the description of the group of two or more events generated by Step 528 and the description of the particular event generated by Step 530. In one example, for at least one specific event of the group of two or more events, the textual content does not include information identifying the specific event. In some examples, Step 532 may insert the description of a group of two or more events generated by Step 528 to a template in a location selected for a description of a group of events, and may insert the description of the particular event generated by Step 530 to the template in a location selected for a description of a single event, thereby generating the textual content that includes the description of the group of two or more events generated by Step 528 and the description of the particular event generated by Step 530. In some examples, Step 532 may use a generative model to generate a textual content that includes the description of a group of two or more events and the description of the particular event, for example using the descriptions as inputs to the generative model. In some examples, the textual content generated by Step 532 may include no information identifying any specific event of the group of two or more events. In some examples, the textual content generated by Step 532 may include no information identifying a specific event of the group of two or more events. In some examples, Step 532 may further include in the textual content other details, such as a description of an object, a description of another event, a description of a scenery, a description of a location, a description related to time, a description of a cause or a reason, a description of a result, contextual information, a reference, and so forth.

In some examples, Step 532 may further comprise selecting an order for the description of the group of two or more events and the description of the particular event in the generated textual content. Further, Step may generate the textual content to include description of the group of two or more events and the description of the particular event arranged based on the selected order. In one example, the selection of the order may be based on data associated with the events. In one example, the selection of the order may be based on the description of the group of two or more events and the description of the particular event. For example, a machine learning model may be trained using training examples to select order for descriptions based on the descriptions. An example of such training example may include a plurality of sample descriptions, together with a label indicating a sample selection of a sample order for the sample descriptions. Step 532 may use the trained machine learning model to analyze the description of the group of two or more events and the description of the particular event and select an order for the two descriptions, thereby selecting the order for the description of the group of two or more events and the description of the particular event in the generated textual content. In some examples, Step 532 may obtain an indication of a topic associated with the generated textual content (for example as described above in relation to topic 152), and may select the order for the description of the group of two or more events and the description of the particular event in the generated textual content based on the topic associated with the generated textual content. In one example, when the particular event is more relevant to the topic than the group of two or more events, the description of the particular event may be positioned before the description of the group of two or more events, and vice versa. In some examples, Step 532 may obtain an indication of a writer persona (for example as described above in relation to writer persona 142), and may select the order for the description of the group of two or more events and the description of the particular event in the generated textual content based on the writer persona. For example, historic textual contents associated with the writer persona may indicate an affinity of the writer persona to start with a description of a single event or with a description of a group of events, and the order may be selected according to the affinity of the writer persona. In some examples, Step 532 may obtain an indication of a prospective audience (for example as described above in relation to prospective audience 144), and may select the order for the description of the group of two or more events and the description of the particular event in the generated textual content based on prospective audience. For example, the prospective audience may have affinity to group statistics over individual accomplishments, and therefore the description of the particular event may be positioned before the description of the group of two or more events.

In some examples, Step 532 may further comprise selecting a conjunction for the description of the group of two or more events and the description of the particular event, and may generate the textual content to include: the description of the group of two or more events, followed by the selected conjunction, followed by the description of the particular event. In some examples, Step 532 may further comprise selecting a conjunction for the description of the group of two or more events and the description of the particular event, and may generate the textual content to include: the description of the particular event, followed by the selected conjunction, followed by the description of the group of two or more events. In some examples, the selection of the conjunction may be based on the description of the group of two or more events and the description of the particular event. For example, a machine learning model may be trained using training examples to select conjunction for two descriptions based on the descriptions. An example of such training example may include a pair of sample descriptions, together with a label indicating a sample selection of a conjunction for the pair of sample descriptions. Step 532 may use the trained machine learning model to analyze the description of the group of two or more events and the description of the particular event and select the conjunction. In another example, the selection of the conjunction may be based on data associated with the events. In some examples, Step 532 may obtain an indication of a writer persona (for example as described above in relation to writer persona 142), and may select the conjunction based on the writer persona. For example, historic textual contents associated with the writer persona may indicate an affinity of the writer persona to specific conjunctions, and the conjunction may be selected from the specific conjunctions. In some examples, Step 532 may obtain an indication of a prospective audience (for example as described above in relation to prospective audience 144), and may select the conjunction based on the prospective audience. For example, the prospective audience may have an affinity to a specific language register, and the conjunction may be selected according to the specific language register.

In some examples, Step 410 may provide a first portion of the textual content generated by Step 532 before an indication of at least one event of the plurality of events is received by Step 522, and may provide a second portion of the textual content generated by Step 532 after the indication of the at least one event of the plurality of events is received by Step 522. In one example, the first portion of the generated textual content may include the description of the group of two or more events, the at least one event of the plurality of events may include the particular event, and the second portion of the generated textual content may include the description of the particular event. In another example, the first portion of the generated textual content may include the description of the particular event, the at least one event of the plurality of events may include at least one event of the group of two or more events, and the second portion of the generated textual content may include the description of the group of two or more events.

In some examples, Step 542 may comprise receiving first modality data captured from an environment using 410 at least one sensor of a first type of sensors, for example as described above. In some examples, Step 544 may comprise receiving second modality data captured from the environment using at least one sensor of a second type of sensors, for example as described above. The second type of sensors may differ from the first type of sensors. In one example, the at least one sensor of the first type of sensors may be at least one image sensor, the first modality data may be image data (such as an image, a series of images, a video, and so forth), the at least one sensor of the second type of sensors may be at least one audio sensor, and the second modality data may be audio data. In one example, the at least one sensor of the first type of sensors may be at least one audio sensor, the first modality data may be audio data, the at least one sensor of the second type of sensors may be at least one image sensor, and the second modality data may be image data (such as an image, a series of images, a video, and so forth).

In some examples, Step 546 may comprise analyzing at least part of modality data captured using a specific type of sensors (such as the first type of sensors of Step 542) to identifying a group of two or more objects of a plurality of objects, for example as described above in relation to Step 504. In some examples, Step 546 may comprise analyzing at least part of the first modality data received by Step 542 to identifying the group of two or more objects (of Step 504) of the plurality of objects (of Step 502), for example as described above in relation to Step 504. In one example, a machine learning model may be trained using training examples to identify whether an object belongs to a specific group based on data captured using sensors of the specific type of sensors. An example of such training example may include sample data captured using a sample sensor of the specific type of sensors and an indication of a sample object, together with a label indicating whether to include the sample object in the specific group. Step 546 may, for each object in the plurality of objects of Step 502, use the trained machine learning model to analyze the at least part of the first modality data received by Step 542 and determine whether to include the object in the group of two or more objects of Step 504.

In some examples, Step 548 may comprise analyzing at least part of modality data captured using a particular type of sensors (such as the second type of sensors of Step 544) to determine a quantity associated with a group of two or more objects, for example as described above in relation to Step 506. In some examples, Step 548 may comprise analyzing at least part of the second modality data received by Step 544 to determine the quantity (of Step 506) associated with the group of two or more objects, for example as described above in relation to Step 506. In one example, a machine learning model may be trained using training examples to determine quantities associated with groups of objects from data captured using sensors of the particular type of sensors. An example of such training example may include sample data captured using a sample sensor of the particular type of sensors and an indication of a sample group of sample objects, together with a label indicating a quantity associated with the sample group of sample objects. Step 548 may use the trained machine learning model to analyze the second modality data received by Step 544 and determine the quantity associated with the group of two or more objects. In some examples, Step 548 may access synchronization data configured to enable synchronization of the first modality data and the second modality data. In one example, the synchronization data may include data configured to correlate different portions of the second modality data to different portions of the first modality data. For example, the synchronization data may correlate the different portions of the first modality data and the different portions of the second modality data to a common timeline. Further, Step 548 may use the synchronization data to identify at least one portion of the second modality data associated with the group of two or more objects, for example based on the at least one portion of the second modality data being synchronized with at least one portion of the first modality data corresponding to the group of two or more objects. Further, Step 548 may analyze the at least one portion of the second modality data associated with the group of two or more objects to determine the quantity associated with the group of two or more objects, for example as described herein.

In some examples, Step 566 may comprise analyzing at least part of modality data captured using a specific type of sensors (such as the first type of sensors of Step 542) to identifying a group of two or more events of a plurality of events, for example as described above in relation to Step 524. In some examples, Step 566 may comprise analyzing at least part of the first modality data received by Step 542 to identifying the group of two or more events (of Step 524) of the plurality of events (of Step 522), for example as described above in relation to Step 524. In one example, a machine learning model may be trained using training examples to identify whether an event belongs to a specific group based on data captured using sensors of the specific type of sensors. An example of such training example may include sample data captured using a sample sensor of the specific type of sensors and an indication of a sample event, together with a label indicating whether to include the sample event in the specific group. Step 566 may, for each event in the plurality of events of Step 522, use the trained machine learning model to analyze the at least part of the first modality data received by Step 542 and determine whether to include the event in the group of two or more events of Step 524.

In some examples, Step 568 may comprise analyzing at least part of modality data captured using a particular type of sensors (such as the second type of sensors of Step 544) to determine a quantity associated with a group of two or more events, for example as described above in relation to Step 526. In some examples, Step 568 may comprise analyzing at least part of the second modality data received by Step 544 to determine the quantity (of Step 526) associated with the group of two or more events, for example as described above in relation to Step 526. In one example, a machine learning model may be trained using training examples to determine quantities associated with groups of events from data captured using sensors of the particular type of sensors. An example of such training example may include sample data captured using a sample sensor of the particular type of sensors and an indication of a sample group of sample events, together with a label indicating a quantity associated with the sample group of sample events. Step 568 may use the trained machine learning model to analyze the second modality data received by Step 544 and determine the quantity associated with the group of two or more events. In some examples, Step 568 may access synchronization data configured to enable synchronization of the first modality data and the second modality data. In one example, the synchronization data may include data configured to correlate different portions of the second modality data to different portions of the first modality data. For example, the synchronization data may correlate the different portions of the first modality data and the different portions of the second modality data to a common timeline. Further, Step 568 may use the synchronization data to identify at least one portion of the second modality data associated with the group of two or more events, for example based on the at least one portion of the second modality data being synchronized with at least one portion of the first modality data corresponding to the group of two or more events. Further, Step 568 may analyze the at least one portion of the second modality data associated with the group of two or more events to determine the quantity associated with the group of two or more events, for example as described herein.

FIG. 6A is a flowchart of an exemplary method 600 for generating a textual content reporting objects based on events. In this example, method 600 may comprise receiving an indication of an object (Step 602); receiving an indication of a group of one or more events associated with the object (Step 604); for each event of the group of one or more events, receiving data associated with the event (Step 606); analyzing the data associated with the group of one or more events to select an adjective (Step 608); generating a particular description of the object, the particular description of the object is based on the group of one or more events, the particular description of the object includes the selected adjective (Step 610); generating a textual content, the textual content includes the particular description of the object (Step 612); and providing the generated textual content (Step 410). In other examples, method 600 may include additional steps or fewer steps. In other examples, one or more steps of method 600 may be executed in a different order and/or one or more groups of steps may be executed simultaneously. In one example, the group of two or more objects does not include at least a specific object of the plurality of objects, the specific object may differ from the particular object, and the generated textual content may include no information associated with the specific object.

FIG. 6B is a flowchart of an exemplary method 620 for detecting objects and events associated with the objects. In this example, method 620 may comprise receiving first modality data captured from an environment using at least one sensor of a first type of sensors (Step 542); receiving second modality data captured from the environment using at least one sensor of a second type of sensors, the second type of sensors differs from the first type of sensors (Step 544); analyzing the first modality data to detect the object (Step 626); accessing synchronization data configured to enable synchronization of the first modality data and the second modality data (Step 628); using the synchronization data to identify at least one portion of the second modality data associated with the object (Step 630); and analyzing at least part of the second modality data to detect the events of the group of one or more events in the at least one portion of the second modality data associated with the object (Step 632). In other examples, method 620 may include additional steps or fewer steps. In other examples, one or more steps of method 620 may be executed in a different order and/or one or more groups of steps may be executed simultaneously. In one example, the group of two or more objects does not include at least a specific object of the plurality of objects, the specific object may differ from the particular object, and the generated textual content may include no information associated with the specific object. In some examples, the at least one sensor of the first type of sensors may be at least one image sensor, the first modality data may be image data, the at least one sensor of the second type of sensors may be at least one audio sensor, and the second modality data may be audio data. In some examples, the at least one sensor of the first type of sensors may be at least one audio sensor, the first modality data may be audio data, the at least one sensor of the second type of sensors may be at least one image sensor, and the second modality data may be image data.

FIG. 6C is a flowchart of an exemplary method 650 for generating a textual content reporting events based on objects. In this example, method 650 may comprise receiving an indication of an event (Step 652); receiving an indication of a group of one or more objects associated with the object (Step 654); for each object of the group of one or more objects, receiving data associated with the object (Step 656); analyzing the data associated with the group of one or more objects to select an adjective (Step 658); generating a particular description of the event, the particular description of the event is based on the group of one or more objects, the particular description of the event includes the selected adjective (Step 660); generating a textual content, the textual content includes the particular description of the event (Step 662); and providing the generated textual content (Step 410). In other examples, method 650 may include additional steps or fewer steps. In other examples, one or more steps of method 650 may be executed in a different order and/or one or more groups of steps may be executed simultaneously. In one example, the group of two or more objects does not include at least a specific object of the plurality of objects, the specific object may differ from the particular object, and the generated textual content may include no information associated with the specific object.

FIG. 6D is a flowchart of an exemplary method 670 for detect events and objects associated with the events. In this example, method 670 may comprise receiving first modality data captured from an environment using at least one sensor of a first type of sensors (Step 542); receiving second modality data captured from the environment using at least one sensor of a second type of sensors, the second type of sensors differs from the first type of sensors (Step 544); analyzing the first modality data to detect the event (Step 676); accessing synchronization data configured to enable synchronization of the first modality data and the second modality data (Step 628); using the synchronization data to identify at least one portion of the second modality data associated with the event (Step 680); and analyzing at least part of the second modality data to detect the objects of the group of one or more objects in the at least one portion of the second modality data associated with the event (Step 682). In other examples, method 670 may include additional steps or fewer steps. In other examples, one or more steps of method 670 may be executed in a different order and/or one or more groups of steps may be executed simultaneously. In one example, the group of two or more objects does not include at least a specific object of the plurality of objects, the specific object may differ from the particular object, and the generated textual content may include no information associated with the specific object. In some examples, the at least one sensor of the first type of sensors may be at least one image sensor, the first modality data may be image data, the at least one sensor of the second type of sensors may be at least one audio sensor, and the second modality data may be audio data. In some examples, the at least one sensor of the first type of sensors may be at least one audio sensor, the first modality data may be audio data, the at least one sensor of the second type of sensors may be at least one image sensor, and the second modality data may be image data.

In some examples, Step 602 may comprise receiving an indication of an object. For example, receiving the indication of the object may comprise reading the indication from memory, may comprise receiving the indication from an external device (for example using a digital communication device), may comprise receiving the indication from an individual (for example via a user interface), may comprise identifying the object, and so forth. In one example, Step 602 may use method 620 to identify the object. In one example, Step 602 may analyze data to identify the object, may analyze image data (for example, using a visual object detection algorithm) to identify the object, may analyze audio data to identify the object (for example, by identifying sounds or vocalizations generated by the object and/or typical to the object), and so forth. For example, a machine learning model may be trained using training examples to identify objects based on data. An example of such training example may include sample data, together with a label indicating a sample object associated with the sample data.

Step 602 may use the trained machine learning model to analyze data and identify the object.

In some examples, Step 604 may comprise receiving an indication of a group of one or more events associated with an object. In some examples, Step 604 may comprise receiving an indication of a group of one or more events associated with the object of Step 602. For example, the group of one or more events may include exactly one event, may include exactly two events, may include exactly three events, may include between four and ten events, may include more than ten events, and so forth. In some examples, receiving the indication of the group of one or more events may comprise reading the indication from memory, may comprise receiving the indication from an external device (for example using a digital communication device), may comprise receiving the indication from an individual (for example via a user interface), may comprise identifying the group of one or more events, and so forth. In one example, Step 604 may use method 620 to identify the group of one or more events. In one example, Step 604 may analyze data to identify the group of one or more events. For example, a machine learning model may be trained using training examples to identify events associated with objects from data. An example of such training example may include sample data and an indication of a sample object, together with a label indicating one or more sample events associated with the sample object. In one example, Step 604 may analyze image data to identify the group of one or more events, for example using visual event detection algorithm to analyze the image data and identify candidate events, and using a visual classification algorithm to select the events associated with the object of Step 602 of the candidate events. In one example, Step 604 may analyze audio data to identify the group of one or more events, for example by analyzing the audio data to identify sounds and vocalizations produced by and/or typical to events associated with the object of Step 602. For example, the object may be a person, the event may be the person speaking, and the audio data may be analyzed using a speaker diarisation algorithm to determine when the person speaks.

In some examples, Step 606 may comprise, for each event of a group of one or more events, receiving data associated with the event. In some examples, Step 606 may comprise, for each event of the group of one or more events of Step 604, receiving data associated with the event. In some examples, the data associated with a specific event of the group of one or more events may include digital data associated with the specific event, such as digital data encoding information associated with the event. In some examples, the data associated with a specific event of the group of one or more events may include image data associated with the specific event. For example, the image data may include a depiction of the event. In another example, Step 606 may receive a video, and for each event of the group of one or more events, the data associated with the event may include at least one portion of the video. For example, the video may be read from memory, may be received from an external device (for example, using a digital communication device), may be captured using at least one image sensor, and so forth. In some examples, the data associated with a specific event of the group of one or more events may include audio data associated with the specific event. For example, the audio data may include sounds and/or vocalizations generated in the event. In another example, Step 606 may receive an audio stream, for each event of the group of one or more events, the data associated with the event may include at least one portion of the audio stream. For example, the audio stream may be read from memory, may be received from an external device (for example, using a digital communication device), may be captured using at least one audio sensor, may be generated from an audio file, and so forth.

In some examples, Step 608 may comprise analyzing data associated with a group of one or more events to select an adjective. In one example, the data associated with a group of one or more events does not include the adjective selected by Step 608. In some examples, Step 608 may comprise analyzing the data received by Step 606 and associated with a group of one or more events to select an adjective. In some examples, Step 608 may comprise analyzing the data received by Step 606 and associated with the group of one or more events of Step 604 to select an adjective. In one example, the adjective may be a descriptive adjective. In another example, the adjective may be a numeral adjective. In yet another example, the adjective may be a quantitative adjective. In an additional example, the adjective may be a demonstrative adjective. In another example, the adjective may be an interrogative adjective. In yet another example, the adjective may be a possessive adjective. In an additional example, the adjective may be a proper adjective. In yet another example, the adjective may be an exclamatory adjective. In one example, a particular machine learning model may be trained using training examples to select adjectives based on data associated with events. An example of such training example may include, for each event in a sample group of events, sample data associated with the event. The training example may further include a label indicating a sample selection of an adjective associated with the sample group of events. Step 608 may use the trained machine learning model to analyze the data received by Step 606 and associated with the group of one or more events of Step 604 to select the adjective. In some examples, the data associated with a specific event of the group of one or more events may include image data associated with the specific event, as described above, and Step 608 may base the selection of the adjective on an analysis of the image data. For example, Step 608 may base the selection of the adjective on pixel values of at least part of a depiction of the particular event in the image data. In one example, the data used by the particular machine learning model described above may be the image data. In one example, Step 608 may calculate a convolution of at least part of the image data and thereby obtain a result value of the calculated convolution of the at least part of the image data, and may base the selection of the adjective on the result value of the calculated convolution of the at least part of the image data. For example, in response to the result value of the calculated convolution of the at least part of the image data being a first value, Step 608 may select the adjective to be a first adjective, and in response to the result value of the calculated convolution of the at least part of the image data being a second value, Step 608 may select the adjective to be a second adjective. The second adjective may differ from the first adjective. In some examples, the data associated with a specific event of the group of one or more events may include audio data associated with the specific event, as described above, and Step 608 may base the selection of the adjective on an analysis of the audio data. For example, Step 608 may base the selection of the adjective on pitch and/or intensities of at least some of the samples in the audio data. In one example, the data used by the particular machine learning model described above may be the audio data. In one example, Step 608 may calculate a convolution of at least part of the audio data and thereby obtain a result value of the calculated convolution of the at least part of the audio data, and may base the selection of the adjective on the result value of the calculated convolution of the at least part of the audio data. For example, in response to the result value of the calculated convolution of the at least part of the audio data being a first value, Step 608 may select the adjective to be a first adjective, and in response to the result value of the calculated convolution of the at least part of the audio data being a second value, Step 608 may select the adjective to be a second adjective. The second adjective may differ from the first adjective. In some examples, Step 606 may analyze the data received by Step 606 and associated with the group of one or more events to determine a magnitude associated with the object of Step 602. For example, for each event in the group of one or more events, Step 606 may determine a magnitude associated with the event (for example as described above in relation to Step 454 and/or Step 474 and/or Step 494), and may calculate a function (such as mean, sum, non-linear function, linear function, etc.) of the magnitudes associated with the group of one or more events to thereby determine the magnitude associated with the object of Step 602. Further, Step 606 may use the determined magnitude associated with the object to select the adjective. For example, in response to the determined magnitude being a first magnitude, Step 606 may select a first adjective, and in response to the determined magnitude being a second magnitude, Step 606 may select a second adjective. The second adjective may differ from the first adjective. In some examples, the data received by Step 606 and associated with a specific event of the group of one or more events may include a specific magnitude, and Step 606 may use the specific magnitude to select the adjective. For example, the specific magnitude associated with specific event may be determined as described above in relation to Step 454 and/or Step 474 and/or Step 494. In one example, in response to the determined magnitude being a first magnitude, Step 606 may select a first adjective, and in response to the determined magnitude being a second magnitude, Step 606 may select a second adjective. The second adjective may differ from the first adjective. In some examples, for each event of the group of one or more events, Step 608 may determine a mathematical object in a mathematical space based on the received data associated with the event, for example as described above in relation to Step 456. Further, Step 608 may analyze the mathematical objects to select the adjective. For example, Step 608 may analyze the mathematical objects to determine a particular mathematical object in the mathematical space (for example, by calculating a mathematical function of the mathematical objects, such as mean, sum, convex hull, a linear function, a non-linear function, a polynomial function, an exponential function, and so forth). The particular mathematical object may differ from any mathematical object of the mathematical objects. In one example, Step 608 may use the particular mathematical object to select the adjective. For example, each mathematical object in the mathematical space may correspond to an adjective, and Step 608 may select the adjective corresponding to the particular mathematical object.

Additionally or alternatively, Step 608 may analyze the data associated with the group of one or more events to select an adverb. In some examples, Step 608 may comprise analyzing the data received by Step 606 and associated with a group of one or more events to select an adverb. In some examples, Step 608 may comprise analyzing the data received by Step 606 and associated with the group of one or more events of Step 604 to select an adverb. In one example, a machine learning model may be trained using training examples to select adverbs based on data associated with events. An example of such training example may include, for each event in a sample group of events, sample data associated with the event. The training example may further include a label indicating a sample selection of an adverb associated with the sample group of events. Step 608 may use the trained machine learning model to analyze the data received by Step 606 and associated with the group of one or more events of Step 604 to select the adverb. In some examples, the data associated with a specific event of the group of one or more events may include image data associated with the specific event, as described above, and Step 608 may base the selection of the adverb on an analysis of the image data. In some examples, the data associated with a specific event of the group of one or more events may include audio data associated with the specific event, as described above, and Step 608 may base the selection of the adverb on an analysis of the audio data.

In some examples, Step 610 may comprise generating a particular description of an object. The particular description may be based on a group of one or more events associated with the object. In one example, the particular description may include a selected adjective. Additionally or alternatively, the particular description may include a selected adverb. In some examples, Step 610 may comprise generating a particular description of the object of Step 602. The particular description may be based on the group of one or more events of Step 604. In one example, the particular description may include the adjective selected by Step 608. Additionally or alternatively, the particular description may include the adverb selected by Step 608. In some examples, Step 610 may insert the selected adjective to a sentence (for example, a template sentence, in a sample sentence, and so forth) in a location selected for an adjective (for example, a place for an adjective in the template sentence, replacing another adjective in the sample sentence, and so forth), to thereby generate the particular description of the object that includes the adjective. In some examples, Step 610 may use a generative model to generate the particular description of the object that includes the adjective, for example using the selected adjective as an input to the generative model. In some examples, Step 610 may insert the selected adverb to a sentence (for example, a template sentence, in a sample sentence, and so forth) in a location selected for an adverb (for example, a place for an adverb in the template sentence, replacing another adverb in the sample sentence, and so forth), to thereby generate the particular description of the object that includes the adverb. In some examples, Step 610 may use a generative model to generate the particular description of the object that includes the adverb, for example using the selected adverb as an input to the generative model. Additionally or alternatively, the group of one or more events of Step 604 may include at least a first event and a second event, and the particular description may include a description of the first event. In one example, the particular description may further include a description of the second event. In one example, the particular description may include no description of the second event. In one example, the description of the first event may be generated using Step 530 and/or as described above in relation to Step 456. In one example, Step 610 may insert the description of the first event to a sentence (for example, a template sentence, in a sample sentence, and so forth) in a location selected for a description of an event (for example, a place for a description of an event in the template sentence, replacing another description of an event in the sample sentence, and so forth), to thereby generate the particular description of the object that includes the description of the first event. In some examples, Step 610 may use a generative model to generate the particular description of the object that includes the description of the first event, for example using the description of the first event as an input to the generative model. In some examples, the group of one or more events of Step 604 may include at least two events, and the particular description may include no description of any particular event of the group of one or more events. In some examples, the group of one or more events of Step 604 may include at least two events, and the particular description may include a description of accumulative data associated with the group of one or more events. For example, each event of the group of one or more events of Step 604 may be associated with a number, for example as described above in relation to Step 526, and the accumulative data may be a function of the numbers associated with the events in the group of one or more events. Some non-limiting examples of such function may include sum, mean, median, a linear function, a non-linear function, a polynomial function, an exponential function, a logarithmic function, and so forth.

In some examples, Step 612 may comprise generating a textual content. The textual content may include a particular description. For example, the textual content may include the particular description generated by Step 610. In one example, the generated textual description may include the particular description generated by Step 610 and an additional description of at least one object different from the object of Step 602. In one example, the generated textual description may include the particular description generated by Step 610 and a description of an event. In one example, the generated textual description may include the particular description generated by Step 610 and a description of a scenery. In one example, Step 612 may insert the particular description generated by Step 610 to a template in a location selected for a description of an object, to thereby generate the textual content that includes the particular description of the object. In some examples, Step 610 may use a generative model to generate the textual content that includes the particular description of the object, for example using the particular description of the object as an input to the generative model. In some examples, Step 612 may further include in the textual content other details, such as a description of another object, a description of an event, a description of a scenery, a description of a location, a description related to time, a description of a cause or a reason, a description of a result, contextual information, a reference, and so forth.

In some examples, the object of Step 602 may be a sportsperson. Further, each event of the group of one or more events associated with the object of Step 604 may be associated with an action performed by the sportsperson. Further, each action may be associated with a number, and Step 608 may select the adjective based on the numbers. In some examples, the sportsperson may be a basketball player, an event may be a shot of a basketball to a hoop by the basketball player, the number associated with the action may be a number of points associated with the shot (for example, 0 points for a miss, 2 points for a successful shot from within the three-point line, and 3 points for a successful shot from behind the three-point line), and Step 608 may select the adjective based on the total number of points associated with the group of one or more shots. For example, when the total number of points is above a selected threshold, the adjective selected by Step 608 may be 'many', and the particular description generated by Step 610 may be 'Jane missed many shots in the first quarter'. In another example, when the total number of points is below a selected threshold, the adjective selected by Step 608 may be 'ineffective', and the particular description generated by Step 610 may be 'Michael was ineffective during the first quarter'. In some examples, the sportsperson may be a high jumper, an event may be an attempt of the high jumper for a jump of a bar specific height, each attempt may be either successful or failure, and Step 608 may select the adjective based on the highest specific height associated with a successful jump. For example, when the highest specific height associated with a successful jump is above a selected threshold, the adjective selected by Step 608 may be 'fortunate', and the particular description generated by Step 610 may be 'Jane was fortunate to break the Olympic record'. In another example, when the highest specific height associated with a successful jump is below a selected threshold, the adjective selected by Step 608 may be 'unsuccessful', and the particular description generated by Step 610 may be 'Michael was unsuccessful in his attempt to break his personal record'.

In some examples, the object of Step 602 may be a portion of a road. Further, each event of the group of one or more events associated with the object of Step 604 may be a vehicle using the road. Further, each usage of the road by a vehicle may be associated with a speed of the vehicle, and Step 608 may select the adjective based on the speeds. For example, when the maximum of the speeds is below a selected threshold, the adjective selected by Step 608 may be 'heavy', and the particular description generated by Step 610 may be 'The heavy traffic at the coastline road is moving slowly towards the city'. In another example, when the number of usages of the road (i.e., the number of events) is below a selected threshold, the adjective selected by Step 608 may be 'sparse', and the particular description generated by Step 610 may be 'The sparse traffic at the coastline road is moving towards the city'.

In some examples, the event of Step 652 may be a conversation. Further, each object of the group of one or more objects associated with the event of Step 654 may be a person participating in the conversation. Further, Step 658 may select the adjective based on the identities of the persons. For example, when one of the participant is a medical doctor and the other participant is a family member of a patient who just passed away, the adjective selected by Step 658 may be 'difficult', and the particular description generated by Step 660 may be 'The difficult conversation took place in the corridor.'

In some examples, the event of Step 652 may be a road collision. Further, each object of the group of one or more objects associated with the event of Step 654 may be a vehicle damaged in the road collision. Further, Step 658 may select the adjective based on the degrees of damages to the vehicles. For example, when the damage to the vehicles is massive, the adjective selected by Step 658 may be 'serious', and the particular description generated by Step 660 may be 'The serious accident caused a traffic jam'. In another example, when the damage to the vehicles is minor, the adjective selected by Step 658 may be 'minor', and the particular description generated by Step 660 may be 'The minor accident caused a traffic jam'.

In some examples, Step 626 may comprise analyzing modality data captured using a specific type of sensors (such as the first type of sensors of Step 542) to detect an object. In some examples, Step 626 may comprise analyzing the first modality data received by Step 542 to detect the object of Step 602. For example, a machine learning model may be trained using training examples to detect objects based on data captured using the specific type of sensors. An example of such training example may include sample data captured using the specific type of sensors, together with a label indicating a sample object associated with the sample data. Step 626 may use the trained machine learning model to analyze the first modality data received by Step 542 to detect the object of Step 602.

In some examples, Step 628 may comprise accessing synchronization data configured to enable synchronization of a first modality data and a second modality data. In some examples, Step 628 may comprise accessing synchronization data configured to enable synchronization of the first modality data received by Step 542 and the second modality data received by Step 544. In some examples, the synchronization data may include data configured to correlate different portions of the second modality data to different portions of the first modality data. In one example, the synchronization data may correlate the different portions of the first modality data and the different portions of the second modality data to a common timeline. In one example, accessing the synchronization data may comprise reading the synchronization data from memory, may comprise receiving the synchronization data from an external device (for example using a digital communication device), may comprise receiving the synchronization data from an individual (for example via a user interface), may comprise generating synchronization data (for example using synchronized clocks), and so forth.

In some examples, Step 630 may comprise using a synchronization data to identify at least one portion of a second modality data associated with an object detected based on an analysis of a first modality data. In some examples, Step 630 may comprise using the synchronization data accessed by Step 628 to identify at least one portion of the second modality data received by Step 544 associated with the object detect by Step 626 (for example, the object of Step 602). For example, Step 630 may use the synchronization data accessed by Step 628 to identify portions of the second modality data received by Step 544 that corresponds to portions of the first modality data received by Step 542 that are associated with the object detect by Step 626. For example, the first modality data may be image data and the portions of the first modality data associated with the object may include portions of the first modality data depicting the object. The portions of the first modality data depicting the object may be identified by analyzing the first modality data, for example using a visual object detection algorithm. In another example, the first modality data may be audio data and the portions of the first modality data associated with the object may include portions of the first modality data including sounds and/or vocalizations produced by and/or typical to the object. These portions of the first modality data may be identified by analyzing the first modality data, for example using a recognition algorithm.

In some examples, Step 632 may comprise analyzing at least part of modality data captured using a particular type of sensors (such as the second type of sensors of Step 544) to detect the events of a group of one or more events in at least one portion of the modality data associated with an object (such as the object of Step 602). In some examples, Step 632 may comprise analyzing at least part of the second modality data received by Step 544 to detect the events of the group of one or more events of Step 604 in the at least one portion of the second modality data identified by Step 630 and associated with the object of Step 602. For example, a machine learning model may be trained using training examples to detect events associated with specific objects based on data captured using the particular type of sensors. An example of such training example may include portions of sample data captured using the particular type of sensors and an indication of a sample object, together with a label indicating sample events associated with the sample object. Step 632 may use the trained machine learning model to analyze the at least one portion of the second modality data identified by Step 630 to detect the events of the group of one or more events of Step 604. In another example, the second modality data may be image data, and Step 632 may analyze the at least one portion of the image data identified by Step 630 using a visual event detection algorithm to detect the events of the group of one or more events of Step 604. In another example, the second modality data may be audio data, and Step 632 may analyze the at least one portion of the audio data identified by Step 630 using an audio classification algorithm to detect sounds and/or vocalizations typical to events and thereby detect the events of the group of one or more events of Step 604.

In some examples, Step 652 may comprise receiving an indication of an event. For example, receiving the indication of the event may comprise reading the indication from memory, may comprise receiving the indication from an external device (for example using a digital communication device), may comprise receiving the indication from an individual (for example via a user interface), may comprise identifying the event, and so forth. In one example, Step 652 may use method 670 to identify the event. In one example, Step 652 may analyze data to identify the event, may analyze image data (for example, using a visual event detection algorithm) to identify the event, may analyze audio data to identify the event (for example, by identifying sounds or vocalizations generated by the event and/or typical to the event), and so forth. For example, a machine learning model may be trained using training examples to identify events based on data. An example of such training example may include sample data, together with a label indicating a sample event associated with the sample data. Step 652 may use the trained machine learning model to analyze data and identify the event.

In some examples, Step 654 may comprise receiving an indication of a group of one or more objects associated with an event. In some examples, Step 654 may comprise receiving an indication of a group of one or more objects associated with the event of Step 652. For example, the group of one or more objects may include exactly one object, may include exactly two objects, may include exactly three objects, may include between four and ten objects, may include more than ten objects, and so forth. In some examples, receiving the indication of the group of one or more objects may comprise reading the indication from memory, may comprise receiving the indication from an external device (for example using a digital communication device), may comprise receiving the indication from an individual (for example via a user interface), may comprise identifying the group of one or more objects, and so forth. In one example, Step 654 may use method 670 to identify the group of one or more objects. In one example, Step 654 may analyze data to identify the group of one or more objects. For example, a machine learning model may be trained using training examples to identify objects associated with events from data. An example of such training example may include sample data and an indication of a sample event, together with a label indicating one or more sample objects associated with the sample event. In one example, Step 654 may analyze image data to identify the group of one or more objects, for example using visual object detection algorithm to analyze the image data and identify candidate objects, and using a visual classification algorithm to select the objects associated with the event of Step 652 of the candidate objects. In one example, Step 654 may analyze audio data to identify the group of one or more objects, for example by analyzing the audio data to identify sounds and vocalizations produced by and/or typical to objects associated with the event of Step 652. For example, the event may be a conversation, an object may be a person taking part in the conversation, and the audio data may be analyzed using a speaker recognition algorithm to identify the people taking part in the conversation.

In some examples, Step 656 may comprise, for each object of a group of one or more objects, receiving data associated with the object. In some examples, Step 656 may comprise, for each object of the group of one or more objects of Step 654, receiving data associated with the object. In some examples, the data associated with a specific object of the group of one or more objects may include digital data associated with the specific object, such as digital data encoding information associated with the object. In some examples, the data associated with a specific object of the group of one or more objects may include image data associated with the specific object. For example, the image data may include a depiction of the object. In another example, Step 656 may receive a video, and for each object of the group of one or more objects, the data associated with the object may include at least one portion of the video (for example, at least one portion of the video depicting the object). For example, the video may be read from memory, may be received from an external device (for example, using a digital communication device), may be captured using at least one image sensor, and so forth. In some examples, the data associated with a specific object of the group of one or more objects may include audio data associated with the specific object. For example, the audio data may include sounds and/or vocalizations generated by the object. In another example, Step 656 may receive an audio stream, and for each object of the group of one or more objects, the data associated with the object may include at least one portion of the audio stream. For example, the audio stream may be read from memory, may be received from an external device (for example, using a digital communication device), may be captured using at least one audio sensor, may be generated from an audio file, and so forth.

In some examples, Step 658 may comprise analyzing data associated with a group of one or more objects to select an adjective. In one example, the data associated with a group of one or more objects does not include the adjective selected by Step 658. In some examples, Step 658 may comprise analyzing the data received by Step 656 and associated with a group of one or more objects to select an adjective. In some examples, Step 658 may comprise analyzing the data received by Step 656 and associated with the group of one or more objects of Step 654 to select an adjective. In one example, the adjective may be a descriptive adjective. In another example, the adjective may be a numeral adjective. In yet another example, the adjective may be a quantitative adjective. In an additional example, the adjective may be a demonstrative adjective. In another example, the adjective may be an interrogative adjective. In yet another example, the adjective may be a possessive adjective. In an additional example, the adjective may be a proper adjective. In yet another example, the adjective may be an exclamatory adjective. In one example, a particular machine learning model may be trained using training examples to select adjectives based on data associated with objects. An example of such training example may include, for each object in a sample group of objects, sample data associated with the object. The training example may further include a label indicating a sample selection of an adjective associated with the sample group of objects. Step 658 may use the trained machine learning model to analyze the data received by Step 656 and associated with the group of one or more objects of Step 654 to select the adjective. In some examples, the data associated with a specific object of the group of one or more objects may include image data associated with the specific object, as described above, and Step 658 may base the selection of the adjective on an analysis of the image data. For example, Step 658 may base the selection of the adjective on pixel values of at least part of a depiction of the particular object in the image data. In one example, the data used by the particular machine learning model may be the image data. In one example, Step 658 may calculate a convolution of at least part of the image data and thereby obtain a result value of the calculated convolution of the at least part of the image data, and may base the selection of the adjective on the result value of the calculated convolution of the at least part of the image data. For example, in response to the result value of the calculated convolution of the at least part of the image data being a first value, Step 658 may select the adjective to be a first adjective, and in response to the result value of the calculated convolution of the at least part of the image data being a second value, Step 658 may select the adjective to be a second adjective. The second adjective may differ from the first adjective. In some examples, the data associated with a specific object of the group of one or more objects may include audio data associated with the specific object, as described above, and Step 658 may base the selection of the adjective on an analysis of the audio data. For example, Step 658 may base the selection of the adjective on pitch and/or intensities of at least some of the samples in the audio data. In one example, the data used by the particular machine learning model may be the audio data. In one example, Step 658 may calculate a convolution of at least part of the audio data and thereby obtain a result value of the calculated convolution of the at least part of the audio data, and may base the selection of the adjective on the result value of the calculated convolution of the at least part of the audio data. For example, in response to the result value of the calculated convolution of the at least part of the audio data being a first value, Step 658 may select the adjective to be a first adjective, and in response to the result value of the calculated convolution of the at least part of the audio data being a second value, Step 658 may select the adjective to be a second adjective. The second adjective may differ from the first adjective. In some examples, Step 656 may analyze the data received by Step 656 and associated with the group of one or more objects to determine a magnitude associated with the event of Step 652. For example, for each object in the group of one or more objects, Step 656 may determine a magnitude associated with the object (for example as described above in relation to Step 404 and/or Step 424 and/or Step 444), and may calculate a function (such as mean, sum, non-linear function, linear function, etc.) of the magnitudes associated with the group of one or more objects to thereby determine the magnitude associated with the event of Step 652. Further, Step 656 may use the determined magnitude associated with the event to select the adjective. For example, in response to the determined magnitude being a first magnitude, Step 656 may select a first adjective, and in response to the determined magnitude being a second magnitude, Step 656 may select a second adjective. The second adjective may differ from the first adjective. In some examples, the data received by Step 656 and associated with a specific object of the group of one or more objects may include a specific magnitude, and Step 656 may use the specific magnitude to select the adjective. For example, the specific magnitude associated with specific object may be determined as described above in relation to Step 404 and/or Step 424 and/or Step 444. In one example, in response to the determined magnitude being a first magnitude, Step 656 may select a first adjective, and in response to the determined magnitude being a second magnitude, Step 656 may select a second adjective. The second adjective may differ from the first adjective. In some examples, for each object of the group of one or more objects, Step 658 may determine a mathematical object in a mathematical space based on the received data associated with the object, for example as described above in relation to Step 406. Further, Step 658 may analyze the mathematical objects to select the adjective. For example, Step 658 may analyze the mathematical objects to determine a particular mathematical object in the mathematical space (for example, by calculating a mathematical function of the mathematical objects, such as mean, sum, convex hull, a linear function, a non-linear function, a polynomial function, an exponential function, and so forth). The particular mathematical object may differ from any mathematical object of the mathematical objects. In one example, Step 658 may use the particular mathematical object to select the adjective. For example, each mathematical object in the mathematical space may correspond to an adjective, and Step 658 may select the adjective corresponding to the particular mathematical object.

Additionally or alternatively, Step 658 may analyze the data associated with the group of one or more objects to select an adverb. In some examples, Step 658 may comprise analyzing the data received by Step 656 and associated with a group of one or more objects to select an adverb. In some examples, Step 658 may comprise analyzing the data received by Step 656 and associated with the group of one or more objects of Step 654 to select an adverb. In one example, a machine learning model may be trained using training examples to select adverbs based on data associated with objects. An example of such training example may include, for each sample object in a sample group of objects, sample data associated with the object. The training example may further include a label indicating a sample selection of an adverb associated with the sample group of objects. Step 658 may use the trained machine learning model to analyze the data received by Step 656 and associated with the group of one or more objects of Step 654 to select the adverb. In some examples, the data associated with a specific object of the group of one or more objects may include image data associated with the specific object, as described above, and Step 658 may base the selection of the adverb on an analysis of the image data. In some examples, the data associated with a specific object of the group of one or more objects may include audio data associated with the specific object, as described above, and Step 658 may base the selection of the adverb on an analysis of the audio data.

In some examples, Step 660 may comprise generating a particular description of an event. The particular description may be based on a group of one or more objects associated with the event. In one example, the particular description may include a selected adjective. Additionally or alternatively, the particular description may include a selected adverb. In some examples, Step 660 may comprise generating a particular description of the event of Step 652. The particular description may be based on the group of one or more objects of Step 654. In one example, the particular description may include the adjective selected by Step 658. Additionally or alternatively, the particular description may include the adverb selected by Step 658. In some examples, Step 660 may insert the selected adjective to a sentence (for example, a template sentence, in a sample sentence, and so forth) in a location selected for an adjective (for example, a place for an adjective in the template sentence, replacing another adjective in the sample sentence, and so forth), to thereby generate the particular description of the event that includes the adjective. In some examples, Step 660 may use a generative model to generate the particular description of the event that includes the adjective, for example using the selected adjective as an input to the generative model. In some examples, Step 660 may insert the selected adverb to a sentence (for example, a template sentence, in a sample sentence, and so forth) in a location selected for an adverb (for example, a place for an adverb in the template sentence, replacing another adverb in the sample sentence, and so forth), to thereby generate the particular description of the event that includes the adverb. In some examples, Step 660 may use a generative model to generate the particular description of the event that includes the adverb, for example using the selected adverb as an input to the generative model. Additionally or alternatively, the group of one or more objects of Step 654 may include at least a first object and a second object, and the particular description may include a description of the first object. In one example, the particular description may further include a description of the second object. In one example, the particular description may include no description of the second object. In one example, the description of the first object may be generated using Step 510 and/or as described above in relation to Step 406. In one example, Step 660 may insert the description of the first object to a sentence (for example, a template sentence, in a sample sentence, and so forth) in a location selected for a description of an object (for example, a place for a description of an object in the template sentence, replacing another description of an object in the sample sentence, and so forth), to thereby generate the particular description of the event that includes the description of the first object. In some examples, Step 660 may use a generative model to generate the particular description of the event that includes the description of the first object, for example using the description of the first object as an input to the generative model. In some examples, the group of one or more objects of Step 654 may include at least two objects, and the particular description may include no description of any particular object of the group of one or more objects. In some examples, the group of one or more objects of Step 654 may include at least two objects, and the particular description may include a description of accumulative data associated with the group of one or more objects. For example, each object of the group of one or more objects of Step 654 may be associated with a number, for example as described above in relation to Step 506, and the accumulative data may be a function of the numbers associated with the objects in the group of one or more objects. Some non-limiting examples of such function may include sum, mean, median, a linear function, a non-linear function, a polynomial function, an exponential function, a logarithmic function, and so forth.

In some examples, Step 662 may comprise generating a textual content. The textual content may include a particular description. For example, the textual content may include the particular description generated by Step 660. In one example, the generated textual description may include the particular description generated by Step 660 and an additional description of at least one event different from the event of Step 652. In one example, the generated textual description may include the particular description generated by Step 660 and a description of an object. In one example, the generated textual description may include the particular description generated by Step 660 and a description of a scenery. In one example, Step 662 may insert the particular description generated by Step 660 to a template in a location selected for a description of an event, to thereby generate the textual content that includes the particular description of the event. In some examples, Step 660 may use a generative model to generate the textual content that includes the particular description of the event, for example using the particular description of the event as an input to the generative model. In some examples, Step 662 may further include in the textual content other details, such as a description of an object, a description of another event, a description of a scenery, a description of a location, a description related to time, a description of a cause or a reason, a description of a result, contextual information, a reference, and so forth.

In some examples, Step 676 may comprise analyzing modality data captured using a specific type of sensors (such as the first type of sensors of Step 542) to detect an event. In some examples, Step 676 may comprise analyzing the first modality data received by Step 542 to detect the event of Step 652. For example, a machine learning model may be trained using training examples to detect events based on data captured using the specific type of sensors. An example of such training example may include sample data captured using the specific type of sensors, together with a label indicating a sample event associated with the sample data. Step 676 may use the trained machine learning model to analyze the first modality data received by Step 542 to detect the event of Step 652.

In some examples, Step 680 may comprise using a synchronization data to identify at least one portion of a second modality data associated with an event detected based on an analysis of a first modality data. In some examples, Step 680 may comprise using the synchronization data accessed by Step 628 to identify at least one portion of the second modality data received by Step 544 associated with the event detect by Step 676 (for example, the event of Step 652). For example, Step 680 may use the synchronization data accessed by Step 628 to identify portions of the second modality data received by Step 544 that corresponds to portions of the first modality data received by Step 542 that are associated with the event detect by Step 676. For example, the first modality data may be image data and the portions of the first modality data associated with the event may include portions of the first modality data depicting the event. The portions of the first modality data depicting the event may be identified by analyzing the first modality data, for example using a visual event detection algorithm. In another example, the first modality data may be audio data and the portions of the first modality data associated with the event may include portions of the first modality data including sounds and/or vocalizations produced by and/or typical to the event. These portions of the first modality data may be identified by analyzing the first modality data, for example using a recognition algorithm.

In some examples, Step 682 may comprise analyzing at least part of modality data captured using a particular type of sensors (such as the second type of sensors of Step 544) to detect the objects of a group of one or more objects in at least one portion of the modality data associated with an event (such as the event of Step 652). In some examples, Step 682 may comprise analyzing at least part of the second modality data received by Step 544 to detect the objects of the group of one or more objects of Step 654 in the at least one portion of the second modality data identified by Step 680 and associated with the event of Step 652. For example, a machine learning model may be trained using training examples to detect objects associated with specific events based on data captured using the particular type of sensors. An example of such training example may include portions of sample data captured using the particular type of sensors and an indication of a sample event, together with a label indicating sample objects associated with the sample event. Step 682 may use the trained machine learning model to analyze the at least one portion of the second modality data identified by Step 680 to detect the objects of the group of one or more objects of Step 654. In another example, the second modality data may be image data, and Step 682 may analyze the at least one portion of the image data identified by Step 680 using a visual object detection algorithm to detect the objects of the group of one or more objects of Step 654. In another example, the second modality data may be audio data, and Step 682 may analyze the at least one portion of the audio data identified by Step 680 using an audio classification algorithm to detect sounds and/or vocalizations typical to objects and thereby detect the objects of the group of one or more objects of Step 654.

In some examples, the textual content generated by Step 612 and/or Step 662 may be associated with a writer persona, such as writer persona 142. For example, an indication of the writer persona may be may be obtained, for example as described above. Further, the selection of the adjective by Step 608 and/or by Step 658 may be based on the writer persona. For example, historic textual contents associated with the writer persona may indicate an affinity of the writer persona to specific adjectives, and Step 608 may analyze the data associated with the group of one or more events to select the adjective of the specific adjectives. In another example, historic textual contents associated with the writer persona may indicate an affinity of the writer persona to specific adjectives, and Step 658 may analyze the data associated with the group of one or more objects to select the adjective of the specific adjectives. Further, Step 610 and/or Step 660 may generate the particular description in a style associated with the writer persona. For example, Step 610 and/or Step 660 may use information related to the writer persona (such as a style, a language register or a word commonly used by the writer persona) as input to the generative model to generate the particular description in the style associated with the writer persona.

In some examples, the textual content generated by Step 612 and/or Step 662 may be associated with a prospective audience, such as prospective audience 144. For example, an indication of the prospective audience may be may be obtained, for example as described above. Further, the selection of the adjective by Step 608 and/or by Step 658 may be based on the prospective audience. For example, historic textual contents associated with the prospective audience (such as historic textual contents consumed by the prospective audience, historic textual contents liked by the prospective audience, and so forth) may indicate an affinity of the prospective audience to specific adjectives, and Step 608 may analyze the data associated with the group of one or more events to select the adjective of the specific adjectives. In another example, historic textual contents associated with the prospective audience may indicate an affinity of the prospective audience to specific adjectives, and Step 658 may analyze the data associated with the group of one or more objects to select the adjective of the specific adjectives. Further, Step 610 and/or Step 660 may generate the particular description in a style associated with the prospective audience. For example, Step 610 and/or Step 660 may use information related to the prospective audience (such as a style, a language register or a word commonly used by the prospective audience) as input to the generative model to generate the particular description in the style associated with the prospective audience.

In some examples, the textual content generated by Step 612 and/or Step 662 may be associated with a topic, such as topic 152. For example, an indication of the topic may be may be obtained, for example as described above. Further, the selection of the adjective by Step 608 and/or by Step 658 may be based on the topic. In one example, Step 608 may select two or more synonyms based on the data associated with the group of one or more events, and may select the adjective of the two or more synonyms based on the topic. In one example, Step 668 may select two or more synonyms based on the data associated with the group of one or more objects, and may select the adjective of the two or more synonyms based on the topic. In one example, the topic may be associated with a specific language register (as described above in relation to topic 152), and the synonym most compatible with the specific language register may be selected. In another example, the synonym that was most commonly used in historic contents associated with the topic may be selected.

FIG. 7A is a flowchart of an exemplary method 700 for generating a textual content selectively reporting objects based on events. In this example, method 700 may comprise receiving an indication of a plurality of objects (Step 702), the plurality of objects may include at least a first object and a second object; receiving an indication of a first group of one or more events associated with the first object (Step 704); receiving an indication of a second group of one or more events associated with the second object (Step 706); based on the first group of one or more events, determining to include in a textual content a description based on the first group of one or more events of the first object (Step 708); based on the second group of one or more events, determining not to include in the textual content any description based on the second group of one or more events of the second object (Step 710); for each event of the first group of one or more events, receiving data associated with the event (Step 712); analyzing the data associated with the first group of one or more events to generate a particular description of the first object (Step 714), the particular description of the first object may be based on the first group of one or more events; generating the textual content (Step 716), the textual content may include the particular description of the first object and may include no description based on the second group of one or more events of the second object; and providing the generated textual content (Step 410). In other examples, method 700 may include additional steps or fewer steps. In other examples, one or more steps of method 700 may be executed in a different order and/or one or more groups of steps may be executed simultaneously.

In some examples, systems, methods and non-transitory computer readable media for selecting and reporting objects based on events are provided. In some examples, systems, methods and non-transitory computer readable media for generating a textual content selectively reporting objects are provided. In one example, Step 702 may receive a video of a basketball game, and may analyze the video to detect a plurality of basketball players (i.e., objects) including a first basketball player (i.e., the first object) and a second basketball player (i.e., the second object). Further, Step 704 may analyze the video to detect shots of a basketball to a hoop (i.e., events) by the first basketball player, and to determine based on the detected shots of the first basketball player that the first basketball player scored 32 points. Further, Step 706 may analyze the video to detect shots of a basketball to a hoop (i.e., events) by the second basketball player, and to determine based on the detected shots of the second basketball player that the second basketball player scored 4 points. Based on the determination that the first basketball player scored 32 points, Step 708 may determine to include in a textual content a description based on the shots of the first basketball player. Based on the determination that the second basketball player scored 4 points, Step 710 may determine not to include in the textual content any description based on the shots of the second basketball player. As described above, Step 712 and Step 714 may analyze the video to determine based on the detected shots of the first basketball player that the first basketball player scored 32 points, and to generate a description of the first basketball player based on the shots, such as 'Alice scored 32 points'. Further, Step 716 may generate a textual content that includes the description, such as 'Although Alice scored 32 points, the game was lost.' Step 410 may include this textual content in an article.

FIG. 7B is a flowchart of an exemplary method 720 for detecting objects and events associated with the objects. In this example, method 720 may comprise receiving first modality data captured from an environment using at least one sensor of a first type of sensors (Step 542); receiving second modality data captured from the environment using at least one sensor of a second type of sensors (Step 544), the second type of sensors may differ from the first type of sensors; analyzing the first modality data to detect the plurality of objects (Step 722); accessing synchronization data configured to enable synchronization of the first modality data and the second modality data (Step 628); using the synchronization data to identify a first at least one portion of the second modality data associated with the first object and to identify a second at least one portion of the second modality data associated with the second object (Step 724); Analyzing the first at least one portion of the second modality data to detect events of the first group of one or more events (Step 726); and analyzing the second at least one portion of the second modality data to detect events of the second group of one or more events (Step 728). In other examples, method 720 may include additional steps or fewer steps. In other examples, one or more steps of method 720 may be executed in a different order and/or one or more groups of steps may be executed simultaneously. In some examples, the synchronization data may include data configured to correlate different portions of the second modality data to different portions of the first modality data. In one example, the synchronization data may correlate the different portions of the first modality data and the different portions of the second modality data to a common timeline. In some examples, the at least one sensor of the first type of sensors may be at least one image sensor, the first modality data may be image data, the at least one sensor of the second type of sensors may be at least one audio sensor, and the second modality data may be audio data. In some examples, the at least one sensor of the first type of sensors may be at least one audio sensor, the first modality data may be audio data, the at least one sensor of the second type of sensors may be at least one image sensor, and the second modality data may be image data.

FIG. 7C is a flowchart of an exemplary method 730 for selecting objects based on events associated with the objects. In this example, method 730 may comprise determining a first magnitude associated with the first group of one or more events (Step 732); based on the first magnitude, determining to include in the textual content the description based on the first group of one or more events of the first object (Step 734); determining a second magnitude associated with the second group of one or more events (Step 736); and based on the second magnitude, determining not to include in the textual content any description based on the second group of one or more events of the second object (Step 738). In other examples, method 730 may include additional steps or fewer steps. In other examples, one or more steps of method 730 may be executed in a different order and/or one or more groups of steps may be executed simultaneously.

FIG. 7D is a flowchart of an exemplary method 740 for selecting objects based on events associated with the objects. In this example, method 740 may comprise for each event of the first group of one or more events and for each event of the second group of one or more events, determining a mathematical object corresponding to the event in a mathematical space (Step 742); basing the determination to include in the textual content the description based on the first group of one or more events of the first object on the mathematical objects corresponding to the first group of one or more events (Step 744); and basing the determination not to include in the textual content any description based on the second group of one or more events of the second object on the mathematical objects corresponding to the second group of one or more events (Step 746). In other examples, method 740 may include additional steps or fewer steps. In other examples, one or more steps of method 740 may be executed in a different order and/or one or more groups of steps may be executed simultaneously.

FIG. 7E is a flowchart of an exemplary method 750 for adding descriptions of additional objects to a generated textual content. In this example, the plurality of objects of Step 702 may include at least two additional objects in addition to the first and second objects. Further, method 750 may comprise selecting a subset of at least one but not all of a group of at least two additional object (Step 752); for each object in the subset, generating a description of the object (Step 754); and including the generated descriptions of all objects in the subset in the generated textual content (Step 756). In other examples, method 750 may include additional steps or fewer steps. In other examples, one or more steps of method 750 may be executed in a different order and/or one or more groups of steps may be executed simultaneously.

FIG. 7F is a flowchart of an exemplary method 760 for selecting objects based on events associated with the objects. In this example, method 760 may comprise analyzing the mathematical objects corresponding to the first group of one or more events to determine a first mathematical object in the mathematical space (Step 762), the first mathematical object may differ from any mathematical object of the mathematical objects corresponding to the first group of one or more events; analyzing the mathematical objects corresponding to the second group of one or more events to determine a second mathematical object in the mathematical space (Step 764), the second mathematical object may differ from any mathematical object of the mathematical objects corresponding to the second group of one or more events; basing the determination to include in the textual content the description based on the first group of one or more events of the first object on the first mathematical object (Step 766);

and basing the determination not to include in the textual content any description based on the second group of one or more events of the second object on the second mathematical object (Step 768). In other examples, method 760 may include additional steps or fewer steps. In other examples, one or more steps of method 760 may be executed in a different order and/or one or more groups of steps may be executed simultaneously.

In some examples, Step 702 may comprise receiving an indication of a plurality of objects. The plurality of objects may include at least a first object and a second object. For example, receiving the indication of the plurality of objects may comprise reading the indication from memory, may comprise receiving the indication from an external device (for example using a digital communication device), may comprise receiving the indication from an individual (for example via a user interface), may comprise identifying the plurality of objects, and so forth. In one example, Step 702 may analyze data to identify the plurality of objects, for example using Step 404 analyzing data received by Step 402. In one example, Step 702 may analyze image data to identify the plurality of objects, for example using Step 424 analyzing image data received by Step 422. In one example, Step 702 may analyze audio data to identify the plurality of objects, for example using Step 444 analyzing audio data received by Step 442. In some examples, Step 702 may detect the plurality of objects using method 720.

In some examples, an indication of a group of one or more events associated with an object may be received. In one example, Step 704 may comprise receiving an indication of a first group of one or more events associated with the first object of Step 702. In one example, Step 706 may comprise receiving an indication of a second group of one or more events associated with the second object of Step 702. In one example, the second group of one or more events may include at least one event not included in the first group of one or more events. In one example, the first group of one or more events may include at least one event not included in the second group of one or more events. In one example, the first group of one or more events of Step 704 and the second group of one or more events of Step 706 may have at least one event in common. In one example, the first group of one or more events of Step 704 and the second group of one or more events of Step 706 may have no event in common. In some examples, receiving an indication of a group of one or more events associated with an object may comprise reading the indication from memory, may comprise receiving the indication from an external device (for example using a digital communication device), may comprise receiving the indication from an individual (for example via a user interface), may comprise identifying the group of one or more events (for example, as described above in relation to Step 604), and so forth. In some examples, Step 704 may identify the first group of one or more events associated with the first object of Step 702 using method 720. In some examples, Step 706 may identify the second group of one or more events associated with the second object of Step 702 using method 720.

In some examples, Step 708 may comprise, based on the first group of one or more events of Step 704, determining to include a description based on the first group of one or more events of the first object of Step 702 in a textual content. In some examples, Step 710 may comprise, based on the second group of one or more events of Step 706, determining not to include in the textual content any description based on the second group of one or more events of the second object of Step 702. For example, a machine learning model may be trained using training examples to determine whether to include descriptions of objects in textual contents based on events associated with the objects and/or the descriptions. An example of such training example may include data associated with sample events associated with a sample object, together with a label indicating whether to include a sample description of the sample object in a textual content. Another example of such training example may include data associated with sample events associated with a sample object and a sample description of the sample object, together with a label indicating whether to include the sample description of the sample object in a textual content. In some examples, Step 708 may use the trained machine learning model to analyze data associated with the first group of one or more events of Step 704 and determine to include in the textual content the description based on the first group of one or more events of the first object of Step 702. In some examples, Step 710 may use the trained machine learning model to analyze the second group of one or more events of Step 706 and determine not to include in the textual content any description based on the second group of one or more events of the second object of Step 702. In some examples, Step 708 may comprise, based on the first group of one or more events of Step 704 and on the second group of one or more events of Step 706, determining to include the description based on the first group of one or more events of the first object of Step 702 in a textual content. In some examples, Step 710 may comprise, based on the first group of one or more events of Step 704 and the second group of one or more events of Step 706, determining not to include in the textual content any description based on the second group of one or more events of the second object of Step 702. For example, a machine learning model may be trained using training examples to determine whether to include descriptions of objects in textual contents based on events and/or the descriptions. An example of such training example may include data associated with sample events associated with a sample object and data associated with other sample events, together with a label indicating whether to include a sample description of the sample object in a textual content. Another example of such training example may include data associated with sample events associated with a sample object, data associated with other sample events and a sample description of the sample object, together with a label indicating whether to include the sample description of the sample object in a textual content. In some examples, Step 708 may use the trained machine learning model to analyze the first group of one or more events of Step 704 and on the second group of one or more events of Step 706, and determine to include the description based on the first group of one or more events of the first object of Step 702 in a textual content. In some examples, Step 710 may use the trained machine learning model to analyze the first group of one or more events of Step 704 and the second group of one or more events of Step 706, and determine not to include in the textual content any description based on the second group of one or more events of the second object of Step 702. In some examples, the plurality of objects of Step 702 may further include a third object, and the third object may be associated with a third group of one or more events. The third group of one or more events may include at least one event not included in the first group of Step 704 and not included in the second group of Step 706. Further, Step 708 may further base the determination of to include in the textual content the description based on the first group of one or more events of the first object on the third group of one or more events, for example using the trained machine learning model. Further, Step 710 may further base the determination not to include in the textual content any description based on the second group of one or more events of the second object is on the third group of one or more events, for example using the trained machine learning model. In some examples, Step 708 may further base the determination to include in the textual content the description based on the first group of one or more events of the first object on a type of the first object and a type of the second object, and/or Step 710 may further base the determination not to include in the textual content any description based on the second group of one or more events of the second object on the type of the first object and the type of the second object. In some examples, Step 708 may further base the determination to include in the textual content the description based on the first group of one or more events of the first object on a type associated with a specific event of the first group of one or more events, and/or Step 710 may further base the determination not to include in the textual content any description based on the second group of one or more events of the second object on a type associated with a specific event of the second group of one or more events.

In some examples, the textual content may be associated with a writer persona. For example, an indication of the writer persona may be received as described above in relation to writer persona 142. Further, Step 708 may further base the determination to include in the textual content the description based on the first group of one or more events of the first object on the writer persona, and/or Step 710 may base the determination not to include in the textual content any description based on the second group of one or more events of the second object on the writer persona. For example, historic textual contents associated with the writer persona may indicate an affinity of the writer persona to specific type of events, the first group of one or more events includes events that has higher affinity to the writer persona than the events of the second group of one or more events. In some examples, the textual content may be associated with a prospective audience. For example, an indication of the prospective audience may be received as described above in relation to prospective audience 144. Further, Step 708 may further base the determination to include in the textual content the description based on the first group of one or more events of the first object on the prospective audience, and/or Step 710 may further base the determination not to include in the textual content any description based on the second group of one or more events of the second object on the prospective audience. For example, historic textual contents associated with the prospective audience (for example, consumer and/or liked by the prospective audience) may indicate an affinity of the prospective audience to specific type of events, the first group of one or more events includes events that has higher affinity to the prospective audience than the events of the second group of one or more events. In some examples, the textual content may be associated with a topic. For example, an indication of the topic may be received as described above in relation to topic 152. Further, Step 708 may further base the determination to include in the textual content the description based on the first group of one or more events of the first object on a degree of relevance of the first object to the topic, and Step 710 may further base the determination not to include in the textual content any description based on the second group of one or more events of the second object on a degree of relevance of the second object to the topic. For example, the first group of one or more events may include events that has higher affinity to the topic than the events of the second group of one or more events.

In some examples, Step 712 may comprise, for each event of the first group of one or more events of Step 704, receiving data associated with the event. For example, receiving the data associated with the event may comprise reading the data from memory, may comprise receiving the data from an external device (for example using a digital communication device), may comprise receiving the data from an individual (for example via a user interface), may comprise capturing the data using at least one sensor, may comprise generating the data, and so forth. For example, the data associated with the event may be or include image data associated with the event (such as image data depicting the event). In one example, capturing the image data may include capturing the image data using at least one image sensor. In another example, the data associated with the event may be or include audio data associated with the event (such as audio data including sounds and/or vocalizations produced by and/or typical to the event). In one example, capturing the audio data may include capturing the image data using at least one audio sensor.

In some examples, Step 714 may comprise analyzing the data associated with the first group of one or more events to generate a particular description of the first object, for example as described above in relation to Step 608 and/or Step 610. The particular description of the first object may be based on the first group of one or more events. In some examples, Step 716 may comprise generating the textual content. The textual content may include the particular description of the first object, for example as described above in relation to Step 608 and/or Step 610. In one example, the textual content may include no description based on the second group of one or more events of the second object. In one example, the textual content does not include any description of the second object. In some examples, Step 716 may further include in the textual content other details, such as a description of another object, a description of an event, a description of a scenery, a description of a location, a description related to time, a description of a cause or a reason, a description of a result, contextual information, a reference, and so forth.

In some examples, Step 722 may comprise analyzing modality data captured using a specific type of sensors (such as the first type of sensors of Step 542) to detect a plurality of objects. In some examples, Step 722 may comprise analyzing the first modality data received by Step 542 to detect the plurality of objects of Step 702, including the first object and the second object. For example, a machine learning model may be trained using training examples to detect objects based on data captured using the specific type of sensors. An example of such training example may include sample data captured using the specific type of sensors, together with a label indicating a sample plurality of objects associated with the sample data. Step 722 may use the trained machine learning model to analyze the first modality data received by Step 542 to detect the plurality of objects of Step 702. In one example, the first type of sensors of Step 542 may be image sensors, the first modality data may be image data, and Step 722 may use a visual object detection algorithm to analyze the image data and detect the plurality of objects of Step 702. In one example, the first type of sensors of Step 542 may be audio sensors, the first modality data may be audio data, and Step 722 may use audio classification algorithm to analyze the audio data and detect sounds and/or vocalizations produced by and/or typical to objects, thereby detecting the plurality of objects of Step 702.

In some examples, Step 724 may comprise using the synchronization data accessed by Step 628 to identify a first at least one portion of the second modality data associated with the first object of Step 702 and to identify a second at least one portion of the second modality data associated with the second object of Step 702. For example, Step 724 may use Step 630 to use the synchronization data accessed by Step 628 to identify the first at least one portion of the second modality data associated with the first object of Step 702 and to identify the second at least one portion of the second modality data associated with the second object of Step 702.

In some examples, at least one portion of modality data captured using a particular type of sensors (such as the second type of sensors of Step 544) to detect events associated with an object, for examples as described above in relation to Step 632. In some examples, Step 726 may comprise analyzing the first at least one portion of the second modality data identified by Step 724 to detect events of the first group of one or more events of Step 704. In some examples, Step 728 may comprise analyzing the second at least one portion of the second modality data by Step 724 to detect events of the second group of one or more events of Step 706.

In some examples, Step 732 and/or Step 736 may comprise determining a magnitude associated with a group of one or more events. In some examples, Step 732 may comprise determining a first magnitude associated with the first group of one or more events of Step 704. In some examples, Step 736 may comprise determining a second magnitude associated with the second group of one or more events of Step 704. For example, a machine learning model may be trained using training examples to determine magnitudes from data associated with events. An example of such training example may include data associated with a sample group of one or more events, together with a label indicating a magnitude associated with the group. The trained machine learning model may be used to analyze data associated with the group of one or more events (such as digital data encoding information associated with the group of one or more events, image data associated with the group of one or more events, audio data associated with the group of one or more events, etc.) and determine the magnitude associated with the group of one or more events. In some examples, each event of the group of one or more events may be associated with a magnitude (for example as described above), and the magnitude associated with the group of one or more events may be a function of the magnitudes of the events. Some non-limiting examples of such function may include sum, mean, median, a linear function, a non-linear function, a polynomial function, an exponential function, a logarithmic function, and so forth.

In some examples, Step 734 may comprise, based on the first magnitude determined by Step 732, determining to include in the textual content of method 700 the description based on the first group of one or more events of the first object of Step 702. In some examples, Step 738 may comprise, based on the second magnitude determined by Step 736, determining not to include in the textual content of method 700 any description based on the second group of one or more events of the second object of Step 702. For example, the first magnitude determined by Step 732 may be compared with a selected threshold, and in response to the first magnitude determined by Step 732 being above the selected threshold, Step 734 may determine to include in the textual content of method 700 the description based on the first group of one or more events of the first object of Step 702. Further, the second magnitude determined by Step 736 may be compared with the selected threshold, and in response to the second magnitude determined by Step 736 being below the selected threshold, Step 738 may determine not to include in the textual content of method 700 any description based on the second group of one or more events of the second object of Step 702.

In some examples, Step 734 may comprise, based on the first magnitude determined by Step 732 and the second magnitude determined by Step 736, determining to include in the textual content of method 700 the description based on the first group of one or more events of the first object of Step 702. In some examples, Step 738 may comprise, based on the first magnitude determined by Step 732 and the second magnitude determined by Step 736, determining not to include in the textual content of method 700 any description based on the second group of one or more events of the second object of Step 702. For example, the first magnitude determined by Step 732 may be compared with the second magnitude determined by Step 736, and based on a result of the comparison, Step 734 may determine to include in the textual content of method 700 the description based on the first group of one or more events of the first object of Step 702, and Step 738 may determine not to include in the textual content of method 700 any description based on the second group of one or more events of the second object of Step 702.

In some examples, image data may be received, for example as described above in relation to image data 102 and/or using Step 422. Further, the image data may be analyzed to detect the plurality of objects, for example using Step 424. Further, the image data may be analyzed to detect events of the first group of one or more events and/or to detect events of the second group of one or more events, for example as described above in relation to Step 604.

In some examples, audio data may be received, for example as described above in relation to audio data 104 and/or using Step 442. Further, the audio data may be analyzed to detect the plurality of objects, for example using Step 444. Further, the audio data may be analyzed to detect events of the first group of one or more events and/or to detect events of the second group of one or more events, for example as described above in relation to Step 604.

In some examples, Step 742 may comprise, determining a mathematical object corresponding to an event in a mathematical space, for example as described above in relation to Step 456. In some examples, Step 742 may comprise, for each event of the first group of one or more events of Step 704 and for each event of the second group of one or more events of Step 706, determining a mathematical object corresponding to the event in a mathematical space, for example as described above in relation to Step 456. In some examples, Step 744 may comprise basing the determination of Step 708 to include in the textual content the description based on the first group of one or more events of the first object on the mathematical objects corresponding to the first group of one or more events. In some examples, Step 746 may comprise basing the determination of Step 710 not to include in the textual content any description based on the second group of one or more events of the second object on the mathematical objects corresponding to the second group of one or more events. For example, a machine learning model may be trained using training examples to determine whether to include descriptions of objects in textual contents based on mathematical objects corresponding to the events associated with the objects. An example of such training example may include mathematical objects corresponding to sample events associated with a sample object, together with a label indicating whether to include a sample description of the sample object in a textual content. Another example of such training example may include mathematical objects corresponding to sample events associated with a sample object and a sample description of the sample object, together with a label indicating whether to include the sample description of the sample object in a textual content. In some examples, Step 744 may use the trained machine learning model to analyze the mathematical objects corresponding to the first group of one or more events of Step 704 and determine to include in the textual content the description based on the first group of one or more events of the first object of Step 702. In some examples, Step 746 may use the trained machine learning model to analyze the mathematical objects corresponding to the second group of one or more events of Step 706 and determine not to include in the textual content any description based on the second group of one or more events of the second object of Step 702.

In some examples, the plurality of objects of Step 702 may include at least two additional objects in addition to the first and second objects. In some examples, Step 752 may comprise selecting a subset of at least one but not all of the at least two additional objects, for example as described above in relation to Step 404 and/or Step 424 and/or Step 444 and the at least three objects. In some examples, for each object of the at least two additional objects, Step 752 may receive an indication of a group of one or more events associated with the object (for example as described above in relation to Step 604), and may determine whether to include the object in the subset based on the group of one or more events associated with the object. For example, a machine learning model may be trained using training examples to determine whether to include objects of a set in a subset based on events associated with the objects. An example of such training example may include a sample group of events associated with a sample object of a sample set, together with a label indicating whether to include the sample object in a sample subset of the sample set. Step 752 may, for each object of the at least two additional objects, use the trained machine learning model to analyze the group of one or more events associated with the object to determine whether to include the object in the subset.

In some examples, Step 754 may comprise, for each object in the subset selected by Step 752, generating a description of the object, for example as described above in relation to Step 406. In one example, Step 754 may, for each object of the subset selected by Step 752, receive an indication of a group of one or more events associated with the object (for example as described above in relation to Step 604). Further, for each event of the group of one or more events associated with the object, Step 754 may receive data associated with the event, for example as described above in relation to Step 606 and/or Step 712. Step 754 may analyze the data associated with the group of one or more events associated with the object to generate the description based on the group of one or more events associated with the object of the object (for example, as described above in relation to Step 608 and/or Step 610), thereby generating the description of the object.

In some examples, Step 756 may comprise including the generated descriptions of all objects in the subset selected by Step 752 in the textual content generated by Step 716. For example, a template may include a plurality of positions for descriptions of objects, and for each object in the subset selected by Step 752, the description generated by Step 754 of the object may be inserted to a template in a position for a description of an object to thereby generate the textual content. In another example, the generated descriptions of all objects in the subset selected by Step 752 may be used as input to a generative model to thereby generate the textual content that includes the generated descriptions of all objects in the subset selected by Step 752.

In some examples, Step 762 may comprise analyzing the mathematical objects corresponding to the first group of one or more events of Step 704 to determine a first mathematical object in the mathematical space, for example by calculating a mathematical function of the mathematical objects, such as mean, sum, convex hull, a linear function, a non-linear function, a polynomial function, an exponential function, and so forth. The first mathematical object may differ from any mathematical object of the mathematical objects corresponding to the first group of one or more events. In some examples, Step 764 may comprise analyzing the mathematical objects corresponding to the second group of one or more events of Step 706 to determine a second mathematical object in the mathematical space, for example by calculating a mathematical function of the mathematical objects, such as mean, sum, convex hull, a linear function, a non-linear function, a polynomial function, an exponential function, and so forth. The second mathematical object may differ from any mathematical object of the mathematical objects corresponding to the second group of one or more events.

In some examples, Step 766 may comprise basing the determination of Step 708 to include in the textual content the description based on the first group of one or more events of the first object of Step 702 on the first mathematical object determined by Step 762. In some examples, Step 766 may comprise basing the determination of Step 710 not to include in the textual content any description based on the second group of one or more events of the second object of Step 702 on the second mathematical object determined by Step 764. For example, all mathematical objects in a first mathematical region may correspond to a decision to include a description in the textual content, all mathematical objects in a second mathematical region may correspond to a decision not to include a description in the textual content, the first mathematical object may be in the first mathematical region, and the second mathematical object may be in the second mathematical region.

In some examples, Step 410 may provide a first portion of the textual content generated by Step 716 may be provided before an indication of at least one object of the plurality of objects is received by Step 702, and a second portion of the generated textual content may be provided after the indication of the at least one object of the plurality of objects is received by Step 702. In one example, the first portion of the generated textual content may include the particular description of the first object. In another example, the at least one object of the plurality of objects may include the first object.

FIG. 8A is a flowchart of an exemplary method 800 for generating a textual content selectively reporting events based on objects. In this example, method 800 may comprise receiving an indication of a plurality of events (Step 802), the plurality of events may include at least a first event and a second event; receiving an indication of a first group of one or more objects associated with the first event (Step 804); receiving an indication of a second group of one or more objects associated with the second event (Step 806); based on the first group of one or more objects, determining to include in a textual content a description based on the first group of one or more objects of the first event (Step 808); based on the second group of one or more objects, determining not to include in the textual content any description based on the second group of one or more objects of the second event (Step 810); for each object of the first group of one or more objects, receiving data associated with the object (Step 812); analyzing the data associated with the first group of one or more objects to generate a particular description of the first event (Step 814), the particular description of the first event may be based on the first group of one or more objects; generating the textual content (Step 816), the textual content may include the particular description of the first event and may include no description based on the second group of one or more objects of the second event; and providing the generated textual content (Step 410). In other examples, method 800 may include additional steps or fewer steps. In other examples, one or more steps of method 800 may be executed in a different order and/or one or more groups of steps may be executed simultaneously.

In some examples, systems, methods and non-transitory computer readable media for selecting and reporting events based on objects are provided. In some examples, systems, methods and non-transitory computer readable media for generating a textual content selectively reporting events are provided. In one example, Step 802 may receive audio data, and may analyze the audio data to detect a first conversation (i.e., first event) and a second conversation (i.e., second event). Step 804 may analyze the audio data using a speaker diarisation algorithm to identify that the participants (i.e., objects) in the first conversation are Bob, John and Alice, and Step 806 may analyze the audio data using a speaker diarisation algorithm to identify that the participants (i.e., objects) in the second conversation Bob, Paul and Alice. Based on the participation of John in the first conversation, Step 808 may determine to include in a textual content a description based on the participants in the first conversation of the first conversation. Based on the lack of participation of John in the second conversation, Step 810 may determine not to include in the textual content any description based on the participants in the second conversation of the second conversation. Step 812 and Step 814 may analyze the audio data using a speaker diarisation algorithm to generate a description of the first conversation, such as 'John conversed with Bob and Alice for four minutes, of which John spoke for one minute, Alice spoke for one minute, and Bob spoke for two minutes.' Step 816 may generate a textual content that includes the generated description of the first conversation, such as 'After leaving the meeting, John conversed with Bob and Alice for four minutes, of which John spoke for one minute, Alice spoke for one minute, and Bob spoke for two minutes.' Step 410 may visually present this textual content on a screen.

FIG. 8B is a flowchart of an exemplary method 820 for detecting events and objects associated with the events. In this example, method 820 may comprise receiving first modality data captured from an environment using at least one sensor of a first type of sensors (Step 542); receiving second modality data captured from the environment using at least one sensor of a second type of sensors (Step 544), the second type of sensors may differ from the first type of sensors; analyzing the first modality data to detect the plurality of events (Step 822); accessing synchronization data configured to enable synchronization of the first modality data and the second modality data (Step 628); using the synchronization data to identify a first at least one portion of the second modality data associated with the first event and to identify a second at least one portion of the second modality data associated with the second event (Step 824); Analyzing the first at least one portion of the second modality data to detect objects of the first group of one or more objects (Step 826); and analyzing the second at least one portion of the second modality data to detect objects of the second group of one or more objects (Step 828). In other examples, method 820 may include additional steps or fewer steps. In other examples, one or more steps of method 820 may be executed in a different order and/or one or more groups of steps may be executed simultaneously. In some examples, the synchronization data may include data configured to correlate different portions of the second modality data to different portions of the first modality data. In one example, the synchronization data may correlate the different portions of the first modality data and the different portions of the second modality data to a common timeline. In some examples, the at least one sensor of the first type of sensors may be at least one image sensor, the first modality data may be image data, the at least one sensor of the second type of sensors may be at least one audio sensor, and the second modality data may be audio data. In some examples, the at least one sensor of the first type of sensors may be at least one audio sensor, the first modality data may be audio data, the at least one sensor of the second type of sensors may be at least one image sensor, and the second modality data may be image data.

FIG. 8C is a flowchart of an exemplary method 830 for selecting events based on objects associated with the events. In this example, method 830 may comprise determining a first magnitude associated with the first group of one or more objects (Step 832); based on the first magnitude, determining to include in the textual content the description based on the first group of one or more objects of the first event (Step 834); determining a second magnitude associated with the second group of one or more objects (Step 836); and based on the second magnitude, determining not to include in the textual content any description based on the second group of one or more objects of the second event (Step 838). In other examples, method 830 may include additional steps or fewer steps. In other examples, one or more steps of method 830 may be executed in a different order and/or one or more groups of steps may be executed simultaneously.

FIG. 8D is a flowchart of an exemplary method 840 for selecting events based on objects associated with the events. In this example, method 840 may comprise for each object of the first group of one or more objects and for each object of the second group of one or more objects, determining a mathematical object corresponding to the object in a mathematical space (Step 842); basing the determination to include in the textual content the description based on the first group of one or more objects of the first event on the mathematical objects corresponding to the first group of one or more objects (Step 844); and basing the determination not to include in the textual content any description based on the second group of one or more objects of the second event on the mathematical objects corresponding to the second group of one or more objects (Step 846). In other examples, method 840 may include additional steps or fewer steps. In other examples, one or more steps of method 840 may be executed in a different order and/or one or more groups of steps may be executed simultaneously.

FIG. 8E is a flowchart of an exemplary method 850 for adding descriptions of additional events to a generated textual content. In this example, the plurality of events of Step 802 may include at least two additional events in addition to the first and second events. Further, method 850 may comprise selecting a subset of at least one but not all of a group of at least two additional event (Step 852); for each event in the subset, generating a description of the event (Step 854); and including the generated descriptions of all events in the subset in the generated textual content (Step 856). In other examples, method 850 may include additional steps or fewer steps. In other examples, one or more steps of method 850 may be executed in a different order and/or one or more groups of steps may be executed simultaneously.

FIG. 8F is a flowchart of an exemplary method 860 for selecting events based on objects associated with the events. In this example, method 860 may comprise analyzing the mathematical objects corresponding to the first group of one or more objects to determine a first mathematical object in the mathematical space (Step 862), the first mathematical object may differ from any mathematical object of the mathematical objects corresponding to the first group of one or more objects; analyzing the mathematical objects corresponding to the second group of one or more objects to determine a second mathematical object in the mathematical space (Step 864), the second mathematical object may differ from any mathematical object of the mathematical objects corresponding to the second group of one or more objects; basing the determination to include in the textual content the description based on the first group of one or more objects of the first event on the first mathematical object (Step 866); and basing the determination not to include in the textual content any description based on the second group of one or more objects of the second event on the second mathematical object (Step 868). In other examples, method 860 may include additional steps or fewer steps. In other examples, one or more steps of method 860 may be executed in a different order and/or one or more groups of steps may be executed simultaneously.

In some examples, Step 802 may comprise receiving an indication of a plurality of events. The plurality of events may include at least a first event and a second event. For example, receiving the indication of the plurality of events may comprise reading the indication from memory, may comprise receiving the indication from an external device (for example using a digital communication device), may comprise receiving the indication from an individual (for example via a user interface), may comprise identifying the plurality of events, and so forth. In one example, Step 802 may analyze data to identify the plurality of events, for example using Step 454 analyzing data received by Step 452. In one example, Step 802 may analyze image data to identify the plurality of events, for example using Step 474 analyzing image data received by Step 472. In one example, Step 802 may analyze audio data to identify the plurality of events, for example using Step 494 analyzing audio data received by Step 492. In some examples, Step 802 may detect the plurality of events using method 820.

In some examples, an indication of a group of one or more objects associated with an event may be received. In one example, Step 804 may comprise receiving an indication of a first group of one or more objects associated with the first event of Step 802. In one example, Step 806 may comprise receiving an indication of a second group of one or more objects associated with the second event of Step 802. In one example, the second group of one or more objects may include at least one object not included in the first group of one or more objects. In one example, the first group of one or more objects may include at least one object not included in the second group of one or more objects. In one example, the first group of one or more objects of Step 804 and the second group of one or more objects of Step 806 may have at least one object in common. In one example, the first group of one or more objects of Step 804 and the second group of one or more objects of Step 806 may have no object in common. In some examples, receiving an indication of a group of one or more objects associated with an event may comprise reading the indication from memory, may comprise receiving the indication from an external device (for example using a digital communication device), may comprise receiving the indication from an individual (for example via a user interface), may comprise identifying the group of one or more objects (for example, as described above in relation to Step 654), and so forth. In some examples, Step 804 may identify the first group of one or more objects associated with the first event of Step 802 using method 820. In some examples, Step 806 may identify the second group of one or more objects associated with the second event of Step 802 using method 820.

In some examples, Step 808 may comprise, based on the first group of one or more objects of Step 804, determining to include a description based on the first group of one or more objects of the first event of Step 802 in a textual content. In some examples, Step 810 may comprise, based on the second group of one or more objects of Step 806, determining not to include in the textual content any description based on the second group of one or more objects of the second event of Step 802. For example, a machine learning model may be trained using training examples to determine whether to include descriptions of events in textual contents based on objects associated with the events and/or the descriptions. An example of such training example may include data associated with sample objects associated with a sample event, together with a label indicating whether to include a sample description of the sample event in a textual content. Another example of such training example may include data associated with sample objects associated with a sample event and a sample description of the sample event, together with a label indicating whether to include the sample description of the sample event in a textual content. In some examples, Step 808 may use the trained machine learning model to analyze data associated with the first group of one or more objects of Step 804 and determine to include in the textual content the description based on the first group of one or more objects of the first event of Step 802. In some examples, Step 810 may use the trained machine learning model to analyze the second group of one or more objects of Step 806 and determine not to include in the textual content any description based on the second group of one or more objects of the second event of Step 802. In some examples, Step 808 may comprise, based on the first group of one or more objects of Step 804 and on the second group of one or more objects of Step 806, determining to include the description based on the first group of one or more objects of the first event of Step 802 in a textual content. In some examples, Step 810 may comprise, based on the first group of one or more objects of Step 804 and the second group of one or more objects of Step 806, determining not to include in the textual content any description based on the second group of one or more objects of the second event of Step 802. For example, a machine learning model may be trained using training examples to determine whether to include descriptions of events in textual contents based on objects and/or the descriptions. An example of such training example may include data associated with sample objects associated with a sample event and data associated with other sample objects, together with a label indicating whether to include a sample description of the sample event in a textual content. Another example of such training example may include data associated with sample objects associated with a sample event, data associated with other sample objects and a sample description of the sample event, together with a label indicating whether to include the sample description of the sample event in a textual content. In some examples, Step 808 may use the trained machine learning model to analyze the first group of one or more objects of Step 804 and on the second group of one or more objects of Step 806, and determine to include the description based on the first group of one or more objects of the first event of Step 802 in a textual content. In some examples, Step 810 may use the trained machine learning model to analyze the first group of one or more objects of Step 804 and the second group of one or more objects of Step 806, and determine not to include in the textual content any description based on the second group of one or more objects of the second event of Step 802. In some examples, the plurality of events of Step 802 may further include a third event, and the third event may be associated with a third group of one or more objects. The third group of one or more objects may include at least one object not included in the first group of Step 804 and not included in the second group of Step 806. Further, Step 808 may further base the determination of to include in the textual content the description based on the first group of one or more objects of the first event on the third group of one or more objects, for example using the trained machine learning model. Further, Step 810 may further base the determination not to include in the textual content any description based on the second group of one or more objects of the second event is on the third group of one or more objects, for example using the trained machine learning model. In some examples, Step 808 may further base the determination to include in the textual content the description based on the first group of one or more objects of the first event on a type of the first event and a type of the second event, and/or Step 810 may further base the determination not to include in the textual content any description based on the second group of one or more objects of the second event on the type of the first event and the type of the second event. In some examples, Step 808 may further base the determination to include in the textual content the description based on the first group of one or more objects of the first event on a type associated with a specific object of the first group of one or more objects, and/or Step 810 may further base the determination not to include in the textual content any description based on the second group of one or more objects of the second event on a type associated with a specific object of the second group of one or more objects.

In some examples, the textual content may be associated with a writer persona. For example, an indication of the writer persona may be received as described above in relation to writer persona 142. Further, Step 808 may further base the determination to include in the textual content the description based on the first group of one or more objects of the first event on the writer persona, and/or Step 810 may base the determination not to include in the textual content any description based on the second group of one or more objects of the second event on the writer persona. For example, historic textual contents associated with the writer persona may indicate an affinity of the writer persona to specific type of objects, the first group of one or more objects includes objects that has higher affinity to the writer persona than the objects of the second group of one or more objects. In some examples, the textual content may be associated with a prospective audience. For example, an indication of the prospective audience may be received as described above in relation to prospective audience 144. Further, Step

808 may further base the determination to include in the textual content the description based on the first group of one or more objects of the first event on the prospective audience, and/or Step 810 may further base the determination not to include in the textual content any description based on the second group of one or more objects of the second event on the prospective audience. For example, historic textual contents associated with the prospective audience (for example, consumer and/or liked by the prospective audience) may indicate an affinity of the prospective audience to specific type of objects, the first group of one or more objects includes objects that has higher affinity to the prospective audience than the objects of the second group of one or more objects. In some examples, the textual content may be associated with a topic. For example, an indication of the topic may be received as described above in relation to topic 152. Further, Step 808 may further base the determination to include in the textual content the description based on the first group of one or more objects of the first event on a degree of relevance of the first event to the topic, and Step 810 may further base the determination not to include in the textual content any description based on the second group of one or more objects of the second event on a degree of relevance of the second event to the topic. For example, the first group of one or more objects may include objects that has higher affinity to the topic than the objects of the second group of one or more objects.

In some examples, Step 812 may comprise, for each object of the first group of one or more objects of Step 804, receiving data associated with the object. For example, receiving the data associated with the object may comprise reading the data from memory, may comprise receiving the data from an external device (for example using a digital communication device), may comprise receiving the data from an individual (for example via a user interface), may comprise capturing the data using at least one sensor, may comprise generating the data, and so forth. For example, the data associated with the object may be or include image data associated with the object (such as image data depicting the object). In one example, capturing the image data may include capturing the image data using at least one image sensor. In another example, the data associated with the object may be or include audio data associated with the object (such as audio data including sounds and/or vocalizations produced by and/or typical to the object). In one example, capturing the audio data may include capturing the image data using at least one audio sensor.

In some examples, Step 814 may comprise analyzing the data associated with the first group of one or more objects to generate a particular description of the first event, for example as described above in relation to Step 658 and/or Step 660. The particular description of the first event may be based on the first group of one or more objects. In some examples, Step 816 may comprise generating the textual content. The textual content may include the particular description of the first event, for example as described above in relation to Step 658 and/or Step 660, and may not include any description based on the second group of one or more objects of the second event. In one example, the textual content does not include any description of the second event. In some examples, Step 816 may further include in the textual content other details, such as a description of an object, a description of another event, a description of a scenery, a description of a location, a description related to time, a description of a cause or a reason, a description of a result, contextual information, a reference, and so forth.

In some examples, Step 822 may comprise analyzing modality data captured using a specific type of sensors (such as the first type of sensors of Step 542) to detect a plurality of events. In some examples, Step 822 may comprise analyzing the first modality data received by Step 542 to detect the plurality of events of Step 802, including the first event and the second event. For example, a machine learning model may be trained using training examples to detect events based on data captured using the specific type of sensors. An example of such training example may include sample data captured using the specific type of sensors, together with a label indicating a sample plurality of events associated with the sample data. Step 822 may use the trained machine learning model to analyze the first modality data received by Step 542 to detect the plurality of events of Step 802. In one example, the first type of sensors of Step 542 may be image sensors, the first modality data may be image data, and Step 822 may use a visual event detection algorithm to analyze the image data and detect the plurality of events of Step 802. In one example, the first type of sensors of Step 542 may be audio sensors, the first modality data may be audio data, and Step 822 may use audio classification algorithm to analyze the audio data and detect sounds and/or vocalizations produced by and/or typical to events, thereby detecting the plurality of events of Step 802.

In some examples, Step 824 may comprise using the synchronization data accessed by Step 628 to identify a first at least one portion of the second modality data associated with the first event of Step 802 and to identify a second at least one portion of the second modality data associated with the second event of Step 802. For example, Step 824 may use Step 680 to use the synchronization data accessed by Step 628 to identify the first at least one portion of the second modality data associated with the first event of Step 802 and to identify the second at least one portion of the second modality data associated with the second event of Step 802.

In some examples, at least one portion of modality data captured using a particular type of sensors (such as the second type of sensors of Step 544) to detect objects associated with an event, for examples as described above in relation to Step 682. In some examples, Step 826 may comprise analyzing the first at least one portion of the second modality data identified by Step 824 to detect objects of the first group of one or more objects of Step 804. In some examples, Step 828 may comprise analyzing the second at least one portion of the second modality data by Step 824 to detect objects of the second group of one or more objects of Step 806.

In some examples, Step 832 and/or Step 836 may comprise determining a magnitude associated with a group of one or more objects. In some examples, Step 832 may comprise determining a first magnitude associated with the first group of one or more objects of Step 804. In some examples, Step 836 may comprise determining a second magnitude associated with the second group of one or more objects of Step 804. For example, a machine learning model may be trained using training examples to determine magnitudes from data associated with objects. An example of such training example may include data associated with a sample group of one or more objects, together with a label indicating a magnitude associated with the group. The trained machine learning model may be used to analyze data associated with the group of one or more objects (such as digital data encoding information associated with the group of one or more objects, image data associated with the group of one or more objects, audio data associated with the group of one or more objects, etc.) and determine the magnitude associated with the group of one or more objects. In some examples, each object of the group of one or more objects may be associated with a magnitude (for example as described above), and the magnitude associated with the group of one or more objects may be a function of the magnitudes of the objects. Some non-limiting examples of such function may include sum, mean, median, a linear function, a non-linear function, a polynomial function, an exponential function, a logarithmic function, and so forth.

In some examples, Step 834 may comprise, based on the first magnitude determined by Step 832, determining to include in the textual content of method 800 the description based on the first group of one or more objects of the first event of Step 802. In some examples, Step 838 may comprise, based on the second magnitude determined by Step 836, determining not to include in the textual content of method 800 any description based on the second group of one or more objects of the second event of Step 802. For example, the first magnitude determined by Step 832 may be compared with a selected threshold, and in response to the first magnitude determined by Step 832 being above the selected threshold, Step 834 may determine to include in the textual content of method 800 the description based on the first group of one or more objects of the first event of Step 802. Further, the second magnitude determined by Step 836 may be compared with the selected threshold, and in response to the second magnitude determined by Step 836 being below the selected threshold, Step 838 may determine not to include in the textual content of method 800 any description based on the second group of one or more objects of the second event of Step 802.

In some examples, Step 834 may comprise, based on the first magnitude determined by Step 832 and the second magnitude determined by Step 836, determining to include in the textual content of method 800 the description based on the first group of one or more objects of the first event of Step 802. In some examples, Step 838 may comprise, based on the first magnitude determined by Step 832 and the second magnitude determined by Step 836, determining not to include in the textual content of method 800 any description based on the second group of one or more objects of the second event of Step 802. For example, the first magnitude determined by Step 832 may be compared with the second magnitude determined by Step 836, and based on a result of the comparison, Step 834 may determine to include in the textual content of method 800 the description based on the first group of one or more objects of the first event of Step 802, and Step 838 may determine not to include in the textual content of method 800 any description based on the second group of one or more objects of the second event of Step 802.

In some examples, image data may be received, for example as described above in relation to image data 102 and/or using Step 422. Further, the image data may be analyzed to detect the plurality of events, for example using Step 474. Further, the image data may be analyzed to detect objects of the first group of one or more objects and/or to detect objects of the second group of one or more objects, for example as described above in relation to Step 654.

In some examples, audio data may be received, for example as described above in relation to audio data 104 and/or using Step 442. Further, the audio data may be analyzed to detect the plurality of events, for example using Step 494. Further, the audio data may be analyzed to detect objects of the first group of one or more objects and/or to detect objects of the second group of one or more objects, for example as described above in relation to Step 654.

In some examples, Step 842 may comprise, determining a mathematical object corresponding to an object in a mathematical space, for example as described above in relation to Step 406. In some examples, Step 842 may comprise, for each object of the first group of one or more objects of Step 804 and for each object of the second group of one or more objects of Step 806, determining a mathematical object corresponding to the object in a mathematical space, for example as described above in relation to Step 406. In some examples, Step 844 may comprise basing the determination of Step 808 to include in the textual content the description based on the first group of one or more objects of the first event on the mathematical objects corresponding to the first group of one or more objects. In some examples, Step 846 may comprise basing the determination of Step 810 not to include in the textual content any description based on the second group of one or more objects of the second event on the mathematical objects corresponding to the second group of one or more objects. For example, a machine learning model may be trained using training examples to determine whether to include descriptions of events in textual contents based on mathematical objects corresponding to the objects associated with the events. An example of such training example may include mathematical objects corresponding to sample objects associated with a sample event, together with a label indicating whether to include a sample description of the sample event in a textual content. Another example of such training example may include mathematical objects corresponding to sample objects associated with a sample event and a sample description of the sample event, together with a label indicating whether to include the sample description of the sample event in a textual content. In some examples, Step 844 may use the trained machine learning model to analyze the mathematical objects corresponding to the first group of one or more objects of Step 804 and determine to include in the textual content the description based on the first group of one or more objects of the first event of Step 802. In some examples, Step 846 may use the trained machine learning model to analyze the mathematical objects corresponding to the second group of one or more objects of Step 806 and determine not to include in the textual content any description based on the second group of one or more objects of the second event of Step 802.

In some examples, the plurality of events of Step 802 may include at least two additional events in addition to the first and second events. In some examples, Step 852 may comprise selecting a subset of at least one but not all of the at least two additional events, for example as described above. In relation to Step 454 and/or Step 474 and/or Step 494 and the at least three events. In some examples, for each event of the at least two additional events, Step 852 may receive an indication of a group of one or more objects associated with the event (for example as described above in relation to Step 654), and may determine whether to include the event in the subset based on the group of one or more objects associated with the event. For example, a machine learning model may be trained using training examples to determine whether to include events of a set in a subset based on objects associated with the events. An example of such training example may include a sample group of objects associated with a sample event of a sample set, together with a label indicating whether to include the sample event in a sample subset of the sample set. Step 852 may, for each event of the at least two additional events, use the trained machine learning model to analyze the group of one or more objects associated with the event to determine whether to include the event in the subset.

In some examples, Step 854 may comprise, for each event in the subset selected by Step 852, generating a description of the event, for example as described above in relation to Step 456. In one example, Step 854 may, for each event of the subset selected by Step 852, receive an indication of a group of one or more objects associated with the event (for example as described above in relation to Step 654). Further, for each object of the group of one or more objects associated with the event, Step 854 may receive data associated with the object, for example as described above in relation to Step 656 and/or Step 812. Step 854 may analyze the data associated with the group of one or more objects associated with the event to generate the description based on the group of one or more objects associated with the event of the event (for example, as described above in relation to Step 658 and/or Step 660), thereby generating the description of the event.

In some examples, Step 856 may comprise including the generated descriptions of all events in the subset selected by Step 852 in the textual content generated by Step 816. For example, a template may include a plurality of positions for descriptions of events, and for each event in the subset selected by Step 852, the description generated by Step 854 of the event may be inserted to a template in a position for a description of an event to thereby generate the textual content. In another example, the generated descriptions of all events in the subset selected by Step 852 may be used as input to a generative model to thereby generate the textual content that includes the generated descriptions of all events in the subset selected by Step 852.

In some examples, Step 862 may comprise analyzing the mathematical objects corresponding to the first group of one or more objects of Step 804 to determine a first mathematical object in the mathematical space, for example by calculating a mathematical function of the mathematical objects, such as mean, sum, convex hull, a linear function, a non-linear function, a polynomial function, an exponential function, and so forth. The first mathematical object may differ from any mathematical object of the mathematical objects corresponding to the first group of one or more objects. In some examples, Step 864 may comprise analyzing the mathematical objects corresponding to the second group of one or more objects of Step 806 to determine a second mathematical object in the mathematical space, for example by calculating a mathematical function of the mathematical objects, such as mean, sum, convex hull, a linear function, a non-linear function, a polynomial function, an exponential function, and so forth. The second mathematical object may differ from any mathematical object of the mathematical objects corresponding to the second group of one or more objects.

In some examples, Step 866 may comprise basing the determination of Step 808 to include in the textual content the description based on the first group of one or more objects of the first event of Step 802 on the first mathematical object determined by Step 862. In some examples, Step 866 may comprise basing the determination of Step 810 not to include in the textual content any description based on the second group of one or more objects of the second event of Step 802 on the second mathematical object determined by Step 864. For example, all mathematical objects in a first mathematical region may correspond to a decision to include a description in the textual content, all mathematical objects in a second mathematical region may correspond to a decision not to include a description in the textual content, the first mathematical object may be in the first mathematical region, and the second mathematical object may be in the second mathematical region.

In some examples, Step 410 may provide a first portion of the textual content generated by Step 816 may be provided before an indication of at least one event of the plurality of events is received by Step 802, and a second portion of the generated textual content may be provided after the indication of the at least one event of the plurality of events is received by Step 802. In one example, the first portion of the generated textual content may include the particular description of the first event. In another example, the at least one event of the plurality of events may include the first event.

In some embodiments, textual content may be generated to selectively report events, for example based on magnitudes associated with the events.

In some examples, an indication of a plurality of events may be received. The plurality of events may include at least a first event and a second event. In some examples, an indication of a first magnitude associated with the first event and/or an indication of a second magnitude associated with the second event may be received. In some examples, it may be determined to include a description of the first event in a textual content based on the first magnitude and the second magnitude. Further, it may be determined not to include any description of the second event in the textual content based on the first magnitude and the second magnitude. In some examples, data associated with the first event may be analyzed to generate the description of the first event. In some examples, the textual content may be generated. The textual content may include the description of the first event and not include any description of the second event. In some examples, the generated textual content may be provided.

In some examples, an indication of the plurality of events may be received. For example, the indication may be read from memory, may be received from an external device, may be identified by analyzing data (such as image data, audio data, etc.), and so forth.

In some examples, indications of magnitudes corresponding events may be received (such as an indication of a first magnitude associated with the first event, an indication of a second magnitude associated with the second event, and so forth). For example, the indication may be read from memory, may be received from an external device, may be identified by analyzing data (such as image data, audio data, etc.), and so forth.

In some examples, it may be determined to include a description of the first event in a textual content based on the first magnitude and the second magnitude. Further, it may be determined not to include any description of the second event in the textual content based on the first magnitude and the second magnitude. For example, based on the first magnitude being larger than the second magnitude.

In some examples, data associated with an event (such as the first event) may be analyzed to generate the description of the event. For example, in response to a first data associated with the event, a first description of the event may be generated, and in response to a second data associated with the event, a second description of the event may be generated, the second description may differ from the first description. In another example, the analysis of the data associated with the event (such as the first event) may identify at least one of a quantity, a word, a phrase and an adjective, and the generated description of the event may include the identified at least one of a quantity, a word, a phrase and an adjective. In some examples, the data associated with the event (such as the first event) may include image data associated with the event, and the generation of the description of the event may be based on an analysis of the image data associated with the event. In one example, a convolution of at least part of the image data may be calculated, in response to a first value of the convolution of the at least part of the image data, a first version of the description of the event may be generated, and in response to a second value of the convolution of the at least part of the image data, a second version of the description of the event may be generated, the second version may differ from the first version. In some examples, the data associated with an event (such as the first event) may include audio data associated with the event, and the generation of the description of the event may be based on an analysis of the audio data associated with the event. In one example, a convolution of at least part of the audio data may be calculated, in response to a first value of the convolution of the at least part of the audio data, a first version of the description of the event may be generated, and in response to a second value of the at least part of the convolution of the audio data, a second version of the description of the event may be generated, the second version may differ from the first version.

In some examples, analyzing data associated with the first event to generate the description of the first event may include analyzing the data associated with the first event to select an adjective, and the generated description of the first event may include the selected adjective. In some examples, analyzing data associated with the first event to generate the description of the first event may include analyzing the data associated with the first event to select an adverb, and the generated description of the first event may include the selected adverb. In some examples, an object associated with the first event may be identified, and the generated description of the first event may include an indication of the object. In one example, the identification of the object associated with the first event may be based on an analysis of the data associated with the first event. In some examples, an effect of the first event may be identified, and the generated description of the first event may include an indication of the effect. In one example, the identification of the effect of the first event may be based on an analysis of the data associated with the first event. In some examples a reaction to the first event may be identified, and the generated description of the first event may include an indication of the reaction. In one example, the identification of reaction to the first event may be based on an analysis of the data associated with the first event. In some examples, a pre-existing obstacle to a successful outcome of the first event may be identified, and the generated description of the first event may include an indication of the pre-existing obstacle. In one example, the identification of the pre-existing obstacle to a successful outcome of the first event may be based on an analysis of the data associated with the first event. In some examples, a cause for the first event may be identified, and the generated description of the first event may include an indication of the cause. In one example, the identification of cause for the first event may be based on an analysis of the data associated with the first event.

In some examples, the textual content may be generated. For example, the description of the first event may be inserted into a template to generate the textual content. In another example, a generative model may be used to generate the textual content that includes the description of the first event.

In some examples, the generated textual content may be provided. For example, the generated textual content may be provided to an external process, to an external device (for example by transmitting the generated textual content to the external device, for example over a digital communication network), to a memory device, to a user. In some examples, the generated textual content may be provided visually, may be provided audibly (for example using text to speech algorithms), may be provided using a user interface, and so forth.

In some examples, the determination to include the description of the first event in the textual content may be based on a comparison of the first magnitude and the second magnitude. In some examples, the determination not to include any description of the second event in the textual content may be based on a comparison of the first magnitude and the second magnitude.

In some examples, the plurality of events may further include a third event, the determination to include the description of the first event in the textual content may be further based on a magnitude associated with the third event, and the determination not to include any description of the second event in the textual content may be further based on the magnitude associated with the third event.

In some examples, the determination to include the description of the first event in the textual content may be further based on a type of the first event and a type of the second event. In some examples, the determination not to include any description of the second event in the textual content may be further based on the type of the first event and the type of the second event.

In some examples, first modality data captured from an environment using at least one sensor of a first type of sensors may be received (for example, from memory, from an external device, from the at least one sensor of the first type of sensors, and so forth). Further, second modality data captured from the environment using at least one sensor of a second type of sensors may be received (for example, from memory, from an external device, from the at least one sensor of the second type of sensors, and so forth). The second type of sensors may differ from the first type of sensors. The first modality data may be analyzed to detect the plurality of events. Synchronization data configured to enable synchronization of the first modality data and the second modality data may be accessed (for example, in a memory, in an external device using a communication link, and so forth). The synchronization data may be used to identify a first portion of the second modality data associated with the first event and a second portion of the second modality data associated with the second event. The first portion of the second modality data may be analyzed to determine the indication of the first magnitude associated with the first event, and the second portion of the second modality data may be analyzed to determine the indication of the second magnitude associated with the second event. In one example, the first modality data may be image data (such as a series of images, a video, etc.) and the second modality data may be audio data. In one example, the first modality data may be audio data and the second modality data may be image data (such as a series of images, a video, etc.). In some examples, the synchronization data may include data configured to correlate different portions of the second modality data to different portions of the first modality data. For example, the synchronization data may correlate the different portions of the first modality data and the different portions of the second modality data to a common timeline.

In some examples, receiving the indication of the plurality of events may comprise: receiving image data, and analyzing the image data to detect the plurality of events. For example, the image data may include at least one of an image, a series of images, a video and a series of videos. For example, the image data may be analyzed using a visual event detector to detect the plurality of events. In some examples, at least one of the indication of the first magnitude associated with the first event and the indication of the second magnitude associated with the second event may be based on an analysis of the image data. In some examples, at least one of the indication of the first magnitude associated with the first event and the indication of the second magnitude associated with the second event may be based on an analysis of audio data.

In some examples, receiving the indication of the plurality of events may comprise: receiving audio data, and analyzing the audio data to detect the plurality of events. For example, at least one of the indication of the first magnitude associated with the first event and the indication of the second magnitude associated with the second event may be based on an analysis of the audio data. In one example, at least one of the indication of the first magnitude associated with the first event and the indication of the second magnitude associated with the second event may be based on an analysis of image data.

In some examples, first image data associated with the first event and second image data associated with the second event may be received. The first image data may be analyzed to determine the indication of the first magnitude associated with the first event, and the second image data may be analyzed to determine the indication of the second magnitude associated with the second event. In one example, the first image data and the second image data may be different. In one example, the first image data and the second image data may be different portions of a video. In one example, a magnitude associated with an event may be based on at least one of a size of an object depicted in the associated image data, a color of a portion of the associated image data, a length of an event depicted in the associated image data, and so forth.

In some examples, first audio data associated with the first event and second audio data associated with the second event may be received. The first audio data may be analyzed to determine the indication of the first magnitude associated with the first event, and the second audio data may be analyzed to determine the indication of the second magnitude associated with the second event. In one example, the first audio data and the second audio data may be different portions of a single audio stream. In one example, a magnitude associated with an event may be based on at least one of a loudness in the associated audio data, words spoken in the associated audio data, a pitch of voice in the associated audio data, and so forth.

In some examples, a first mathematical object corresponding to the first event in a mathematical space may be determined, and a second mathematical object corresponding to the second event in the mathematical space may be determined. In one example, the determination to include the description of the first event in the textual content may be based on the first mathematical object and on the second mathematical object. In one example, the determination not to include any description of the second event in the textual content may be based on the first mathematical object and on the second mathematical object. In one example, the first mathematical object may be used to determine the indication of the first magnitude associated with the first event. In one example, the second mathematical object may be used to determine the indication of the second magnitude associated with the second event. In one example, the first mathematical object may be used to generate the description of the first event. In one example, the data associated with the first event may be analyzed to determine a first mathematical object corresponding to the first event in a mathematical space, and the first mathematical object may be used to generate the description of the first event.

In some examples, providing the generated textual content may comprise causing a visual presentation of the generated textual content to a user, may comprise causing an audio representation of the generated textual content to be provided audibly, may comprise transmission of the generated textual content to an external device using a digital communication device (for example over a digital communication network), may comprise storing the generated textual content in a digital memory accessible by at least one external process, and so forth.

In some examples, the first event may be associated with a particular portion of a media stream, and providing the generated textual content may comprise providing the generated textual content in a format that associate the description of the first event in the generated textual content with the particular portion of the media stream. For example, the media stream may be a video, and the description of the first event may be provided in one or more captions over the particular portion of the video.

In some examples, the determination to include the description of the first event in the textual content may be further based on a writer persona, the determination not to include any description of the second event in the textual content may be further based on the writer persona, and the generated description of the first event may be in a style associated with the writer persona.

In some examples, the determination to include the description of the first event in the textual content may be further based on a prospective audience of the generated textual content, the determination not to include any description of the second event in the textual content may be further based on the prospective audience, and the generated description of the first event may be in a style selected based on the prospective audience.

In some examples, a first portion of the generated textual content may be provided before at least one event of the plurality of events occurs, and a second portion of the generated textual content may be provided after the at least one event of the plurality of events occurs. In one example, the first portion of the generated textual content may include the description of the first event. In another example, the at least one event of the plurality of events may include the first event, and the second portion of the generated textual content may include the description of the first event.

In some embodiments, textual content may be generated to selectively report events, for example based on topic.

In some examples, an indication of a plurality of events may be received, for example as described above. In some examples, an indication of a topic may be received. In some examples, for each event of the plurality of events, a degree of relevance of the event to the topic may be identified. In some examples, the identified degrees of relevance may be used to select a subset of the plurality of events. In one example, the selected subset may include some but not all of the plurality of events. In some examples, for each event in the selected subset, data associated with the event may be analyzed to generate a description of the event, for example as described above. In some examples, textual content may be generated, the generated textual content may include the generated descriptions of the events in the selected subset and not include any description of any specific event of the plurality of events that is not included in the selected subset. In some examples, the generated textual content may be provided, for example as described above. In one example, the degrees of relevance may be binary (for example, 'relevant' or 'not-relevant'). In another example, the degrees of relevance may be discrete (for example, 'high', 'medium', 'low' or 'none'). In yet another example, the degrees of relevance may be continuous (for example, a number in a continuous range of numbers).

In some examples, an indication of a topic may be received. For example, the indication of the topic may be read from memory, may be received from an external device, may be received from a user, may be identified by analyzing data (such as image data, audio data, etc.), and so forth.

In some examples, a degree of relevance of the event to the topic may be identified. For example, a regression model may be trained using training examples to identify degrees of relevance of events to topics, and the trained regression model may be used to identify the degree of relevance of the event to the topic. An example of such training example may include data associated with a sample event and an indication of a sample topic, together with a label corresponding to the degree of relevance of the sample event to the sample topic.

In some examples, textual content may be generated. For example, the generated descriptions of the events in the selected subset may be inserted into a template to generate the textual content. In another example, a generative model may be used to generate the textual content that includes the generated descriptions of the events in the selected subset.

In some examples, for each event in the selected subset, the data associated with the event may include image data associated with the event, and the generation of the description of the event may be based on an analysis of the image data associated with the event. In one example, a convolution of at least part of the image data may be calculated, in response to a first value of the convolution of the at least part of the image data, a first version of the description of the event may be generated, and in response to a second value of the convolution of the at least part of the image data, a second version of the description of the event may be generated, the second version may differ from the first version.

In some examples, for each event in the selected subset, the data associated with the event may include audio data associated with the event, and the generation of the description of the event may be based on an analysis of the audio data associated with the event. In one example, a convolution of at least part of the audio data, in response to a first value of the convolution of the at least part of the audio data, a first version of the description of the event may be generated, and in response to a second value of the at least part of the convolution of the audio data, a second version of the description of the event may be generated, the second version may differ from the first version.

In some examples, for at least a particular event in the selected subset, analyzing data associated with the particular event to generate the description of the particular event may include analyzing the data associated with the particular event to select an adjective, and the generated description of the particular event may include the selected adjective. In some examples, for at least a particular event in the selected subset, analyzing data associated with the particular event to generate the description of the particular event may include analyzing the data associated with the particular event to select an adverb, and the generated description of the particular event may include the selected adverb. In some examples, an object associated with a particular event in the selected subset may be identified, and the generated description of the particular event may include an indication of the object. In one example, the identification of the object associated with the particular event may be based on an analysis of the data associated with the particular event. In some examples, an effect of a particular event in the selected subset may be identified, and the generated description of the particular event may include an indication of the effect. In one example, the identification of the effect of the particular event may be based on an analysis of the data associated with the particular event. In some examples, a reaction to a particular event in the selected subset may be identified, and the generated description of the particular event may include an indication of the reaction. In one example, the identification of reaction to the particular event may be based on an analysis of the data associated with the particular event. In some examples, a pre-existing obstacle to a successful outcome of a particular event in the selected subset may be identified, and the generated description of the particular event may include an indication of the pre-existing obstacle. In one example, the identification of the pre-existing obstacle to a successful outcome of the particular event may be based on an analysis of the data associated with the particular event. In some examples, a cause for a particular event in the selected subset may be identified, and the generated description of the particular event may include an indication of the cause. In one example, the identification of cause for the particular event may be based on an analysis of the data associated with the particular event.

In some examples, analyzing data associated with a particular event to generate the description of the particular event may include analyzing the data associated with the particular event to select an adjective, and the generated description of the particular event may include the selected adjective. In some examples, analyzing data associated with a particular event to generate the description of the particular event may include analyzing the data associated with the particular event to select an adverb, and the generated description of the particular event may include the selected adverb. In some examples, an object associated with a particular event may be identified, and the generated description of the particular event may include an indication of the object. In one example, the identification of the object associated with the particular event may be based on an analysis of the data associated with the particular event. In some examples, an effect of a particular event may be identified, and the generated description of the particular event may include an indication of the effect. In one example, the identification of the effect of the particular event may be based on an analysis of the data associated with the particular event. In some examples, a reaction to a particular event may be identified, and the generated description of the particular event may include an indication of the reaction. In one example, the identification of reaction to the particular event may be based on an analysis of the data associated with the particular event. In some examples, a pre-existing obstacle to a successful outcome of a particular event may be identified, and the generated description of the particular event may include an indication of the pre-existing obstacle. In one example, the identification of the pre-existing obstacle to a successful outcome of the particular event may be based on an analysis of the data associated with the particular event. In some examples, a cause for a particular event may be identified, and the generated description of the particular event may include an indication of the cause. In one example, the identification of cause for the particular event may be based on an analysis of the data associated with the particular event.

In some examples, the selection of the subset of the plurality of events may be based on a type of each event in the plurality of events.

In some examples, for each event in the plurality of events: a mathematical object corresponding to the event in a mathematical space may be determined, and the mathematical object corresponding to the event may be used to identify the degree of relevance of the event to the topic. In one example, a mathematical object associated with the topic in the mathematical space may be determined, and for each event in the plurality of events, the mathematical object corresponding to the event and the mathematical object associated with the topic in the mathematical space may be used to identify the degree of relevance of the event to the topic. In one example, the degree of relevance of the event to the topic may be based on a distance between the mathematical object corresponding to the event and the mathematical object associated with the topic in the mathematical space. In another example, the mathematical object associated with the topic in the mathematical space may include a plurality of other mathematical objects (such as a region, a manifold, a mathematical subspace, etc.), and the degree of relevance of the event to the topic may be based on whether the mathematical object corresponding to the event is included in the mathematical object associated with the topic.

In some examples, each event in the selected subset may be associated with a particular portion of a media stream, and providing the generated textual content may comprise providing the generated textual content in a format that associate the description of the event in the generated textual content with the particular portion of the media stream corresponding to the event. For example, the media stream may be a video, and the description of an event may be provided in one or more captions over the particular portion of the video corresponding to the event.

In some examples, the selection of the subset of the plurality of events may be based on a writer persona, and for each event in the selected subset, the generated description of the event may be in a style associated with the writer persona.

In some examples, the topic may be selected based on a writer persona, and for each event in the selected subset, the generated description of the event may be in a style associated with the writer persona.

In some examples, the selection of the subset of the plurality of events may be based on a prospective audience of the generated textual content, and for each event in the selected subset, the generated description of the event may be in a style selected based on the prospective audience.

In some examples, the topic may be selected based on a prospective audience, and for each event in the selected subset, the generated description of the event may be in a style associated with the prospective audience.

In some examples, generating the textual content may include selecting an order for the events in the selected subset in the generated textual content, for example as described below.

In some examples, generating the textual content may include selecting a conjunction for a pair of first and second events of the selected subset. In one example, the generated textual content may include: the generated description of the first event, followed by the selected conjunction, followed by the generated description of the second event.

In some examples, a first portion of the generated textual content may be provided before at least one event of the plurality of events occurs, and a second portion of the generated textual content may be provided after the at least one event of the plurality of events occurs. In one example, the first portion of the generated textual content may include a generated descriptions of a first event in the selected subset, and the selected subset may include the at least one event of the plurality of events. In one example, the first portion of the generated textual content may include a generated descriptions of a first event in the selected subset, and the second portion of the generated textual content may include a generated description of the at least one event of the plurality of events.

In some embodiments, textual content may be generated to report events in a selected order.

In some examples, an indication of a plurality of events may be received, for example as described above. For each event in the plurality of events, data associated with the event may be analyzed to generate a description of the event, for example as described above. An order for the plurality of events in a generated textual content may be selected. The textual content may be generated, the generated textual content may include the generated descriptions of the events in the plurality of events arranged based on the selected order. The generated textual content may be provided, for example as described above.

In some examples, an order for the plurality of events in a generated textual content may be selected. For example, a ranking mechanism (such as machine-learning ranking algorithms) may be used to select the order. In another example, the order may be selected by user input.

In some examples, the textual content may be generated, and the generated textual content may include the generated descriptions of the events in the plurality of events arranged based on the selected order. For example, the descriptions of the events may be inserted to a template according to the selected order to generate the textual content. In another example, a generative model may be used to generate the textual content.

In some examples, the selection of the order for the plurality of events in the generated textual content may be based on magnitudes associated with the plurality of events. In one example, the magnitude associated with an event may be obtained as described above. In one example, the plurality of events may be ordered in a decreasing (or increasing) order of magnitudes.

In some examples, the selection of the order for the plurality of events in the generated textual content may be based on a topic associated with the generated textual content. For example, in response to a first topic, a first order for the plurality of events may be selected, and in response to a second topic, a second order for the plurality of events may be selected, the second order may differ from the first order.

In some examples, the selection of the order for the plurality of events in the generated textual content is based on a writer persona. For example, in response to a first writer persona, a first order for the plurality of events may be selected, and in response to a second writer persona, a second order for the plurality of events may be selected, the second order may differ from the first order.

In some examples, the selection of the order for the plurality of events in the generated textual content may be based on a prospective audience. For example, in response to a first prospective audience, a first order for the plurality of events may be selected, and in response to a second prospective audience, a second order for the plurality of events may be selected, the second order may differ from the first order.

In some examples, each event of the plurality of events may correspond to at least a portion of an image data, and the image data may be analyzed to select the order for the plurality of events in the generated textual content. For example, the at least a portion of the image data may be analyzed to determine a magnitude associated with the event (for example as described above), and the order for the plurality of events may be selected based on the magnitudes (for example as described above).

In some examples, each event of the plurality of events may correspond to at least a portion of an audio data, and the audio data may be analyzed to select the order for the plurality of events in the generated textual content. For example, the at least a portion of the audio data may be analyzed to determine a magnitude associated with the event (for example as described above), and the order for the plurality of events may be selected based on the magnitudes (for example as described above).

In some examples, the plurality of events may include a first event and a second event. In one example, according to the order, the first event may precede the second event. In this example, generating the textual content may include selecting a conjunction for the first and the second events, and the generated textual content may include: the generated description of the first event, followed by the selected conjunction, followed by the generated description of the second event.

In some examples, the plurality of events may include a first event and a second event. In one example, an indication that the first event is a cause for the second event may be received, and the selection of the order for the plurality of events in the generated textual content may be based on the first event being a cause for the second event.

In some examples, the plurality of events may include a first event and a second event. In one example, an indication that the first event antedates the second event may be received, and the selection of the order for the plurality of events in the generated textual content may be based on the first event antedating the second event.

In some examples, the plurality of events may include a first event and a second event. In one example, an indication that the first event overlaps with the second event in time may be received, and the selection of the order for the plurality of events in the generated textual content may be based on the first event overlapping with the second event in time.

In some examples, a first portion of the generated textual content may be provided before at least one event of the plurality of events occurs, and a second portion of the generated textual content may be provided after the at least one event of the plurality of events occurs. In one example, the first portion of the generated textual content may include the descriptions of one or more events of the plurality of events, and the second portion of the generated textual content may include the description of the at least one event of the plurality of events.

In some embodiments, textual content may be generated to report events in a particular writer persona.

In some examples, an indication of a plurality of events may be received, for example as described above. In some examples, an indication of a writer persona may be received. In some examples, for each event in the plurality of events, data associated with the event may be analyzed and the indication of the writer persona may be used to generate a description of the event in a style associated with the writer persona. In some examples, textual content that includes the generated descriptions of the plurality of events may be generated, for example as described above. In some examples, the generated textual content may be provided, for example as described above.

In some examples, an indication of a writer persona may be received. For example, the indication of the writer persona may be read from memory, may be received from an external device, may be received from a user, may be identified by analyzing data (for example, by analyzing historic textual data previously generated by the writer persona), and so forth. Some non-limiting examples of such indication of the writer persona may include an identity of a human writer, historic textual data previously generated by the writer persona, personality characteristics of the writer persona, preferences of the writer persona, areas of interest of the writer persona, a generative model associated with the writer persona, and so forth.

In some examples, for each event in the plurality of events, data associated with the event may be analyzed and the indication of the writer persona may be used to generate a description of the event in a style associated with the writer persona. For example, in response to a first pair of data associated with the event and writer persona, a first description of the event may be generated, and in response to a second pair of data associated with the event and writer persona, a second description of the event may be generated, the second description may differ from the first description.

In some examples, generating the textual content may include selecting an order for the plurality of events in the generated textual content, for example as described above. For example, generating the textual content may include selecting an order for the plurality of events in the generated textual content based on the indication of the writer persona, for example as described above.

In some examples, generating the textual content may include selecting a conjunction for a pair of first and second events of the plurality of events, for example based on the writer persona. In this example, the generated textual content may include: the generated description of the first event, followed by the selected conjunction, followed by the generated description of the second event. For example, in response to a first writer persona, a first conjunction for the pair of first and second events may be selected, and in response to a second writer persona, a second conjunction for the pair of first and second events may be selected, the second conjunction may differ from the first conjunction.

In some examples, the writer persona may be selected based on a prospective audience of the generated textual content. For example, in response to a first prospective audience, a first writer persona may be selected, and in response to a second prospective audience, a second writer persona may be selected, the second writer persona may differ from the first writer persona.

In some examples, the writer persona may be selected based on a topic associated with the generated textual content. For example, in response to a first topic, a first writer persona may be selected, and in response to a second topic, a second writer persona may be selected, the second writer persona may differ from the first writer persona.

In some examples, the writer persona may be selected based on the plurality of events. For example, in response to a first plurality of events, a first writer persona may be selected, and in response to a second plurality of events, a second writer persona may be selected, the second writer persona may differ from the first writer persona.

In some examples, the writer persona may be selected based on an analysis of image data associated with at least part of to the plurality of events, for example as described below.

In some examples, the writer persona may be selected based on an analysis of audio data associated with at least part of to the plurality of events, for example as described below.

In some examples, the plurality of events may be selected from a group of three or more events, for example based on the writer persona. The group of three or more events may include all events of the plurality of events. In one example, at least one event of the group of three or more events may not be included in the plurality of events. In one example, in response to a first writer persona, a first plurality of events may be selected, and in response to a second writer persona, a second plurality of events may be selected, the second plurality of events may differ from the first plurality of events.

In some examples, a first portion of the generated textual content may be provided before at least one event of the plurality of events occurs, and a second portion of the generated textual content may be provided after the at least one event of the plurality of events occurs. In one example, the first portion of the generated textual content may include the descriptions of one or more events of the plurality of events, and the second portion of the generated textual content may include the description of the at least one event of the plurality of events.

In some embodiments, textual content may be generated to report events to a particular prospective audience.

In some examples, an indication of a plurality of events may be received, for example as described above. In some examples, an indication of a prospective audience may be received. In some examples, for each event in the plurality of events, data associated with the event may be analyzed and the indication of the prospective audience may be used to generate a description of the event in a style selected based on the prospective audience. In some examples, textual content that includes the generated descriptions of the plurality of events may be generated, for example as described above. In some examples, the generated textual content may be provided, for example as described above.

In some examples, an indication of a prospective audience may be received. For example, the indication of the prospective audience may be read from memory, may be received from an external device, may be received from a user, may be identified by analyzing data, and so forth. Some non-limiting examples of such indication of the prospective audience may include an identification of at least one person in the prospective audience, data based on historic behavior of one or more persons in the prospective audience, personality characteristics of one or more persons in the prospective audience, preferences of one or more persons in the prospective audience, areas of interest of one or more persons in the prospective audience, and so forth.

In some examples, for each event in the plurality of events, data associated with the event may be analyzed and the indication of the prospective audience may be used to generate a description of the event in a style selected based on the prospective audience. For example, in response to a first pair of data associated with the event and prospective audience, a first description of the event may be generated, and in response to a second pair of data associated with the event and prospective audience, a second description of the event may be generated, the second description may differ from the first description.

In some examples, the prospective audience may be a single person. In some examples, the prospective audience may be a group of at least two people. In some examples, the prospective audience may include at least an automated process configured to analyze the generated textual content.

In some examples, generating the textual content may include selecting an order for the plurality of events in the generated textual content, for example as described above. For example, generating the textual content may include selecting an order for the plurality of events in the generated textual content based on the indication of the prospective audience, for example as described above.

In some examples, generating the textual content may include selecting a conjunction for a pair of first and second events of the plurality of events based on the prospective audience, and the generated textual content may include: the generated description of the first event, followed by the selected conjunction, followed by the generated description of the second event. For example, in response to a first prospective audience, a first conjunction may be selected, and in response to a second prospective audience, a second conjunction may be selected, the second conjunction may differ from the first conjunction.

In some examples, the plurality of events may be selected from a group of three or more events based on the prospective audience. The group of three or more events may include all events of the plurality of events. In one example, at least one event of the group of three or more events may not be included in the plurality of events. In one example, in response to a first prospective audience, a first plurality of events may be selected, and in response to a second prospective audience, a second plurality of events may be selected, the second plurality of events may differ from the first plurality of events.

In some examples, a first portion of the generated textual content may be provided before at least one event of the plurality of events occurs, and a second portion of the generated textual content may be provided after the at least one event of the plurality of events occurs. In one example, the first portion of the generated textual content may include the descriptions of one or more events of the plurality of events, and the second portion of the generated textual content may include the description of the at least one event of the plurality of events.

In some embodiments, textual content may be generated to selectively report objects, for example based on magnitudes associated with the objects.

In some examples, an indication of a plurality of objects may be received. The plurality of objects may include at least a first object and a second object. In some examples, an indication of a first magnitude associated with the first object may be received. In some examples, an indication of a second magnitude associated with the second object may be received. In some examples, it may be determined to include a description of the first object in a textual content, for example based on the first magnitude and the second magnitude. In some examples, it may be determined not to include any description of the second object in the textual content, for example based on the first magnitude and the second magnitude. In some examples, data associated with the first object may be received. In some examples, data associated with the first object may be analyzed to generate the description of the first object. In some examples, the textual content may be generated. The textual content may include the description of the first object and may not include any description of the second object. In some examples, the generated textual content may be provided.

In some examples, an indication of the plurality of objects may be received. For example, the indication may be read from memory, may be received from an external device, may be identified by analyzing data (such as image data, audio data, etc.), and so forth.

In some examples, indications of magnitudes corresponding objects may be received (such as an indication of a first magnitude associated with the first object, an indication of a second magnitude associated with the second object, and so forth). For example, the indication may be read from memory, may be received from an external device, may be identified by analyzing data (such as image data, audio data, etc.), and so forth.

In some examples, it may be determined to include a description of the first object in a textual content based on the first magnitude and the second magnitude. Further, it may be determined not to include any description of the second object in the textual content based on the first magnitude and the second magnitude. For example, based on the first magnitude being larger than the second magnitude.

In some examples, data associated with an object (such as the first object) may be analyzed to generate the description of the object. For example, in response to a first data associated with the object, a first description of the object may be generated, and in response to a second data associated with the object, a second description of the object may be generated, the second description may differ from the first description. In another example, the analysis of the data associated with the object (such as the first object) may identify at least one of a quantity, a word, a phrase and an adjective, and the generated description of the object may include the identified at least one of a quantity, a word, a phrase and an adjective. In some examples, the data associated with the object (such as the first object) may include image data associated with the object, and the generation of the description of the object may be based on an analysis of the image data associated with the object. In one example, a convolution of at least part of the image data may be calculated, in response to a first value of the convolution of the at least part of the image data, a first version of the description of the object may be generated, and in response to a second value of the convolution of the at least part of the image data, a second version of the description of the object may be generated, the second version may differ from the first version. In some examples, the data associated with an object (such as the first object) may include audio data associated with the object, and the generation of the description of the object may be based on an analysis of the audio data associated with the object. In one example, a convolution of at least part of the audio data may be calculated, in response to a first value of the convolution of the at least part of the audio data, a first version of the description of the object may be generated, and in response to a second value of the at least part of the convolution of the audio data, a second version of the description of the object may be generated, the second version may differ from the first version.

In some examples, analyzing data associated with the first object to generate the description of the first object may include analyzing the data associated with the first object to select an adjective, and the generated description of the first object may include the selected adjective. In some examples, analyzing data associated with the first object to generate the description of the first object may include analyzing the data associated with the first object to select an adverb, and the generated description of the first object may include the selected adverb. In some examples, an event associated with the first object may be identified, and the generated description of the first object may include an indication of the event. In one example, the identification of the object associated with the first object may be based on an analysis of the data associated with the first object.

In some examples, the textual content may be generated. For example, the description of the first object may be inserted into a template to generate the textual content. In another example, a generative model may be used to generate the textual content that includes the description of the first object.

In some examples, the generated textual content may be provided. For example, the generated textual content may be provided to an external process, to an external device (for example by transmitting the generated textual content to the external device, for example over a digital communication network), to a memory device, to a user. In some examples, the generated textual content may be provided visually, may be provided audibly (for example using text to speech algorithms), may be provided using a user interface, and so forth.

In some examples, the plurality of objects may further include a third object, the determination to include the description of the first object in the textual content may be further based on a magnitude associated with the third object, and the determination not to include any description of the second object in the textual content may be further based on the magnitude associated with the third object.

In some examples, the determination to include the description of the first object in the textual content may be further based on a type of the first object and/or a type of the second object. In one example, the determination not to include any description of the second object in the textual content may be further based on the type of the first object and/or the type of the second object.

In some examples, first modality data captured from an environment using at least one sensor of a first type of sensors may be received (for example, from memory, from an external device, from the at least one sensor of the first type of sensors, and so forth). Further, second modality data captured from the environment using at least one sensor of a second type of sensors may be received (for example, from memory, from an external device, from the at least one sensor of the second type of sensors, and so forth). The second type of sensors may differ from the first type of sensors. The first modality data may be analyzed to detect the plurality of objects. Synchronization data configured to enable synchronization of the first modality data and the second modality data may be accessed (for example, in a memory, in an external device using a communication link, and so forth). The synchronization data may be used to identify a first portion of the second modality data associated with the first object and/or a second portion of the second modality data associated with the second object. The first portion of the second modality data may be analyzed to determine the indication of the first magnitude associated with the first object. The second portion of the second modality data may be analyzed to determine the indication of the second magnitude associated with the second object. In one example, the first modality data may be image data (such as a series of images, a video, etc.) and the second modality data may be audio data. In one example, the first modality data may be audio data and the second modality data may be image data (such as a series of images, a video, etc.). In one example, the synchronization data may include data configured to correlate different portions of the second modality data to different portions of the first modality data. For example, the synchronization data may correlate the different portions of the first modality data and the different portions of the second modality data to a common timeline.

In some examples, receiving the indication of the plurality of objects may comprise receiving image data, and analyzing the image data to detect the plurality of objects. For example, the image data may include at least one of an image, a series of images, a video and a series of videos. For example, the image data may be analyzed using a visual object detector to detect the plurality of objects. In one example, at least one of the indication of the first magnitude associated with the first object and the indication of the second magnitude associated with the second object may be based on an analysis of the image data. In one example, at least one of the indication of the first magnitude associated with the first object and the indication of the second magnitude associated with the second object may be based on an analysis of audio data.

In some examples, receiving the indication of the plurality of objects may comprise receiving audio data, and analyzing the audio data to detect the plurality of objects. In one example, at least one of the indication of the first magnitude associated with the first object and the indication of the second magnitude associated with the second object may be based on an analysis of the audio data. In one example, at least one of the indication of the first magnitude associated with the first object and the indication of the second magnitude associated with the second object may be based on an analysis of image data.

In some examples, first image data associated with the first object and/or second image data associated with the second object may be received. The first image data may be analyzed to determine the indication of the first magnitude associated with the first object. The second image data may be analyzed to determine the indication of the second magnitude associated with the second object. In one example, the first image data and the second image data may be different. In one example, the first image data and the second image data may be different portions of a video. In one example, a magnitude associated with an object may be based on at least one of a size of an object depicted in the associated image data, a color of a portion of the associated image data, and so forth.

In some examples, first audio data associated with the first object and/or second audio data associated with the second object may be received. The first audio data may be analyzed to determine the indication of the first magnitude associated with the first object. The second audio data may be analyzed to determine the indication of the second magnitude associated with the second object. In one example, the first audio data and the second audio data may be different portions of a single audio stream. In one example, a magnitude associated with an object may be based on at least one of a loudness in the associated audio data, words spoken in the associated audio data, a pitch of voice in the associated audio data, and so forth.

In some examples, a first mathematical object corresponding to the first object in a mathematical space may be determined. A second mathematical object corresponding to the second object in the mathematical space may be determined. In one example, the determination to include the description of the first object in the textual content may be based on the first mathematical object and on the second mathematical object. In one example, the determination not to include any description of the second object in the textual content may be based on the first mathematical object and on the second mathematical object. In one example, the first mathematical object may be used to determine the indication of the first magnitude associated with the first object. In one example, the second mathematical object may be used to determine the indication of the second magnitude associated with the second object. In one example, the first mathematical object may be used to generate the description of the first object.

In some examples, the data associated with the first object may be analyzed to determine a first mathematical object corresponding to the first object in a mathematical space, and the first mathematical object may be used to generate the description of the first object.

In some examples, providing the generated textual content may comprise causing a visual presentation of the generated textual content to a user. In some examples, providing the generated textual content may comprise causing an audio representation of the generated textual content to be provided audibly. In some examples, providing the generated textual content may comprise transmission of the generated textual content to an external device using a digital communication device (for example, over a digital communication network). In some examples, providing the generated textual content may comprise storing the generated textual content in a digital memory accessible by at least one external process.

In some examples, the first object may be associated with a particular portion of a media stream, and providing the generated textual content may comprise providing the generated textual content in a format that associate the description of the first object in the generated textual content with the particular portion of the media stream. For example, the media stream may be a video, and the description of the first object may be provided in one or more captions over the particular portion of the video.

In some examples, the determination to include the description of the first object in the textual content may be further based on a writer persona, the determination not to include any description of the second object in the textual content may be further based on the writer persona, and the generated description of the first object may be in a style associated with the writer persona.

In some examples, the determination to include the description of the first object in the textual content may be further based on a prospective audience of the generated textual content, the determination not to include any description of the second object in the textual content may be further based on the prospective audience, and the generated description of the first object may be in a style selected based on the prospective audience.

In some examples, a first portion of the generated textual content may be provided before an indication of at least one object of the plurality of objects is received, and a second portion of the generated textual content may be provided after the indication of the at least one object of the plurality of objects is received. In one example, the first portion of the generated textual content may include the description of the first object. In another example, the at least one object of the plurality of objects may include the first object, and the second portion of the generated textual content may include the description of the first object.

In some embodiments, textual content may be generated to selectively report objects, for example based on topic.

In some examples, an indication of a plurality of objects may be received, for example as described above. In some examples, an indication of a topic may be received. In some examples, for each object of the plurality of objects, a degree of relevance of the object to the topic may be identified. In some examples, the identified degrees of relevance may be used to select a subset of the plurality of objects. In one example, the selected subset may include some but not all of the plurality of objects. In some examples, for each object in the selected subset, data associated with the object may be analyzed to generate a description of the object, for example as described above. In some examples, textual content may be generated, the generated textual content may include the generated descriptions of the objects in the selected subset and not include any description of any specific object of the plurality of objects that is not included in the selected subset. In some examples, the generated textual content may be provided, for example as described above. In one example, the degrees of relevance may be binary (for example, 'relevant' or 'not-relevant'). In another example, the degrees of relevance may be discrete (for example, 'high', 'medium', 'low' or 'none'). In yet another example, the degrees of relevance may be continuous (for example, a number in a continuous range of numbers).

In some examples, an indication of a topic may be received. For example, the indication of the topic may be read from memory, may be received from an external device, may be received from a user, may be identified by analyzing data (such as image data, audio data, etc.), and so forth.

In some examples, a degree of relevance of the object to the topic may be identified. For example, a regression model may be trained using training examples to identify degrees of relevance of objects to topics, and the trained regression model may be used to identify the degree of relevance of the object to the topic. An example of such training example may include data associated with a sample object and an indication of a sample topic, together with a label corresponding to the degree of relevance of the sample object to the sample topic.

In some examples, textual content may be generated. For example, the generated descriptions of the objects in the selected subset may be inserted into a template to generate the textual content. In another example, a generative model may be used to generate the textual content that includes the generated descriptions of the objects in the selected subset.

In some examples, for each object in the selected subset, the data associated with the object may include image data associated with the object, and the generation of the description of the object may be based on an analysis of the image data associated with the object. For example, a convolution of at least part of the image data may be calculated, in response to a first value of the convolution of the at least part of the image data, a first version of the description of the object may be generated, and in response to a second value of the convolution of the at least part of the image data, a second version of the description of the object may be generated, the second version may differ from the first version.

In some examples, for each object in the selected subset, the data associated with the object may include audio data associated with the object, and the generation of the description of the object may be based on an analysis of the audio data associated with the object. For example, a convolution of at least part of the audio data may be calculated, in response to a first value of the convolution of the at least part of the audio data, a first version of the description of the object may be generated, and in response to a second value of the at least part of the convolution of the audio data, a second version of the description of the object may be generated, the second version may differ from the first version.

In some examples, for at least a particular object in the selected subset, analyzing data associated with the particular object to generate the description of the particular object may include analyzing the data associated with the particular object to select an adjective, and wherein the generated description of the particular object includes the selected adjective. In some examples, for at least a particular object in the selected subset, analyzing data associated with the particular object to generate the description of the particular object may include analyzing the data associated with the particular object to select an adverb, and wherein the generated description of the particular object includes the selected adverb.

In some examples, an event associated with a particular object in the selected subset may be identified, and the generated description of the particular object may include an indication of the event. In one example, the identification of the event associated with the particular object may be based on an analysis of the data associated with the particular object.

In some examples, the selection of the subset of the plurality of objects may be based on a type of each object of the plurality of objects.

In some examples, for each object of the plurality of objects: a mathematical object corresponding to the object in a mathematical space determined, and the mathematical object corresponding to the object may be used to identify the degree of relevance of the object to the topic. In some examples, a mathematical object associated with the topic in the mathematical space may be determined, and for each object of the plurality of objects, the mathematical object corresponding to the object and the mathematical object associated with the topic in the mathematical space may be used to identify the degree of relevance of the object to the topic. In one example, the degree of relevance of the object to the topic may be based on a distance between the mathematical object corresponding to the object and the mathematical object associated with the topic in the mathematical space. In another example, the mathematical object associated with the topic in the mathematical space may include a plurality of other mathematical objects (such as a region, a manifold, a mathematical subspace, etc.), and the degree of relevance of the object to the topic may be based on whether the mathematical object corresponding to the object is included in the mathematical object associated with the topic.

In some examples, each object in the selected subset may be associated with a particular portion of a media stream, and providing the generated textual content may comprise providing the generated textual content in a format that associate the description of the object in the generated textual content with the particular portion of the media stream associated with the object. For example, the media stream may be a video, and the description of an object may be provided in one or more captions over the particular portion of the video associated with the object.

In some examples, the selection of the subset of the plurality of objects may be based on a writer persona, and for each object in the selected subset, the generated description of the object may be in a style associated with the writer persona.

In some examples, the topic may be selected based on a writer persona, and for each object in the selected subset, the generated description of the object is in a style associated with the writer persona.

In some examples, the selection of the subset of the plurality of objects may be based on a prospective audience of the generated textual content, and for each object in the selected subset, the generated description of the object may be in a style selected based on the prospective audience.

In some examples, the topic may be selected based on a prospective audience, and for each object in the selected subset, the generated description of the object may be in a style associated with the prospective audience.

In some examples, generating the textual content may include selecting an order for the objects in the selected subset in the generated textual content.

In some examples, generating the textual content may include selecting a conjunction for a pair of first and second objects of the selected subset, and the generated textual content may include: the generated description of the first object, followed by the selected conjunction, followed by the generated description of the second object.

In some examples, a first portion of the generated textual content may be provided before an indication of at least one object of the plurality of objects is received, and a second portion of the generated textual content may be provided after the indication of the at least one object of the plurality of objects is received. In one example, the first portion of the generated textual content may include a generated descriptions of a first object in the selected subset, and the selected subset may include the at least one object of the plurality of objects. In one example, the first portion of the generated textual content may include a generated descriptions of a first object in the selected subset, and the second portion of the generated textual content may include a generated description of the at least one object of the plurality of objects.

In some embodiments, textual content reporting objects in a selected order may be generated.

In some examples, an indication of a plurality of objects may be received, for example as described above. For each object of the plurality of objects, data associated with the object may be analyzed to generate a description of the object, for example as described above. An order for the plurality of objects in a generated textual content may be selected. The textual content may be generated. The textual content may include the generated descriptions of the plurality of objects arranged based on the selected order. The generated textual content may be provided, for example as described above.

In some examples, an order for the plurality of objects in a generated textual content may be selected. For example, a ranking mechanism (such as machine-learning ranking algorithms) may be used to select the order. In another example, the order may be selected by user input.

In some examples, the textual content may be generated, and the generated textual content may include the generated descriptions of the plurality of objects arranged based on the selected order. For example, the descriptions of the objects may be inserted to a template according to the selected order to generate the textual content. In another example, a generative model may be used to generate the textual content.

In some examples, the selection of the order for the plurality of objects in the generated textual content may be based on magnitudes associated with the plurality of objects. In one example, the magnitude associated with an object may be obtained as described above. In one example, the plurality of objects may be ordered in a decreasing (or increasing) order of magnitudes.

In some examples, the selection of the order for the plurality of objects in the generated textual content may be based on a topic associated with the generated textual content. For example, in response to a first topic, a first order for the plurality of objects may be selected, and in response to a second topic, a second order for the plurality of objects may be selected, the second order may differ from the first order.

In some examples, the selection of the order for the plurality of objects in the generated textual content may be based on a writer persona. For example, in response to a first writer persona, a first order for the plurality of objects may be selected, and in response to a second writer persona, a second order for the plurality of objects may be selected, the second order may differ from the first order.

In some examples, the selection of the order for the plurality of objects in the generated textual content may be based on a prospective audience. For example, in response to a first prospective audience, a first order for the plurality of objects may be selected, and in response to a second prospective audience, a second order for the plurality of objects may be selected, the second order may differ from the first order.

In some examples, each object of the plurality of objects may correspond to at least a portion of an image data, and the image data may be analyzed to select the order for the plurality of objects in the generated textual content. For example, the at least a portion of the image data may be analyzed to determine a magnitude associated with the object (for example as described above), and the order for the plurality of objects may be selected based on the magnitudes (for example as described above).

In some examples, each object of the plurality of objects may correspond to at least a portion of an audio data, and the audio data may be analyzed to select the order for the plurality of objects in the generated textual content. For example, the at least a portion of the audio data may be analyzed to determine a magnitude associated with the object (for example as described above), and the order for the plurality of objects may be selected based on the magnitudes (for example as described above).

In some examples, the plurality of objects may include a first object and a second object. In one example, according to the order, the first object may precede the second object. In this example, generating the textual content may include selecting a conjunction for the first and the second objects, and the generated textual content includes: the generated description of the first object, followed by the selected conjunction, followed by the generated description of the second object.

In some examples, the plurality of objects may include a first object and a second object. In one example, an indication that the first object holds the second object may be received, and the selection of the order for the plurality of objects in the generated textual content may be based on the first object holding the second object.

In some examples, the plurality of objects may include a first object and a second object. In one example, an indication that the first object contains the second object may be received, and the selection of the order for the plurality of objects in the generated textual content may be based on the first object containing the second object.

In some examples, the plurality of objects may include a first object and a second object. An indication that the first object uses the second object may be received, and the selection of the order for the plurality of objects in the generated textual content may be based on the first object using the second object.

In some examples, the plurality of objects may include a first object and a second object. An indication that the first object affects the second object may be received, and the selection of the order for the plurality of objects in the generated textual content may be based on the first object affecting the second object.

In some examples, the plurality of objects may include a first object and a second object. An indication of a relationship between the first object and the second object may be received, and the selection of the order for the plurality of objects in the generated textual content may be based on the relationship between the first object and the second object.

In some examples, a first portion of the generated textual content may be provided before an indication of at least one object of the plurality of objects is received, and a second portion of the generated textual content may be provided after the indication of the at least one object of the plurality of objects is received. In one example, the first portion of the generated textual content may include the descriptions of one or more objects of the plurality of objects, and the second portion of the generated textual content may include the description of the at least one object of the plurality of objects.

In some embodiments, textual content may be generated to report objects in a particular writer persona.

In some examples, an indication of a plurality of objects may be received, for example as described above. In some examples, an indication of a writer persona may be received, for example as described above. In some examples, for each object of the plurality of objects, data associated with the object may be analyzed and the indication of the writer persona may be used to generate a description of the object in a style associated with the writer persona. In some examples, textual content that includes the generated descriptions of the plurality of objects may be generated, for example as described above. In some examples, the generated textual content may be provided, for example as described above.

In some examples, for each object of the plurality of objects, data associated with the object may be analyzed and the indication of the writer persona may be used to generate a description of the object in a style associated with the writer persona. For example, in response to a first pair of data associated with the object and writer persona, a first description of the object may be generated, and in response to a second pair of data associated with the object and writer persona, a second description of the object may be generated, the second description may differ from the first description.

In some examples, generating the textual content may include selecting an order for the plurality of objects in the generated textual content based on the indication of the writer persona. For example, in response to a first pair of data associated with the object and writer persona, a first description of the object may be generated, and in response to a second pair of data associated with the object and writer persona, a second description of the object may be generated, the second description may differ from the first description.

In some examples, generating the textual content may include selecting a conjunction for a pair of first and second objects of the plurality of objects based on the writer persona. In this example, the generated textual content includes: the generated description of the first object, followed by the selected conjunction, followed by the generated description of the second object. For example, in response to a first writer persona, a first conjunction for the pair of first and second objects may be selected, and in response to a second writer persona, a second conjunction for the pair of first and second objects may be selected, the second conjunction may differ from the first conjunction.

In some examples, the writer persona may be selected based on a prospective audience of the generated textual content, for example as described above. In some examples, the writer persona may be selected based on a topic associated with the generated textual content, for example as described above. In some examples, the writer persona may be selected based on the plurality of objects. For example, in response to a first plurality of objects, a first writer persona may be selected, and in response to a second plurality of objects, a second writer persona may be selected, the second writer persona may differ from the first writer persona. In some examples, the writer persona may be selected based on an analysis of image data associated with at least part of to the plurality of objects, for example as described above. In some examples, the writer persona may be selected based on an analysis of audio data associated with at least part of to the plurality of objects, for example as described above.

In some examples, the plurality of objects are selected from a group of three or more objects based on the writer persona. In one example, the group of three or more objects may include all objects of the plurality of objects. In one example, at least one object of the group of three or more objects is not included in the plurality of objects. In one example, in response to a first writer persona, a first plurality of objects may be selected, and in response to a second writer persona, a second plurality of objects may be selected, the second plurality of events may differ from the first plurality of events.

In some examples, a first portion of the generated textual content may be provided before an indication of at least one object of the plurality of objects is received, and a second portion of the generated textual content may be provided after the indication of the at least one object of the plurality of objects is received. In one example, the first portion of the generated textual content may include the descriptions of one or more objects of the plurality of objects, and the second portion of the generated textual content may include the description of the at least one object of the plurality of objects.

In some embodiments, textual content may be generated to report objects to a particular prospective audience.

In some examples, an indication of a plurality of objects may be received, for example as described above. In some examples, an indication of a prospective audience may be received, for example as described above. In some examples, for each object of the plurality of objects, data associated with the object may be analyzed and the indication of the prospective audience may be used to generate a description of the object in a style selected based on the prospective audience. In some examples, textual content that includes the generated descriptions of the plurality of objects may be generated, for example as described above. In some examples, the generated textual content may be provided, for example as described above.

In some examples, for each object of the plurality of objects, data associated with the object may be analyzed and the indication of the prospective audience may be used to generate a description of the object in a style selected based on the prospective audience. For example, in response to a first pair of data associated with the object and prospective audience, a first description of the object may be generated, and in response to a second pair of data associated with the object and prospective audience, a second description of the object may be generated, the second description may differ from the first description.

In some examples, the prospective audience may be a single person. In some examples, the prospective audience may be a group of at least two people. In some examples, the prospective audience may include at least an automated process configured to analyze the generated textual content.

In some examples, generating the textual content may include selectin an order for the plurality of objects in the generated textual content, for example as described above. For example, generating the textual content may include selecting an order for the plurality of objects in the generated textual content based on the indication of the prospective audience, for example as described above.

In some examples, generating the textual content may include selecting a conjunction for a pair of first and second objects of the plurality of objects based on the prospective audience (for example as described above), and wherein the generated textual content includes: the generated description of the first object, followed by the selected conjunction, followed by the generated description of the second object.

In some examples, the plurality of objects may be selected from a group of three or more objects based on the prospective audience. In one example, the group of three or more objects may include all objects of the plurality of objects. In one example, at least one object of the group of three or more objects is not included in the plurality of objects. In one example, in response to a first prospective audience, a first plurality of objects may be selected, and in response to a second prospective audience, a second plurality of objects may be selected, the second plurality of objects may differ from the first plurality of objects.

In some examples, a first portion of the generated textual content may be provided before an indication of at least one object of the plurality of objects is received, and a second portion of the generated textual content may be provided after the indication of the at least one object of the plurality of objects is received. In one example, the first portion of the generated textual content may include the descriptions of one or more objects of the plurality of objects, and the second portion of the generated textual content may include the description of the at least one object of the plurality of objects.

It will also be understood that the system according to the invention may be a suitably programmed computer, the computer including at least a processing unit and a memory unit. For example, the computer program can be loaded onto the memory unit and can be executed by the processing unit. Likewise, the invention contemplates a computer program being readable by a computer for executing the method of the invention. The invention further contemplates a machine-readable memory tangibly embodying a program of instructions executable by the machine for executing the method of the invention.

What is claimed is:

1. A non-transitory computer readable medium storing a software program comprising data and computer implementable instructions that when executed by at least one processor cause the at least one processor to perform operations for generating a textual content reporting events, the operations comprising:

receiving an indication of an event;

receiving an indication of a group of two or more objects associated with the event;

for each object of the group of two or more objects, receiving respective image data associated with the object;

for each object of the group of two or more objects, analyzing the respective image data to determine a respective number associated with the object, wherein the analysis of the respective image data includes: calculating a convolution of respective pixel values of at least part of the respective image data to obtain a respective result value, and determining the respective number associated with the object based on the respective result value;

calculating a function of the numbers associated with the group of two or more objects to select an adjective;

generating a particular description of the event, the particular description is based on the group of two or more objects, the particular description includes the selected adjective;

generating a textual content, the textual content includes the particular description; and providing the generated textual content.

2. The non-transitory computer readable medium of claim 1, wherein the operations further comprise receiving a video, and wherein for each object of the group of two or more objects, the respective image data associated with the object includes at least one portion of the video.

3. The non-transitory computer readable medium of claim 1, wherein the operations further comprise analyzing the image data associated with the group of two or more objects to select an adverb, and wherein the particular description includes the selected adverb.

4. The non-transitory computer readable medium of claim 1, wherein the particular description includes a description of accumulative data associated with the group of two or more objects and no description of any particular object of the group of two or more objects.

5. The non-transitory computer readable medium of claim 1, wherein the operations further comprise:

receiving first modality data captured from an environment using at least one sensor of a first type of sensors;

receiving second modality data captured from the environment using at least one sensor of a second type of sensors, the second type of sensors differs from the first type of sensors;

analyzing the first modality data to detect the event;

accessing synchronization data configured to enable synchronization of the first modality data and the second modality data;

using the synchronization data to identify at least one portion of the second modality data associated with the event; and analyzing at least part of the second modality data to detect the objects of the group of two or more objects in the at least one portion of the second modality data associated with the event.

6. The non-transitory computer readable medium of claim 1, wherein the operations further comprise:

determining a magnitude associated with the event; and using the determined magnitude associated with the event to select the adjective.

7. The non-transitory computer readable medium of claim 1, wherein the operations further comprise:

for each object of the group of two or more objects, determining a respective mathematical object in a mathematical space based on the received respective image data associated with the object;

analyzing the mathematical objects to determine a particular mathematical object in the mathematical space, the particular mathematical object differs from any mathematical object of the mathematical objects; and using the particular mathematical object to select the adjective.

8. The non-transitory computer readable medium of claim 1, wherein the event is associated with a particular portion of a media stream, and wherein providing the generated textual content comprises providing the generated textual content in a format that associates the particular description in the generated textual content with the particular portion of the media stream.

9. The non-transitory computer readable medium of claim 1, wherein the generated textual content is associated with a writer persona, the selection of the adjective is based on the writer persona, and the particular description is in a style associated with the writer persona, wherein the style includes an affinity to usage of specific words.

10. The non-transitory computer readable medium of claim 1, wherein the generated textual content is associated with a prospective audience, the selection of the adjective is based on the prospective audience, and the particular description is in a style associated with the prospective audience, wherein the style includes an affinity to usage of specific words.

11. The non-transitory computer readable medium of claim 1, wherein the generated textual content is associated with a topic, and the selection of the adjective is based on the topic.

12. The non-transitory computer readable medium of claim 1, wherein the event is a conversation, each object of the group of two or more objects associated with the event is a respective person participating in the conversation, and the adjective is based on the identities of the persons.

13. The non-transitory computer readable medium of claim 1, wherein the event is a road collision, each object of the group of two or more objects associated with the event is a respective vehicle damaged in the road collision associated with a respective degree of damage to the respective vehicle, and the selection of the adjective is based on the degrees of damages to the vehicles.

14. A system for generating a textual content reporting events, the system comprising:

at least one processing unit configured to perform the operations of:

receiving an indication of an event;

receiving an indication of a group of two or more objects associated with the event;

for each object of the group of two or more objects, receiving respective image data associated with the object;

for each object of the group of two or more objects, analyzing the respective image data to determine a respective number associated with the object, wherein the analysis of the respective image data includes; calculating a convolution of respective pixel values of at least part of the respective image data to obtain a respective result value, and determining the respective number associated with the object based on the respective result value;

calculating a function of the numbers associated with the group of two or more objects to select an adjective;

generating a particular description of the event, the particular description is based on the group of two or more objects, the particular description includes the selected adjective;

generating a textual content, the textual content includes the particular description; and providing the generated textual content.

15. A method for generating a textual content reporting events, the method comprising:

receiving an indication of an event;

receiving an indication of a group of two or more objects associated with the event;

for each object of the group of two or more objects, receiving respective image data associated with the object;

for each object of the group of two or more objects, analyzing the respective image data to determine a respective number associated with the object, wherein the analysis of the respective image data includes: calculating a convolution of respective pixel values of at least part of the respective image data to obtain a respective result value, and determining the respective number associated with the object based on the respective result value;

calculating a function of the numbers associated with the group of two or more objects to select an adjective;

generating a particular description of the event, the particular description is based on the group of two or more objects, the particular description includes the selected adjective;

generating a textual content, the textual content includes the particular description; and providing the generated textual content.

16. The non-transitory computer readable medium of claim 1, wherein each object of the group of two or more objects is associated with a respective position in space, and the adjective is based on the positions.

17. The non-transitory computer readable medium of claim 1, wherein each object of the group of two or more objects is associated with a respective point in time, and the adjective is based on the points in time.

18. The non-transitory computer readable medium of claim 1, wherein each object of the group of two or more objects is a respective person, and wherein for each object of the group of two or more objects, the respective number associated with the object is a respective age of the person.

19. The non-transitory computer readable medium of claim 1, wherein for each object of the group of two or more objects, the respective number associated with the object is a respective money amount.

20. The non-transitory computer readable medium of claim 1, wherein for each object of the group of two or more objects, the respective number associated with the object is a respective weight of the object.

21. The non-transitory computer readable medium of claim 1, wherein the function is a non-linear function, and wherein, for each object of the group of two or more objects, the convolution is one of a two dimensional convolution, a three dimensional convolution, or a four dimensional convolution.

* * * * *